US012405766B2

(12) United States Patent
Lindholm et al.

(10) Patent No.: US 12,405,766 B2
(45) Date of Patent: Sep. 2, 2025

(54) USER INTERFACES FOR CONTENT APPLICATIONS

(71) Applicant: Apple Inc., Cupertino, CA (US)

(72) Inventors: Erik Lindholm, San Francisco, CA (US); Drew R. Domm, Oakland, CA (US); Adam Silver, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/319,939

(22) Filed: May 18, 2023

(65) Prior Publication Data

US 2023/0305799 A1 Sep. 28, 2023

Related U.S. Application Data

(63) Continuation of application No. 16/584,715, filed on Sep. 26, 2019, now Pat. No. 11,675,563.

(60) Provisional application No. 62/856,012, filed on Jun. 1, 2019.

(51) Int. Cl.

| | |
|---|---|
| ***G06F 3/16*** | (2006.01) |
| ***G06F 3/0481*** | (2022.01) |
| ***G06F 3/04847*** | (2022.01) |
| ***G06F 3/0485*** | (2022.01) |

(52) U.S. Cl.

CPC ............ *G06F 3/165* (2013.01); *G06F 3/0481* (2013.01); *G06F 3/04847* (2013.01); *G06F 3/0485* (2013.01); *G10H 2220/011* (2013.01)

(58) Field of Classification Search

CPC .... G06F 3/165; G06F 3/0481; G06F 3/04847; G06F 3/0485; G06F 3/167; G06F 3/0488; G06F 3/04883; G10H 2220/011; G10H 2220/096; G10H 2220/106; G10H 2240/131; G10H 2240/325; G10H 1/368; G10H 1/0008

See application file for complete search history.

(56) References Cited

U.S. PATENT DOCUMENTS

| | | | |
|---|---|---|---|
| 5,613,909 | A | 3/1997 | Stelovsky |
| 6,323,846 | B1 | 11/2001 | Westerman et al. |
| 6,357,042 | B2 | 3/2002 | Srinivasan et al. |
| 6,570,557 | B1 | 5/2003 | Westerman et al. |
| 6,677,932 | B1 | 1/2004 | Westerman |

(Continued)

FOREIGN PATENT DOCUMENTS

| | | | |
|---|---|---|---|
| CN | 102014081 | A | 4/2011 |
| CN | 103593142 | A | 2/2014 |

(Continued)

OTHER PUBLICATIONS

Examiner's Answer to Appeal Brief received for U.S. Appl. No. 16/584,715, mailed on Apr. 29, 2022, 33 pages.

(Continued)

*Primary Examiner* — Andrey Belousov

(74) *Attorney, Agent, or Firm* — Kubota & Basol LLP

(57) ABSTRACT

In some embodiments, an electronic device displays time-synced lyrics of content items playing on an electronic device. In some embodiments, an electronic device displays representations of content items in a playback sequence on an electronic device. In some embodiments, an electronic device shares an item of content with another user account of another electronic device.

24 Claims, 121 Drawing Sheets

(56) References Cited

U.S. PATENT DOCUMENTS

| | | | |
|---|---|---|---|
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,689,920 B2 | 3/2010 | Robbin et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,199,160 B2 | 6/2012 | Hauke | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,433,431 B1 | 4/2013 | Master et al. | |
| 8,479,122 B2 | 7/2013 | Hotelling et al. | |
| 8,601,372 B1 | 12/2013 | Gentile et al. | |
| 9,002,410 B2 | 4/2015 | Tsui et al. | |
| 9,176,658 B1 * | 11/2015 | Latin-Stoermer | G06F 3/04847 |
| 9,280,905 B2 | 3/2016 | Campiranon et al. | |
| 9,348,458 B2 | 5/2016 | Hotelling et al. | |
| 9,933,937 B2 | 4/2018 | Lemay et al. | |
| 9,977,584 B2 | 5/2018 | Latin-stoermer et al. | |
| 10,678,427 B2 | 6/2020 | Xu | |
| 2002/0015024 A1 | 2/2002 | Westerman et al. | |
| 2004/0205334 A1 | 10/2004 | Rennels | |
| 2004/0266337 A1 | 12/2004 | Radcliffe et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2007/0204288 A1 | 8/2007 | Candelore | |
| 2008/0163283 A1 | 7/2008 | Tan et al. | |
| 2008/0184870 A1 | 8/2008 | Toivola | |
| 2009/0083281 A1 | 3/2009 | Sarig et al. | |
| 2009/0153288 A1 | 6/2009 | Hope et al. | |
| 2009/0177966 A1 | 7/2009 | Chaudhri | |
| 2009/0228544 A1 | 9/2009 | Demers et al. | |
| 2010/0251121 A1 | 9/2010 | Rosser et al. | |
| 2011/0137920 A1 | 6/2011 | Cohen et al. | |
| 2011/0276333 A1 | 11/2011 | Wang et al. | |
| 2012/0033948 A1 | 2/2012 | Rodriguez et al. | |
| 2012/0047437 A1 | 2/2012 | Chan | |
| 2012/0079384 A1 | 3/2012 | Chuang | |
| 2012/0221975 A1 | 8/2012 | Juristovski et al. | |
| 2012/0304111 A1 | 11/2012 | Queru | |
| 2013/0132904 A1 * | 5/2013 | Primiani | G06F 3/0482 715/834 |
| 2013/0269019 A1 | 10/2013 | Garmark et al. | |
| 2013/0275506 A1 | 10/2013 | Warner | |
| 2013/0297697 A1 * | 11/2013 | Haimovitch | H04L 67/55 709/204 |
| 2015/0339787 A1 * | 11/2015 | Evans | G06K 19/06009 705/311 |
| 2016/0011761 A1 | 1/2016 | Latin-stoermer et al. | |
| 2016/0255025 A1 | 9/2016 | Valverde et al. | |
| 2017/0068402 A1 | 3/2017 | Lochhead et al. | |
| 2017/0083214 A1 | 3/2017 | Furesjöet al. | |
| 2017/0093943 A1 | 3/2017 | Alsina et al. | |
| 2017/0357421 A1 | 12/2017 | Dye et al. | |
| 2018/0088896 A1 | 3/2018 | Olson | |
| 2018/0309636 A1 | 10/2018 | Strom et al. | |
| 2018/0366097 A1 | 12/2018 | Sharp | |
| 2019/0034075 A1 | 1/2019 | Smochko et al. | |
| 2019/0087082 A1 | 3/2019 | Chaudhri et al. | |
| 2019/0172166 A1 | 6/2019 | Evans | |
| 2019/0355337 A1 | 11/2019 | Steinwedel et al. | |
| 2020/0204868 A1 | 6/2020 | Peng et al. | |
| 2020/0356221 A1 | 11/2020 | Behzadi et al. | |
| 2020/0356593 A1 | 11/2020 | Azzinnari et al. | |
| 2020/0379715 A1 | 12/2020 | Won et al. | |
| 2022/0247703 A1 | 8/2022 | Deva et al. | |
| 2022/0248187 A1 | 8/2022 | Reese et al. | |

FOREIGN PATENT DOCUMENTS

| | | |
|---|---|---|
| EP | 2533548 A1 | 12/2012 |
| EP | 3179354 A1 | 6/2017 |
| EP | 3367257 A1 | 8/2018 |
| JP | 2013-45131 A | 3/2013 |
| KR | 10-2015-0054375 A | 5/2015 |
| WO | 2013/169849 A2 | 11/2013 |
| WO | 2014/105276 A1 | 7/2014 |
| WO | 2020/023376 A1 | 1/2020 |

OTHER PUBLICATIONS

Final Office Action received for U.S. Appl. No. 16/584,715, mailed on Jun. 8, 2020, 25 pages.

Final Office Action received for U.S. Appl. No. 16/584,715, mailed on May 17, 2021, 30 pages.

International Search Report received for PCT Patent Application No. PCT/US2020/035465, mailed on Nov. 2, 2020, 6 pages.

International Search Report received for PCT Patent Application No. PCT/US2022/014451, mailed on Apr. 8, 2022, 3 pages.

Looking ahead in the YouTube Player, YouTube Official Blog, Mar. 6, 2012, 5 pages.

Non-Final Office Action received for U.S. Appl. No. 16/584,715, mailed on Feb. 24, 2020, 25 pages.

Non-Final Office Action received for U.S. Appl. No. 16/584,715, mailed on Nov. 24, 2020, 26 pages.

Notice of Allowance received for U.S. Appl. No. 16/584,715, mailed on Feb. 7, 2023, 10 pages.

Patent Board Decision received for U.S. Appl. No. 16/584,715, mailed on Nov. 14, 2022, 11 pages.

Notice of Allowance received for U.S. Appl. No. 17/587,965, mailed on Jan. 26, 2023, 9 pages.

Notice of Allowance received for U.S. Appl. No. 17/657,311, mailed on Feb. 21, 2023, 9 pages.

European Search Report received for European Patent Application No. 20746437.1, mailed on Feb. 16, 2024, 5 pages.

Notice of Allowance received for U.S. Appl. No. 17/587,965, mailed on Jun. 1, 2023, 10 pages.

Search Report received for Chinese Patent Application No. 202111665846.3, mailed on Nov. 1, 2024, 5 Pages (2 Pages of English Translation and 3 Pages of Official Copy).

Office Action received for Chinese Patent Application No. 202111665846.3, mailed on Nov. 1, 2024, 13 Pages (7 Pages of English Translation and 6 Pages of Official Copy).

Office Action received for Chinese Patent Application No. 202111665846.3, mailed on Mar. 6, 2025, 15 pages (9 Pages of English Translation and 6 Pages of Official Copy).

* cited by examiner

Figure 7H:
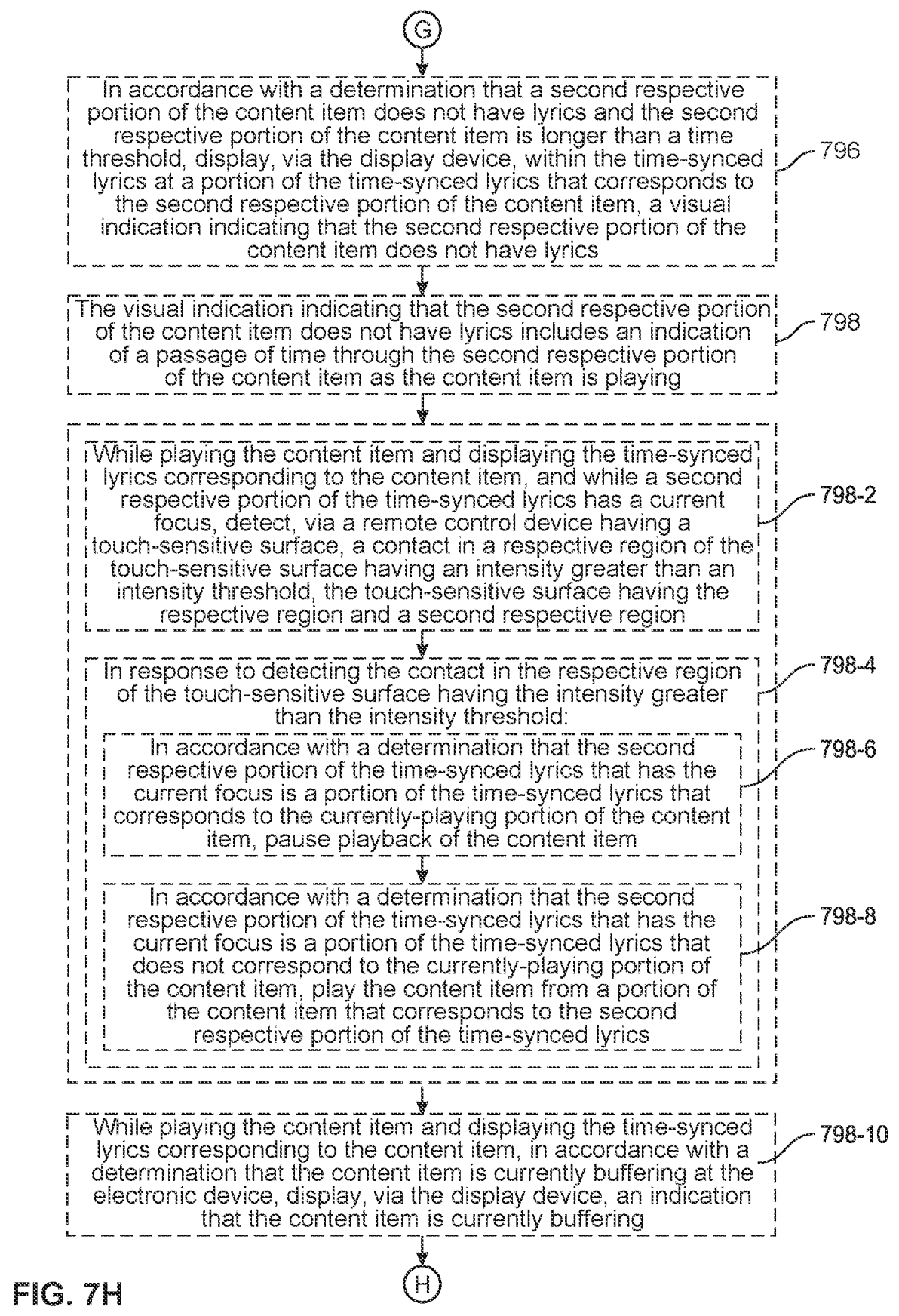

G

In accordance with a determination that a second respective portion of the content item does not have lyrics and the second respective portion of the content item is longer than a time threshold, display, via the display device, within the time-synced lyrics at a portion of the time-synced lyrics that corresponds to the second respective portion of the content item, a visual indication indicating that the second respective portion of the content item does not have lyrics 796

The visual indication indicating that the second respective portion of the content item does not have lyrics includes an indication of a passage of time through the second respective portion of the content item as the content item is playing 798

While playing the content item and displaying the time-synced lyrics corresponding to the content item, and while a second respective portion of the time-synced lyrics has a current focus, detect, via a remote control device having a touch-sensitive surface, a contact in a respective region of the touch-sensitive surface having an intensity greater than an intensity threshold, the touch-sensitive surface having the respective region and a second respective region 798-2

In response to detecting the contact in the respective region of the touch-sensitive surface having the intensity greater than the intensity threshold: 798-4

In accordance with a determination that the second respective portion of the time-synced lyrics that has the current focus is a portion of the time-synced lyrics that corresponds to the currently-playing portion of the content item, pause playback of the content item 798-6

In accordance with a determination that the second respective portion of the time-synced lyrics that has the current focus is a portion of the time-synced lyrics that does not correspond to the currently-playing portion of the content item, play the content item from a portion of the content item that corresponds to the second respective portion of the time-synced lyrics 798-8

While playing the content item and displaying the time-synced lyrics corresponding to the content item, in accordance with a determination that the content item is currently buffering at the electronic device, display, via the display device, an indication that the content item is currently buffering 798-10

USER INTERFACES FOR CONTENT APPLICATIONS

CROSS-REFERENCE TO RELATED APPLICATIONS

This application is a continuation of U.S. patent application Ser. No. 16/584,715 (published as U.S. Publication No. 2020-0379715 on Dec. 3, 2020), filed Sep. 26, 2019, which claims benefit of U.S. Provisional Patent Application No. 62/856,012, filed Jun. 1, 2019, the contents of which are hereby incorporated by reference in their entirety for all purposes.

FIELD OF THE DISCLOSURE

This relates generally to electronic devices that present user interfaces of content applications.

BACKGROUND

User interaction with electronic devices has increased significantly in recent years. These devices can be devices such as computers, tablet computers, televisions, multimedia devices, mobile devices, and the like.

In some circumstances, users wish to view information about content playing on an electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to displaying time-synced lyrics of content items playing on an electronic device. Some embodiments described in this disclosure are directed to displaying representations of content items in a playback sequence on an electronic device. Some embodiments described in this disclosure are directed to sharing an item of content with another user account of another electronic device.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 6A-600 illustrate exemplary ways in which an electronic device presents time-synced lyrics of a content item in accordance with some embodiments.

FIGS. 7A-7K are flow diagrams illustrating a method of presenting time-synced lyrics of a content item in accordance with some embodiments.

DETAILED DESCRIPTION

Figure 1A:
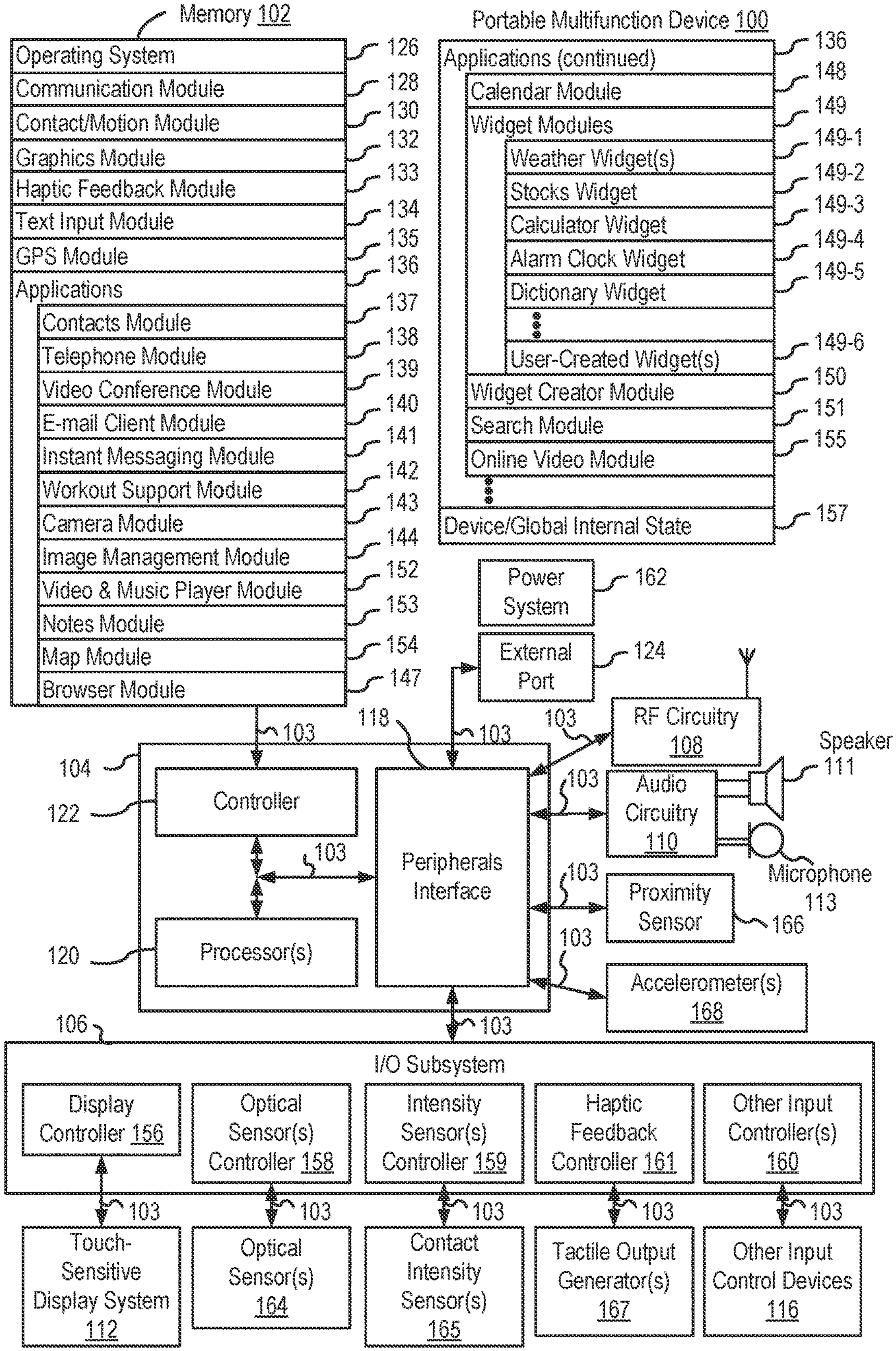
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that play items of content. There is also a need for electronic devices that display information about content playing on the electronic device. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
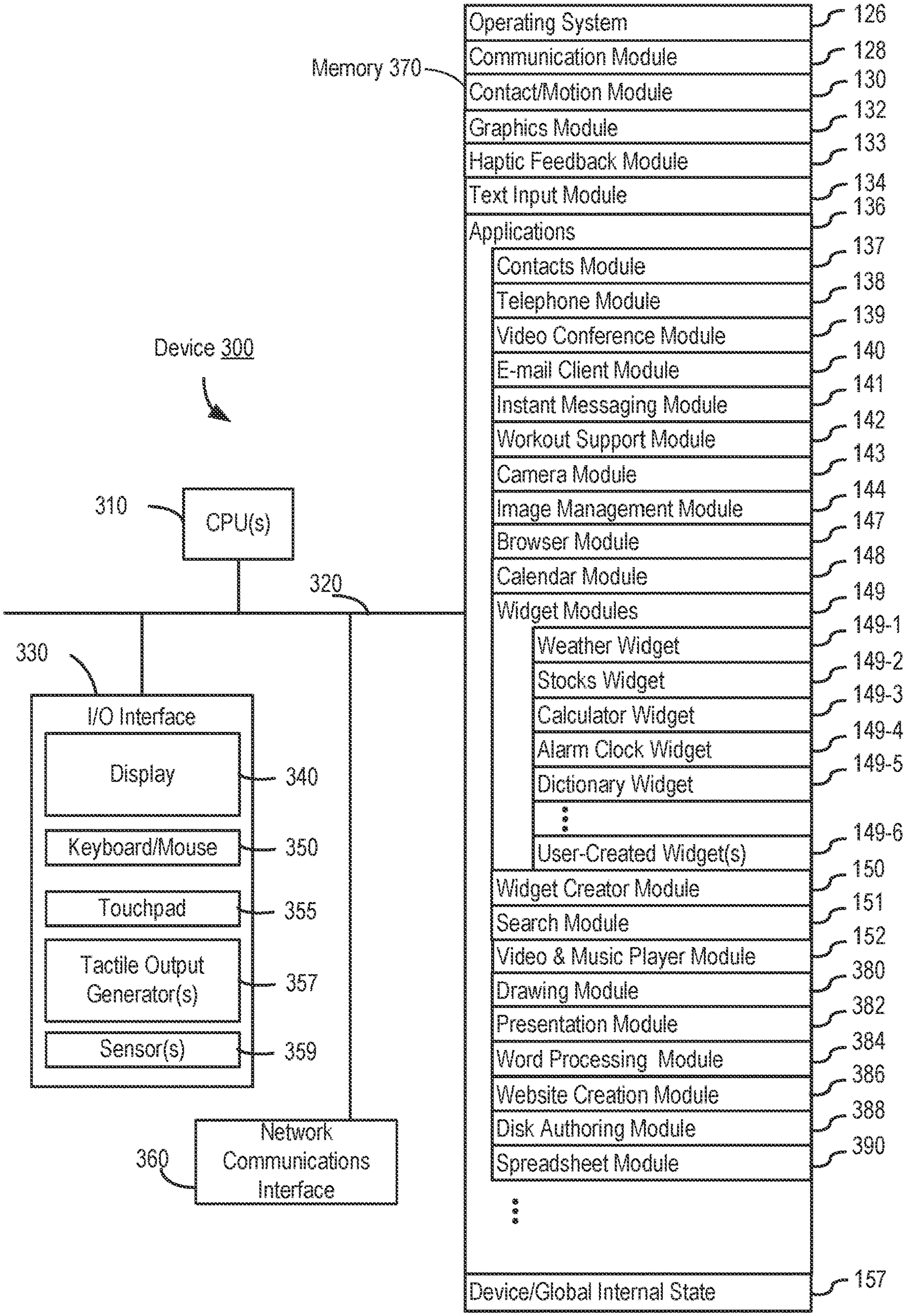
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
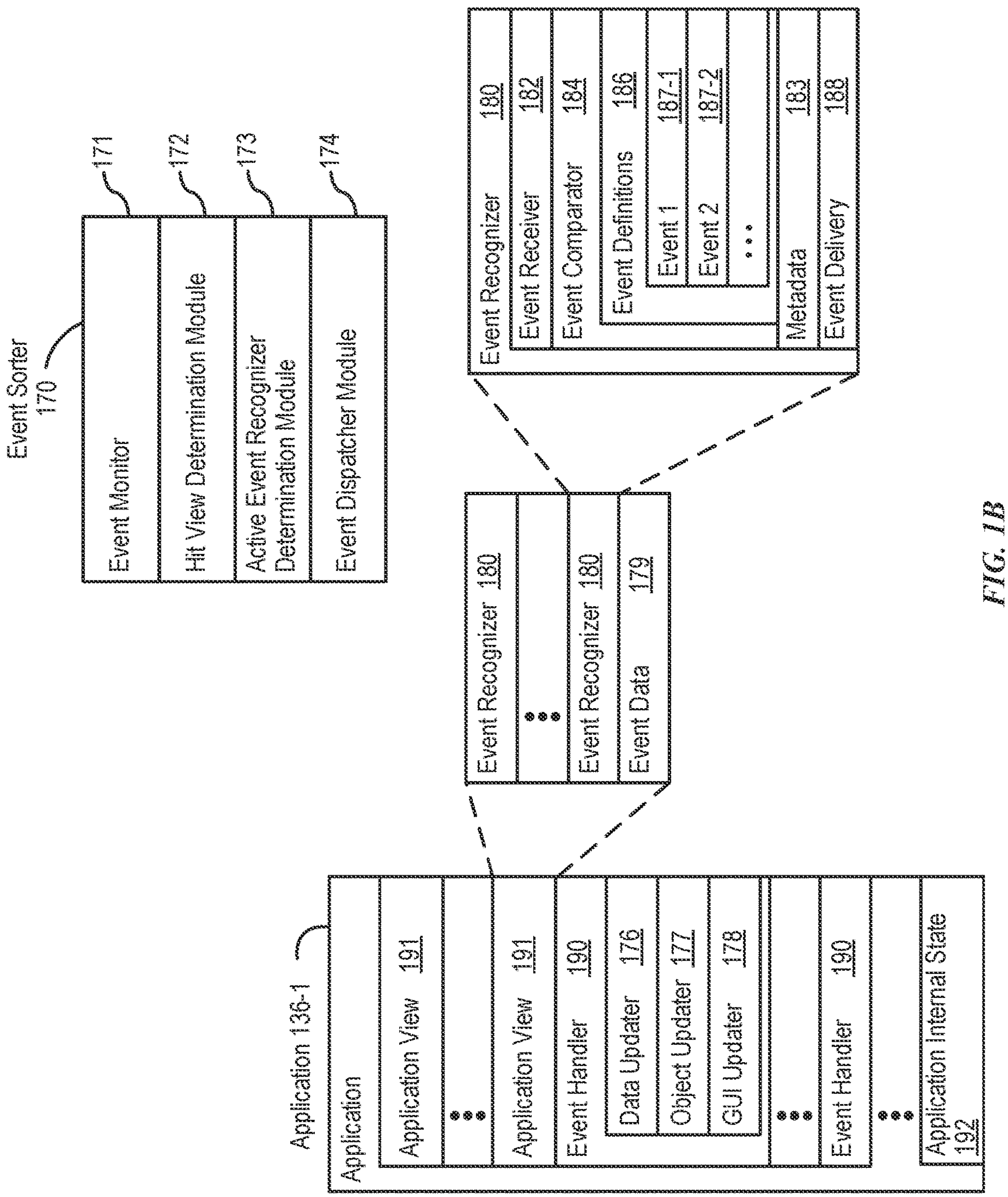
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
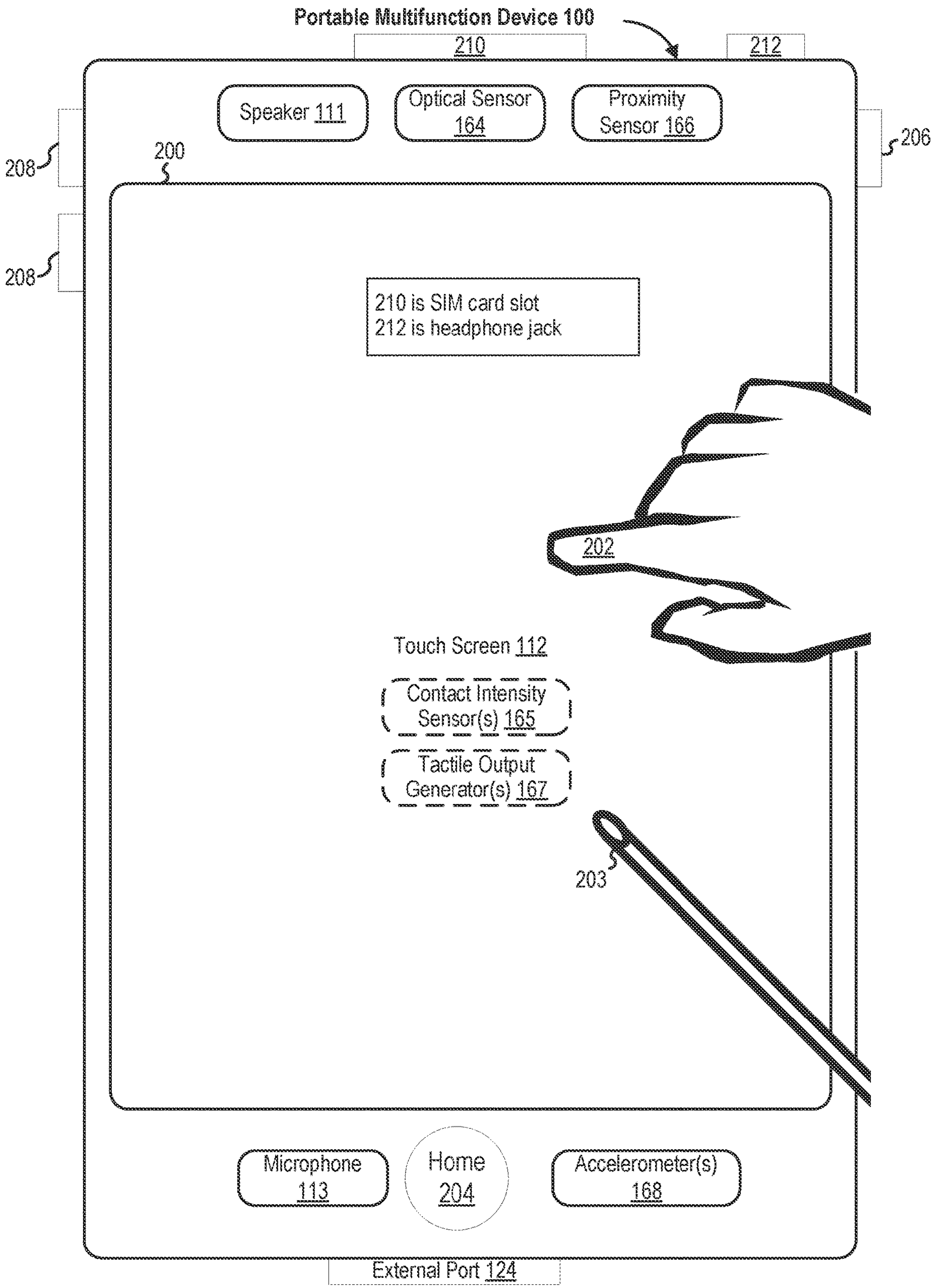
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
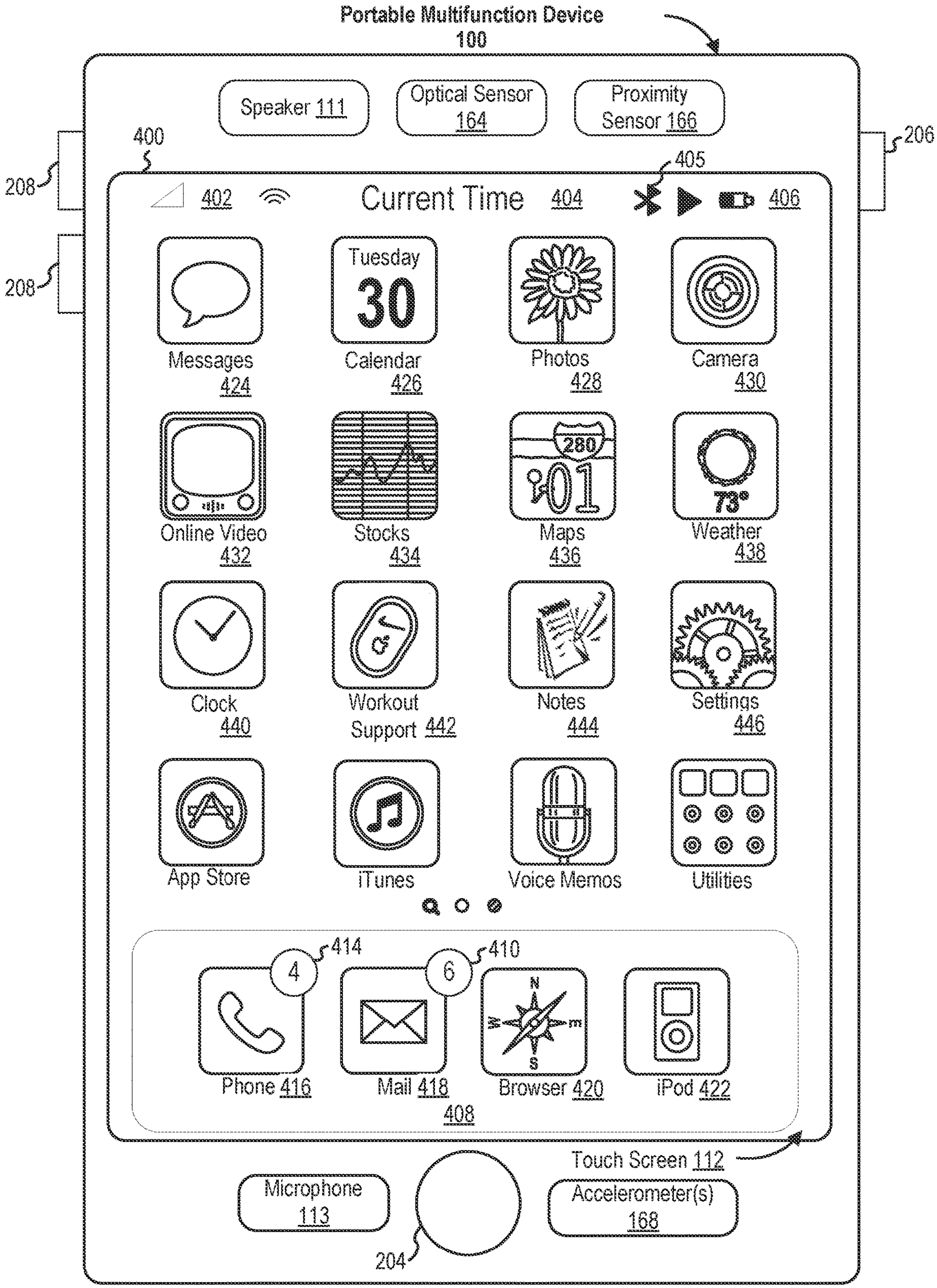
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
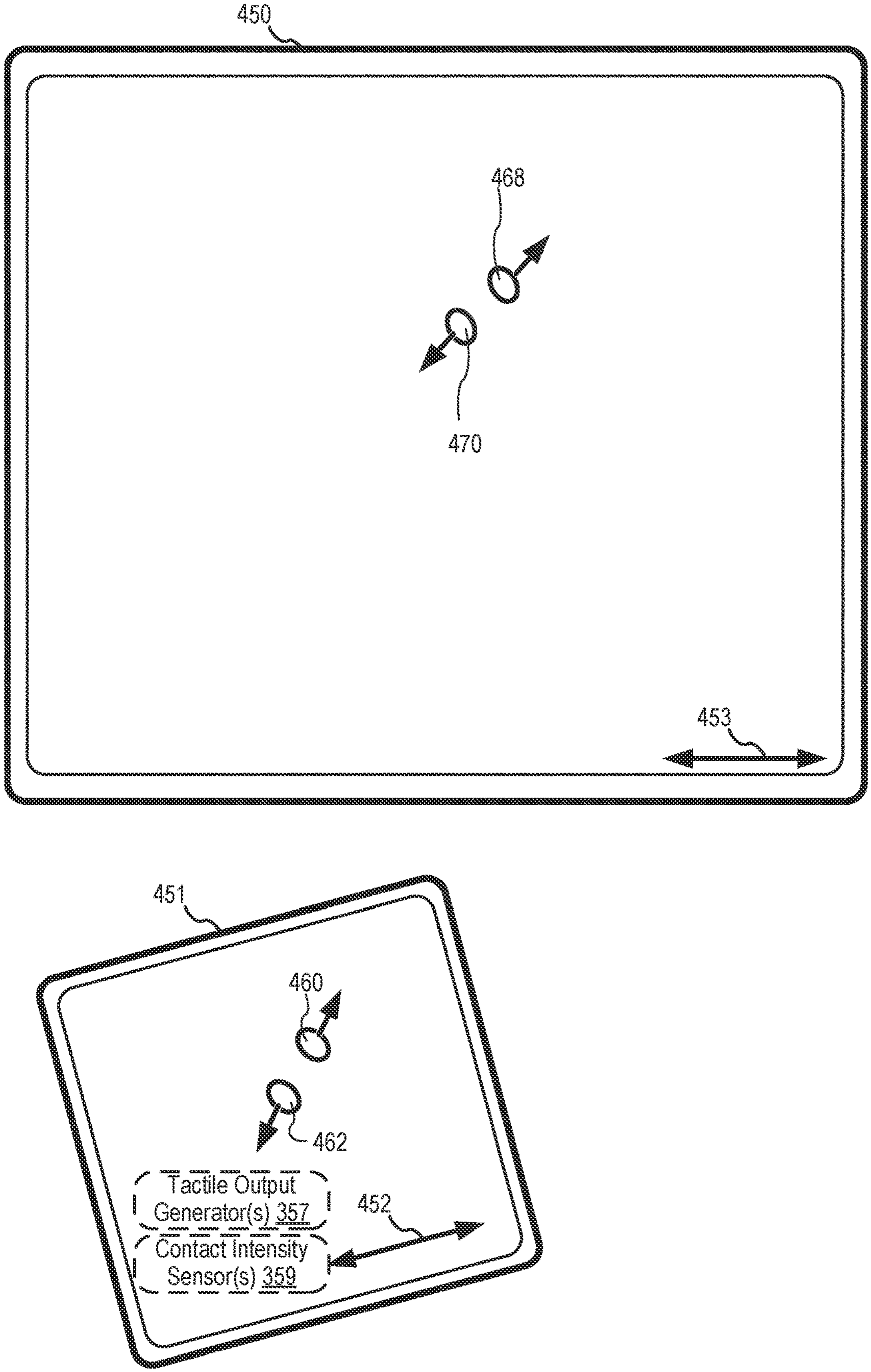
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
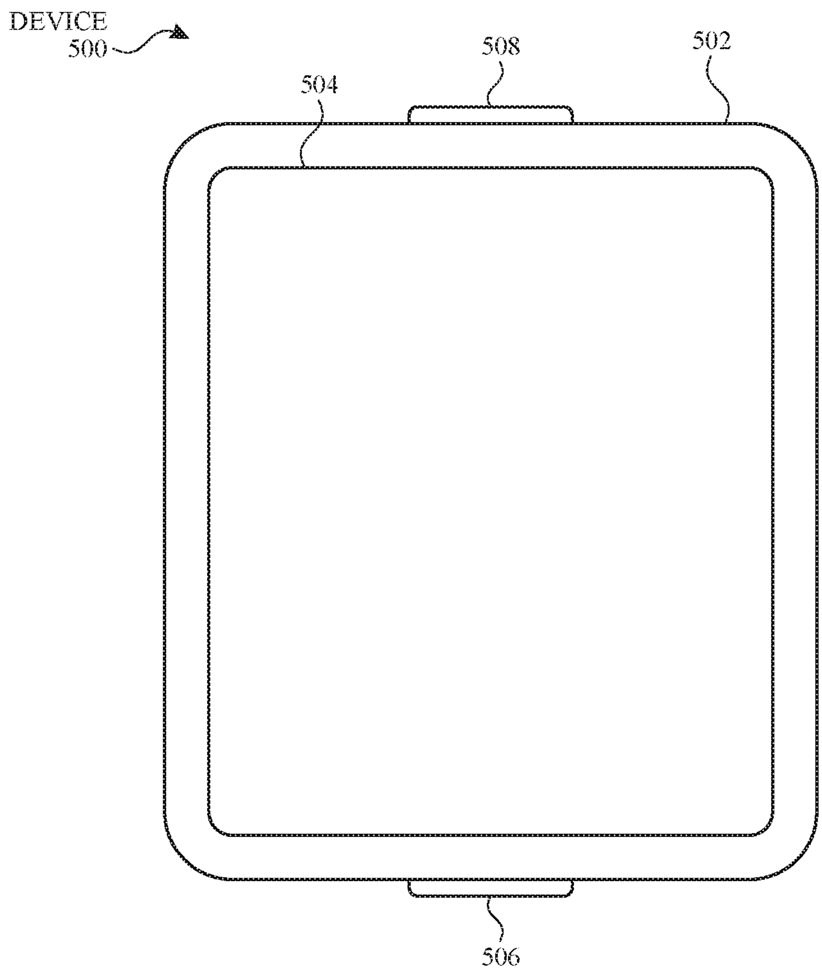
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
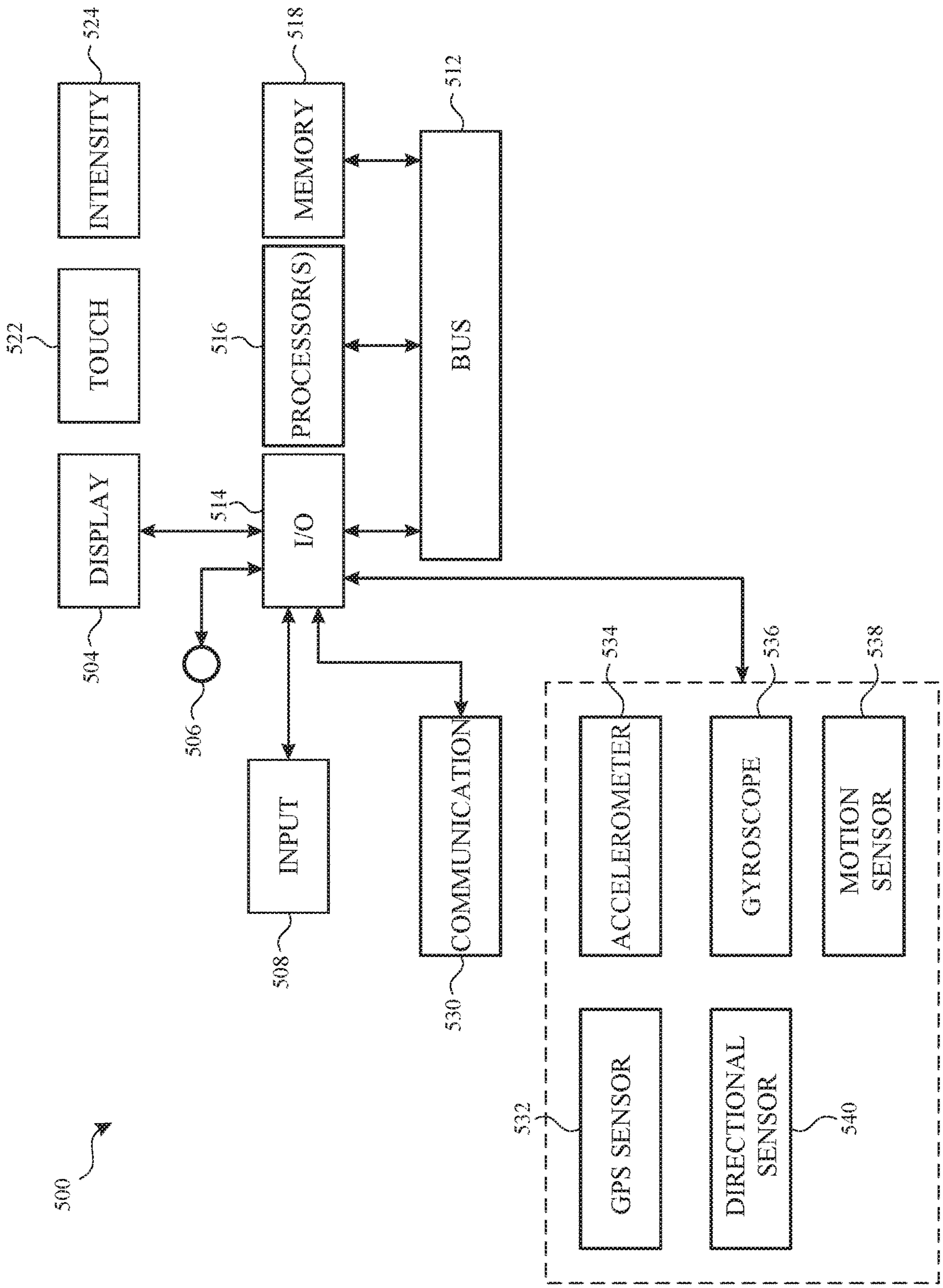
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
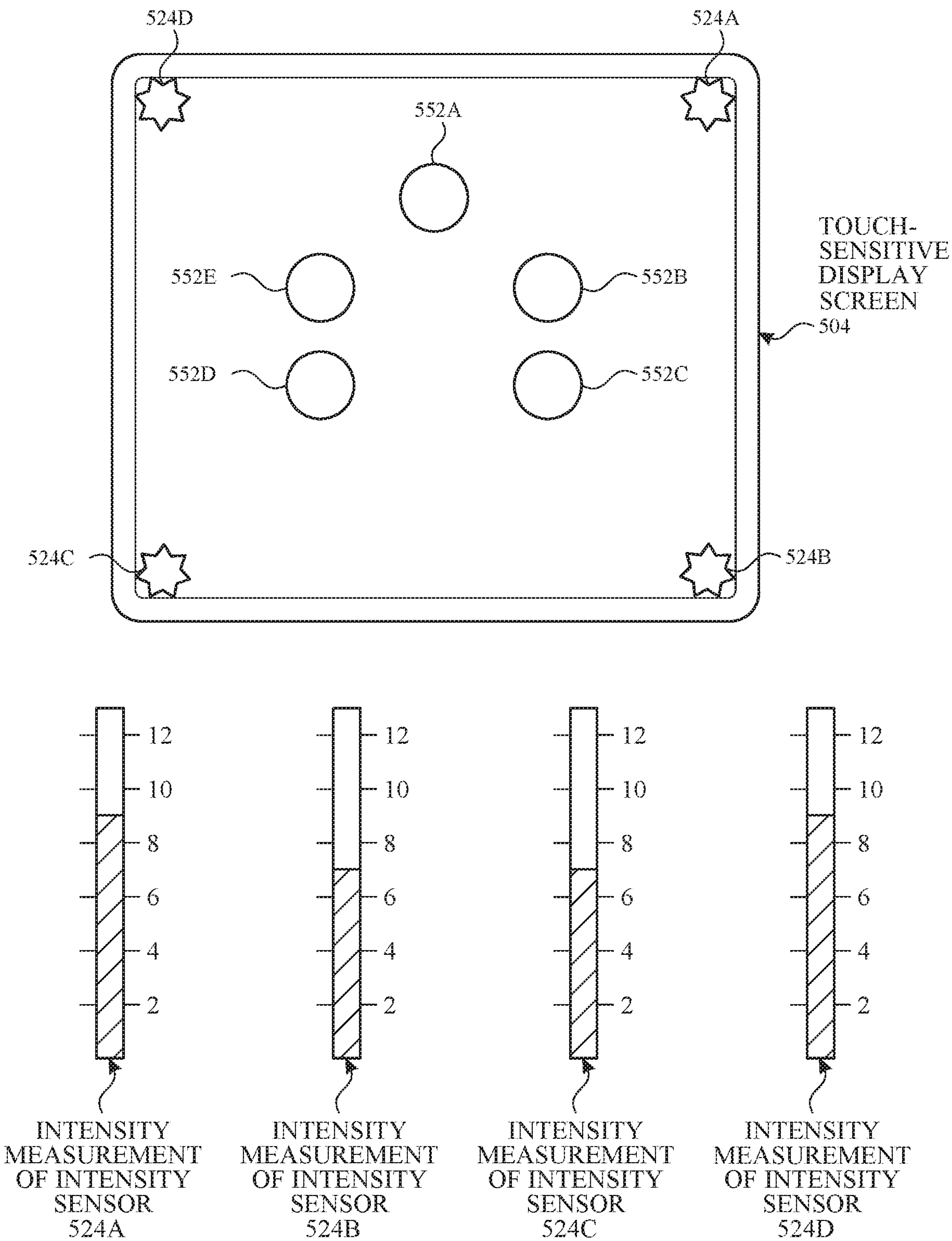
FIGS. 5C-5D illustrate exemplary components of a personal electronic device having a touch-sensitive display and intensity sensors in accordance with some embodiments.
Figure 5D:
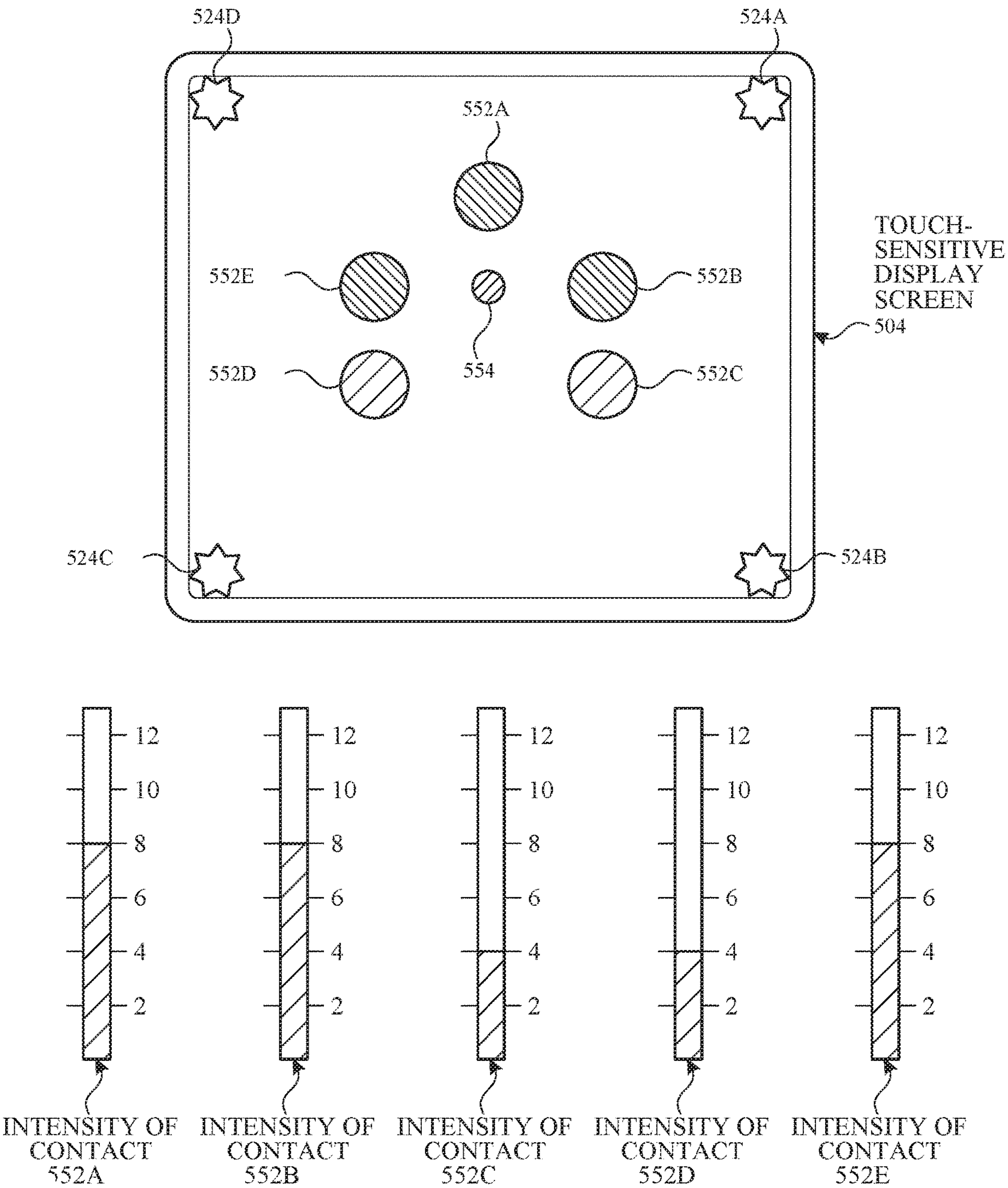

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input.

An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
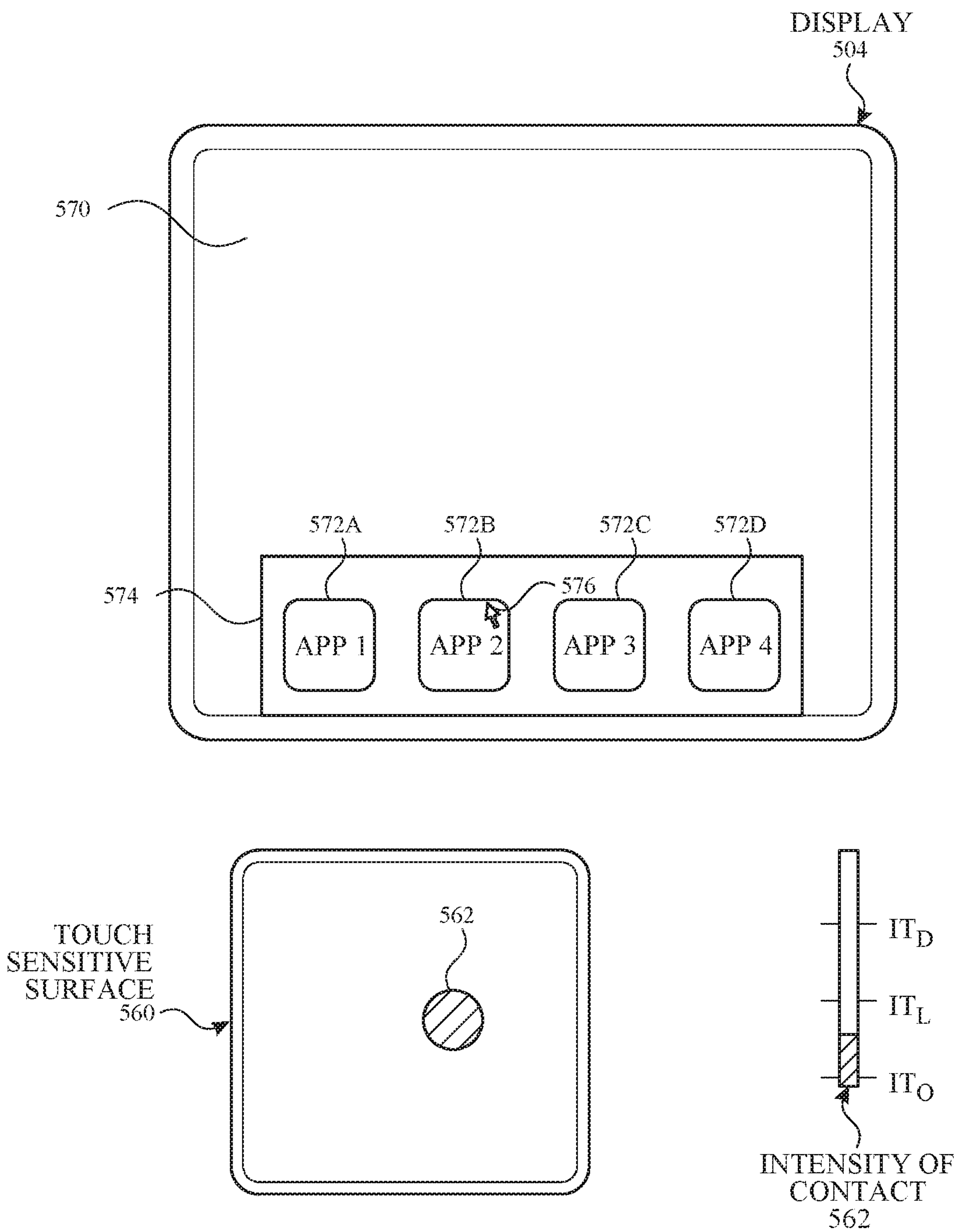
FIGS. 5E-5H illustrate exemplary components and user interfaces of a personal electronic device in accordance with some embodiments.
Figure 5F:
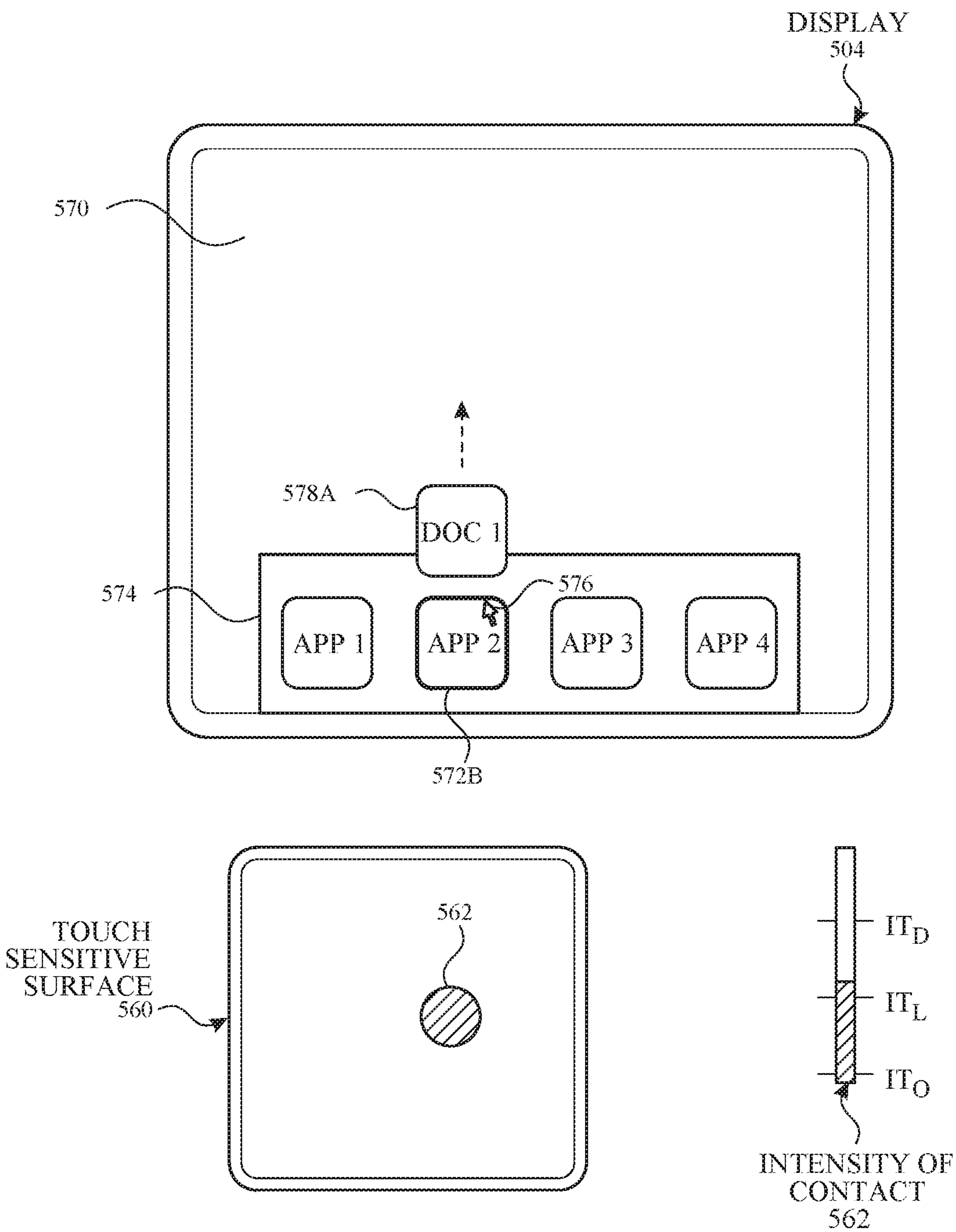
Figure 5G:
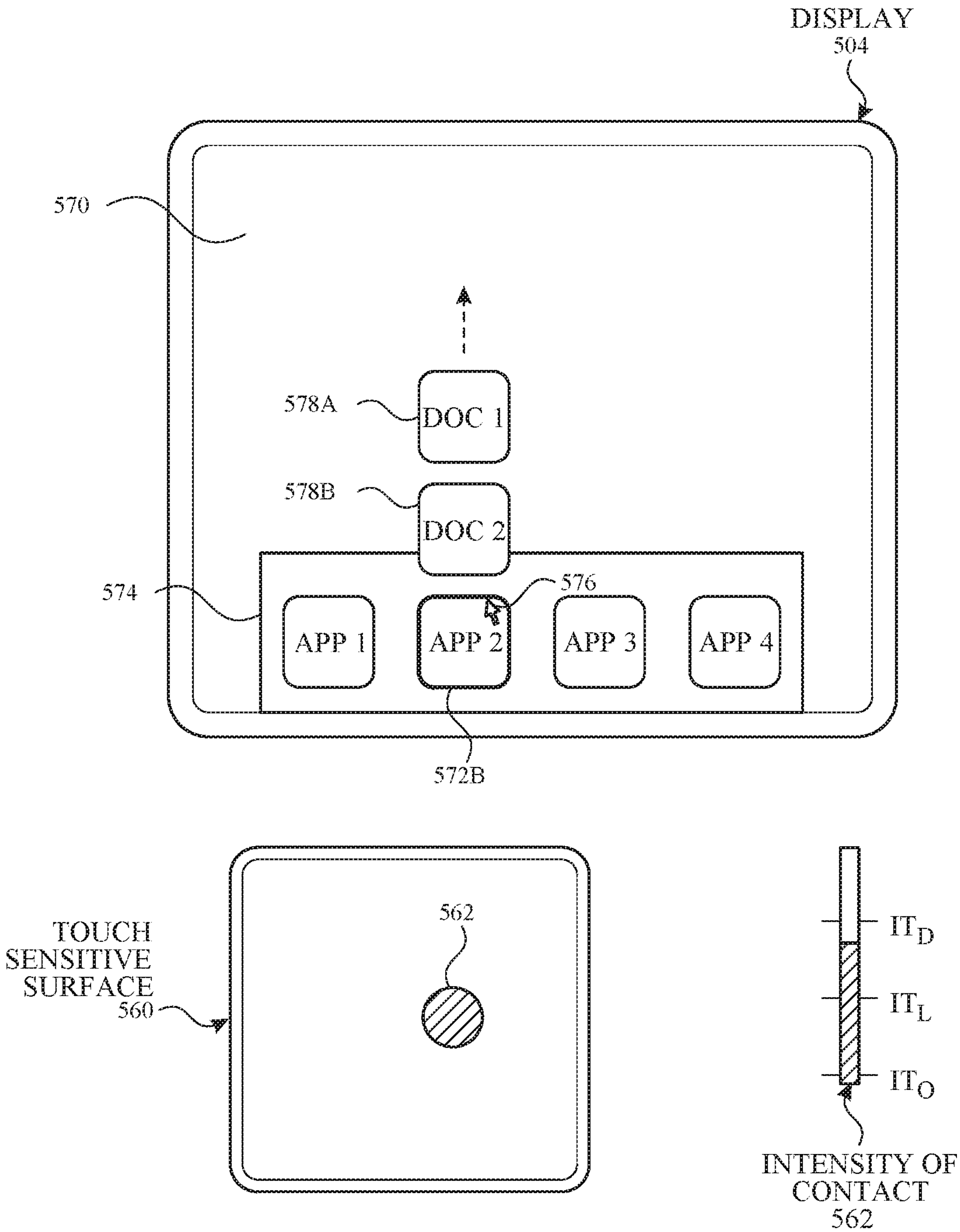
Figure 5H:
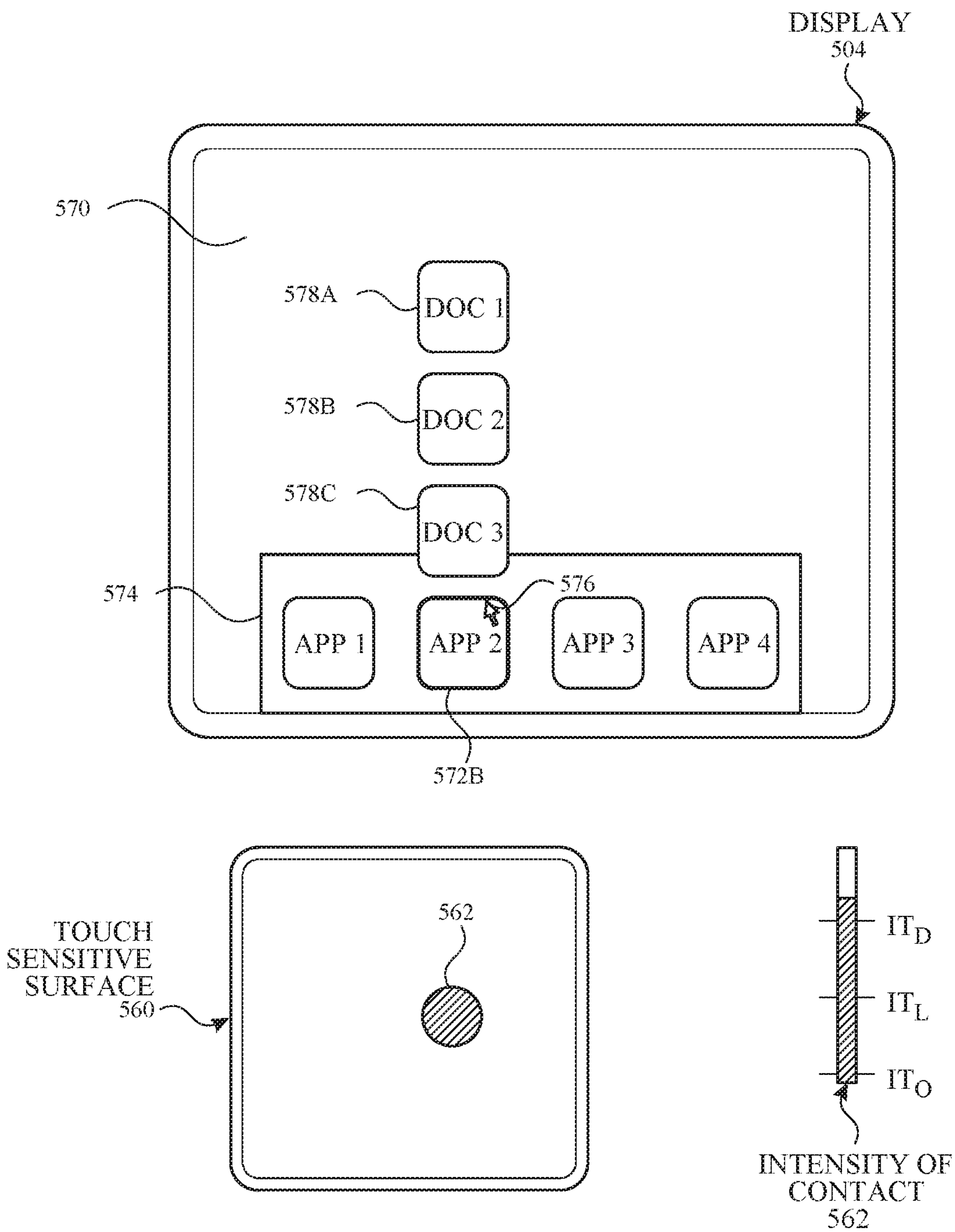

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
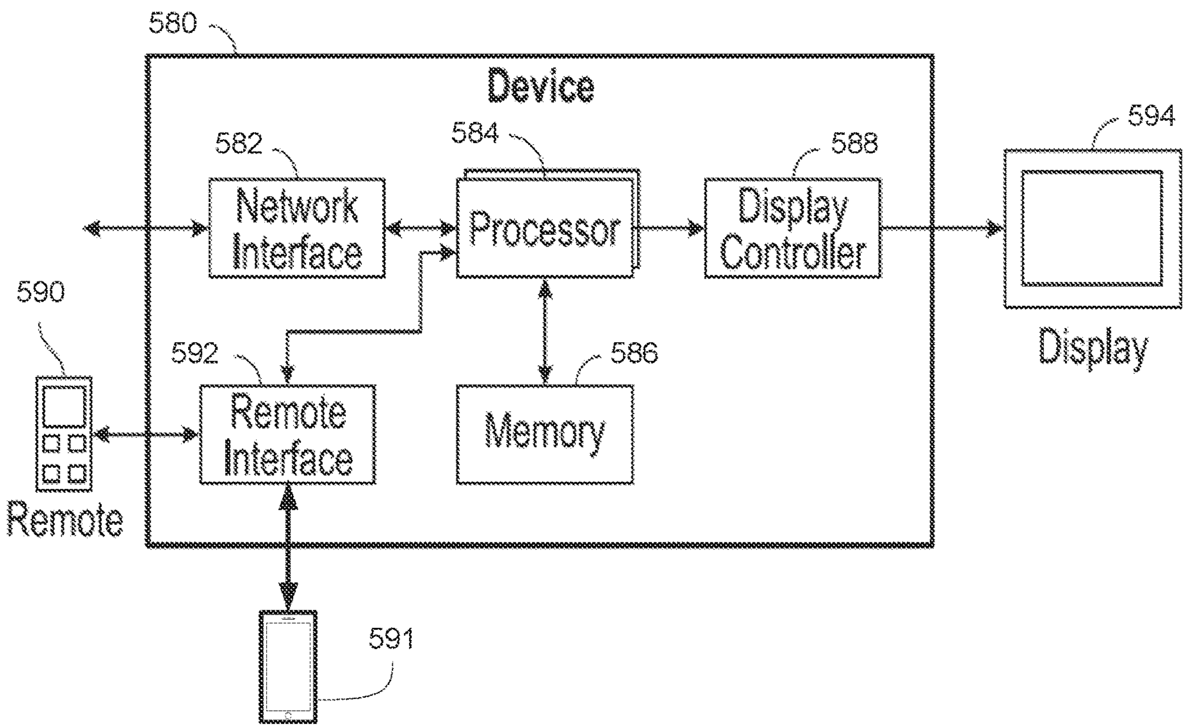
FIGS. 5I-5J illustrate block diagrams of exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, and 1100).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

Figure 5J:
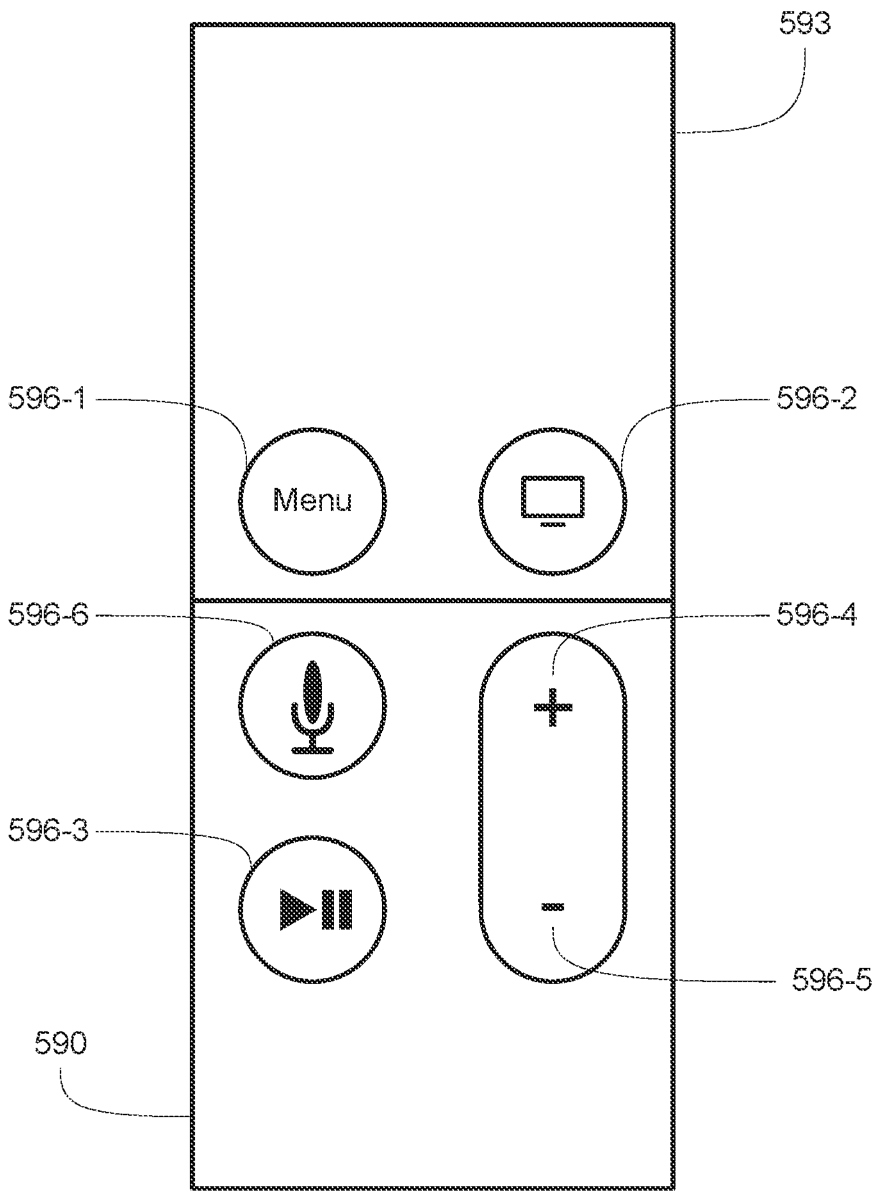

FIG. 5J illustrates an exemplary structure for remote 590 according to some embodiments of the disclosure. In some embodiments, remote 590 optionally corresponds to one or more of multifunction device 100 in FIGS. 1A and 2, device 300 in FIG. 3, and device 500 in FIG. 5A. Remote 590 optionally includes touch-sensitive surface 593, similar to touch-sensitive surface 451 in FIG. 4. In some embodiments, touch-sensitive surface 593 is edge-to-edge (e.g., it extends to the edges of remote 590, such that little or no surface of remote 590 exists between the touch-sensitive surface 593 and one or more edges of remote 590, as illustrated in FIG. 5J). Touch-sensitive surface 593 is optionally able to sense contacts as well as contact intensities (e.g., clicks of touch-sensitive surface 593), as previously described in this disclosure. Further, touch-sensitive surface 593 optionally includes a mechanical actuator for providing physical button click functionality (e.g., touch-sensitive surface 593 is "clickable" to provide corresponding input to device 580). Remote 590 also optionally includes buttons 596-1, 596-2, 596-3, 596-4, 596-5, and 596-6. Buttons 596-1, 596-2, 596-3, 596-4, 596-5, and 596-6 are optionally mechanical buttons or mechanical button alternatives that are able to sense contact with, or depression of, such buttons to initiate corresponding action(s) on, for example, device 580. In some embodiments, selection of "menu" button 596-1 by a user navigates device 580 backwards in a currently-executing application or currently-displayed user interface (e.g., back to a user interface that was displayed previous to the currently-displayed user interface), or navigates device 580 to a one-higher-level user interface than the currently-displayed user interface. In some embodiments, selection of "home" button 596-2 by a user navigates device 580 to a main, home, or root user interface from any user interface that is displayed on device 580 (e.g., to a home screen of device 580 that optionally includes one or more applications accessible on device 580). In some embodiments, selection of the "home" button 596-2 causes the electronic device to navigate to a unified media browsing application. In some embodiments, selection of "play/pause" button 596-3 by a user toggles between playing and pausing a currently-playing content item on device 580 (e.g., if a content item is playing on device 580 when "play/pause" button 596-3 is selected, the content item is optionally paused, and if a content item is paused on device 580 when "play/pause" button 596-3 is selected, the content item is optionally played). In some embodiments, selection of "+" 596-4 or "−" 596-5 buttons by a user increases or decreases, respectively, the volume of audio reproduced by device 580 (e.g., the volume of a content item currently-playing on device 580). In some embodiments, selection of "audio input" button 596-6 by a user allows the user to provide audio input (e.g., voice input) to device 580, optionally, to a voice assistant on the device. In some embodiments, remote 590 includes a microphone via which the user provides audio input to device 580 upon selection of "audio input" button 596-6. In some embodiments, remote 590 includes one or more accelerometers for detecting information about the motion of the remote.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Time-Synced Lyrics User Interfaces

Users interact with electronic devices in many different manners, including using an electronic device to play items of content, such as music, with lyrics. In some embodiments, an electronic device is able to present the lyrics associated with an item of content that is playing on the electronic device. The embodiments described below provide ways in which an electronic device presents time-synced lyrics while playing an item of content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
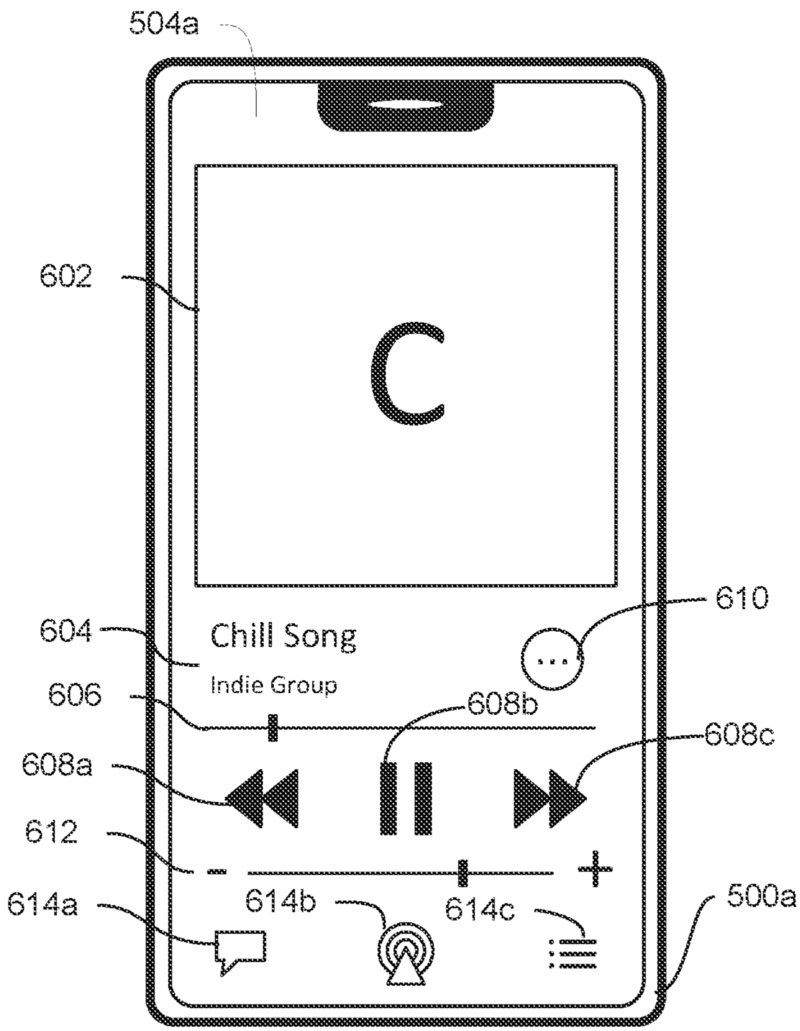
Figure 6B:
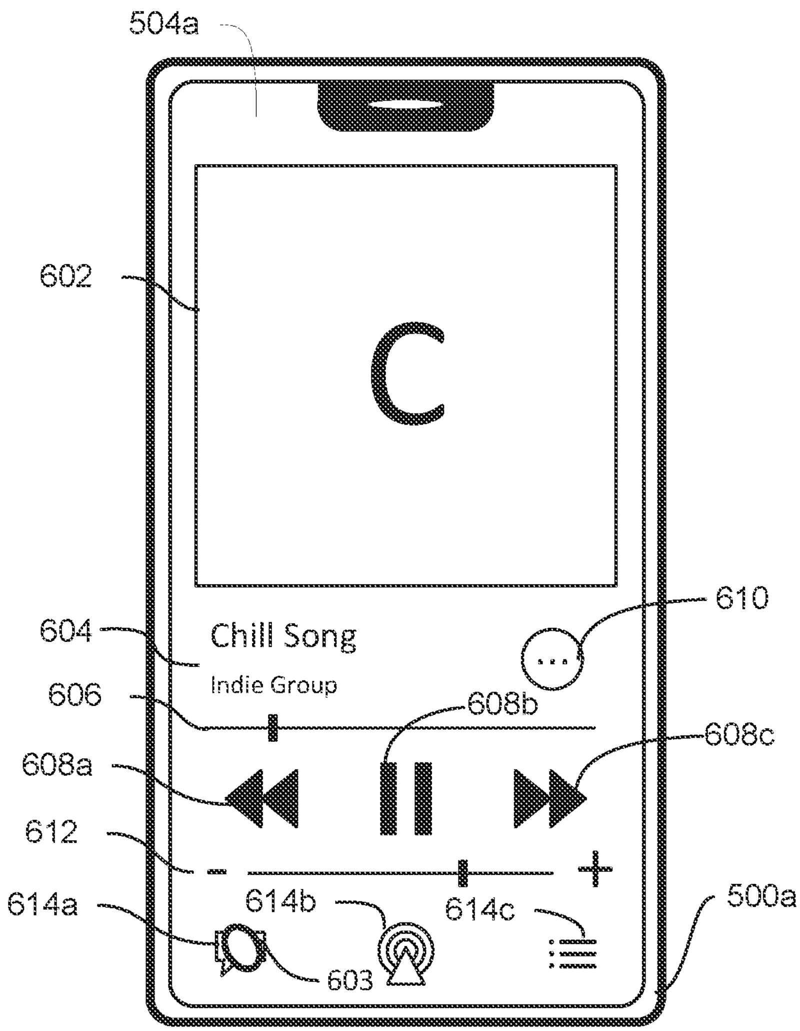
Figure 6C:
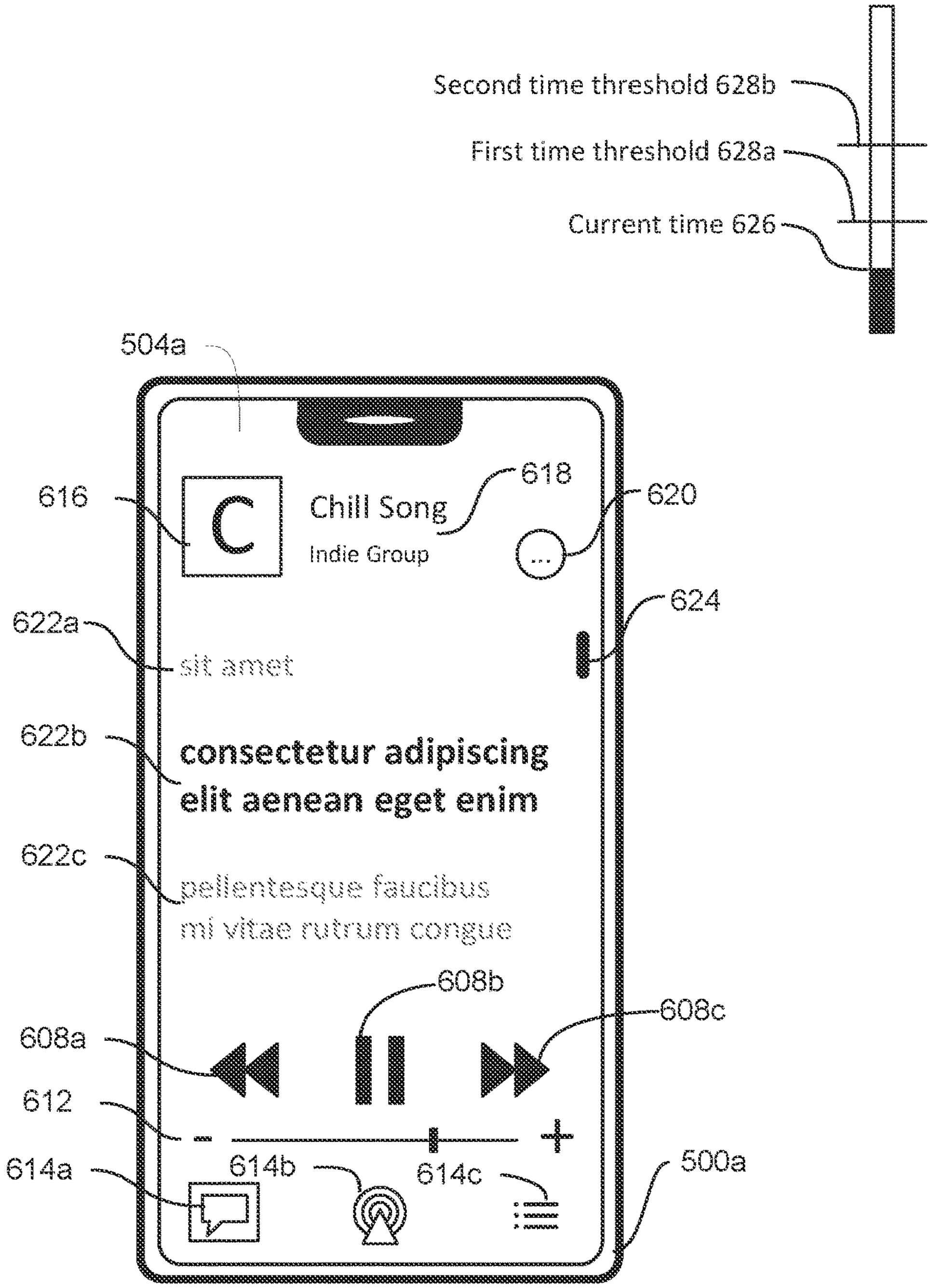
Figure 6D:
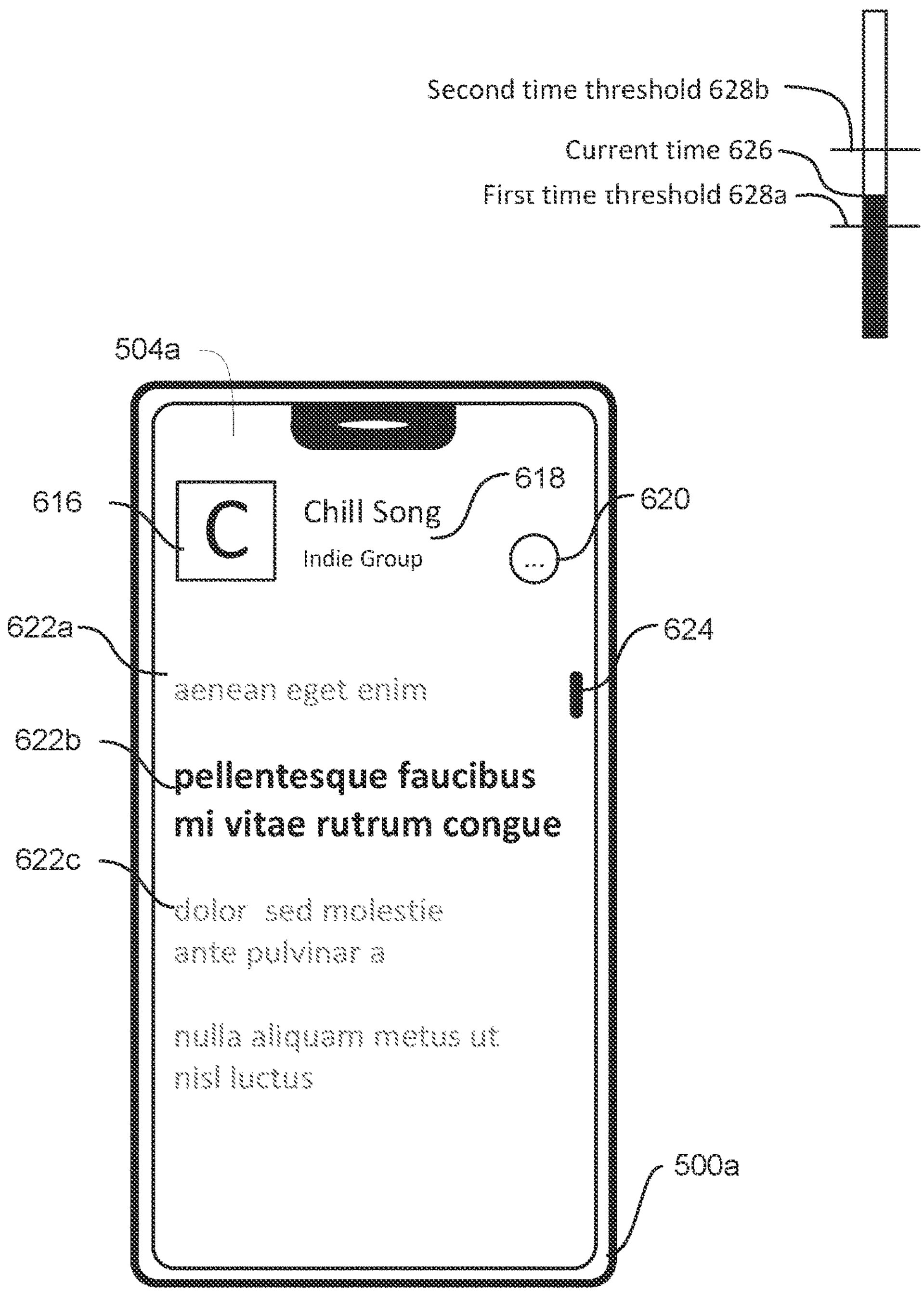
Figure 6E:
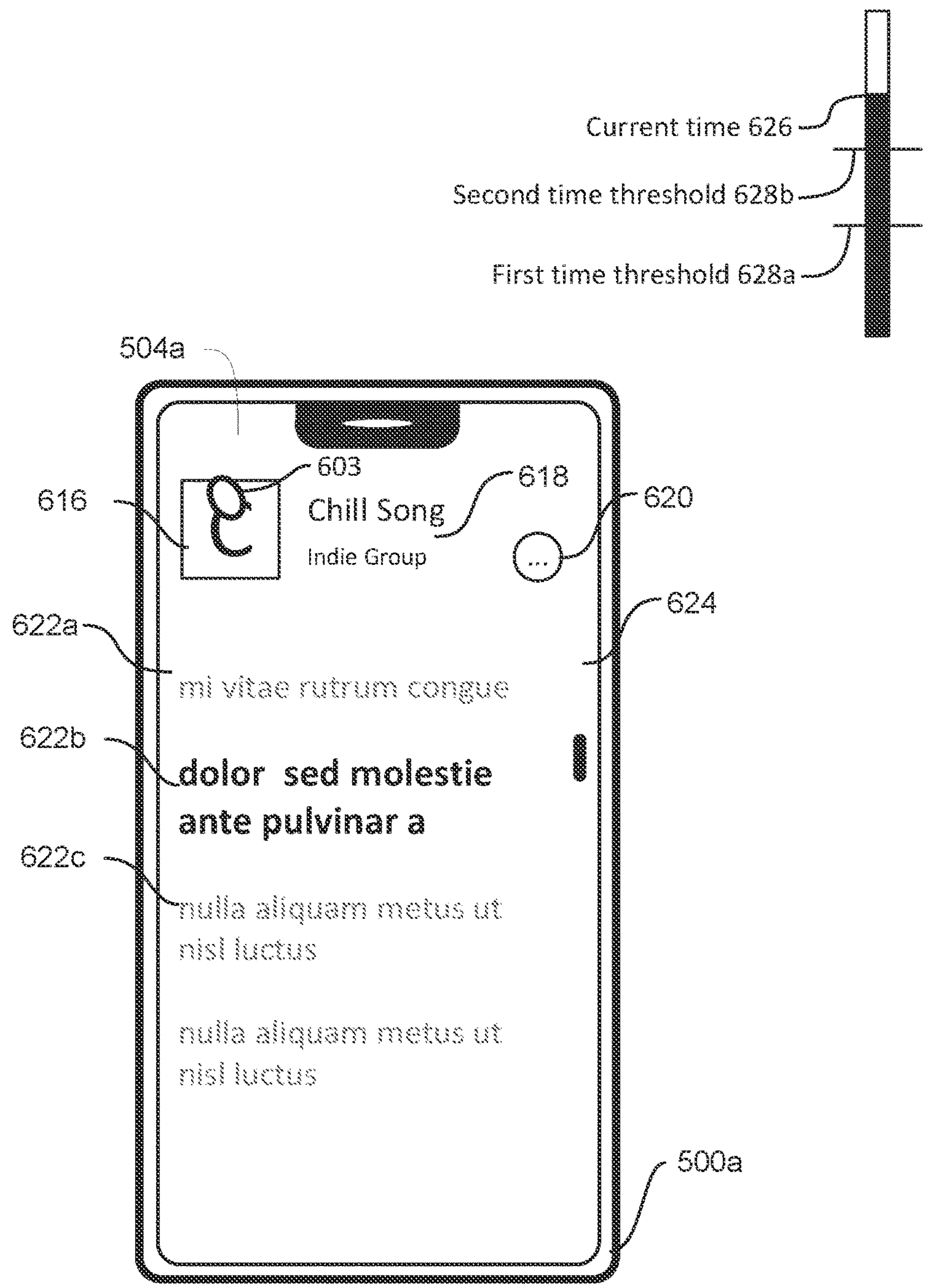
Figure 6F:
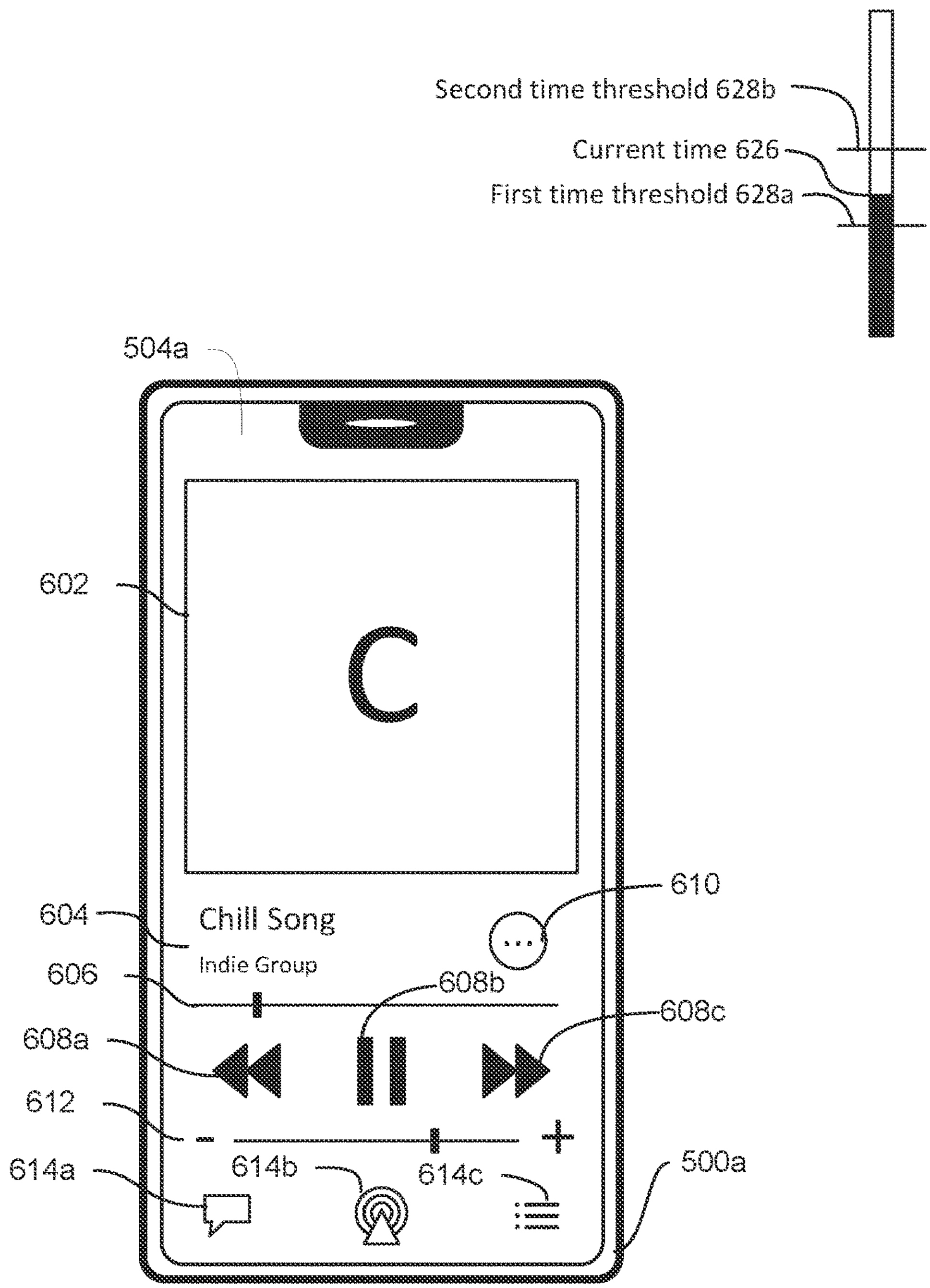
Figure 6G:
Figure 6H:
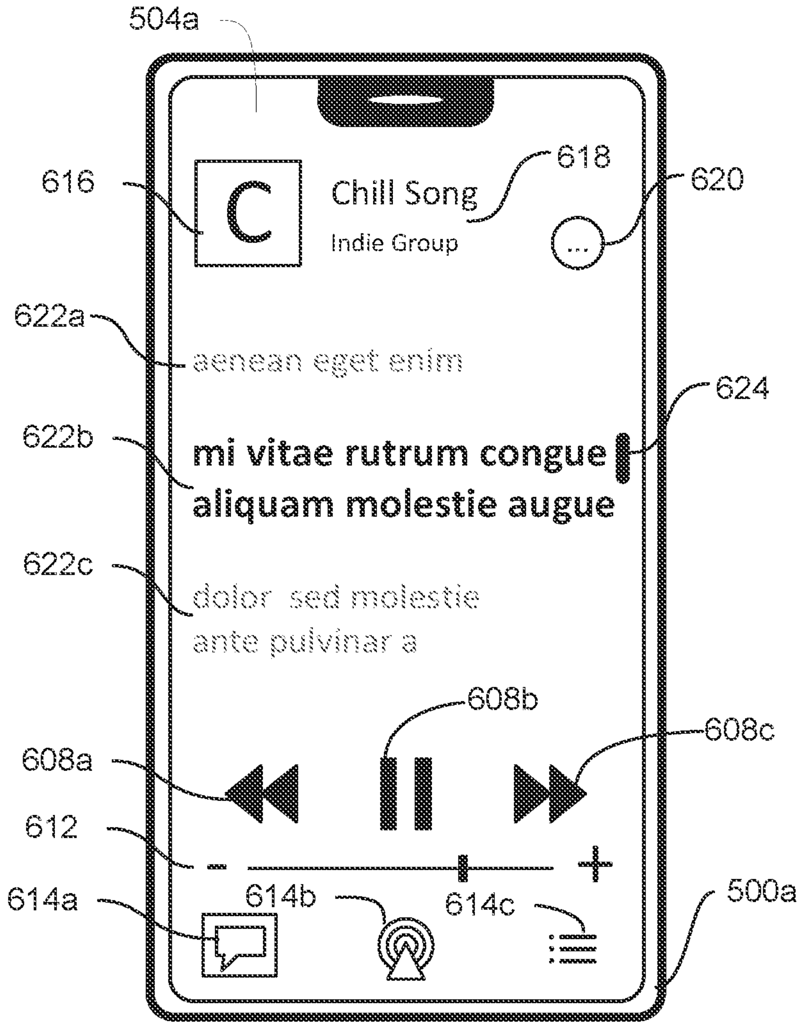
Figure 6I:
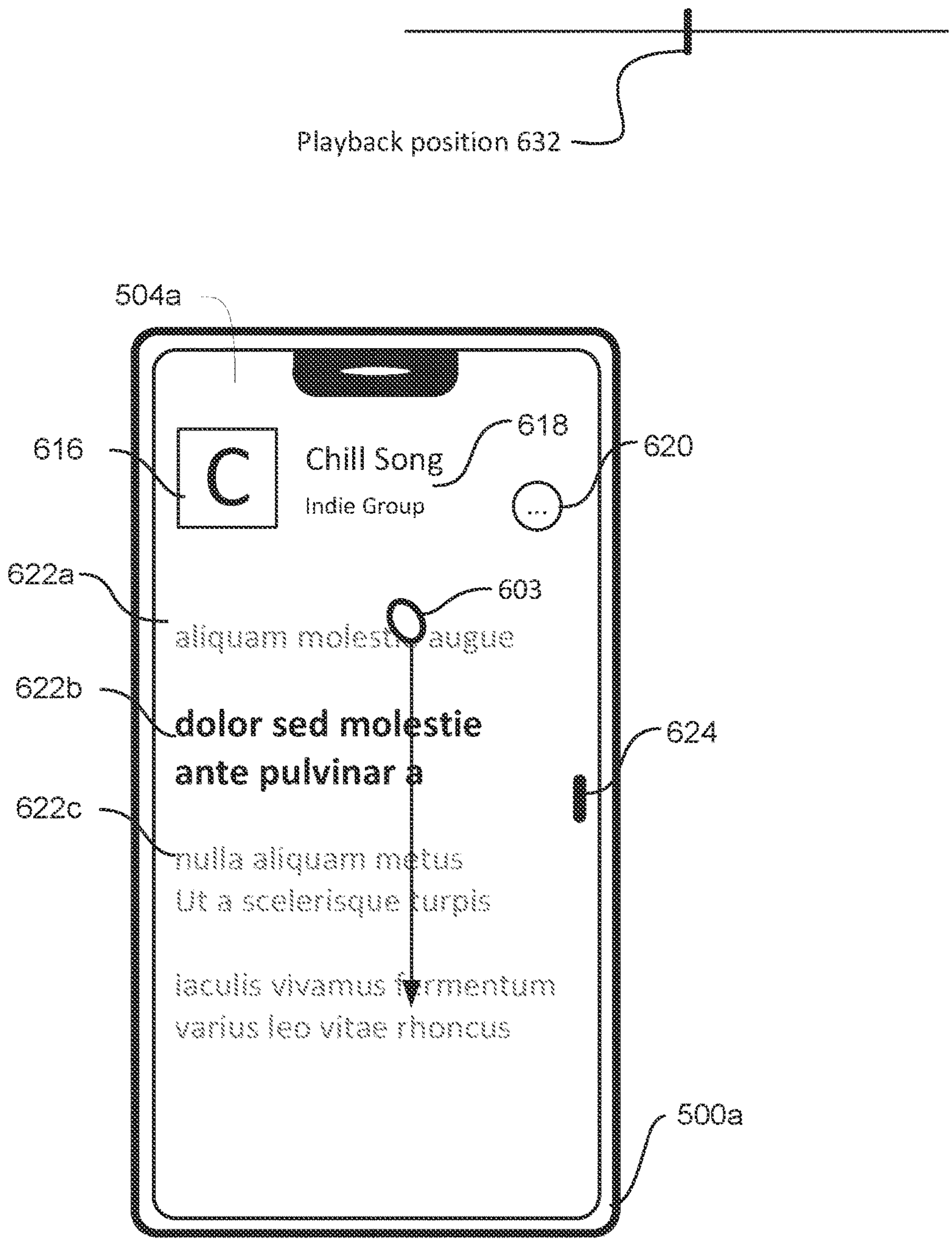
Figure 6J:
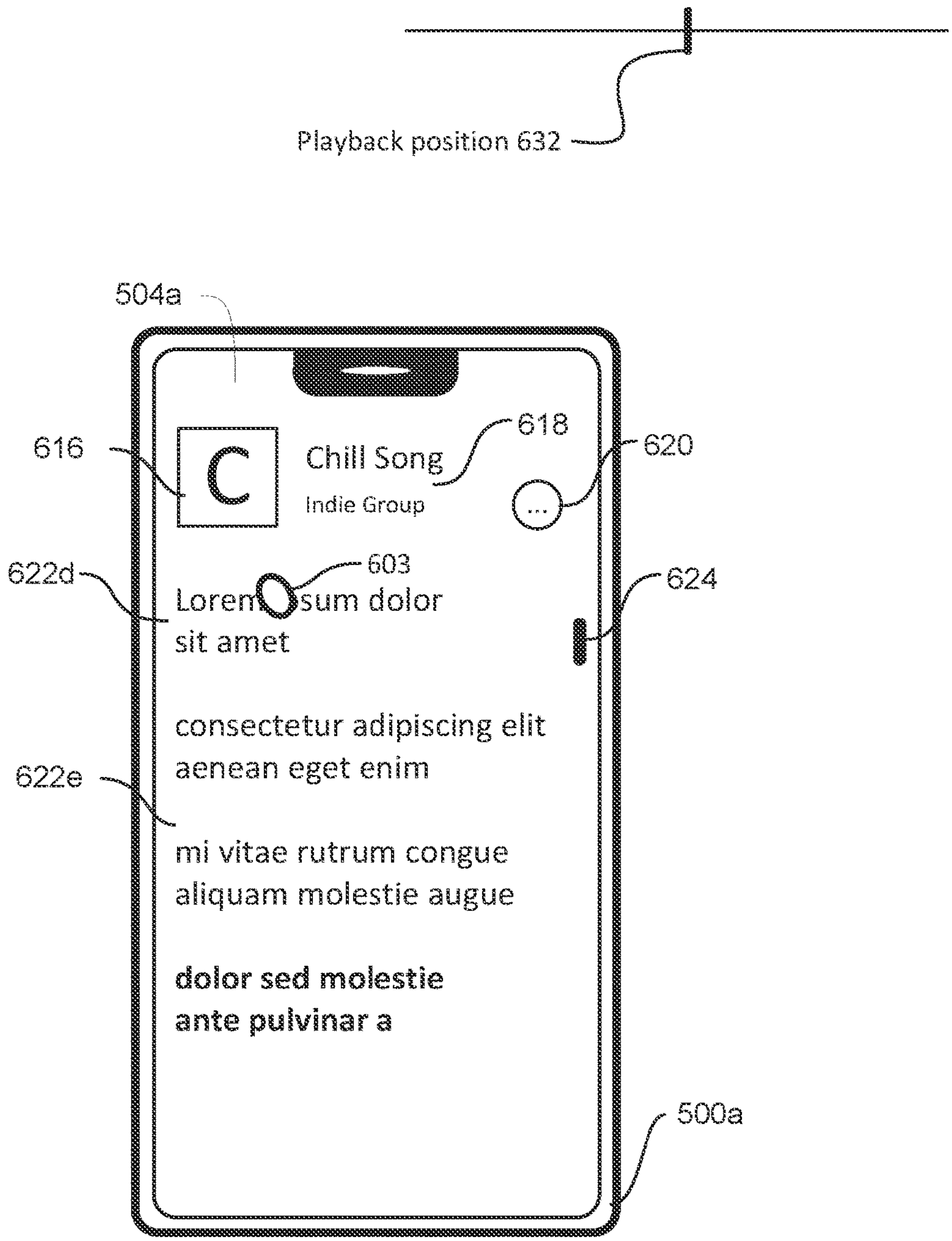
Figure 6K:
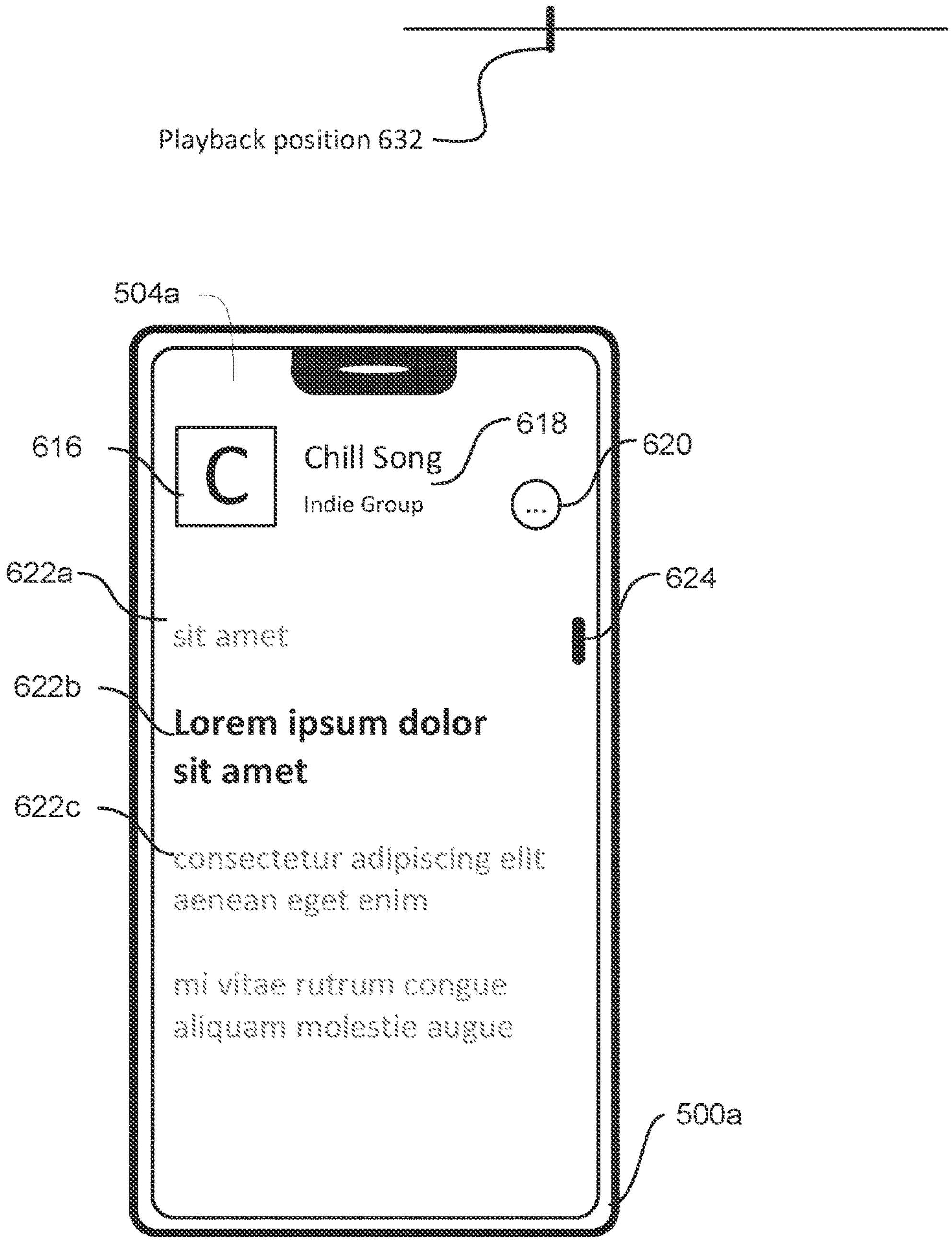
Figure 6L:
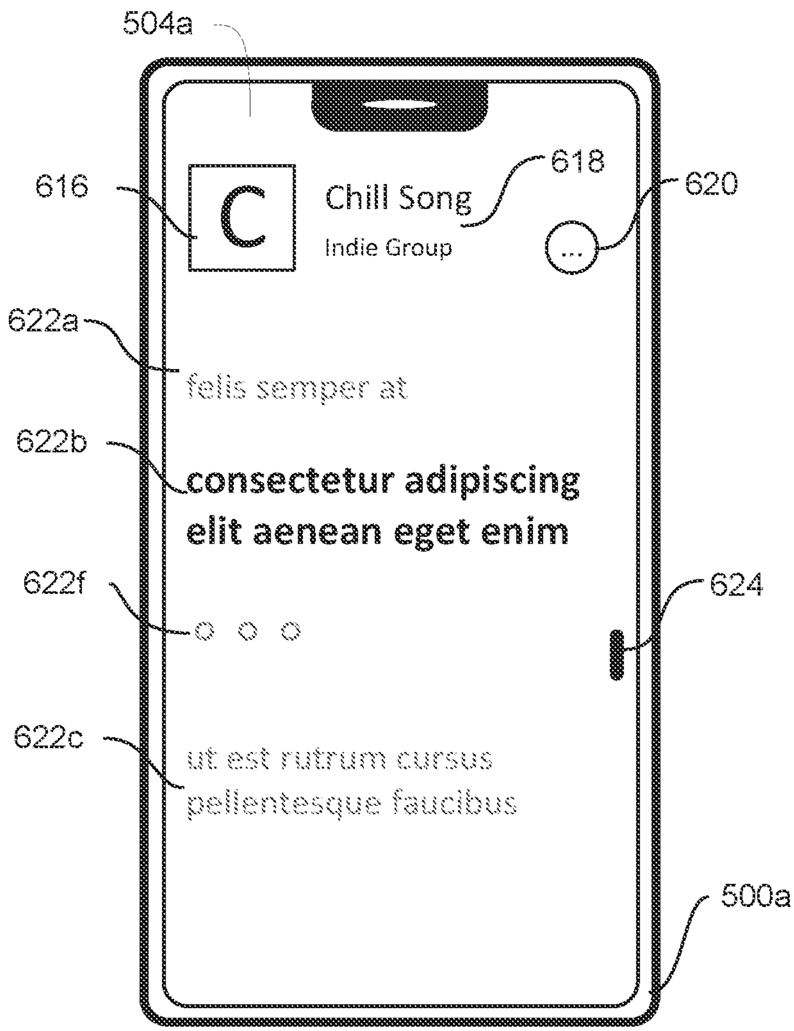
Figure 6M:
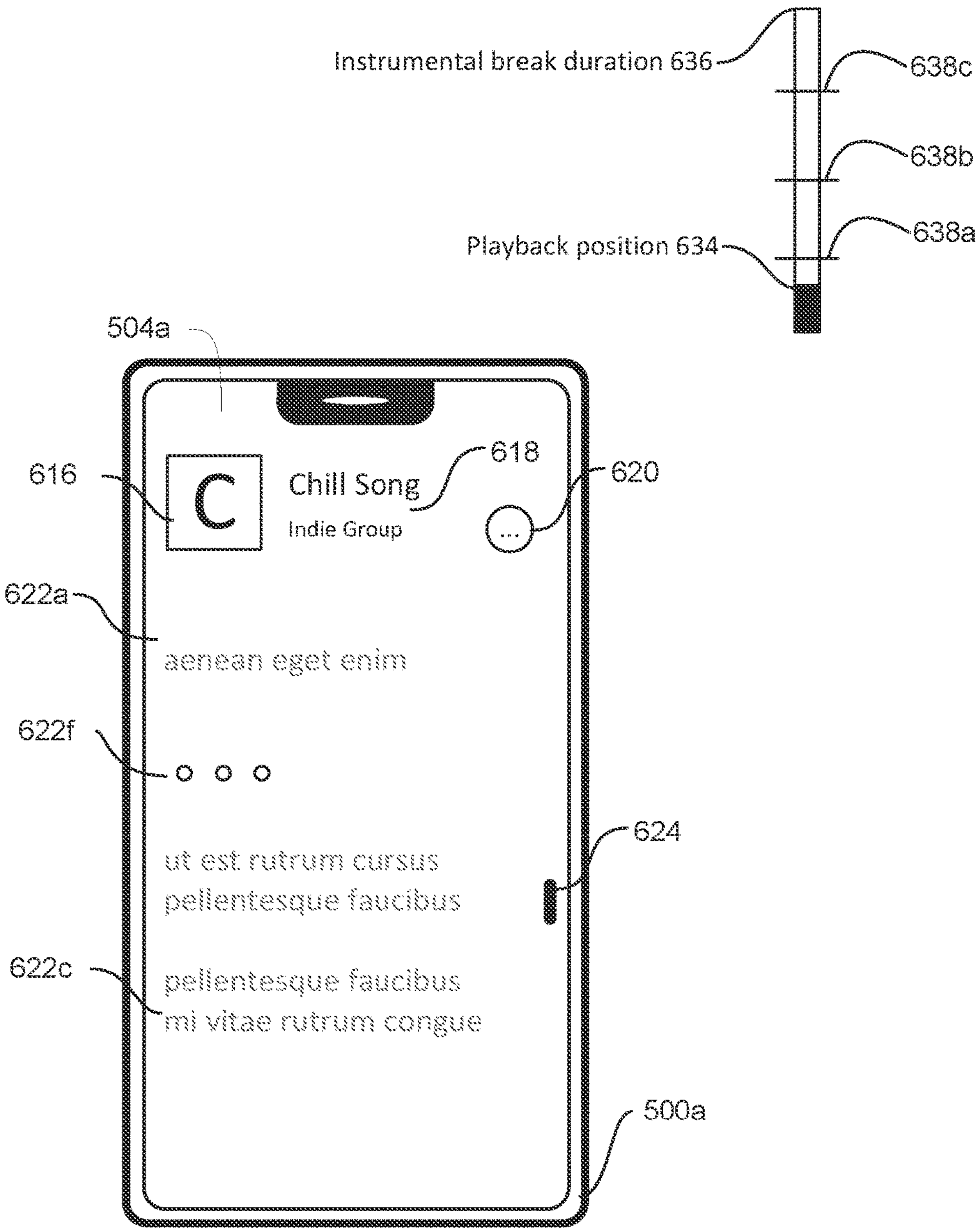
Figure 6N:
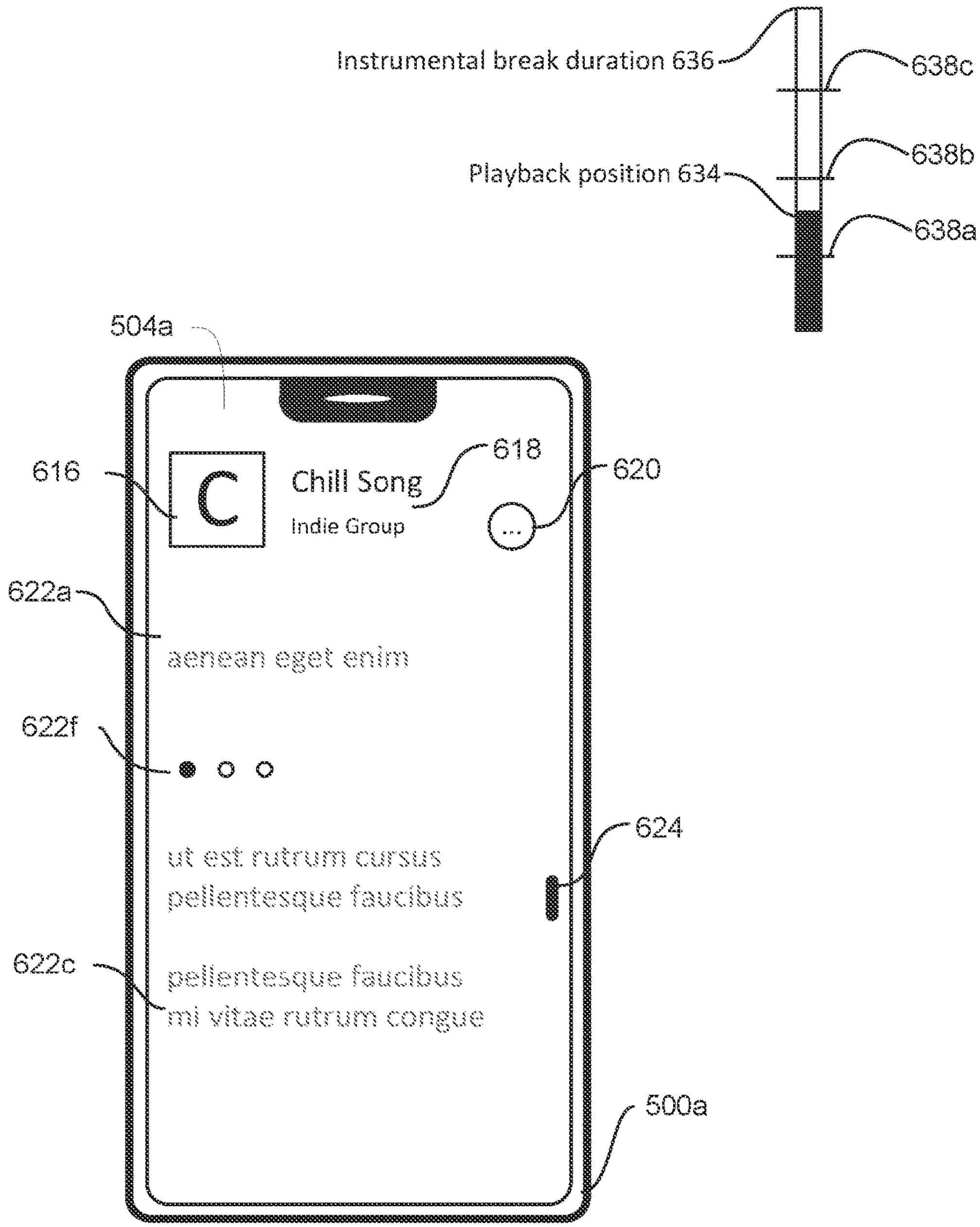
Figure 6O:
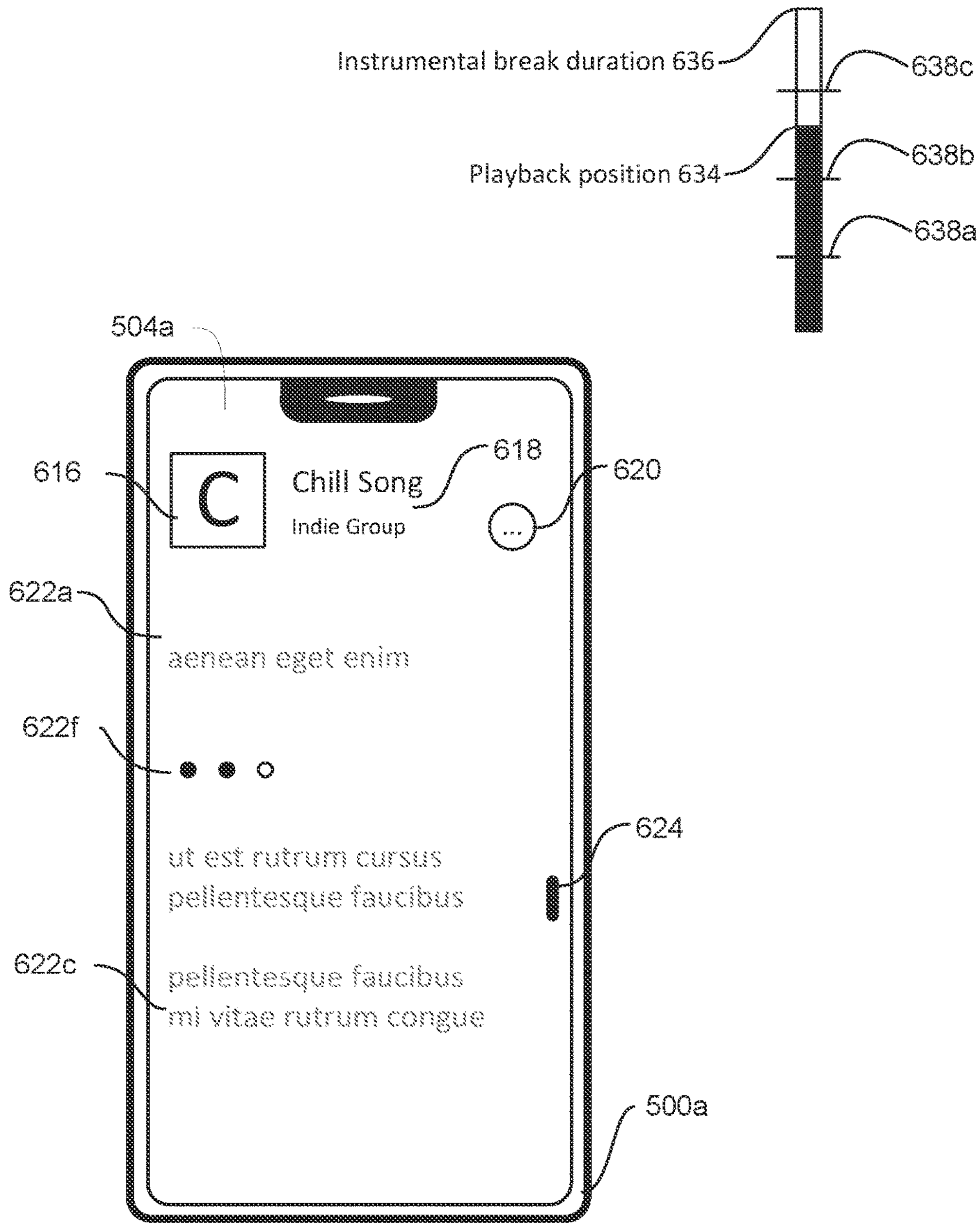

FIGS. 6A-6OO illustrate exemplary ways in which an electronic device 500*a*, 500*b*, or 500*c* present the lyrics associated with an item of content that is playing on the electronic device in accordance with some embodiments. The embodiments in these figures are used to illustrate the processes described below, including the processes described with reference to FIGS. 7A-7K.

Although the examples described herein are illustrated with one of electronic devices 500*a*, 500*b*, or 500*c*, it should be understood that any of the electronic devices illustrated herein or otherwise are capable of performing the operations described herein.

FIG. 6A illustrates a content playback user interface of a content application. The content playback user interface includes album artwork 602 associated with an item of content that is playing on the electronic device 500*a*, an indication 604 of the title and artist of the content item, a scrubber bar 606 that indicates the playback position in the item of content that is selectable to move the playback position to a different part of the content item, selectable controls 608*a*-*c* (e.g., skip back 608*a*, pause 608*b*, skip forward 608*c*) for controlling playback of the content item, selectable volume controls 612 selectable to adjust the playback volume of the item of content, a menu option 610 that is selectable to present a menu such as the menu illustrated in FIG. 6V, a selectable option 614*a* to view time-synced lyrics of the content item, a selectable option 614*b* to select an audio output device to play the content, and a selectable option 614*c* to view representations of items of content in a playback sequence that will play after the item of content.

As shown in FIG. 6B, the user selects (e.g., with contact 603) the option 614*a* to view time-synced lyrics while continuing to play the content item. In response to the user's selection in FIG. 6B, the electronic device 500*a* presents the time-synced lyrics user interface illustrated in FIG. 6C.

FIG. 6C illustrates a time-synced lyrics user interface of the content application. The time-synced lyrics user interface includes album art 616 associated with the content item, an indication 618 of the title and artist of the content item, the selectable option 620 to display the menu with a plurality of options for performing an action with the content item, time-synced lyrics 622, scroll bar 624, playback controls 608*a*-*c*, volume controls 612, and navigation options 614*a*-*c*. The time-synced lyrics include a portion 622*b* of lyrics that correspond to a portion of the content item that is currently playing, a portion 622*a* of lyrics that correspond to a portion of the content item that previously played, and a portion 622*c* of lyrics corresponding to a portion of the content item that will play after the portion that is currently playing. As shown in FIG. 6C, the portion of the lyrics 622*b* corresponding to the currently-playing portion of the content item is presented with a darker color and larger text size than the remaining portions 622*a* and 622*c* of lyrics. In some embodiments, other ways of distinguishing the currently-playing portion of lyrics 622*b* are possible, such as opacity, font, and the like. In some embodiments, the further down in the user interface the text of the upcoming lyrics 622*c* are, the less opaque the text of the lyrics is. The scroll bar 624 indicates the current playback position within the item of content and/or the lyrics for the item of content. In some embodiments, as the item of content plays, the time-synced lyrics automatically advance with the playback such that the currently playing lyric remains highlighted, the previously-played lyrics fade out and/or scroll up off the screen, and upcoming lyrics fade in and/or scroll onto the screen.

The electronic device 500*a* displays the playback controls 608*a*-*c* and 612 and navigation options 614*a*-*c* for a period of time 626 until a first threshold time 628*a* (e.g., 2, 3, 5, 10 seconds) has been reached. As shown in FIG. 6D, once the time-synced lyrics user interface has been displayed for a period of time 626 equal to or greater than the first threshold 628*a* without user input being detected, the electronic device 500*a* ceases display of the playback controls and navigation options. In some embodiments, however, the electronic device 500*a* always displays the playback controls and navigation options in the time-synced lyrics user interface. As shown in FIG. 6D, when the electronic device 500*a* ceases displaying the playback control options and navigation options, the electronic device 500*a* displays additional lyrics 622*c* corresponding to portions of the content item that will play after the portion of the content item that is currently playing.

The electronic device 500*a* is able to forgo entering a sleep mode while displaying the time-synced lyrics user interface. In some embodiments, the electronic device 500*a* enters the sleep mode (e.g., halting one or more processes, such as powering off the display) once a second time threshold 628*b* (e.g., 30 seconds, 1 minute, 2 minutes, 5 minutes, etc.) has passed since the electronic device 500*a* detected a user input. As shown in FIG. 6E, after displaying the time-synced lyrics user interface for an amount of time 626 that exceeds the second time threshold 628*b* without detecting any user inputs, the electronic device 500*a* continues to present the time-synced lyrics user interface without entering the sleep mode. As shown in FIG. 6E, the user selects (e.g., with contact 603) the album artwork 616 to navigate back to the content playback user interface, as shown in FIG. 6F.

In FIG. 6F, the electronic device 500*a* displays the content playback user interface for an amount of time 626 that is less than the second time threshold 628*b*. In FIG. 6G, after a period of time 626 that is greater than the second threshold 628*b*, the electronic device 500*a* enters the sleep mode, including deactivating display 504*a*.

FIGS. 6H-6K illustrate ways the electronic device 500*a* scrolls the time-synced lyrics and moves the playback position of the item of content in response to detecting selection of a portion of the time-synced lyrics.

In FIG. 6H, the electronic device 500*a* displays the time-synced lyrics user interface with elements corresponding to the elements described above with reference to FIG. 6C.

In FIG. 6I, the user scrolls (e.g., with contact 603) the time-synced lyrics 622. When the electronic device 500 detects the user's scrolling, the electronic device is at a particular playback position within the content item. FIG. 6J illustrates the updated time-synced lyrics user interface after the user's scrolling illustrated in FIG. 6I (e.g., the user scrolls up into previously-played lyrics). As shown in FIG. 6J, the electronic device 500*a* presents a different portion of the time-synced lyrics 622 in response to the user's scrolling. While the user scrolls the time-synced lyrics, the electronic device 500*a* displays all of the time-synced lyrics in a high-contrast, opaque color (e.g., both the currently playing lyrics and the previous/upcoming lyrics are displayed with the same visual characteristics). The position of the scroll bar 624 is updated to correspond to the playback position that corresponds to the playback position corresponding to the time-synced lyrics 622 displayed in the user interface while the user scrolls the time-synced lyrics 622, though the electronic device continues to play the content normally, as indicated by playback position 632.

As shown in FIG. 6J, the user selects (e.g., with a tap of contact 603) a portion 622*d* of the time-synced lyrics while scrolling the time-synced lyrics. As shown in FIG. 6K, in response to the user's selection, the electronic device 500*a* updates the playback position 632 of the content item to a playback position that corresponds to the selected portion of time-synced lyrics, which are now displayed with the visual characteristics of the currently-playing portion of the time-synced lyrics 622*b*.

Thus, as shown in FIGS. 6H-6K, the electronic device 500*a* is able to scroll the time-synced lyrics and moves the playback position of the item of content in response to detecting selection of a portion of the time-synced lyrics.

FIGS. 6L-6P illustrate ways the electronic device 500*a* presents a visual indication of a portion of the content item that does not include lyrics within the time-synced lyrics.

In FIG. 6L, the electronic device 500*a* plays a portion of the content corresponding to a portion 622*b* of the time-synced lyrics. The electronic device will play a portion of the content that does not have lyrics after playing the currently-playing portion of the content. Thus, the electronic device 500*a* presents an indication 622*f* of the portion of the content that does not include lyrics within the time-synced lyrics 622.

In FIG. 6M, the electronic device 500*a* continues playing the content and reaches the portion of the content that does not have lyrics. While playing the portion of the lyrics that does not have lyrics, the electronic device 500*a* presents the indication 622*f* of the instrumental break at a position within the time-synced lyrics corresponding to the portion of the content that is currently playing. While the playback position 634 is less than a first portion 638*a* through the instrumental break, the electronic device 500*a* presents all of the circles of the indication 622*f* with a first visual characteristic, such as not filled in, as shown in FIG. 6M.

In FIG. 6N, the playback position 634 advances to a position that is past the first portion 638*a* of the instrumental break but before the second portion 638*b* of the instrumental break. In response to passing the first portion 638*a* of the instrumental break, the electronic device 500*a* presents part of the indication 622*f* of the instrumental break with a different visual characteristic, such as being filled in.

In FIG. 6O, the playback position 634 advances to a position that is past the second portion 638*b* of the instrumental break but before the third portion 638*c* of the instrumental break. In response to passing the second portion 638*b* of the instrumental break, the electronic device 500*a* presents two parts of the indication 622*f* of the instrumental break with a different visual characteristic, such as being filled in.

Figure 6P:
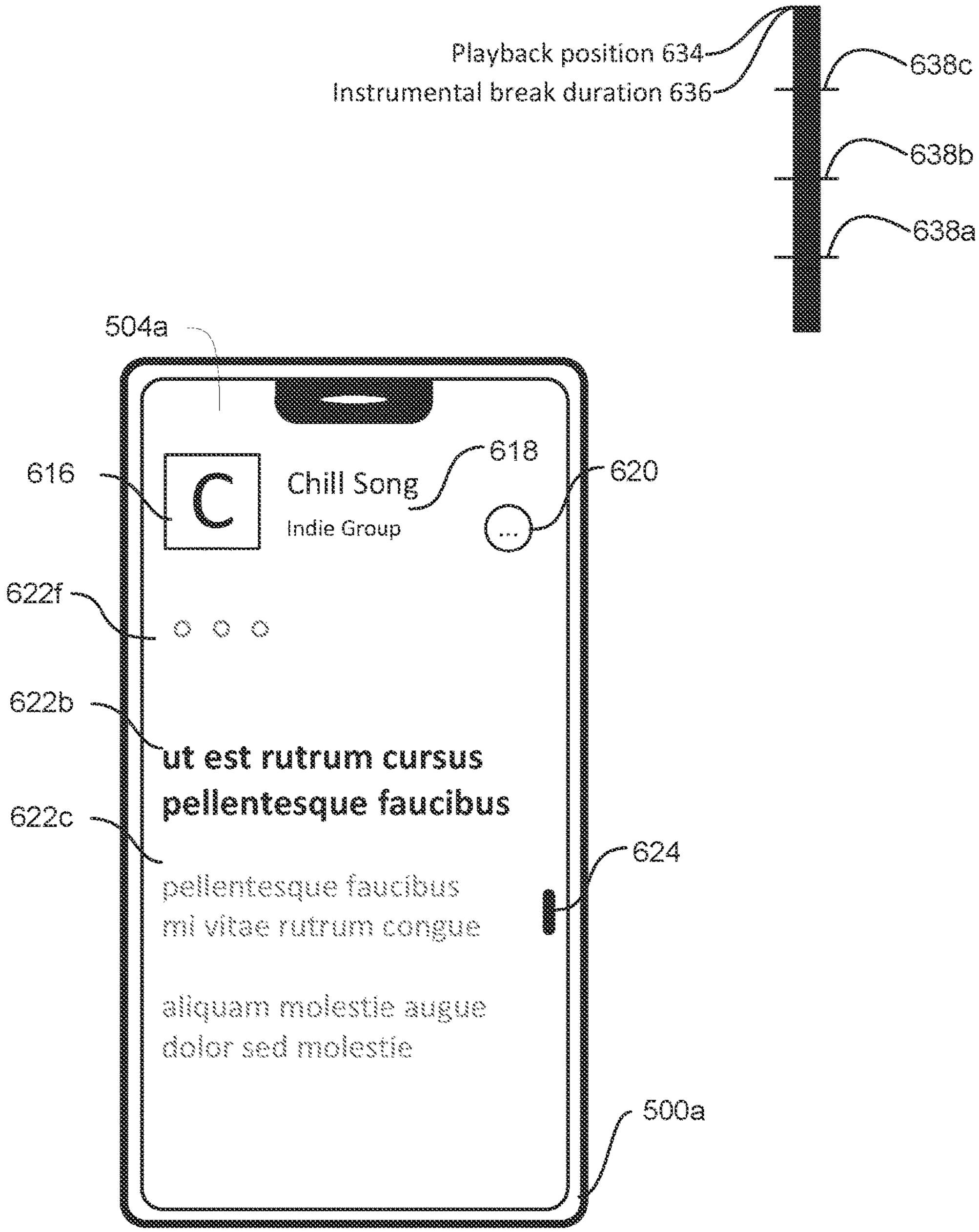

In FIG. 6P, the playback position 634 reaches the end 636 of the instrumental break. After reaching the end of the instrumental break, in some embodiments, the electronic device 500*a* fills in the last part of the indication 622*f*, and then the electronic device 500*a* plays the next portion of the content and displays the portion 622*b* of the time-synced lyrics with the bolded and high-contrast appearance. The indication 622*f* of the instrumental break moves above the portion 622*b* of the time-synced lyrics corresponding to the currently-playing portion of the content item.

Thus, as shown in FIGS. 6L-6P, the electronic device 500*a* is able to present a visual indication of a portion of the content item that does not include lyrics within the time-synced lyrics.

Figure 6Q:
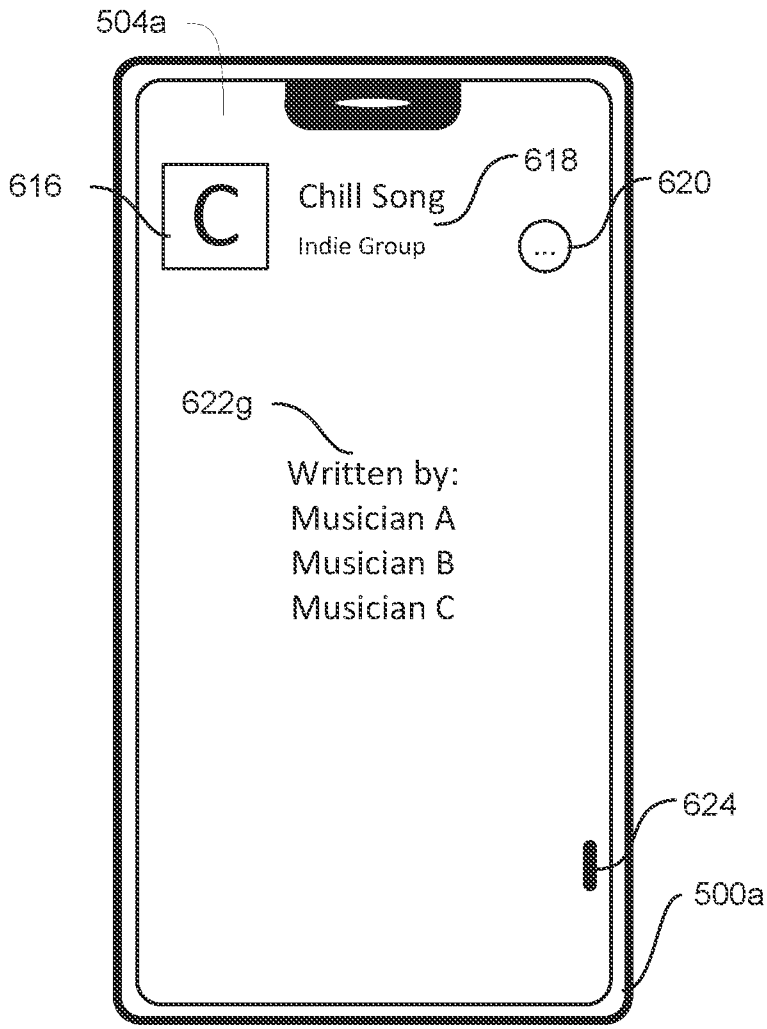

In FIG. 6Q, the electronic device 500*a* reaches the end of the content item. At the end of the content item, the electronic device 500*a* displays the credits 622*g* of the item of content in the time-synced lyrics user interface.

Figure 6R:
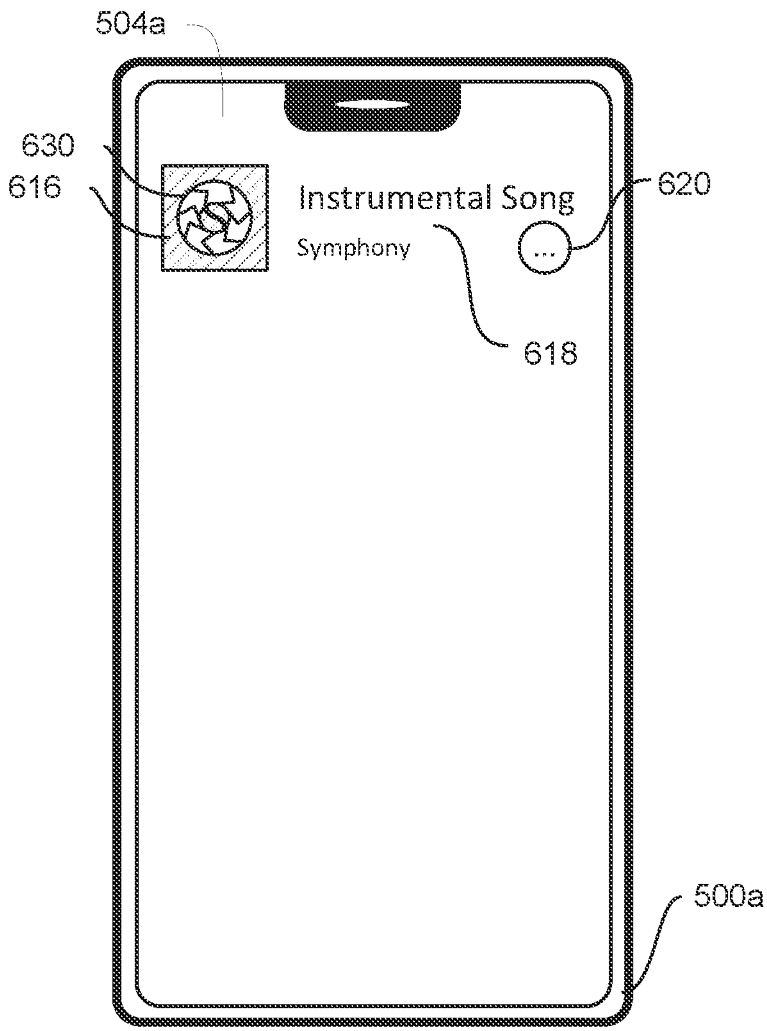

In FIG. 6R, after finishing the previous item of content, the electronic device 500*a* prepares to play the next item of content. While the next item of content is buffering, the electronic device 500*a* displays, in the time-synced lyrics user interface, the indication 618 of the title and artist of the next content item, the option 620 to view the menu of options related to the item of content, and an indication 630 that the content item is buffering. The indication 630 that the content item is buffering is displayed over the album artwork 616 of the content item.

Figure 6S:
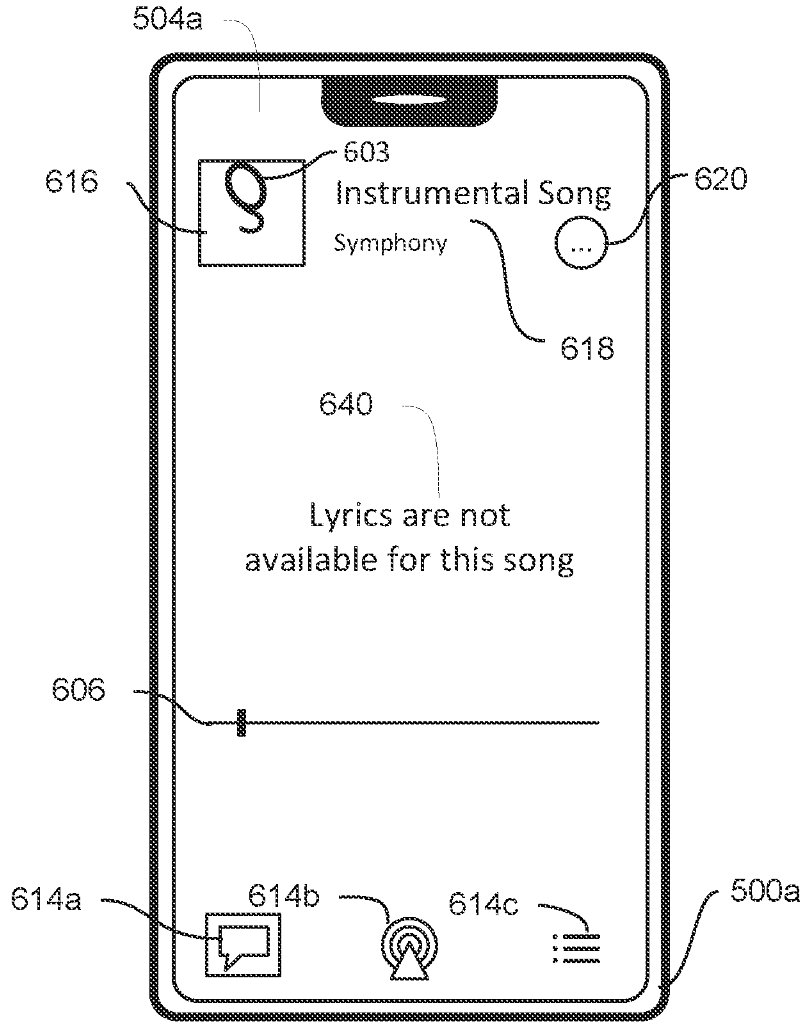

In FIG. 6S, the electronic device 500*a* finished buffering the content item and begins playing the content item while continuing to display the time-synced lyrics user interface. The item of content that is playing does not include lyrics. Thus, the electronic device 500*a* displays an indication 640 that the content item does not have lyrics in the time-synced lyrics user interface. The user interface further includes a scrubber bar 606 (e.g., that is able to receive input to scrub through the currently playing content item) and the navigation options 614*a-c*.

As shown in FIG. 6S, the user selects (e.g., with contact 603) the album artwork 616 associated with the item of content. In response to the user's selection in FIG. 6S, the electronic device 500 displays the content playback user interface illustrated in FIG. 6T.

Figure 6T:
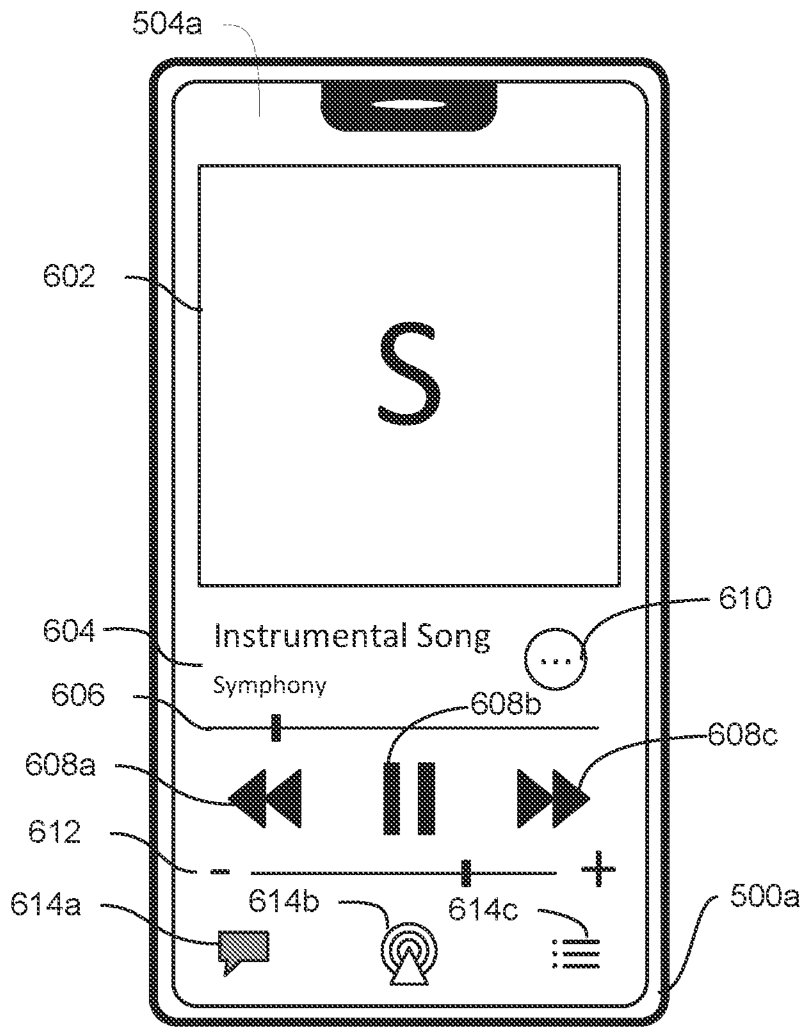

In FIG. 6T, the electronic device displays the content playback user interface while playing the item of content that does not include lyrics (e.g., time-synced lyrics). Because the content item does not include lyrics (e.g., time-synced lyrics), the option 614*a* to display the time-synced lyrics of the content item is presented with a greyed out appearance (and is optionally not selectable from FIG. 6T to display the time-synced lyrics user interface of FIG. 6S).

Figure 6U:
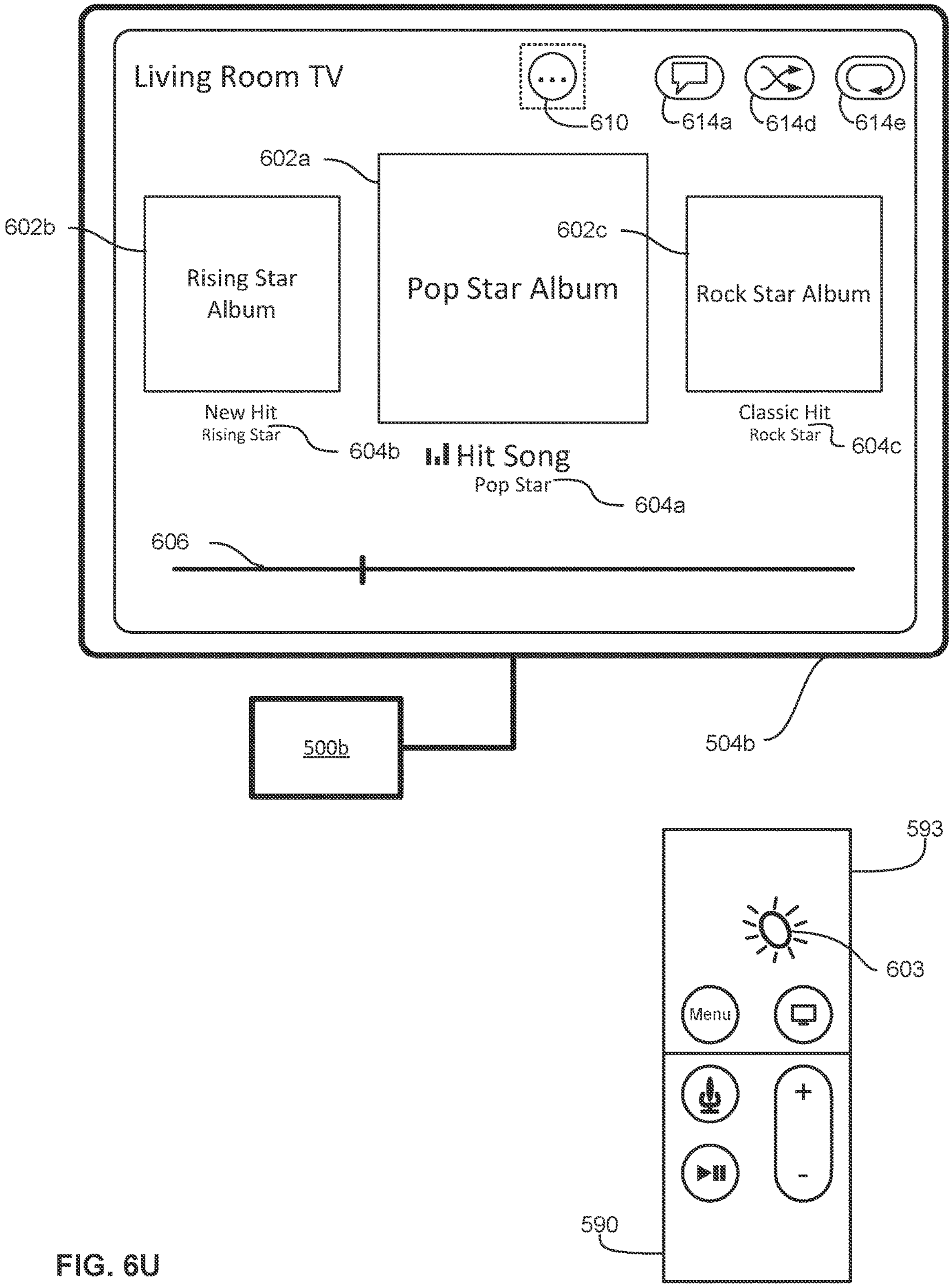
Figure 6V:
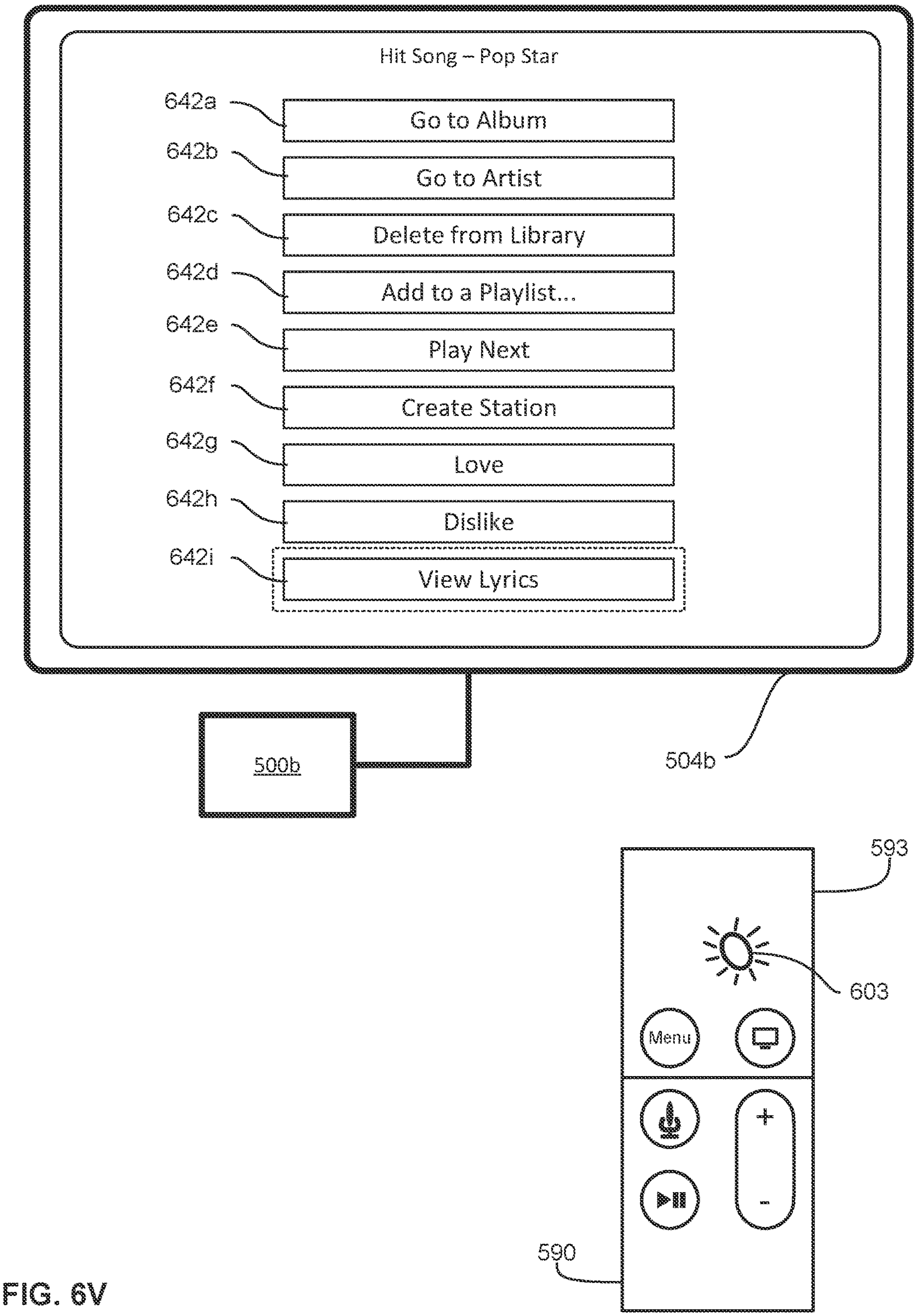
Figure 6W:
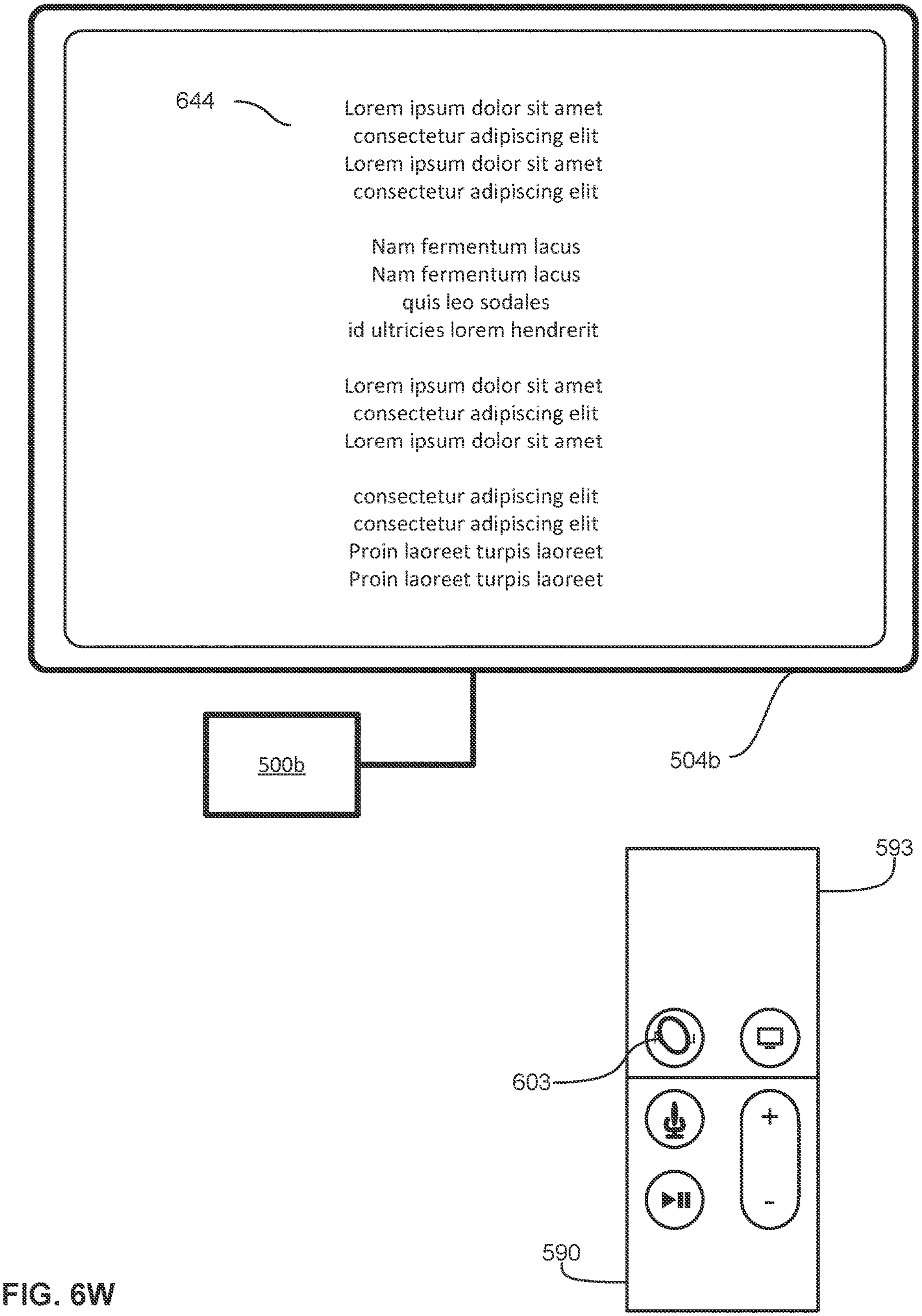

FIGS. 6U-6W illustrate ways an electronic device 500*b* displays non-time synchronized lyrics. As will be described in more detail with reference to FIGS. 6X-6JJ below, the electronic device 500*b* is also capable of presenting time-synced lyrics.

In FIG. 6U, the electronic device 500*b* presents a content playback user interface. The content playback user interface includes the album artwork 602*a* and title and artist 604*a* corresponding to the currently-playing content item, the album artwork 602*b* and title and artist 604*b* corresponding to a previously-played content item, the album artwork 602*c* and title and artist 604*c* corresponding to a content item that will play next, a scrubber bar 606, an option 610 to present a menu, time-synced lyrics option 614*a*, shuffle option 614*d*, and repeat option 614*e*.

As shown in FIG. 6U, the user selects (e.g., with contact 603) the option 610 to present the menu. In response to the user's selection in FIG. 6U, the electronic device 500*b* presents the menu illustrated in FIG. 6V.

FIG. 6V illustrates a menu user interface including a plurality of selectable options 642*a-i*. Selectable option 642*a* is selectable to display the album including the item of content that is currently playing. Selectable option 642*b* is selectable to display a user interface including information about the artist of the currently playing item of content. Selectable option 642*c* is selectable to delete the content item from the user's library. Selectable option 642*d* is selectable to add the content item to a playlist. Selectable option 642*e* is selectable to add the content item to a playback queue of the electronic device. Selectable option 642*f* is selectable to create a radio station based on the content item. Selectable option 642*g* is selectable to add the content item to a list of content items the user loves/likes. Selectable option 642*h* is selectable to add the content item to a list of content items the user dislikes. Selectable option 642*i* is selectable to display the full lyrics of the item of content.

As shown in FIG. 6V, the user selects (e.g., with contact 603) the option 642*i* to view the full lyrics of the item of content. In response to the user's selection in FIG. 6V, the electronic device 500*b* displays the full lyrics 644 of the content item, as shown in FIG. 6W. The lyrics of FIG. 6W are optionally not time-synced, but are merely a full listing of the lyrics that are either displayed all at once or are scrollable by the user.

Thus, as shown in FIGS. 6U-6W, the electronic device 500*b* is able to display non-time synchronized lyrics.

Figure 6X:
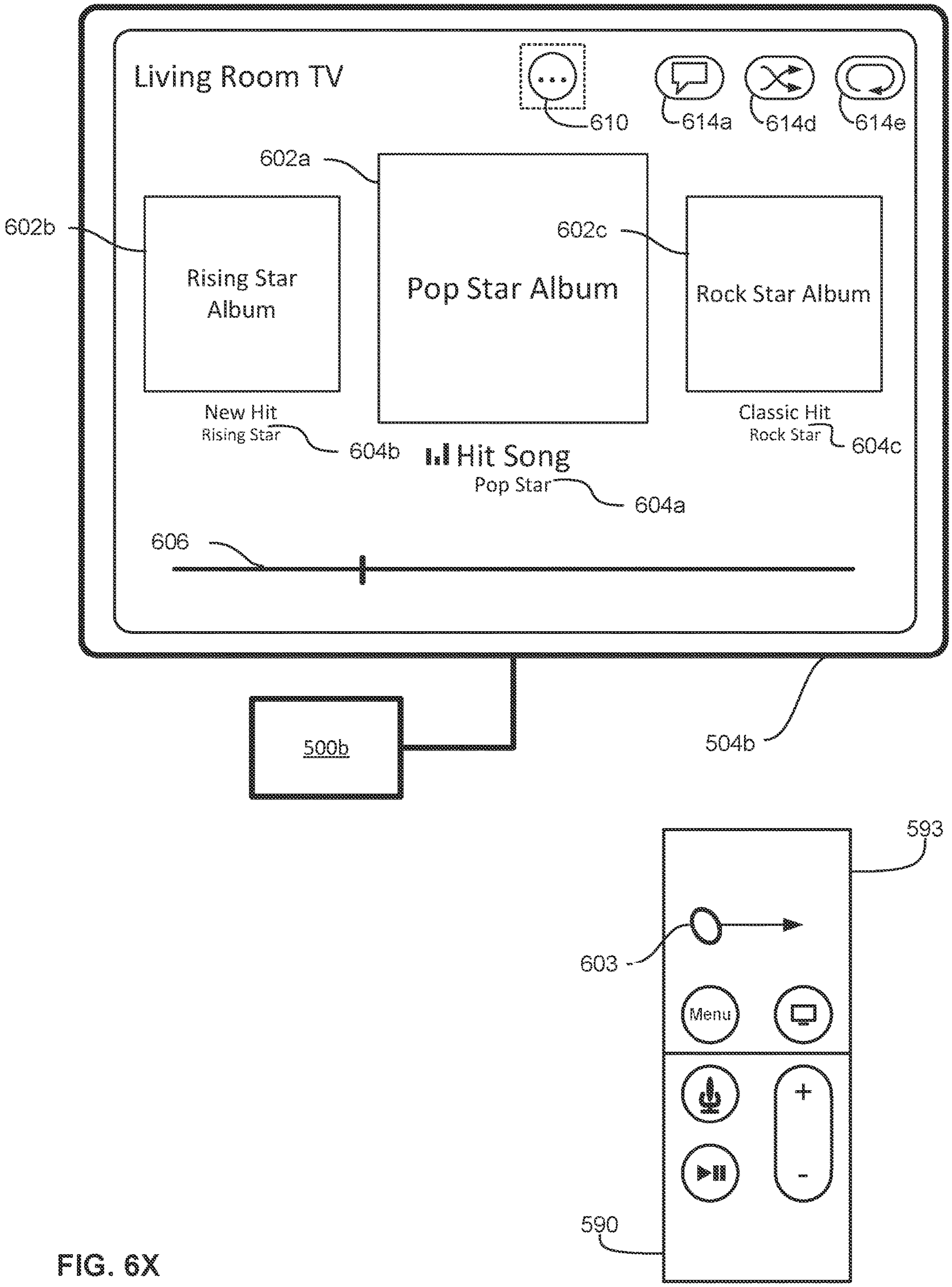

FIGS. 6X-6KK illustrate ways the electronic device 500*b* displays time-synced lyrics and enables the user to scroll through the time-synced lyrics.

Figure 6Y:
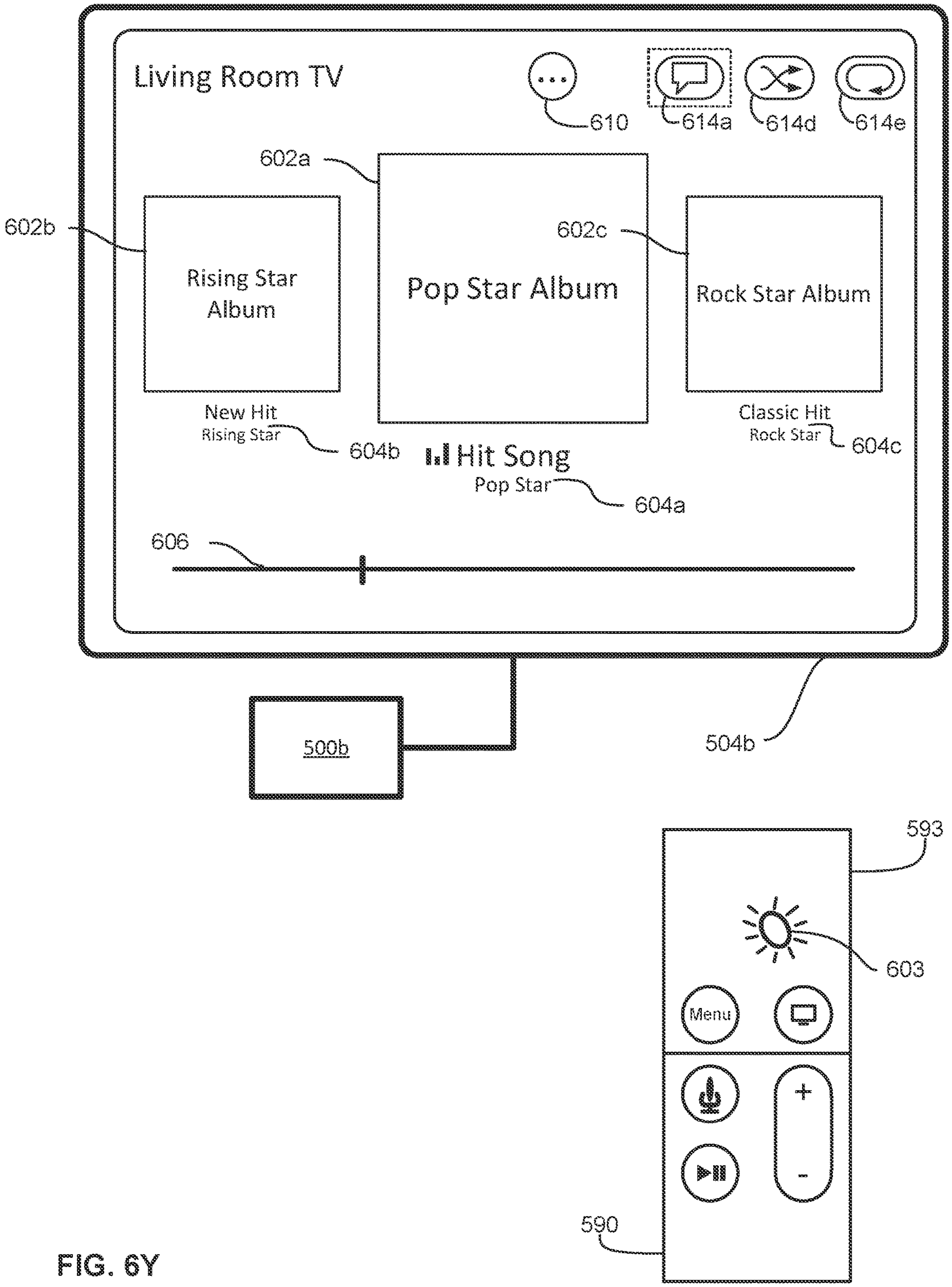

In FIG. 6X, the electronic device 500*b* displays the content playback user interface. The user swipes (e.g., with contact 603) to move the current focus from the menu option 610 to the time-synced lyrics option 614*a*. As shown in FIG. 6Y, in response to the input shown in FIG. 6X, the electronic device 500*b* moves the current focus to the time-synced lyrics option 614*a*. The user selects (e.g., with a click of contact 603) the time-synced lyrics option 614*a*.

Figure 6Z:
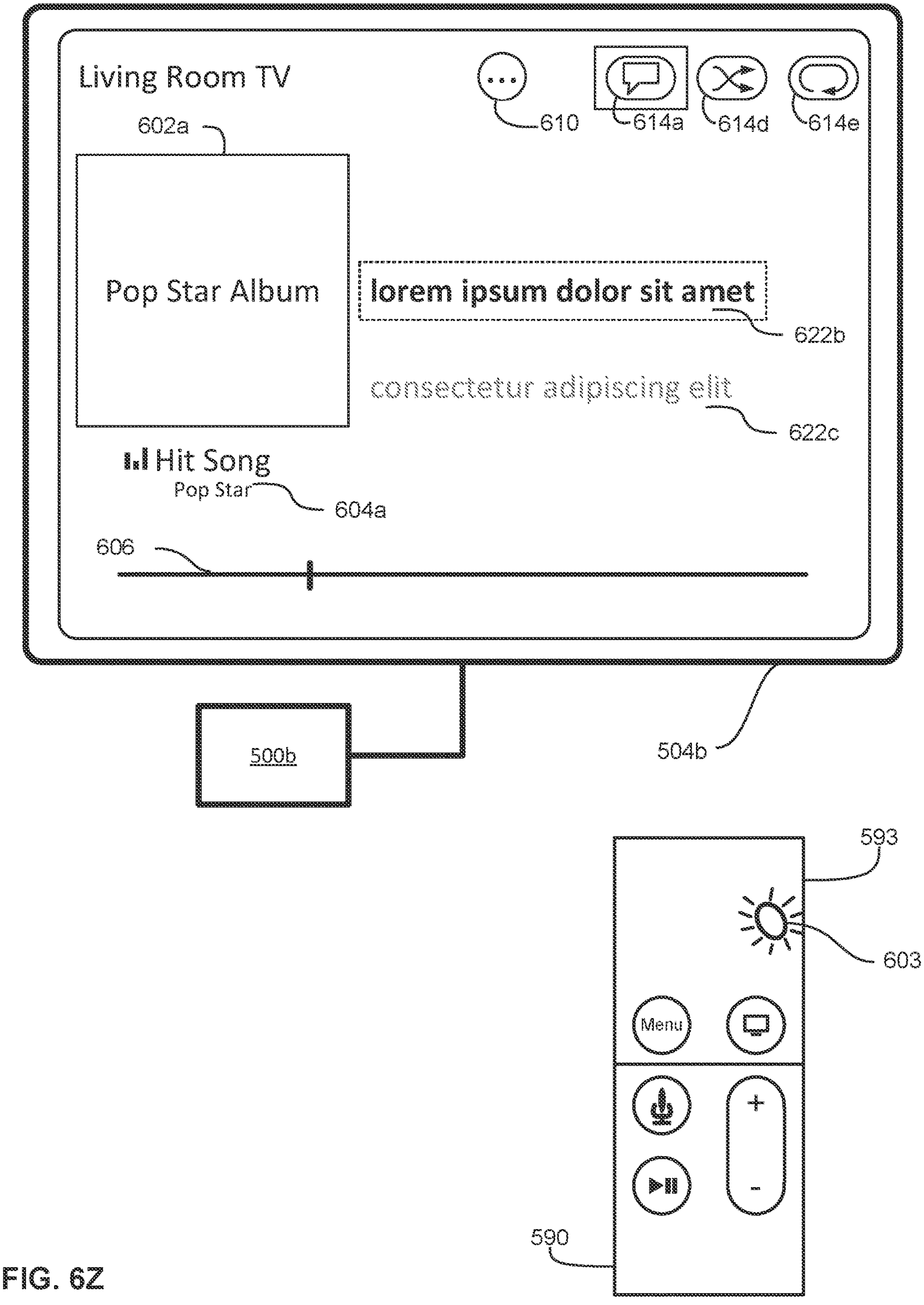
Figure 6A:
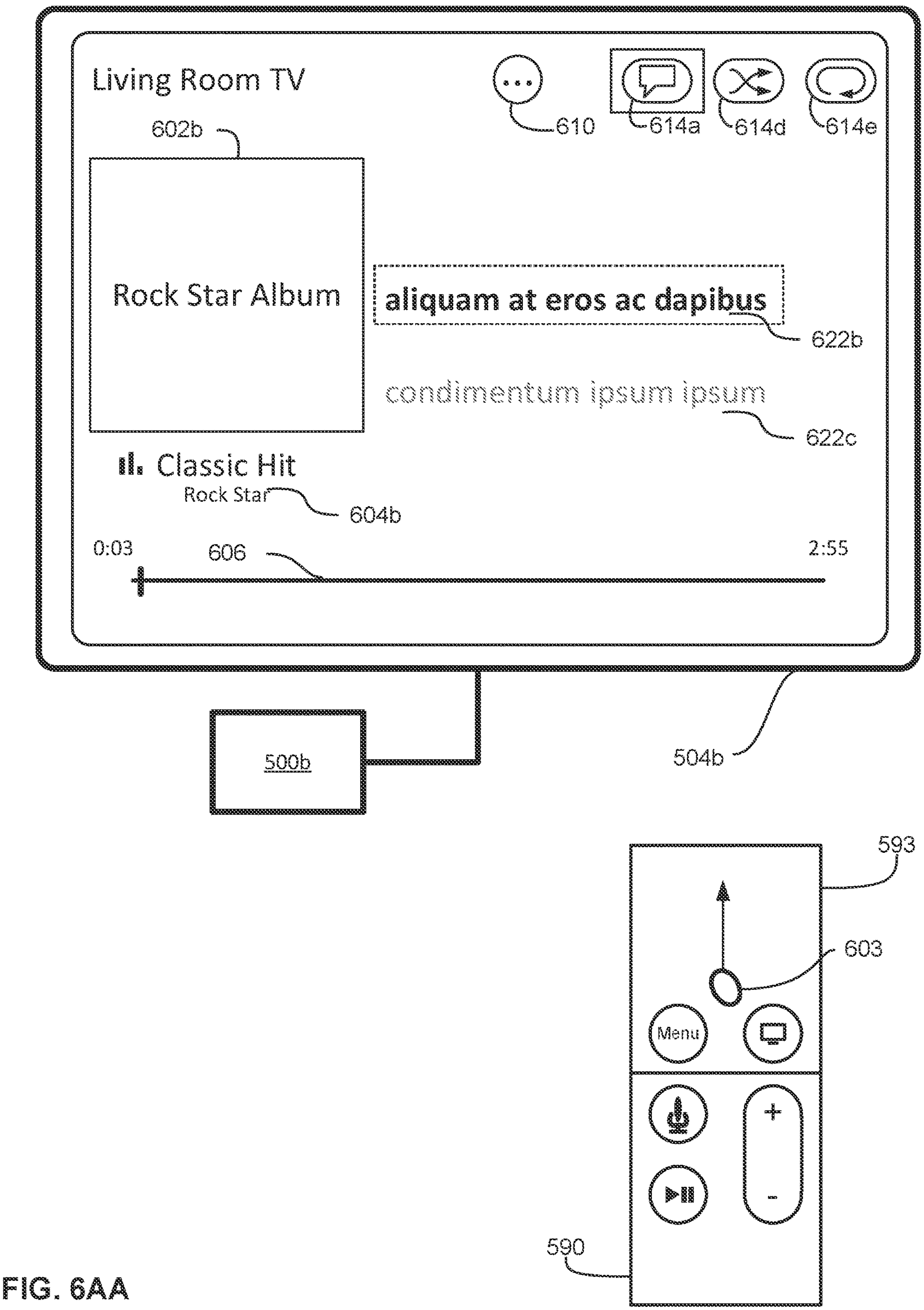
Figure 6B:
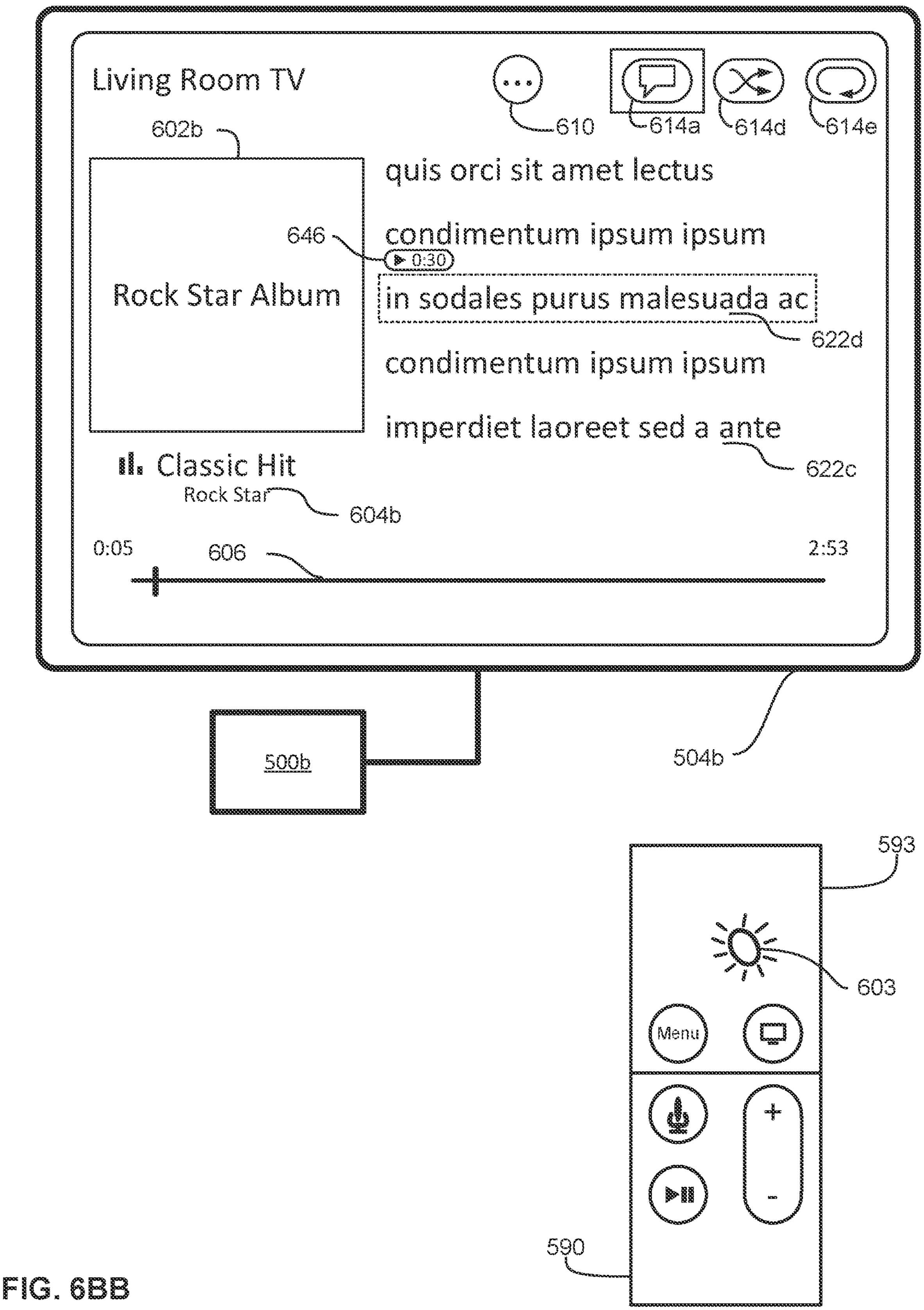
Figure 6C:
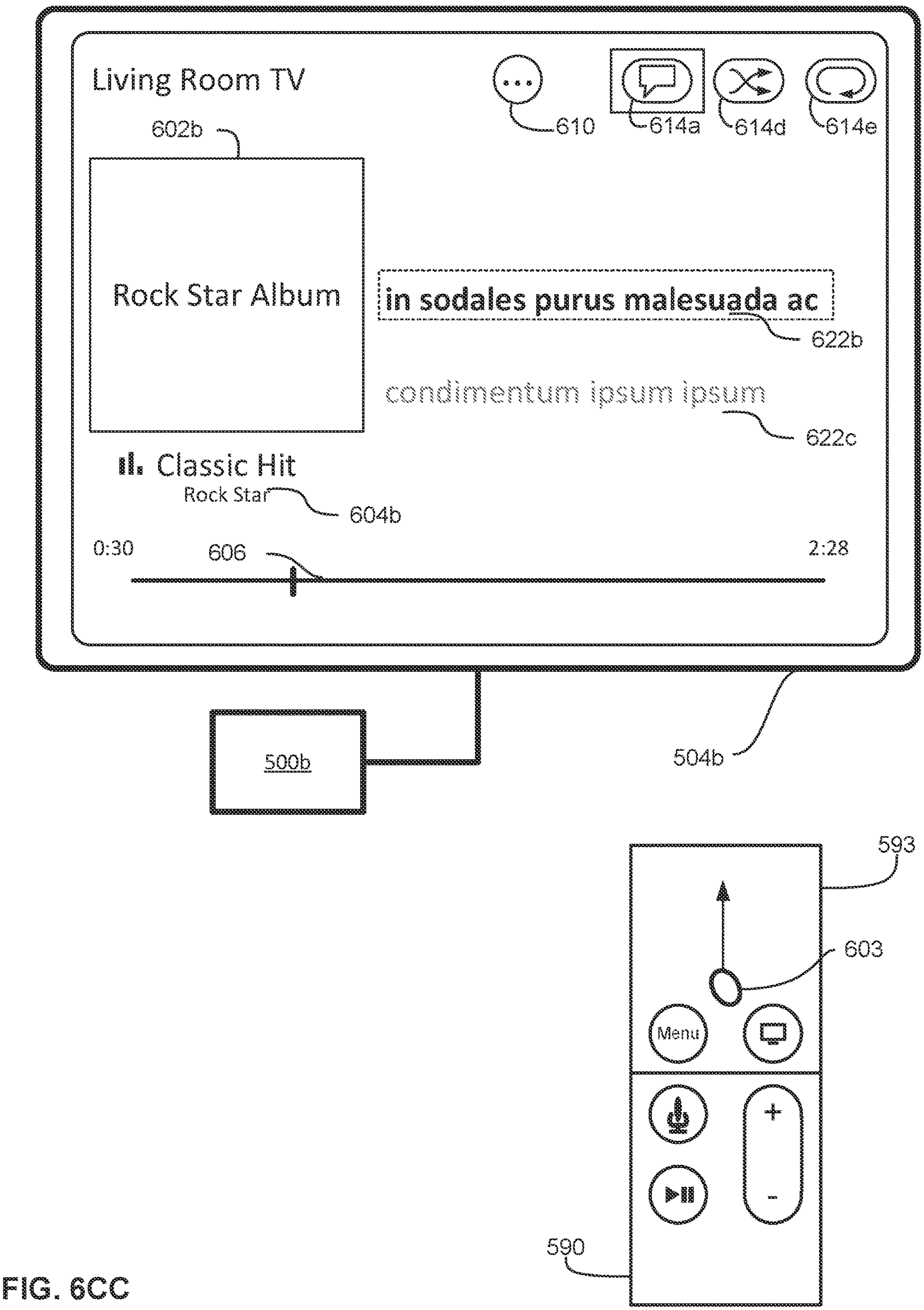
Figure 6D:
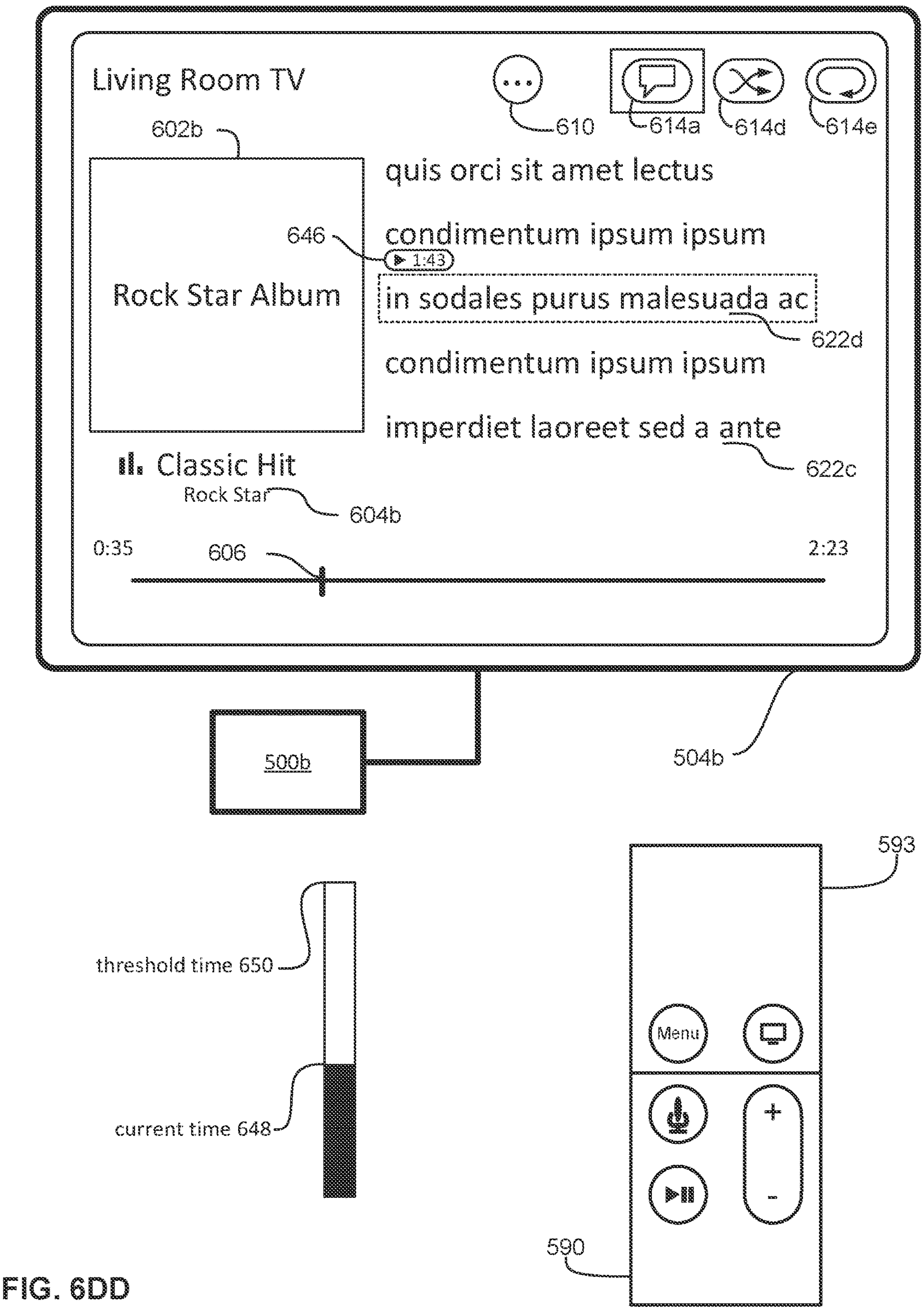
Figure 6E:
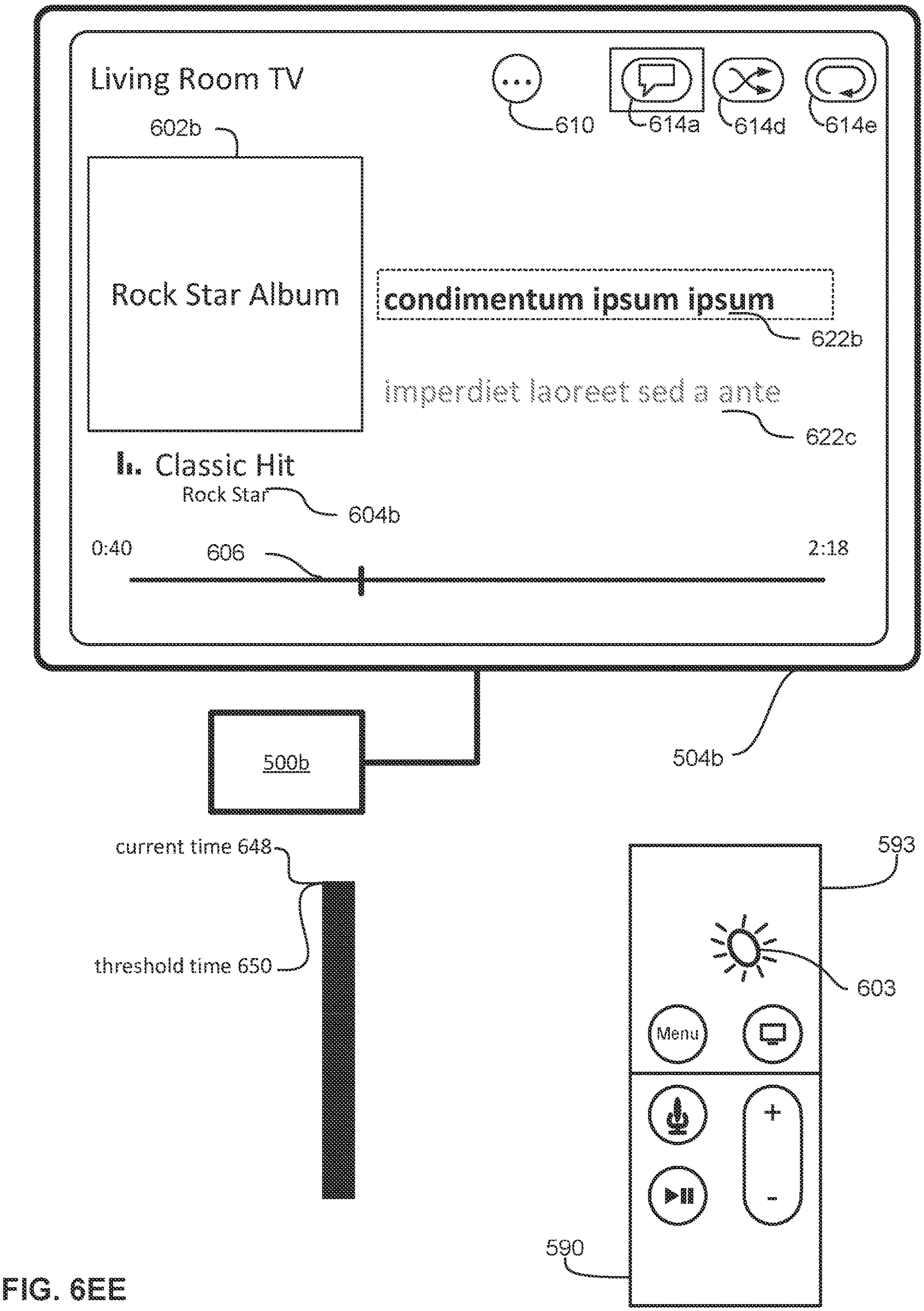
Figure 6F:
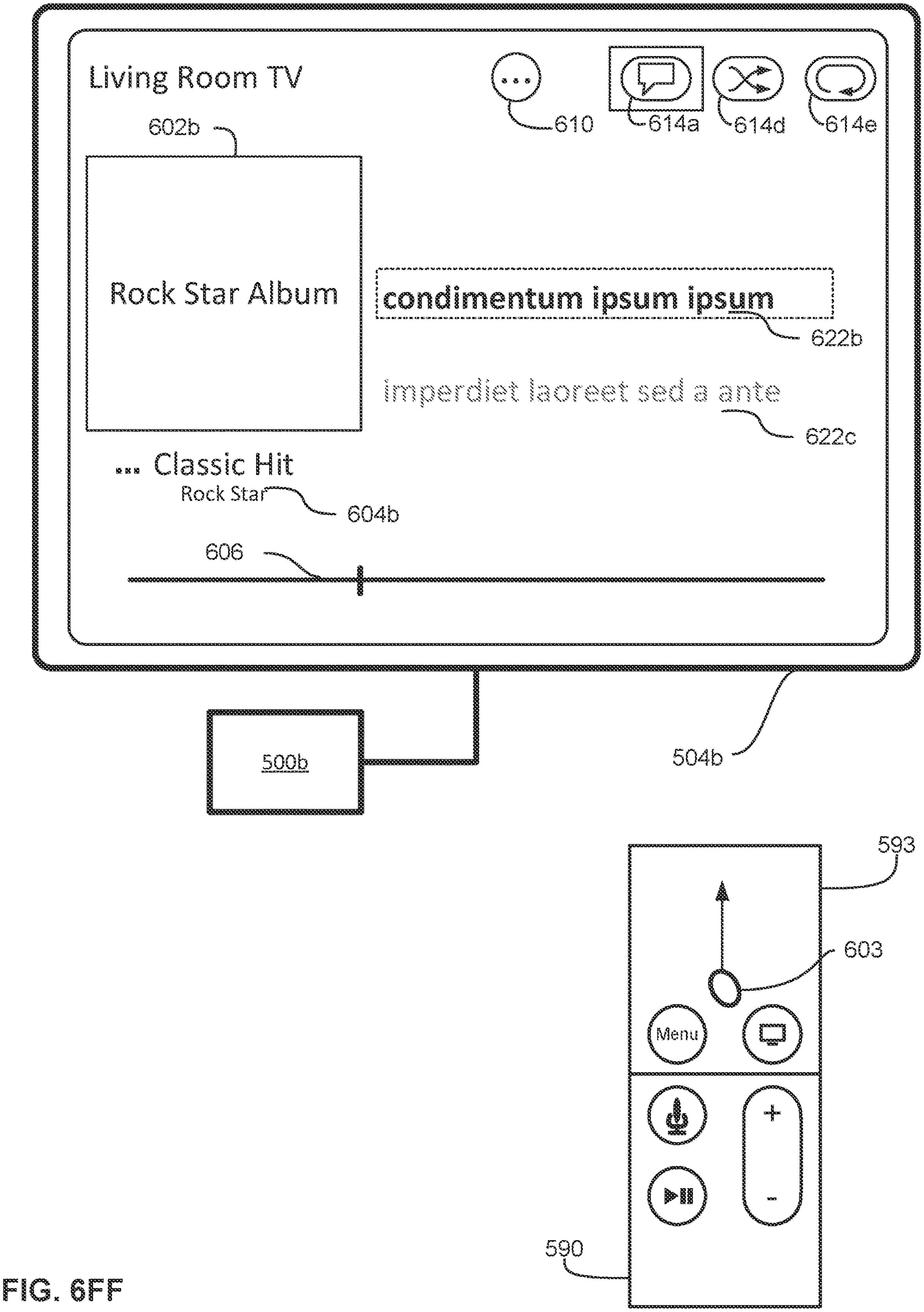
Figure 6G:
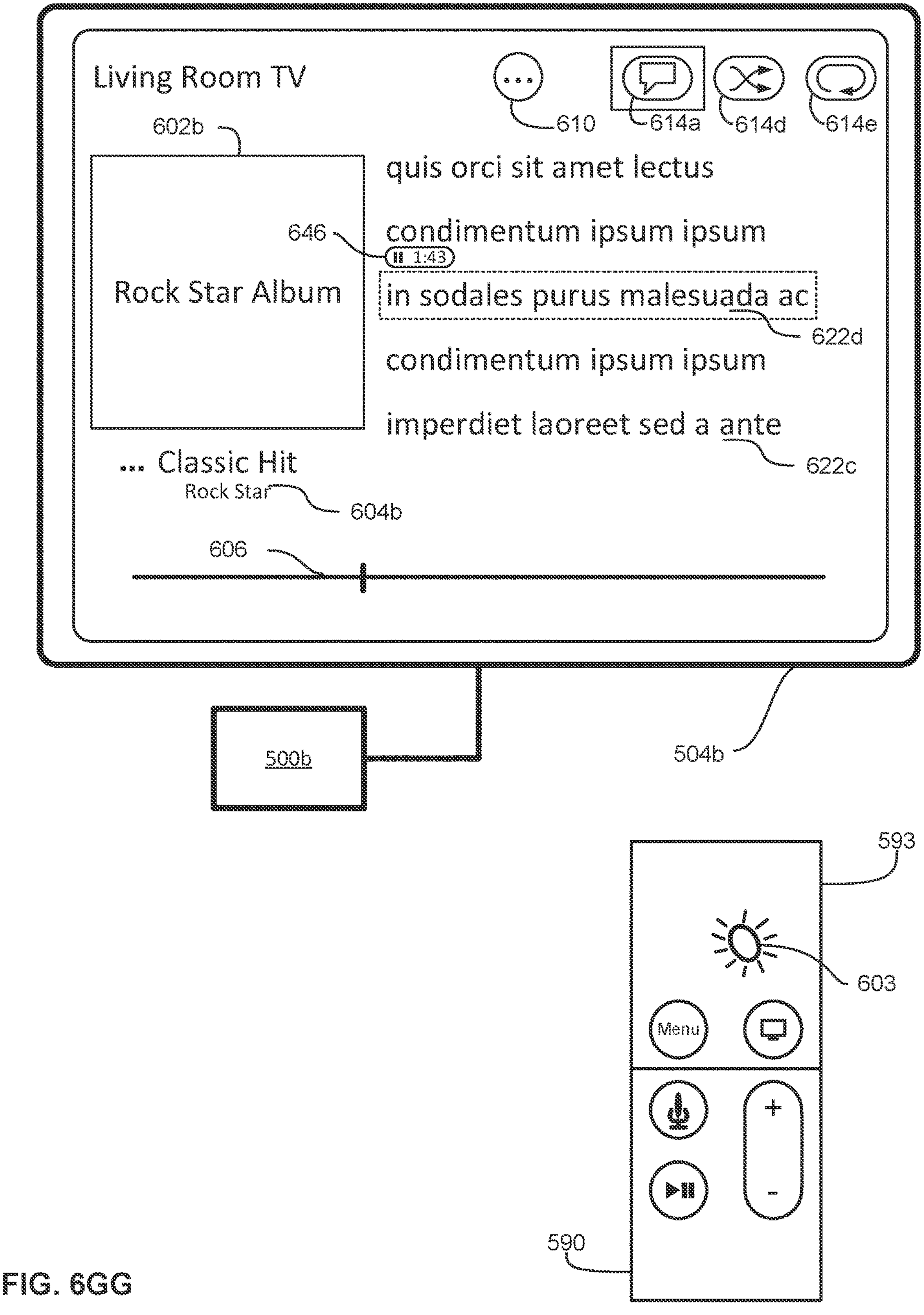
Figure 6H:
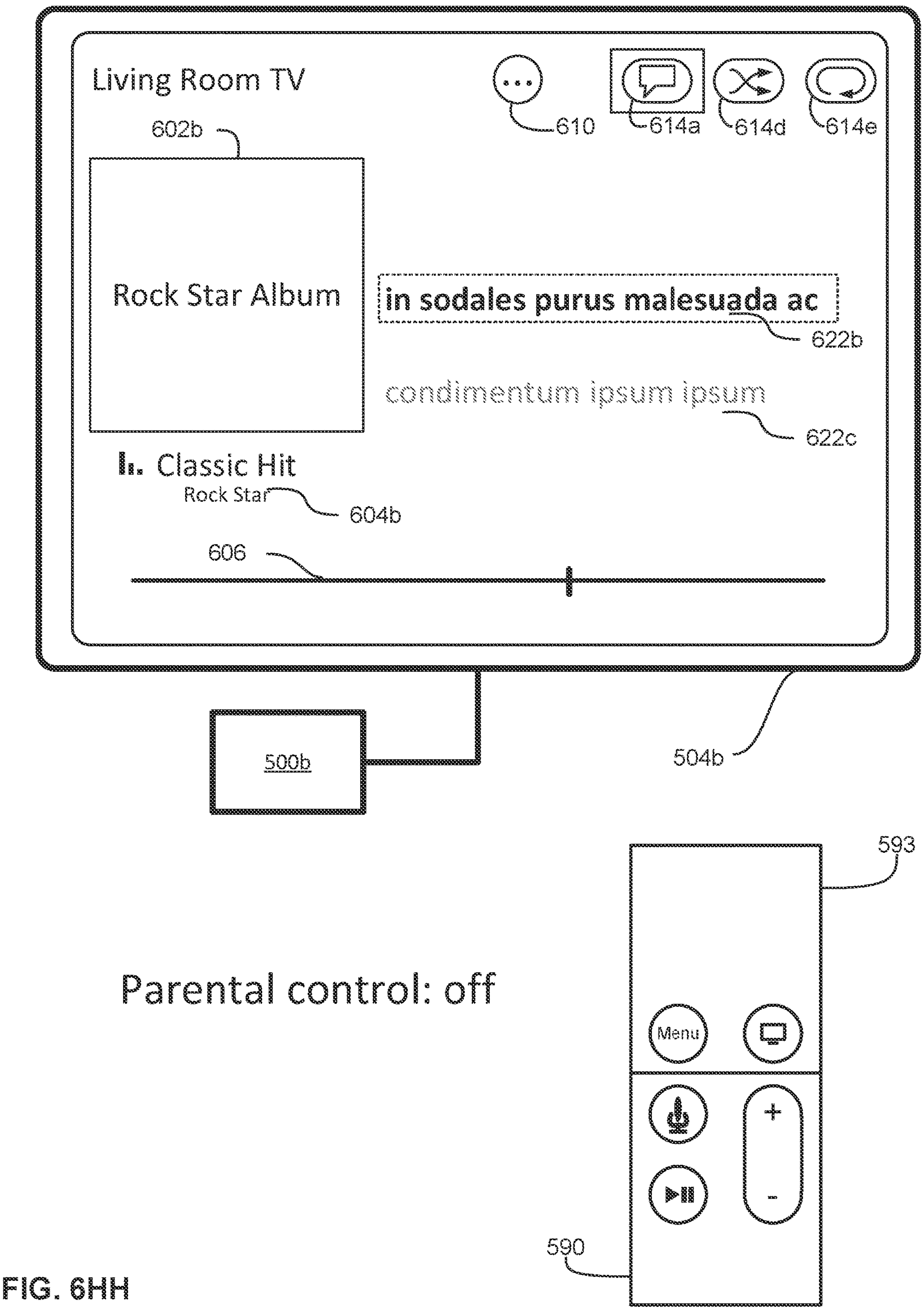
Figure 6I:
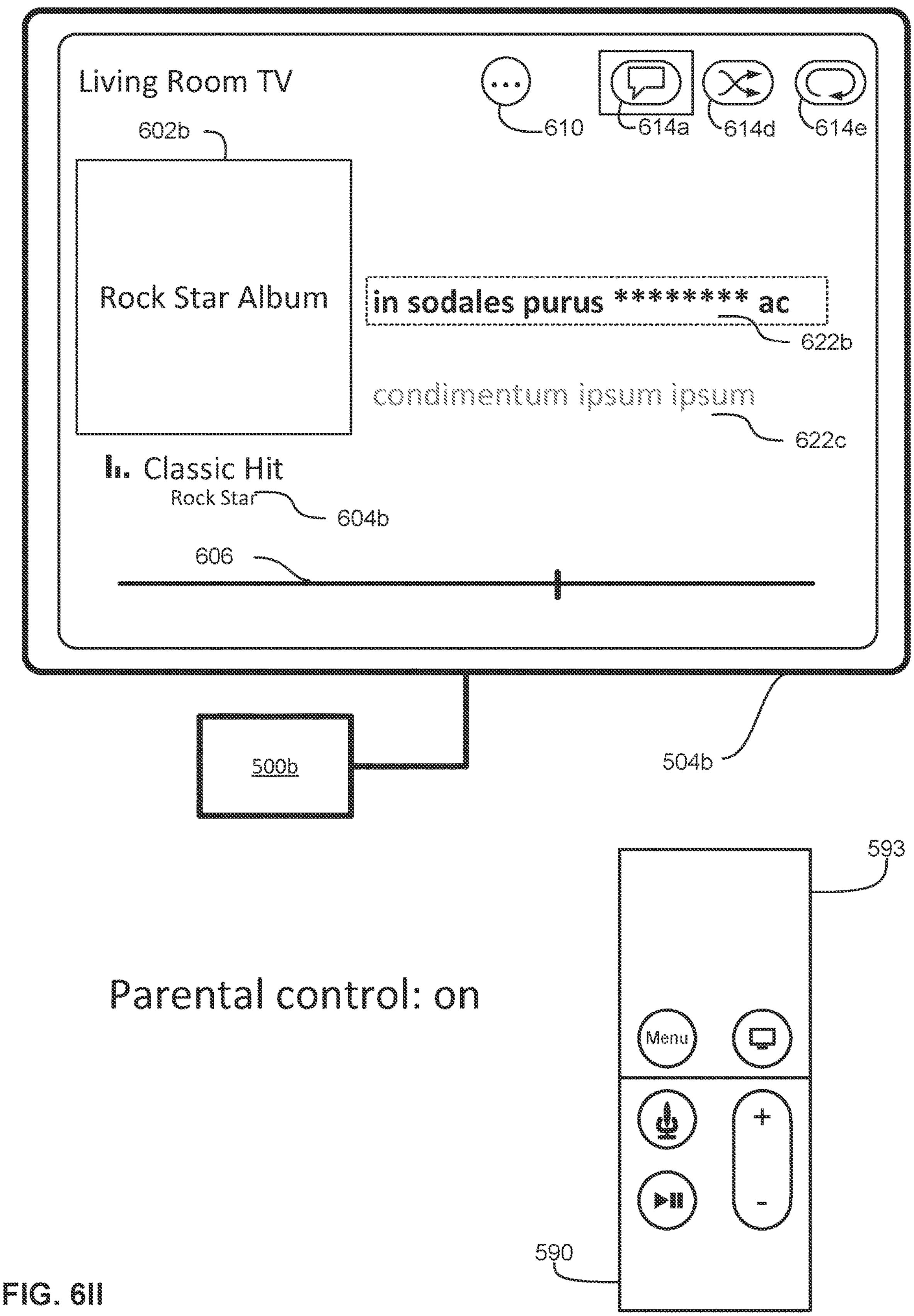
Figure 6J:
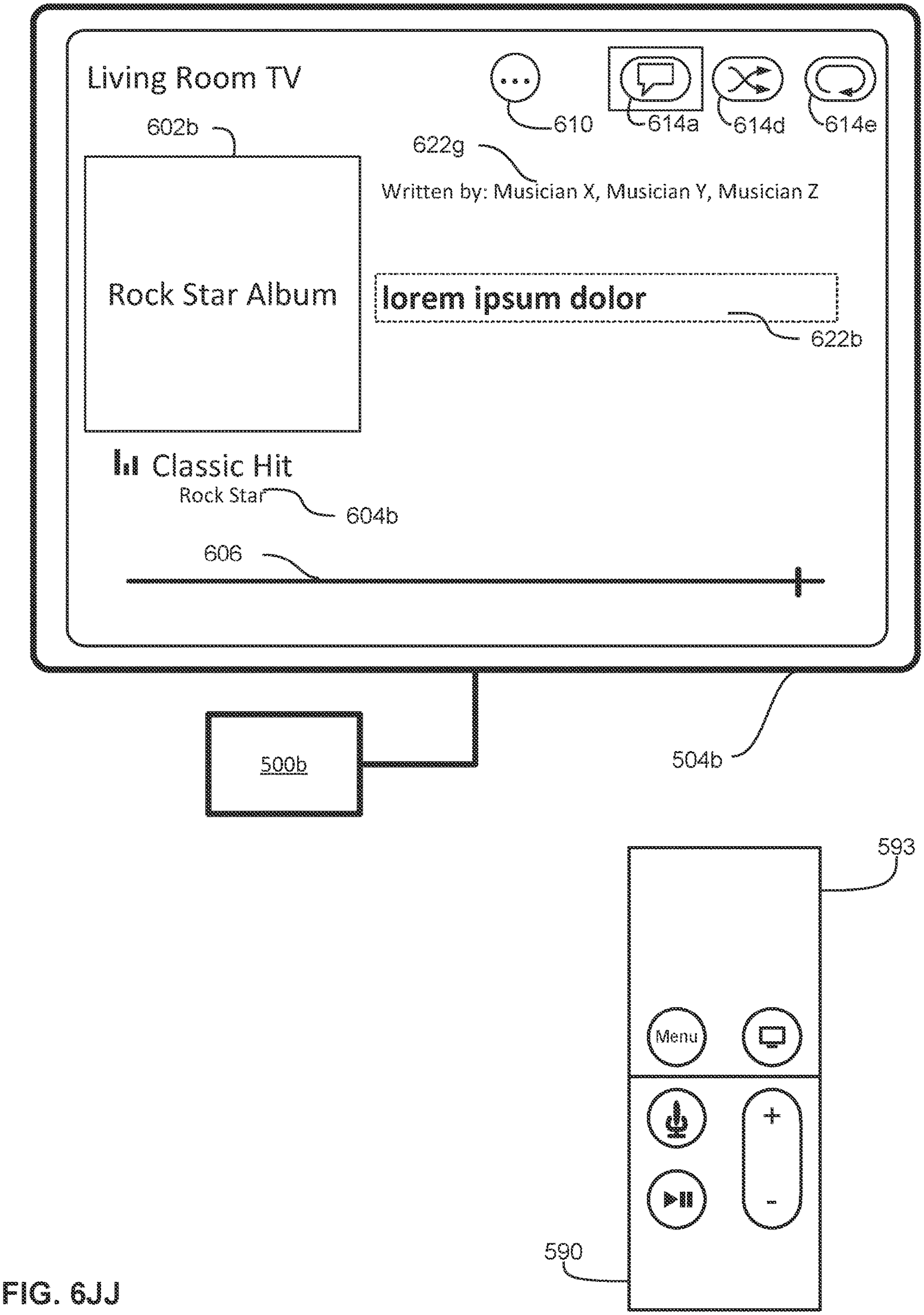
Figure 6K:
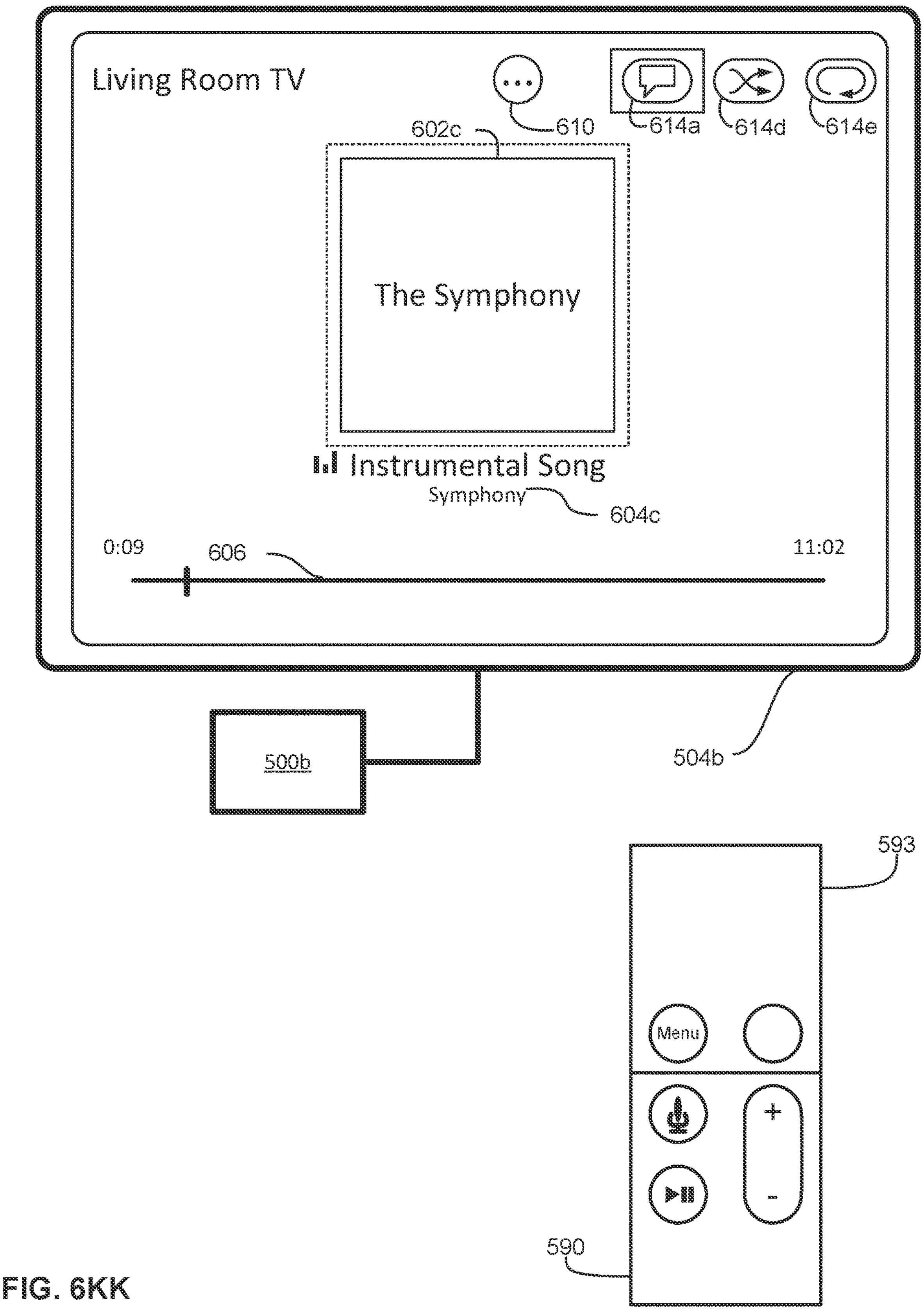
Figure 6L:
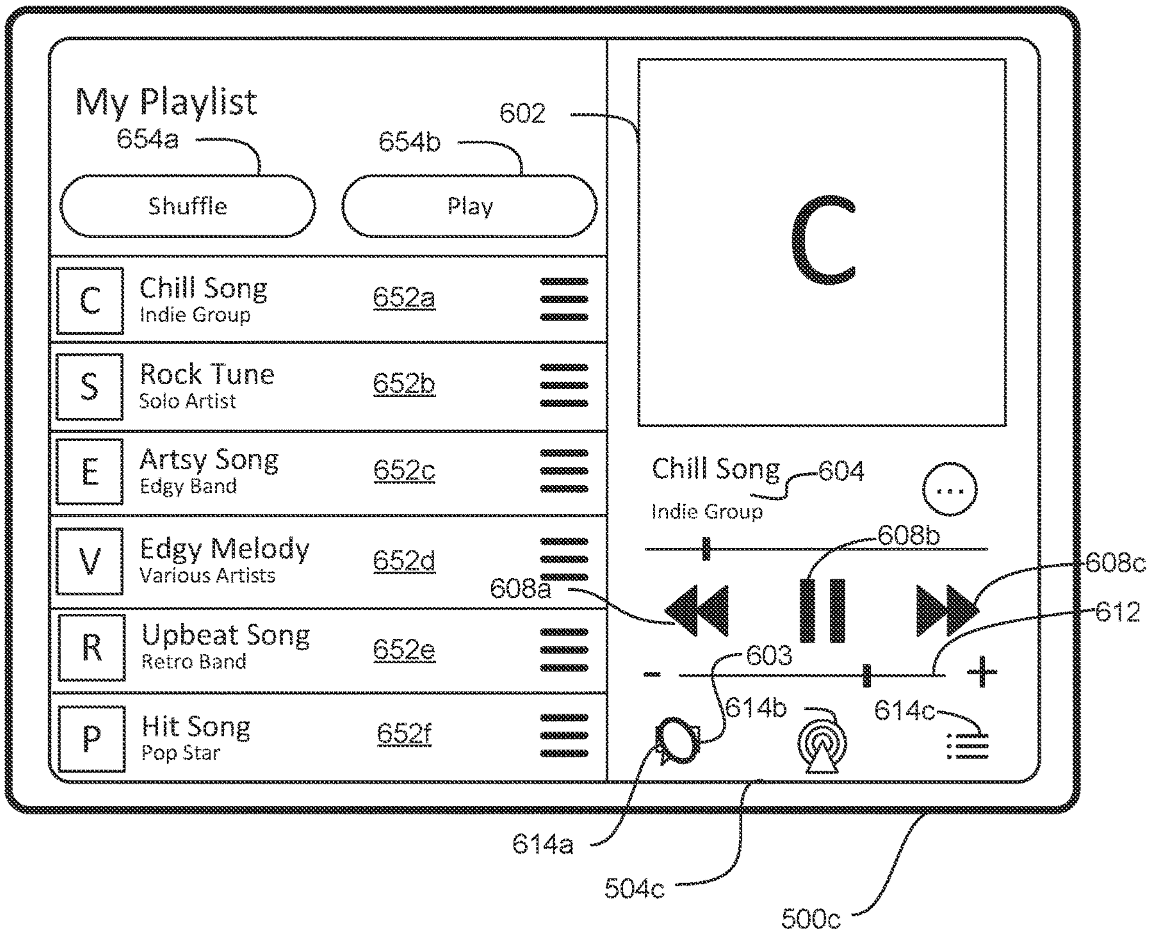
Figure 6M:
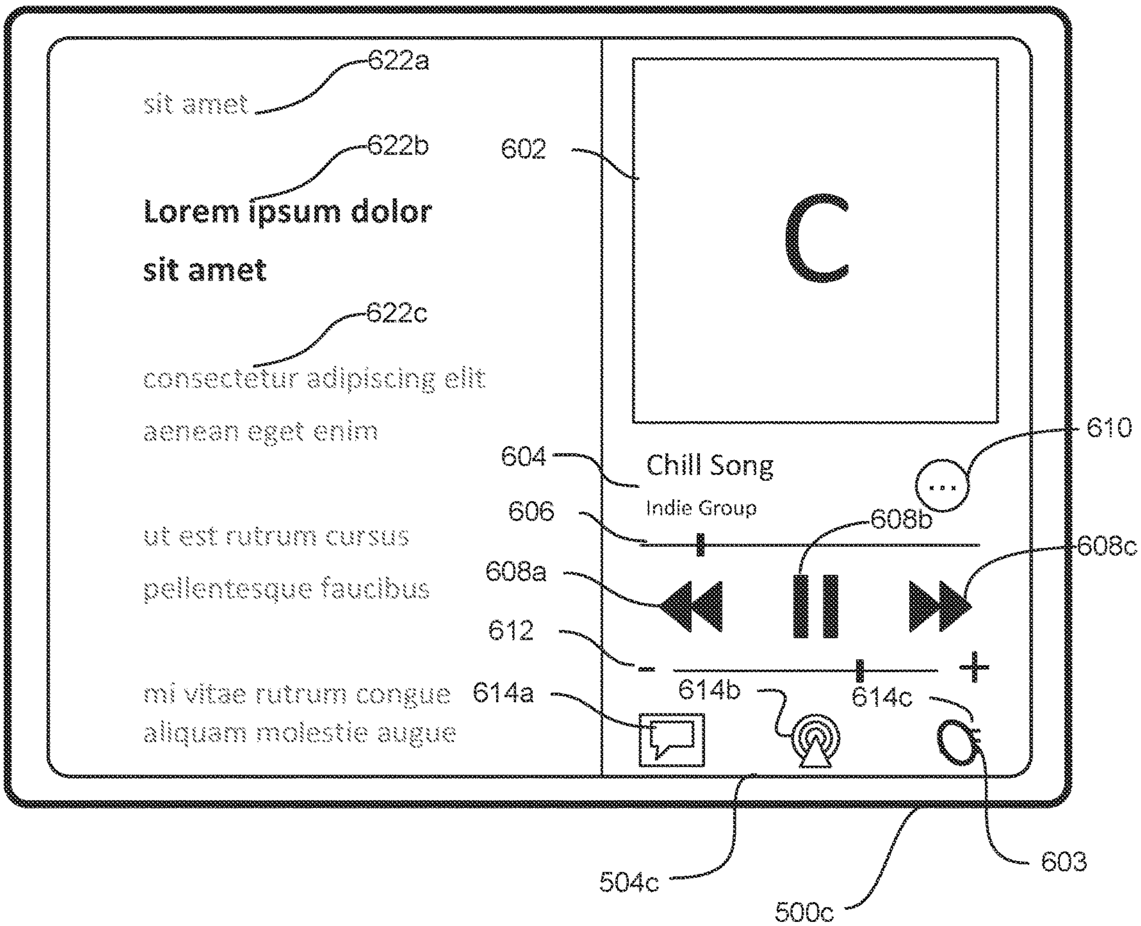
Figure 6N:
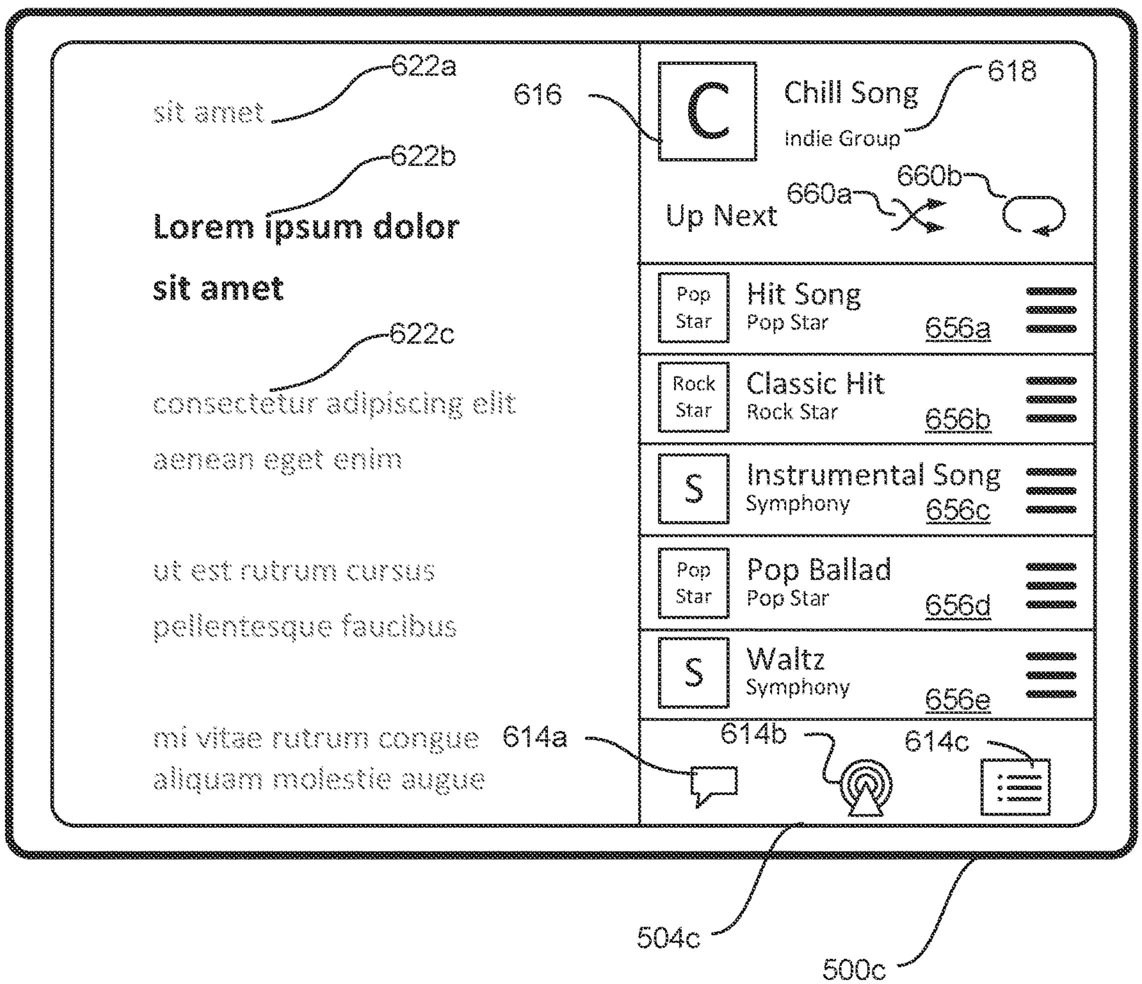
Figure 6O:
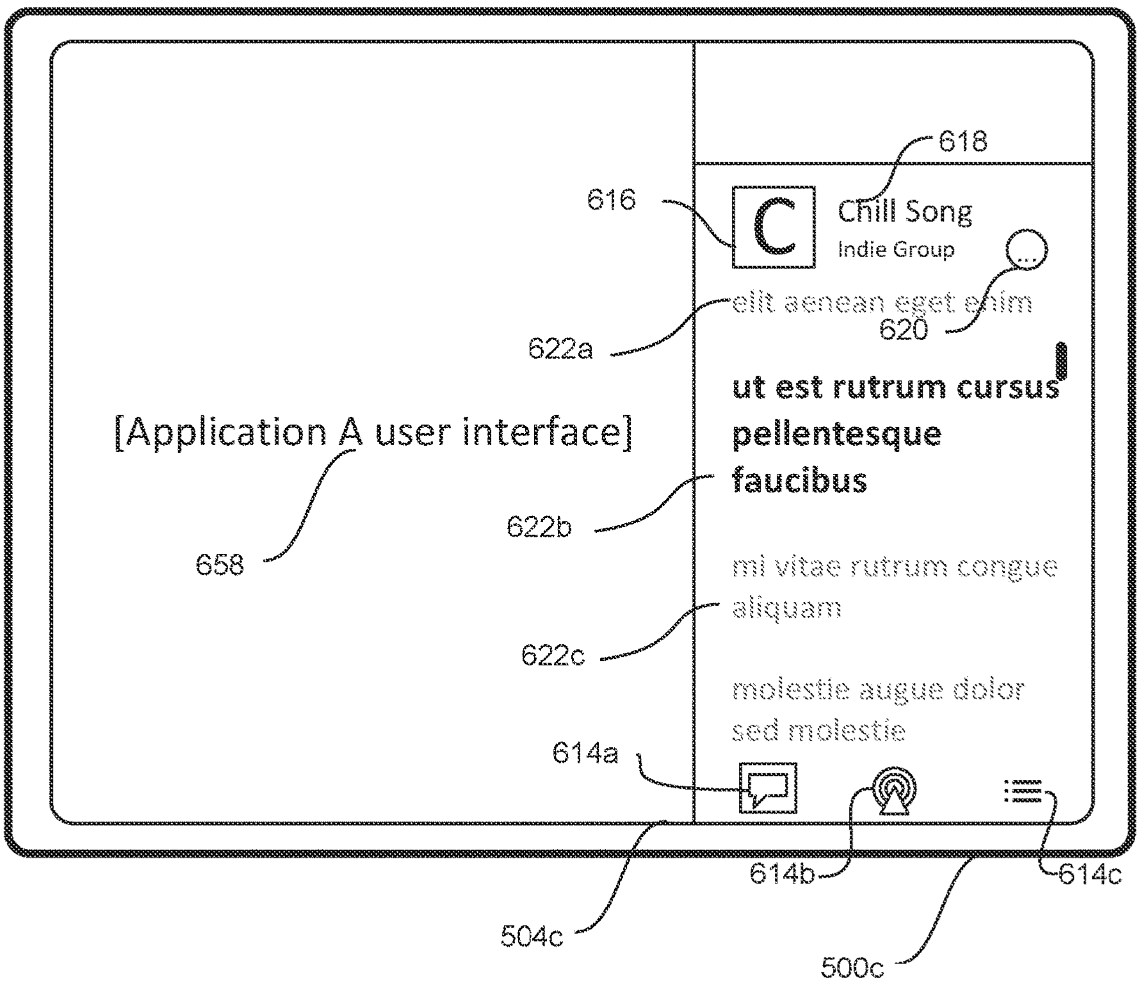
Figure 7A:
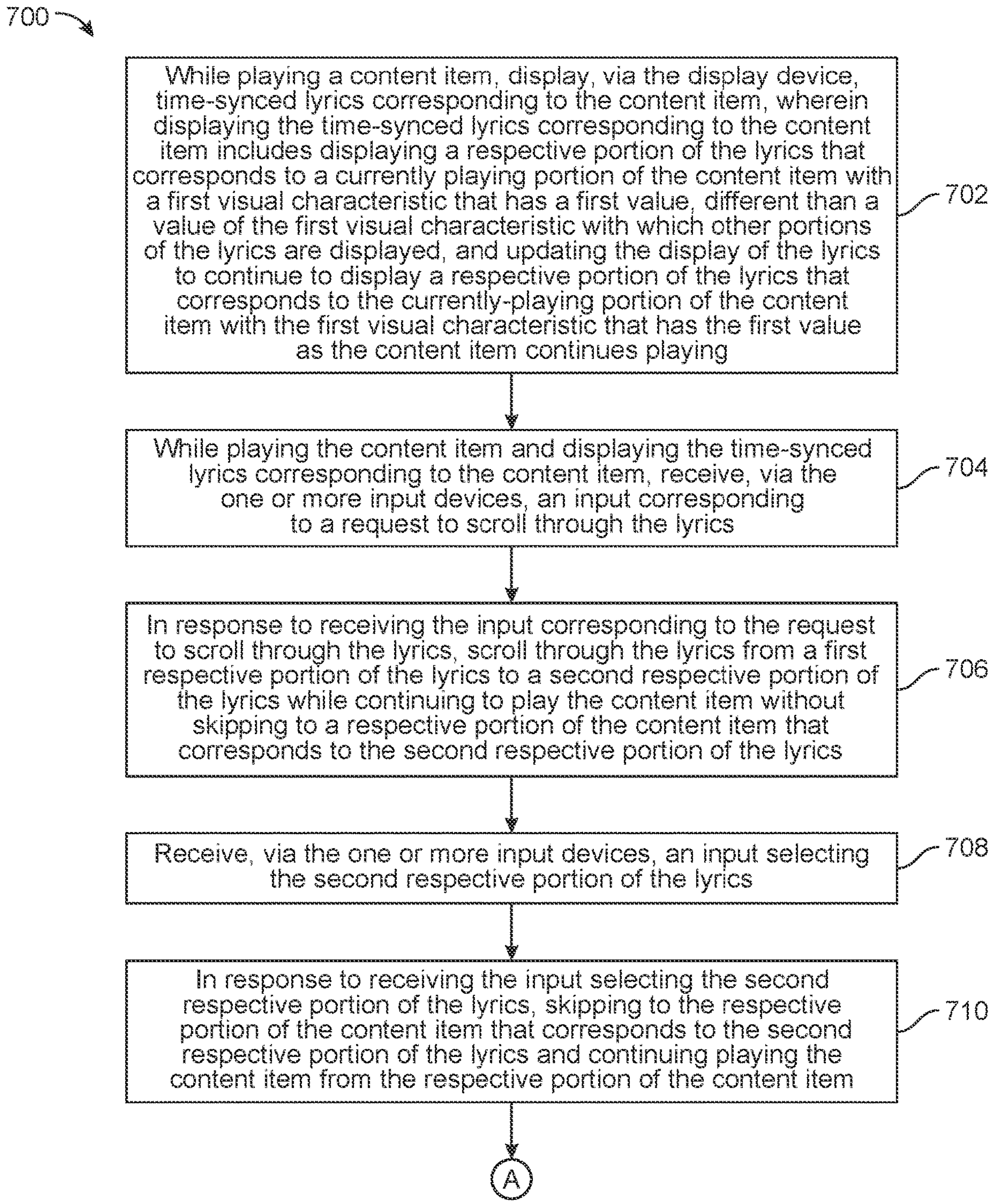
Figure 7B:
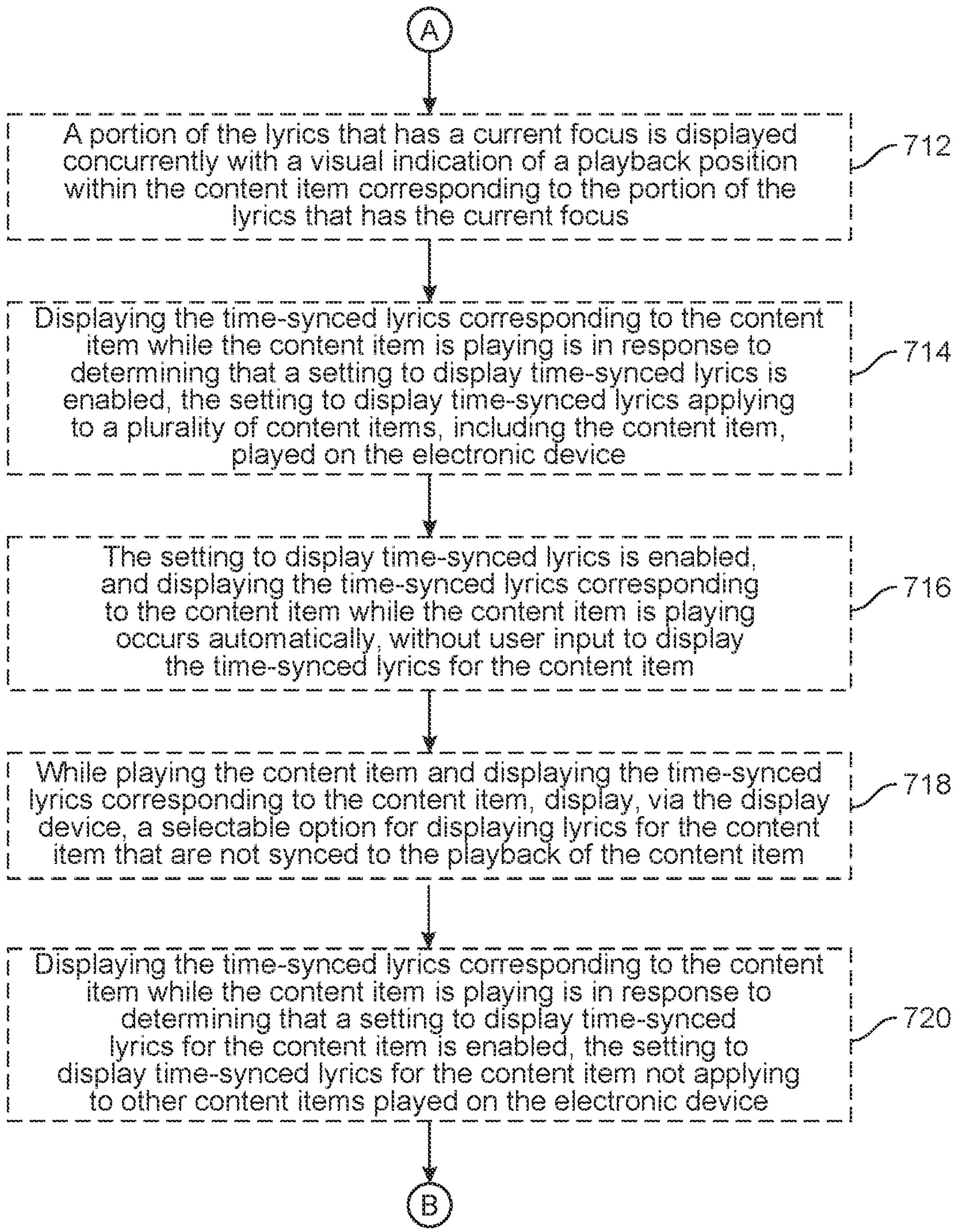
Figure 7C:
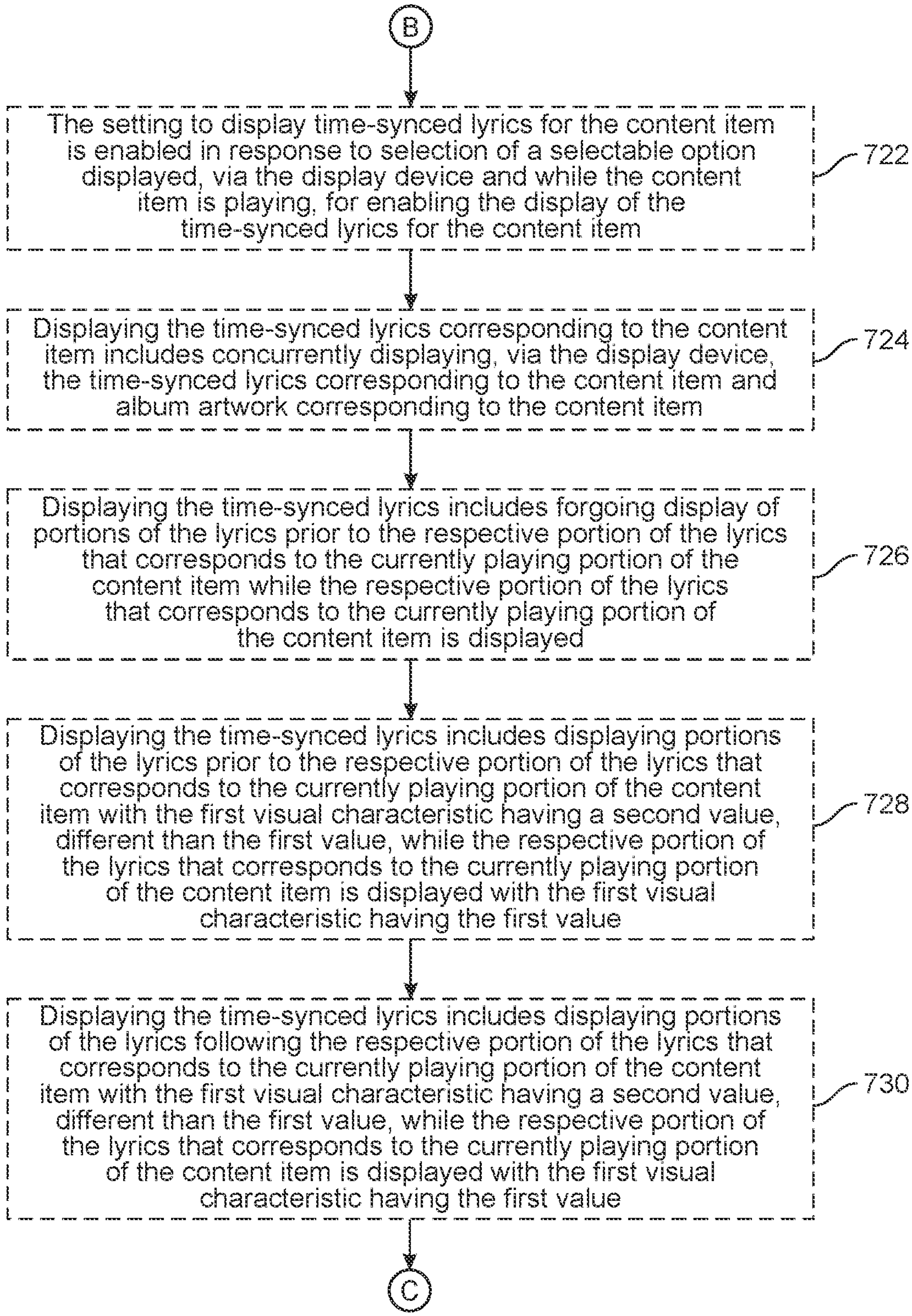
Figure 7D:
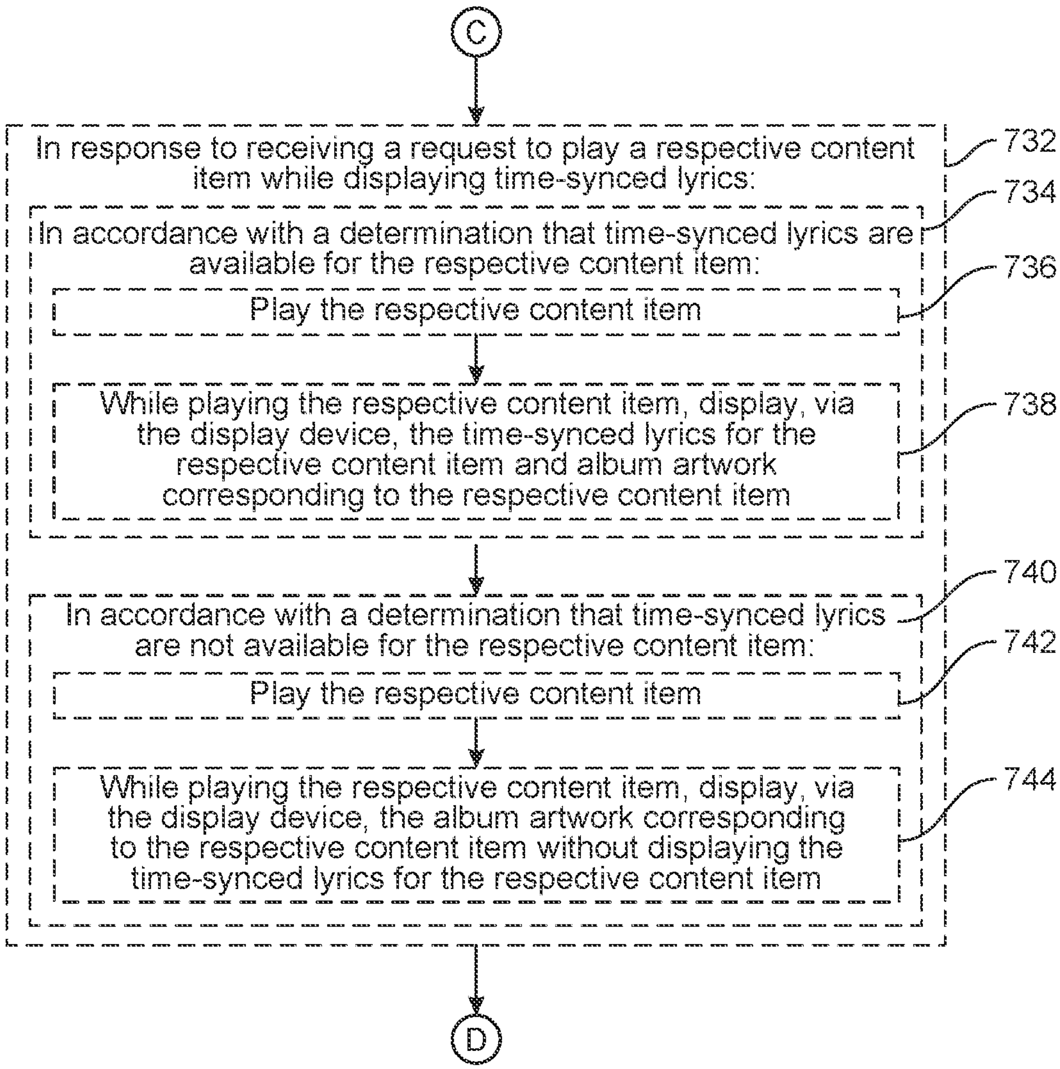
Figure 7E:
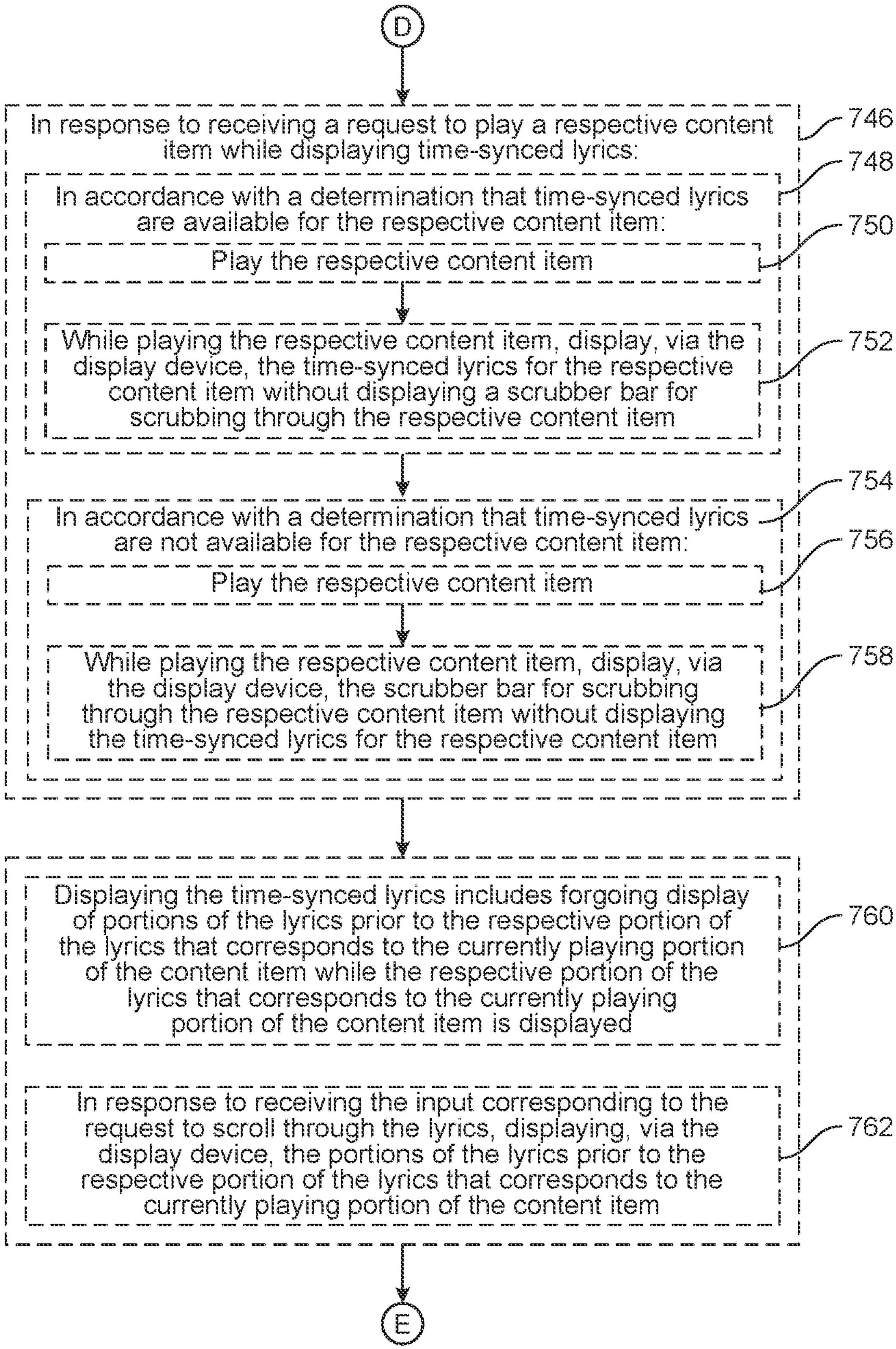
Figure 7F:
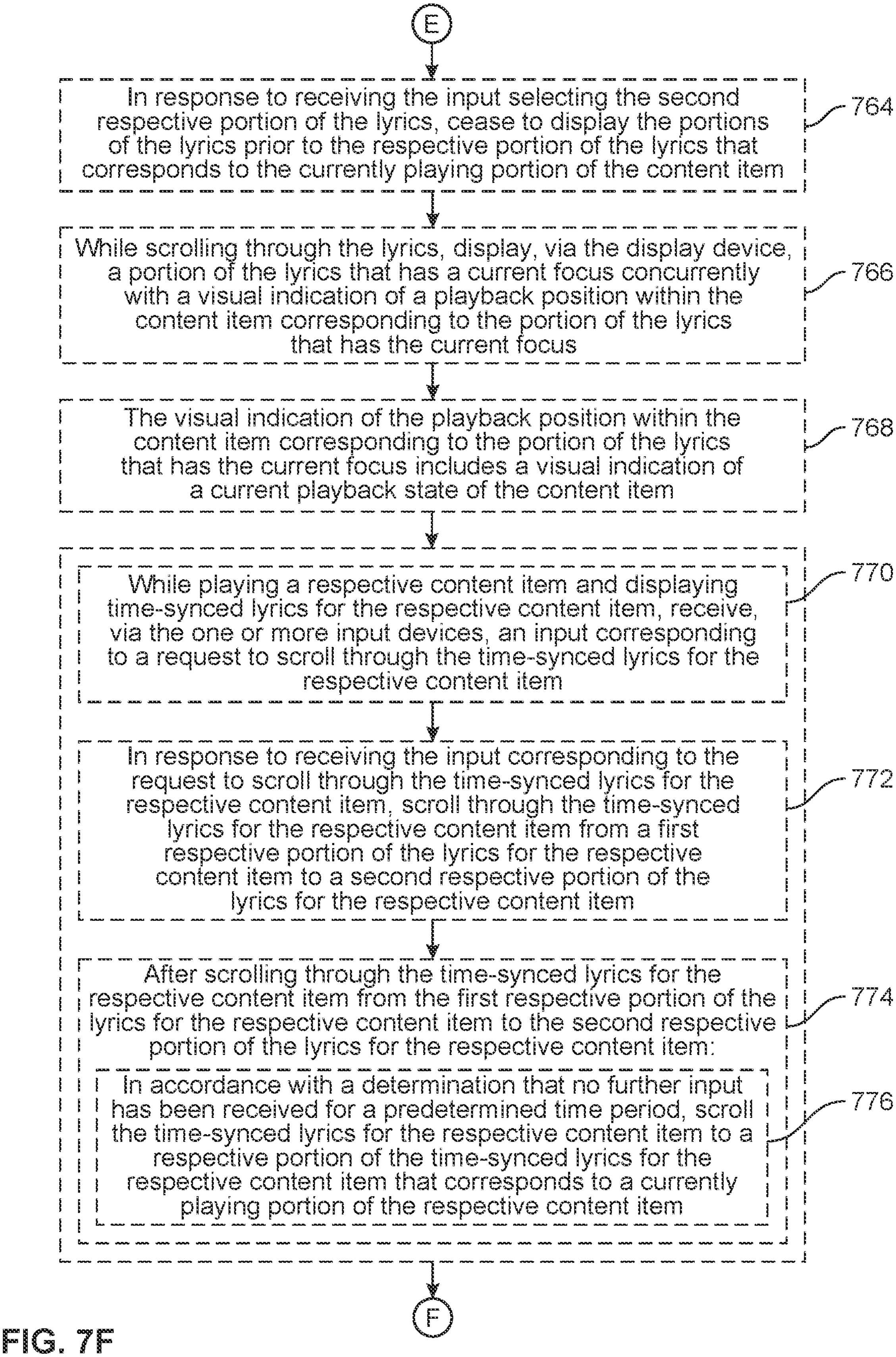
Figure 7G:
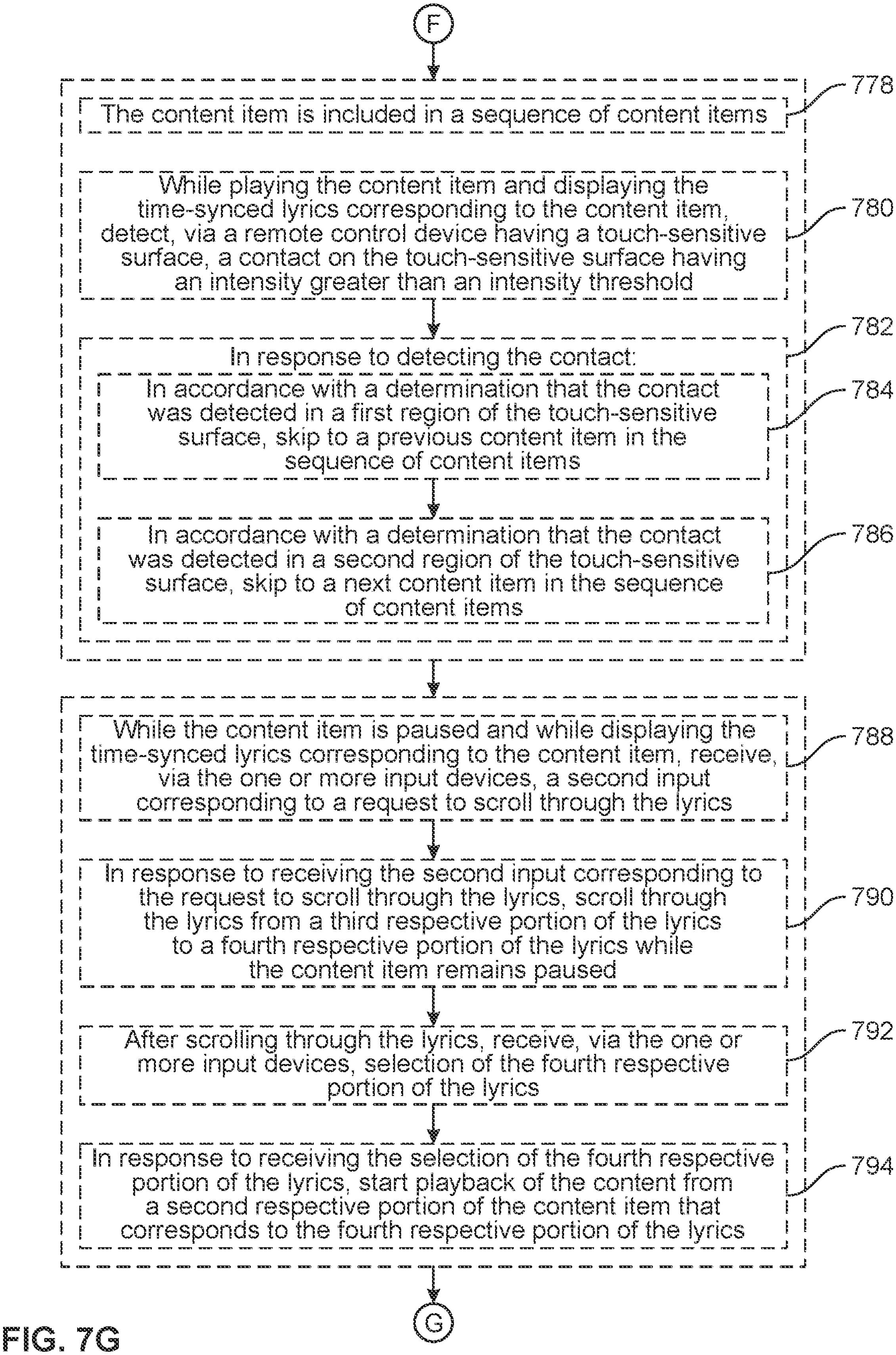
Figure 7I:
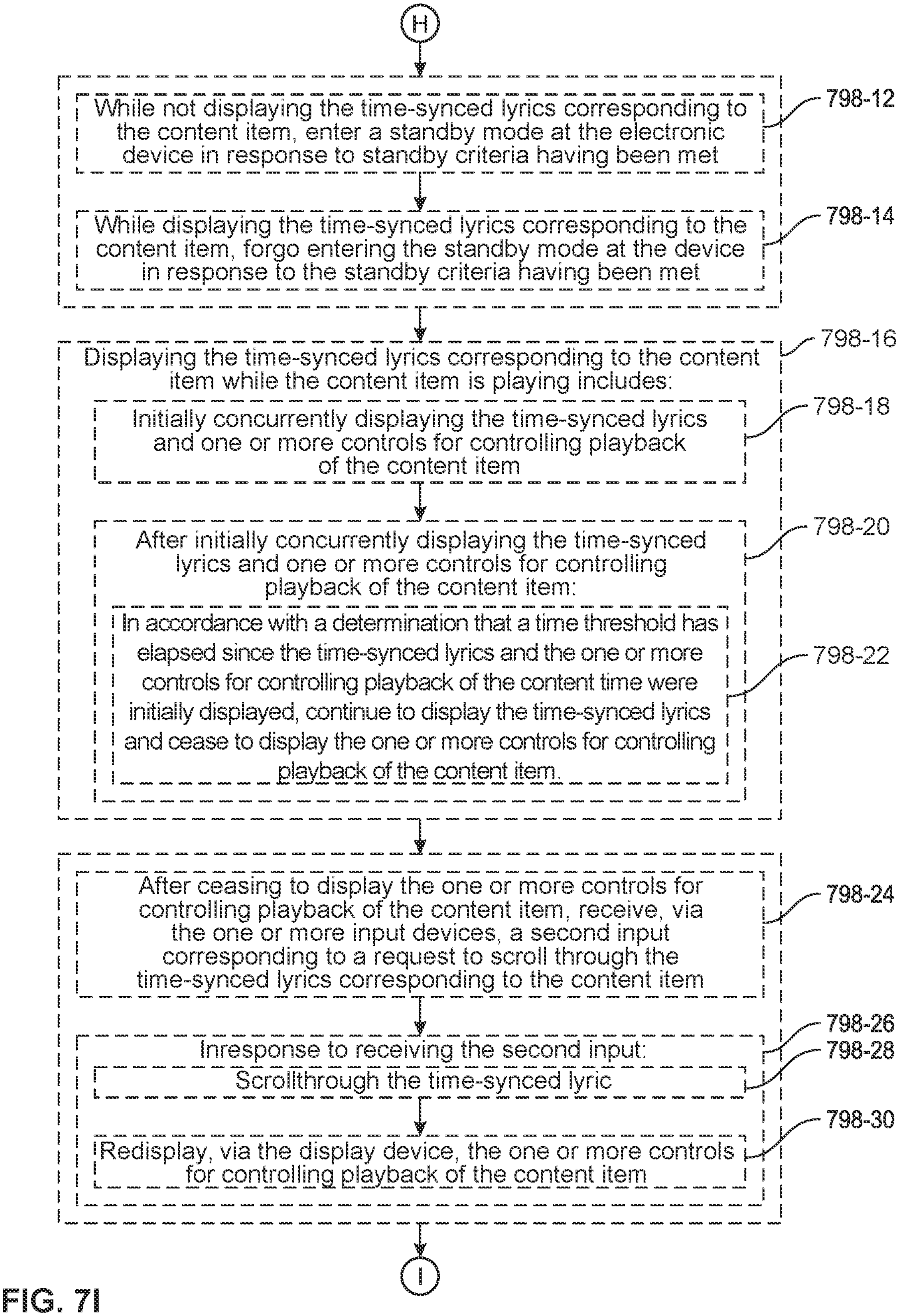
Figure 7J:
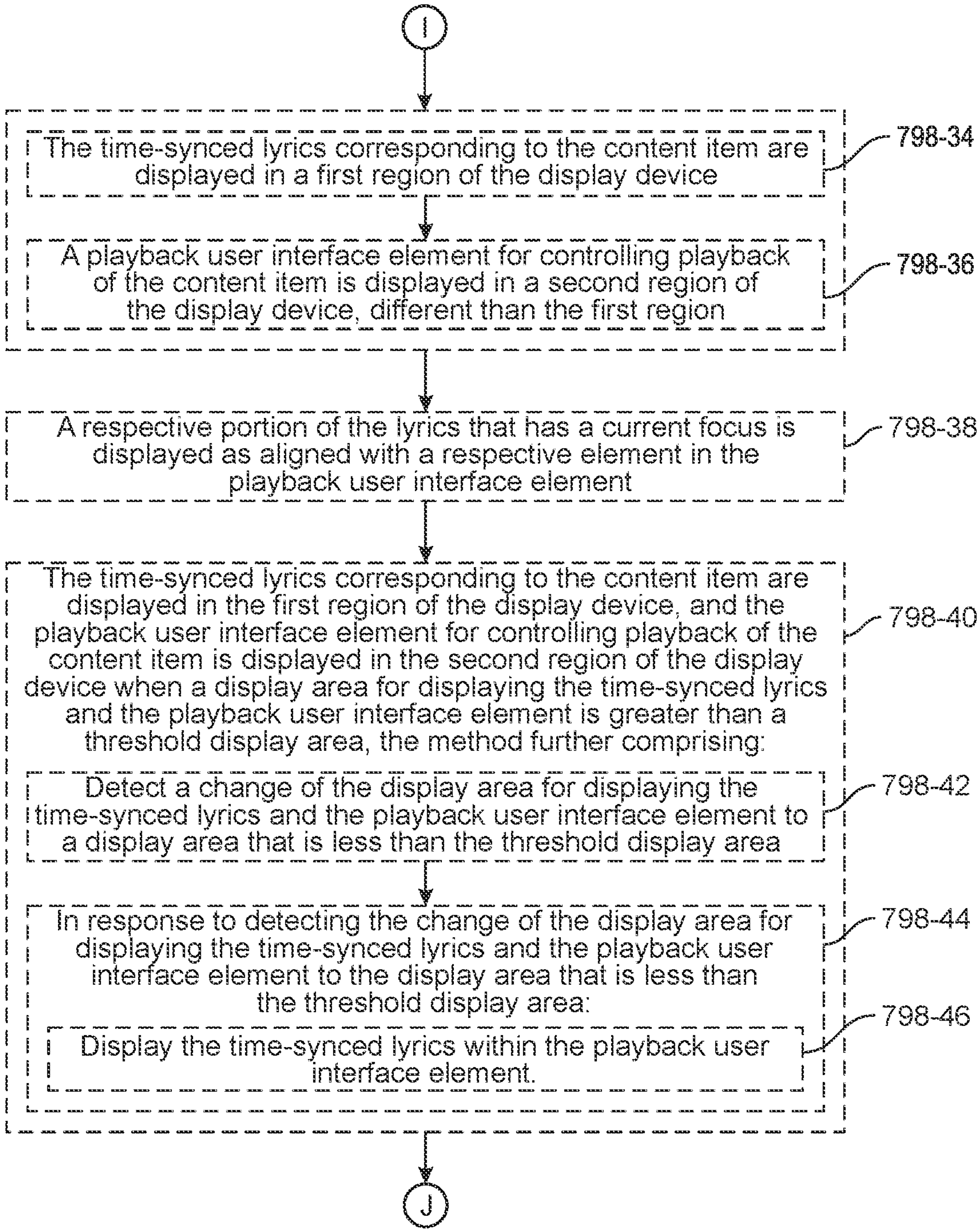
Figure 7K:
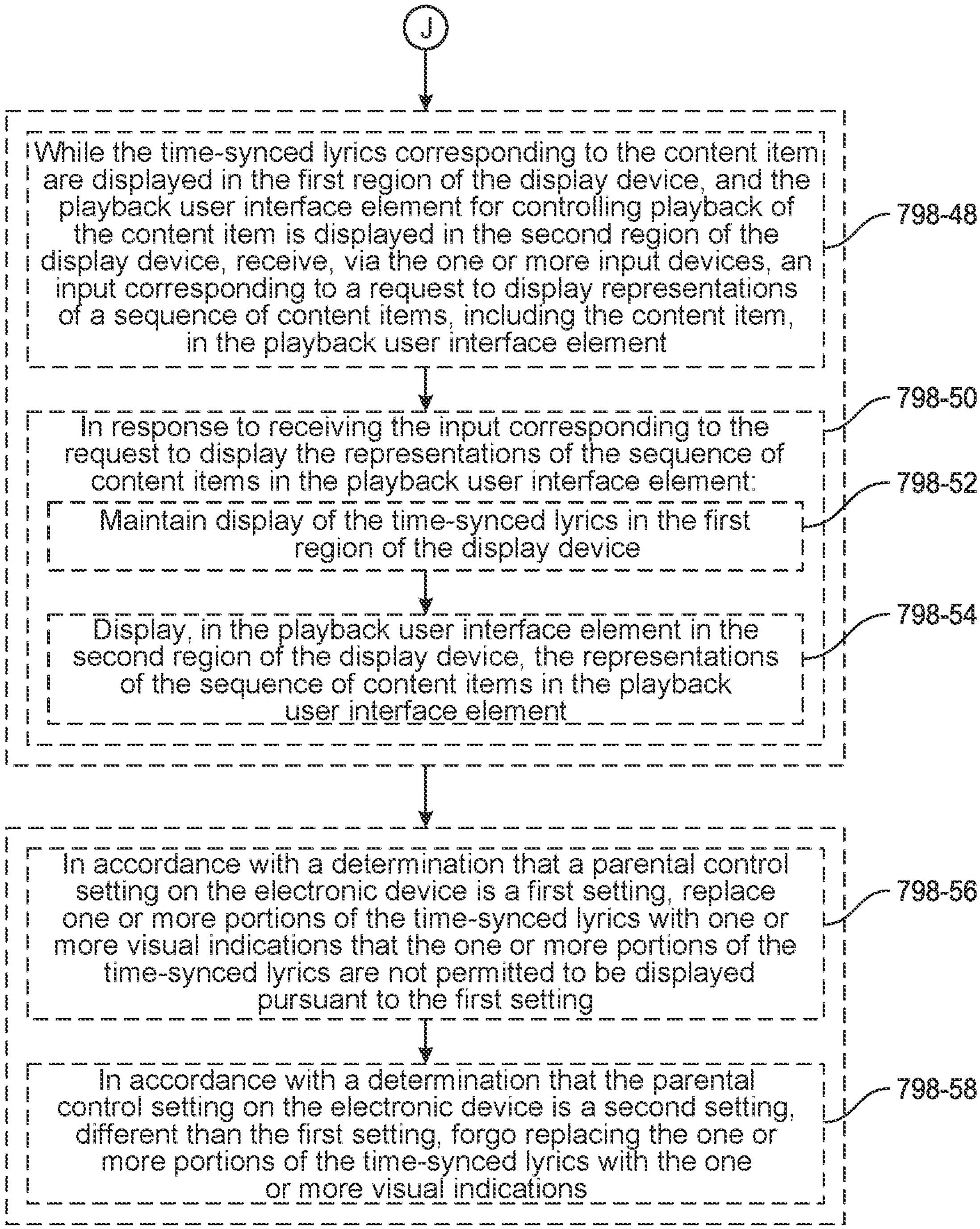

As shown in FIG. 6Z, in response to the user's selection in FIG. 6Y, the electronic device displays the time-synced lyrics of the content item. The time-synced lyrics user interface includes the menu option 610, time-synced lyrics option 614*a* which is selectable to stop displaying time-synced lyrics, the shuffle option 614*d*, and the repeat option 614*e*. The time-synced lyrics user interface further includes the album artwork 602*a* and title and artist 604*a* associated with the currently playing content item, a scrubber bar 606 that indicates the current playback position, a portion 622*b* of lyrics corresponding to the currently-playing portion of the content, and a portion 622*c* of time-synced lyrics that corresponds to the portion of the content that will play after the currently-playing portion of content. The current portion 622*b* of the time-synced lyrics is displayed in a high contrast color and the next portion 622*c* of the time-synced lyrics is displayed in a low-contrast color. The electronic device 500*b* does not display a portion of time-synced lyrics corresponding to the previously-played portion of the content item to reduce the amount of movement displayed on display 504*b* and, thus, reduce the risk of motion sickness among users viewing the time-synced lyrics on a large display 504*b* device. In some embodiments, as the item of content plays, the time-synced lyrics automatically advance with the playback such that the currently playing lyric remains highlighted, the previously-played lyrics fade out off the screen, and upcoming lyrics fade in and/or scroll onto the screen. Further, in the example of FIG. 6Z, because navigation in the user interface is accomplished using a focus and select/click model, the current focus also automatically advances with the lyrics and remains with the currently-playing lyrics unless user input changing the current focus is received.

As shown in FIG. 6Z, the user selects (e.g., with contact 603) the right side of the touch sensitive surface 593 of the input device 590 to play the next content item.

As shown in FIG. 6AA, in response to the user input illustrated in FIG. 6Z, the electronic device 500*b* plays the next item of content and displays the time-synced lyrics 622 of the next content item. In FIG. 6AA, the user scrolls (e.g., with contact 603) to scroll the time-synced lyrics 622 of the content item.

In FIG. 6BB, the electronic device 500*b* scrolls the time-synced lyrics in accordance with the user input. While scrolling the time-synced lyrics 622, the electronic device 500*b* presents all of the lyrics in a high-contrast color (e.g., the lyrics that are currently playing and the previously played/upcoming lyrics are all displayed with the same visual characteristic, except that a portion of lyrics that has the current focus is displayed with an indication of focus) and displays a portion of lyrics with current focus 622*d* and other lyrics 622*c* before and after the portion of the time synced lyrics with the current focus. The electronic device 500*b* also displays an indication 646 of the playback position of the time-synced lyrics that have the current focus 622*d*, which is not necessarily the same as the playback position of the playback of the item of content, which is indicated by scrubber bar 606. While displaying and/or scrolling the time-synced lyrics, the electronic device 500*b* continues playing the content item normally. As shown in FIG. 6BB, the user selects (e.g., with contact 603) the portion of the time-synced lyrics 622*d* with the current focus.

As shown in FIG. 6CC, in response to the user's selection in FIG. 6BB, the electronic device 500*b* moves the playback position within the content item to a portion of the content corresponding to the selected portion of the time-synced lyrics. In FIG. 6CC, the user scrolls (e.g., with contact 603) the lyrics 622 again.

In FIG. 6DD, in response to the user's scrolling in FIG. 6CC, the electronic device 500*b* scrolls the time synced lyrics to another portion 622*d* of the lyrics. After scrolling the lyrics, the user does not enter another input for an amount of time 648 that is less than a threshold time 650 (e.g., 5, 10, etc. seconds).

In FIG. 6EE, after receiving no user input for an amount of time 648 that equals the threshold time 650, the electronic device 500*b* stops displaying the time-synced lyrics to the scrolled location and resumes displaying the portion of the time-synced lyrics 622*b* that correspond to the portion of the content item that is currently playing (and reverts to not displaying previously played lyrics, and displaying currently played lyrics with a different visual characteristic than upcoming lyrics). As shown in FIG. 6EE, while the current focus is on the portion 622*b* of the time-synced lyrics corresponding to the currently-playing portion of the content item, the user selects (e.g., with contact 603) the current portion 622*b* of the time-synced lyrics.

In response to the user's selection in FIG. 6EE, the electronic device 500*b* pauses the content, as shown in FIG. 6FF. As shown in FIG. 6FF, the user scrolls (e.g., with contact 603) the time-synced lyrics while the content item is paused. FIG. 6GG illustrates the time-synced lyrics user interface while the user scrolls the lyrics while the content is paused, which remains paused as the user scrolls through the lyrics. As shown in FIG. 6GG, the indication 646 of the playback position of the portion of lyrics 622*d* with the current focus includes an indication that the content is currently paused.

In FIG. 6GG, the user selects (e.g., with contact 603) the portion of lyrics 622*d* with the current focus. As shown in FIG. 6HH, in response to the user's selection in FIG. 6GG, the electronic device 500*b* resumes playback of the content item from a playback position corresponding to the selected portion of the lyrics (and reverts to not displaying previously played lyrics, and displaying currently played lyrics with a different visual characteristic than upcoming lyrics). Also shown in FIG. 6HH, while parental control is off, the electronic device 500*b* displays all of the lyrics of the content item. As shown in FIG. 6II, when parental control is on, the electronic device 500*b* redacts one or more portions of lyrics that are restricted due to the parental control setting.

In FIG. 6JJ, the electronic device 500*b* reaches the end of the content item and displays the last line of lyrics 622*b* with the current focus, and the credits 622*g* of the content item above the last line of the lyrics.

In FIG. 6KK, the electronic device 500*b* finished playing the previous item of content and plays the next item of content, which does not have lyrics (e.g., time-synced lyrics). While in the time-synced lyrics view on the electronic device 500*b*, the electronic device 500*b* displays the album art 602*c* and title and artist 604*c* of the content item and scrubber bar 606. The electronic device 500*b* does not display time-synced lyrics because the content item does not have lyrics, even though the time-synced lyrics toggle 614*a* is enabled. In some embodiments, if another content item is played after the content item in FIG. 6KK, the time-synced lyrics for that content item will be automatically displayed by device 500*b* as long as that content item has time-synced lyrics available.

Thus, as shown in FIGS. 6X-6KK, the electronic device 500*b* is able to display time-synced lyrics and able to enable the user to scroll through the time-synced lyrics.

FIGS. 6LL-6OO illustrate ways an electronic device 500*c* concurrently displays a time-synced lyrics user interface and another user interface.

In FIG. 6LL, the electronic device 500*c* displays a user interface of a content application. The left side of the display 504*c* includes a playlist user interface and the right side of the display 504*c* includes the content playback user interface described previously with reference to FIG. 6A. The playlist user interface includes a plurality of representations 652*a-f* of content items included in a respective playlist, an option 654*a* to play the playlist in a shuffled order that is different from a predetermined order of the playlist and an option 654*b* to play the playlist in the predetermined order of the playlist. The representations 652 are optionally selectable to initiate playback of the selected content item. As shown in FIG. 6LL, the user selects (e.g., with contact 603) the option 614*a* to display the time-synced lyrics of a content item that is currently playing on the electronic device 500*b*.

As shown in FIG. 6MM, in response to the input illustrated in FIG. 6LL, the electronic device 500*b* displays the time-synced lyrics user interface in the left region of the display 504*c* in place of the playlist user interface. The time-synced lyrics user interface includes a portion of lyrics 622*a* corresponding to a portion of the content item that already played, a portion of lyrics 622*b* corresponding to the portion of the content item that is currently playing, and a portion 622*c* of lyrics corresponding to an upcoming portion of the content item. The current portion 622*b* of lyrics is middle-aligned with the album artwork 602 of the content item. As shown in FIG. 6MM, the user selects (e.g., with contact 603) an option 614*c* to display representations of content items in a playback sequence that the electronic device 500*c* will play next in accordance with one or more steps of method 900 described below.

In response to the user's selection in FIG. 6MM, the electronic device 500*c* presents the representations 646*a-e* of the content items that will play next on the electronic device while displaying the time-synced lyrics user interface (and instead of the content playback user interface displayed in FIG. 6MM). The electronic device 500*c* also displays the album art 616 of the content item, the indication 618 of the title and artist of the content item, an option 660*a* to shuffle the remaining content items, and an option 660*b* to repeat playback of one or more content items.

In FIG. 6OO, the electronic device 500*c* concurrently displays the user interface 658 of an application other than the content application and the time-synced lyrics user interface (e.g., in a split screen, multitasking view). The content playback user interface is scaled down to maintain a predetermined aspect ratio within the width of the display 504*c* not occupied by the user interface 658 of the other application, and the time-synced lyrics user interface is now displayed in place of the content item sequence user interface (e.g., because it is no longer possible to concurrently display the time-synced lyrics user interface and the content item sequence user interface). In some embodiments, option 614*a* in FIG. 6OO is selectable to cease displaying the time-synced lyrics user interface on the right side of display 504*c*, and to redisplay the content playback user interface on the right side of display 504*c*. Further, in some embodiments, option 614*c* in FIG. 6OO is selectable to cease displaying the time-synced lyrics user interface on the right side of display 504*c*, and to redisplay the content item sequence user interface on the right side of display 504*c*.

Thus, as shown in FIGS. 6LL-6OO, electronic device 500*c* is able to concurrently display a time-synced lyrics user interface and another user interface.

FIGS. 7A-7K are flow diagrams illustrating a method 700 of presenting time-synced lyrics of a content item in accordance with some embodiments. The method 700 is optionally performed at an electronic device such as device 100, device 300, device 500, device 501, device 510, and device 590 as described above with reference to FIGS. 1A-1B, 2-3, 4A-4B and 5A-5J. Some operations in method 700 are, optionally combined and/or order of some operations is, optionally, changed.

As described below, the method 700 provides ways to present time-synced lyrics while playing an item of content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6C, an electronic device 500*a* in communication with a display device 504*a* and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), while playing a content item, displays (702), via the display device, time-synced lyrics 622 corresponding to the content item (e.g., the lyrics of the content item, which is optionally a song that includes lyrics). In some embodiments, such as in FIG. 6C, displaying the time-synced lyrics corresponding to the content item includes displaying a respective portion 622*b* of the lyrics that corresponds to a currently playing portion of the content item with a first visual characteristic that has a first value, different than a value of the first visual characteristic with which other portions 622*a* and 622*c* of the lyrics are displayed, and updating the display of the lyrics to continue to display a respective portion of the lyrics that corresponds to the currently-playing portion of the content item with the first visual characteristic that has the first value as the content item continues playing. For example, highlighting a respective portion of the lyrics includes presenting the lyrics with a visual characteristic that is different from a visual characteristic of the other lyrics. For example, the display device displays a line of lyrics corresponding to a portion of a song that is currently playing in high-contrast color (e.g., white text on a dark gray background or black text on a light gray background) and one or more lines of lyrics before and/or after the line of lyrics that is currently playing in a low-contrast color (e.g., black text on a dark gray background or white text on a light gray background). In some embodiments, as the electronic device continues to play the content, the electronic device updates the presentation of the lyrics to highlight the line of lyrics that includes the words that are currently playing in the content. Once all of the words in a highlighted portion of the lyrics have been played and the next line of lyrics starts playing, the electronic device optionally highlights the next line of lyrics and optionally either ceases displaying the line of lyrics that was just playing or presents the line of lyrics that was just playing with the non-highlighted appearance. In some embodiments, the electronic device displays a predetermined number of lines of lyrics before and/or after the currently-playing line of lyric and updates the displayed lyrics as the content plays to cease displaying previously-played lyrics and to display lines of lyrics that will be played next.

In some embodiments, such as in FIG. 6I, while playing the content item and displaying the time-synced lyrics 622 corresponding to the content item, the electronic device 500*a* receives (704), via the one or more input devices, an input corresponding to a request to scroll through the lyrics (e.g., a contact and movement of a contact on a touch-sensitive display that displays the lyrics, clicking a touch surface and moving a contact on the touch surface of a remote control device in communication with the electronic device that displays the lyrics on a display device, etc.). In some embodiments, the electronic device scrolls the lyrics in accordance with the direction of the movement of the contact or another directional input (e.g., selection of an arrow key of a keyboard in communication with the electronic device).

In some embodiments, such as in FIG. 6J, in response to receiving the input corresponding to the request to scroll through the lyrics, the electronic device 500*a* scrolls (706) through the lyrics 622*a* from a first respective portion of the lyrics (e.g., a portion of the lyrics that includes the lyrics that are currently playing in the content) to a second respective portion 622*d* of the lyrics (e.g., a different portion of the lyrics selected in accordance with the input) while continuing to play the content item without skipping to a respective portion of the content item that corresponds to the second respective portion of the lyrics (e.g., the content continues to play normally while the lyrics scroll in accordance with the input). In some embodiments, scrolling the lyrics includes ceasing to display the lyrics that correspond to the part of the content that is currently playing. The electronic device optionally highlights the second respective portion of the lyrics that has the current focus as the lyrics are scrolled. In some embodiments, in addition to presenting the second respective portion of the lyrics (e.g., the line of lyrics with the current focus), the electronic device presents one or more lines of lyrics before and/or after the second respective portion of the lyrics.

In some embodiments, the electronic device 500*a* receives (708), via the one or more input devices, an input selecting the second respective portion 622*d* of the lyrics (e.g., detecting a click of a touchpad of a remote control device in communication with the electronic device that displays the lyrics on the display device, detecting selection (e.g., with a tap of a contact) of the second respective portion of the lyrics displayed on a touch-sensitive display of the electronic device).

In some embodiments, such as in FIG. 6K, in response to receiving the input selecting the second respective portion of the lyrics, the electronic device 500*a* skips (710) to the respective portion of the content item that corresponds to the second respective portion 622*b* of the lyrics and continuing playing the content item from the respective portion of the content item. In some embodiments, the electronic device skips to a portion of the content item that is right before the second respective portion of the lyrics (e.g., 1 second, 3 seconds, 5 seconds before), or right at the second portion of the content item. The electronic device optionally displays the lyrics overlaid on a background that includes a blurred version of an image associated with the content item (e.g., album artwork) that moves in a manner that corresponds to the playing content. For example, the brightness of the background changes as the treble portions of the content change and the shapes of the different colors of the background expand and contract as the bass portions of the content change. The above-described manner of continuing to play the respective content item while the user scrolls the lyrics of the respective content item allows the electronic device to enable the user to search for and select a respective portion of the lyrics from which to resume playback while continuing to listen to the respective content item, which simplifies the interaction between the user and the electronic device and enhances the operability of the electronic device and makes the user-device interface more efficient (e.g., by enabling the user to more quickly locate the respective portion of the respective item of content by scrubbing the lyrics instead of scrubbing the audio of the respective content item), which additionally reduces power usage and improves battery life of the electronic device by enabling the user to use the electronic device more quickly and efficiently.

In some embodiments, such as in FIG. 6BB, a portion of the lyrics 622*d* that has a current focus is displayed concurrently with a visual indication 646 of a playback position within the content item corresponding to the portion of the lyrics that has the current focus (712). In some embodiments, while the user scrolls through the lyrics, the electronic device displays a portion of the lyrics with the current focus and one or more other portions of lyrics that do not have the current focus. Optionally, the electronic device displays the time of the playback position of the portion of the lyrics with the current focus. In some embodiments, in response to detecting selection of the portion of the lyrics that has the current focus, the electronic device skips to the portion of the content corresponding to the selected portion of the lyrics and resumes playback of the item of content from the selected portion of the item of content. The above-described manner of displaying the visual indication of the playback position within the content item corresponding to the portion of the lyrics that has the current focus allows the electronic device to quickly and efficiently indicate to the user the playback position of the portion of the lyrics that has the current focus, which simplifies the interaction between the user and the electronic device and enhances the operability of the electronic device and makes the user-device interface more efficient (e.g., by enabling the user to see the playback position the playback will be set to in response to selecting the portion of the lyrics with the current focus before the user makes the selection), which additionally reduces power usage and improves battery life of the electronic device by enabling the user to use the electronic device more quickly and efficiently.

In some embodiments, such as in FIG. 6BB, displaying the time-synced lyrics corresponding to the content item while the content item is playing is in response to determining that a setting to display time-synced lyrics is enabled, the setting to display time-synced lyrics applying to a plurality of content items, including the content item, played on the electronic device (714). In some embodiments, the electronic device activates the time-synced lyrics setting in response to detecting selection of a time-synced lyrics option displayed in the user interface of the content application. Optionally, while the time-synced lyrics setting is enabled, the electronic device automatically displays time-synced lyrics for every item of content played by the electronic device that has time-synced lyrics available. The above-described manner of applying the setting to display time-synced lyrics to a plurality of content items allows the electronic device to continue to present time synced lyrics of each of the plurality of content items as playback of the plurality of content items continues, which simplifies the interaction between the user and the electronic device and enhances the operability of the electronic device and makes the user-device interface more efficient (e.g., by reducing the number of inputs needed to view time-synced lyrics for each of the plurality of content items), which additionally reduces power usage and improves battery life of the electronic device by enabling the user to use the electronic device more quickly and efficiently.

In some embodiments, such as in FIG. 6AA, the setting to display time-synced lyrics 622 is enabled, and displaying the time-synced lyrics 622 corresponding to the content item while the content item is playing occurs automatically, without user input to display the time-synced lyrics for the content item (716). For example, the electronic device plays a first item of content while displaying the time-synced lyrics for the first item of content and, after the first item of content is finished playing, the electronic device starts playing a second item of content and displays the time-synced lyrics for the second item of content automatically without receiving a user input. The above-described manner of displaying the time-synced lyrics automatically while the setting to display time-synced lyrics is enabled allows the electronic device to display time synced lyrics for each content item without the user entering an input to cause the display of the time-synced lyrics, which simplifies the interaction between the user and the electronic device and enhances the operability of the electronic device and makes the user-device interface more efficient (e.g., by reducing the number of inputs needed to display the time-synced lyrics for each of a plurality of content items), which additionally reduces power usage and improves battery life of the electronic device by enabling the user to use the electronic device more quickly and efficiently.

In some embodiments, such as in FIG. 6AA, while playing the content item and displaying the time-synced lyrics 622 corresponding to the content item, the electronic device displays (718), via the display device, a selectable option 610 for displaying lyrics for the content item that are not synced to the playback of the content item. In some embodiments, in response to detecting selection of the selectable option for displaying the lyrics for the content item that are not synced to the playback of the content item, the electronic device displays the text of the lyrics without scrolling the lyrics in accordance with playback of the item of content. Optionally, the selectable option is displayed in response to selection of an option to display a menu that includes a plurality of selectable options for performing a plurality of actions related to the content item. In some embodiments, the selectable option for displaying the lyrics is displayed without detecting selection of an option to display the menu. The above-described manner of the above-described manner of displaying lyrics for the content item that are not synced to the playback of the content item in response to detecting selection of a selectable option allows the electronic device to provide the lyrics to the user in a way the user is able to read at a desired pace that is not the playback of the content item, which simplifies the interaction between the user and the electronic device and enhances the operability of the electronic device and makes the user-device interface more efficient (e.g., by reducing the time it takes for the user to read the lyrics or to find a specific part of the lyrics), which additionally reduces power usage and improves battery life of the electronic device by enabling the user to use the electronic device more quickly and efficiently.

In some embodiments, such as in FIG. 6C, displaying the time-synced lyrics 622 corresponding to the content item while the content item is playing is in response to determining that a setting to display time-synced lyrics for the content item is enabled, the setting to display time-synced lyrics for the content item not applying to other content items played on the electronic device (720). In some embodiments, the electronic device displays time-synced lyrics for the content item in response to detecting selection of an option to enable the time-synced lyrics setting for the content item. Optionally, once the content item finishes playing and the electronic device begins playing a second content time, the electronic device does not display the time-synced lyrics for the second content item because the time-synced lyrics setting is not enabled for the second content item. The above-described manner of not applying the setting to display the time-synced lyrics to the plurality of content items allows the electronic device to automatically cease displaying time-synced lyrics after the content item for which display of time-synced lyrics is enabled finishes playing, which simplifies the interaction between the user and the electronic device and enhances the operability of the electronic device and makes the user-device interface more efficient (e.g., by reducing the number of inputs needed to stop viewing time-synced lyrics for only one item of content), which additionally reduces power usage and improves battery life of the electronic device by enabling the user to use the electronic device more quickly and efficiently.

In some embodiments, such as in FIG. 6B, the setting to display time-synced lyrics for the content item is enabled in response to selection of a selectable option 614*a* displayed, via the display device and while the content item is playing, for enabling the display of the time-synced lyrics for the content item (722). In some embodiments, the selectable option for enabling the display of time-synced lyrics is displayed in a user interface of the content application that provides the item of content. While time-synced lyrics are displayed, the selectable option is optionally displayed with a visual characteristic that indicates that time-synced lyrics are being displayed. In some embodiments, in response to detecting selection of the time-synced lyrics selectable option while time-synced lyrics are displayed, the electronic device stops displaying the time-synced lyrics and displays the time-synced lyrics option with a visual characteristic that indicates that time-synced lyrics are not being displayed. In some embodiments, if time-synced lyrics are not available for the item of content that is playing, the time-synced lyrics option is displayed with a visual characteristic that indicates that time-synced lyrics are not available. For example, the time-synced lyrics option is greyed out if time-synced lyrics are not available. The above-described manner of displaying the selectable option for displaying time-synced lyrics while the content item is playing allows the electronic device to enable the user to quickly and easily enable or disable the display of time-synced lyrics while the content item is playing, which simplifies the interaction between the user and the electronic device and enhances the operability of the electronic device and makes the user-device interface more efficient (e.g., by reducing the number of inputs needed to enable or disable the display of time-synced lyrics while playing the content item), which additionally reduces power usage and improves battery life of the electronic device by enabling the user to use the electronic device more quickly and efficiently.

In some embodiments, such as in FIG. 6C, displaying the time-synced lyrics 622 corresponding to the content item includes concurrently displaying, via the display device, the time-synced lyrics 622 corresponding to the content item and album artwork 616 corresponding to the content item (724). In some embodiments, the album artwork is an image associated with the content item, such as an image associated with an album in which the content item is included. Optionally, the album artwork is displayed horizontally adjacent to the time-synced lyrics such that the line of time-synced lyrics that corresponds to the current playback position of the content item is aligned with the middle of the album artwork. In some embodiments, the album artwork is displayed vertically adjacent to the time-synced lyrics in a region of the user interface that includes metadata about the content item, such as title, artist, and album. The above-described manner of concurrently displaying the time-synced lyrics corresponding to the content item with album artwork corresponding to the content item allows the electronic device to present more information about the content item at one time, which simplifies the interaction between the user and the electronic device and enhances the operability of the electronic device and makes the user-device interface more efficient (e.g., by reducing the number of inputs needed to view the album artwork while viewing the time-synced lyrics), which additionally reduces power usage and improves battery life of the electronic device by enabling the user to use the electronic device more quickly and efficiently.

In some embodiments, such as in FIG. 6Z, displaying the time-synced lyrics includes forgoing display of portions of the lyrics prior to the respective portion of the lyrics 622*b* that corresponds to the currently playing portion of the content item while the respective portion of the lyrics that corresponds to the currently playing portion of the content item is displayed (726). In some embodiments, the electronic device displays the portion of the time-synced lyrics that corresponds to the portion of the content item that is currently playing without displaying a portion of the time-synced lyrics that corresponds to a portion of the content item that previously played. Optionally, the electronic device displays a portion of time-synced lyrics that correspond to a portion of the content item that will play immediately after the portion of the content item that is currently playing. The above-described manner of forgoing displaying the portions of the lyrics prior to the respective portion of the lyrics that corresponds to the currently playing portion of the content item allows the electronic device to present the current lyrics in a more simple user interface taking up less space in the user interface, which simplifies the interaction between the user and the electronic device and enhances the operability of the electronic device and makes the user-device interface more efficient (e.g., by reducing the amount of time it takes the user to read the lyrics displayed on the display), which additionally reduces power usage and improves battery life of the electronic device by enabling the user to use the electronic device more quickly and efficiently.

In some embodiments, such as in FIG. 6L, displaying the time-synced lyrics includes displaying portions 622*a* of the lyrics prior to the respective portion 622*b* of the lyrics that corresponds to the currently playing portion of the content item with the first visual characteristic having a second value, different than the first value, while the respective portion of the lyrics that corresponds to the currently playing portion of the content item is displayed with the first visual characteristic having the first value (728). In some embodiments, the electronic device displays time-synced lyrics that correspond to a portion of the content item that already played (e.g., the portion of the content item immediately before the portion of the content item that is currently playing). Optionally, the electronic device displays the portion of the time-synced lyrics that correspond to the portion of the content item that previously played in a different color than the time-synced lyrics that correspond to the portion of the content item that is currently playing. For example, the electronic device displays the portion of the time-synced lyrics that corresponds to the portion of the content item that is currently playing in a high-contrast color (e.g., black or white) and displays the portion of the time-synced lyrics that correspond to the portion of the content time that already played in a low-contrast color (e.g., grey). In some embodiments, the text of the portion of the time-synced lyrics that correspond to the portion of the content item that is currently playing is bolder or a larger size than the text of the portion of the time-synced lyrics that correspond to the portion of the content item that has previously played. The above-described manner of displaying the prior lyrics with the first visual characteristic with the second value and the currently playing portion with the first visual characteristic with the first value allows the electronic device to visually distinguish the currently playing portion of the lyrics, which simplifies the interaction between the user and the electronic device and enhances the operability of the electronic device and makes the user-device interface more efficient (e.g., by making it easier for the user to identify which portion of the lyrics is currently playing), which additionally reduces power usage and improves battery life of the electronic device by enabling the user to use the electronic device more quickly and efficiently.

In some embodiments, such as in FIG. 6L, displaying the time-synced lyrics includes displaying portions 622*c* of the lyrics following the respective portion 622*b* of the lyrics that corresponds to the currently playing portion of the content item with the first visual characteristic having a second value, different than the first value, while the respective portion of the lyrics that corresponds to the currently playing portion of the content item is displayed with the first visual characteristic having the first value (730). In some embodiments, the electronic device displays time-synced lyrics that correspond to a portion of the content item that will play after the portion of the content that is currently playing. Optionally, the electronic device displays the portion of the time-synced lyrics that correspond to the portion of the content item that will play next in a different color than the time-synced lyrics that correspond to the portion of the content item that is currently playing. For example, the electronic device displays the portion of the time-synced lyrics that corresponds to the portion of the content item that is currently playing in a high-contrast color (e.g., black or white) and displays the portion of the time-synced lyrics that correspond to the portion of the content time that will play next in a low-contrast color (e.g., grey). In some embodiments, the text of the portion of the time-synced lyrics that correspond to the portion of the content item that is currently playing is bolder or a larger size than the text of the portion of the time-synced lyrics that correspond to the portion of the content item that will play next. The above-described manner of displaying the portion of lyrics following the currently playing portion of the lyrics with the first visual characteristic with the second value and the currently playing portion with the first visual characteristic with the first value allows the electronic device to visually distinguish the currently playing portion of the lyrics, which simplifies the interaction between the user and the electronic device and enhances the operability of the electronic device and makes the user-device interface more efficient (e.g., by making it easier for the user to identify which portion of the lyrics is currently playing), which additionally reduces power usage and improves battery life of the electronic device by enabling the user to use the electronic device more quickly and efficiently.

In some embodiments, such as in FIG. 6Z, in response to receiving a request to play a respective content item while displaying time-synced lyrics 622 (732) (e.g., while playing a different item of content in a time-synced lyrics mode, the electronic device detects a skip ahead or skip back input that causes the electronic device to play the respective content item while displaying time-synced lyrics or while playing the respective content item without displaying the time-synced lyrics, the electronic device detects selection of an option to display time-synced lyrics for the respective item of content), in accordance with a determination that time-synced lyrics are available for the respective content item (734), such as in FIG. 6AA, the electronic device 500*b* plays (736) the respective content item, and while playing the respective content item, the electronic device displays (738), via the display device, the time-synced lyrics 622 for the respective content item and album artwork 602*b* corresponding to the respective content item. In some embodiments, such as in FIG. 6S, in accordance with a determination that time-synced lyrics are not available for the respective content item (740) (e.g., the respective content item does not have lyrics, the electronic device does not have access to the lyrics of the respective content item, the electronic device does not have access to time-synced lyrics of the respective content item), the electronic device 500*a* plays (742) the respective content item, and while playing the respective content item, the electronic device displays (744), via the display device, the album artwork 616 corresponding to the respective content item without displaying the time-synced lyrics for the respective content item. In some embodiments, the electronic device also displays an indication that time-synced lyrics will not be displayed, such as a message that says "time-synced lyrics are not available" or "this song does not have lyrics". The above-described manner of displaying the time-synced lyrics and album artwork when time-synced lyrics are available and displaying the album artwork without time-synced lyrics when time-synced lyrics are not available while playing the content item allows the electronic device to consistently display the album artwork in response to the input to display time-synced lyrics, which simplifies the interaction between the user and the electronic device and enhances the operability of the electronic device and makes the user-device interface more efficient (e.g., by reducing the amount of time it takes the user to learn how to display the album artwork in response to the input to display time-synced lyrics), which additionally reduces power usage and improves battery life of the electronic device by enabling the user to use the electronic device more quickly and efficiently.

In some embodiments, such as in FIG. 6Z, in response to receiving a request to play a respective content item while displaying time-synced lyrics (746) (e.g., while playing a different item of content in a time-synced lyrics mode, the electronic device detects a skip ahead or skip back input that causes the electronic device to play the respective content item while displaying time-synced lyrics or while playing the respective content item without displaying the time-synced lyrics, the electronic device detects selection of an option to display time-synced lyrics for the respective item of content), in accordance with a determination that time-synced lyrics are available for the respective content item, such as in FIG. 6AA, the electronic device plays (750) the respective content item, and while playing the respective content item, the electronic device displays (752), via the display device, the time-synced lyrics 622 for the respective content item without displaying a scrubber bar for scrubbing through the respective content item. That is to say, scrubber bar 606 is optionally not displayed. In some embodiments, such as in FIG. 6KK, in accordance with a determination that time-synced lyrics are not available for the respective content item (754) (e.g., the respective content item does not have lyrics, the electronic device does not have access to the lyrics of the respective content item, the electronic device does not have access to time-synced lyrics of the respective content item), the electronic device plays (756) the respective content item, and while playing the respective content item, the electronic device displays (758), via the display device, the scrubber bar 606 for scrubbing through the respective content item without displaying the time-synced lyrics for the respective content item. In some embodiments, in response to detecting selection and movement of a playback position indicator of the scrubber bar, the electronic device changes the playback position within the item of content and resumes playing the content from the playback position indicated by the position indicator. The electronic device optionally displays an indication that time-synced lyrics are not available for the content item while displaying the scrubber bar. For example, the electronic device displays the message "time-synced lyrics are not available". The above-described manner of displaying the time-synced lyrics without the scrubber bar when time-synced lyrics are available and displaying the scrubber bar without the time-synced lyrics when time-synced lyrics are not available while playing the content item allows the electronic device to consistently present an indication of the playback position by displaying either the time-synced lyrics or scrubber bar in response to an input to display time-synced lyrics (and always provide the ability to scrub through the content item irrespective of the availability of time-synced lyrics), which simplifies the interaction between the user and the electronic device and enhances the operability of the electronic device and makes the user-device interface more efficient (e.g., by reducing the amount of time it takes the user to learn how to display a visual indication of the playback position by entering an input to view time-synced lyrics), which additionally reduces power usage and improves battery life of the electronic device by enabling the user to use the electronic device more quickly and efficiently.

In some embodiments, such as in FIG. 6FF, displaying the time-synced lyrics 622 includes forgoing display of portions of the lyrics prior to the respective portion 622*b* of the lyrics that corresponds to the currently playing portion of the content item while the respective portion of the lyrics that corresponds to the currently playing portion of the content item is displayed (760). Optionally, the electronic device displays a portion of the lyrics corresponding to a portion of the content item that is currently playing and a portion of the lyrics that corresponds to a portion of the content item that will play after the portion of the content item that is currently playing without displaying the lyrics that correspond to a portion of the content item that previously played. For example, once a portion of the content item corresponding to a first portion of lyrics that is displayed is played and the electronic device plays the next portion of the content item corresponding to a second portion of the lyrics, the electronic device stops displaying the first portion of the lyrics and optionally moves the second portion of the lyrics to a position in the user interface where the first portion of the lyrics had been displayed.

In some embodiments, such as in FIG. 6GG, in response to receiving the input corresponding to the request to scroll through the lyrics, the electronic device displays (762), via the display device, the portions 622*c* of the lyrics prior to the respective portion of the lyrics that corresponds to the currently playing portion of the content item. In some embodiments, in response to a request to scroll the lyrics, the electronic device displays portions of lyrics that correspond to portions of the content item that previously played. The user is then able to scroll through the complete lyrics to optionally view lyrics that correspond to portions of the content that already played and/or portions of the content that have not yet played. The above-described manner of forgoing displaying portions of the lyrics prior to the respective portion of the lyrics while the user is not scrolling through the lyrics and displaying the portions of the lyrics prior to the respective portion of the lyrics while the user is scrolling through the lyrics allows the electronic device to make it easier for the user to identify the currently-playing portion of the lyrics while the user is not scrolling through the lyrics and to make it easier for the user to browse the lyrics while scrolling through the lyrics, which simplifies the interaction between the user and the electronic device and enhances the operability of the electronic device and makes the user-device interface more efficient (e.g., by simplifying the user interface when the use is not scrolling through the lyrics and displaying more information when the user is scrolling through the lyrics), which additionally reduces power usage and improves battery life of the electronic device by enabling the user to use the electronic device more quickly and efficiently.

In some embodiments, such as in FIG. 6HH, in response to receiving the input selecting the second respective portion of the lyrics, the electronic device ceases (764) to display the portions of the lyrics prior to the respective portion 622*b* of the lyrics that corresponds to the currently playing portion of the content item. In some embodiments, in response to detecting selection of the second respective portion of the lyrics, the electronic device resumes playback from a playback position of the item of content that corresponds to the second respective portion of the lyrics. The above-described manner of ceasing to display the portions of the lyrics prior to the respective portion of the lyrics in response to receiving the input selecting the second respective portion of the lyrics allows the electronic device to simplify the user interface when the user stops scrolling the lyrics, which simplifies the interaction between the user and the electronic device and enhances the operability of the electronic device and makes the user-device interface more efficient (e.g., by making it easier for the user to identify the portion of the lyrics that is currently-playing), which additionally reduces power usage and improves battery life of the electronic device by enabling the user to use the electronic device more quickly and efficiently.

In some embodiments, such as in FIG. 6DD, while scrolling through the lyrics, the electronic device displays (766), via the display device, a portion 622*d* of the lyrics that has a current focus concurrently with a visual indication 626 of a playback position within the content item corresponding to the portion of the lyrics that has the current focus. In some embodiments, the electronic device displays the visual indication proximate to the portion of the lyrics with the current focus. Optionally, while the user scrolls through the lyrics, the electronic device displays a scrubber bar that indicates the current playback position of the content item. The scrubber bar optionally advances as the electronic device continues to play the content item, independent of the portion of the lyrics with the current focus while the user is scrolling the time-synced lyrics. In some embodiments, the visual indication of the playback position within the content item corresponding to the portion of the lyrics that has the current focus is different and independent from the scrubber bar. The above-described manner of displaying the visual indication of the playback position within the content item corresponding to the portion of lyrics with the current focus while scrolling through the lyrics allows the electronic device to quickly and efficiently indicate to the user the new playback position if the user were to select the portion of lyrics with the current focus, which simplifies the interaction between the user and the electronic device and enhances the operability of the electronic device and makes the user-device interface more efficient (e.g., by indicating to the user the new playback position before the user selects the portion of the lyrics with the current focus), which additionally reduces power usage and improves battery life of the electronic device by enabling the user to use the electronic device more quickly and efficiently.

In some embodiments, such as in FIG. 6DD, the visual indication 646 of the playback position within the content item corresponding to the portion of the lyrics that has the current focus includes a visual indication of a current playback state of the content item (768). In some embodiments, the visual indication includes a triangular "play" icon to indicate that the content item is playing while the user scrolls the lyrics or a "pause" icon to indicate that the content item is paused while the user scrolls the lyrics. Optionally, the visual indication is an icon that includes the indication of the playback state and the playback position corresponding to the portion of the lyrics with the current focus. The above-described manner of including a visual indication of a current playback state of the content item allows the electronic device to quickly and efficiently visually confirm the playback state to the user, which simplifies the interaction between the user and the electronic device and enhances the operability of the electronic device and makes the user-device interface more efficient (e.g., by reducing the amount of time it takes the user to determine the current playback state of the content item), which additionally reduces power usage and improves battery life of the electronic device by enabling the user to use the electronic device more quickly and efficiently.

In some embodiments, such as in FIG. 6CC, while playing a respective content item and displaying time-synced lyrics 622 for the respective content item, the electronic device receives (770), via the one or more input devices, an input corresponding to a request to scroll through the time-synced lyrics for the respective content item (e.g., the user selects the time-synced lyrics and enters a directional input to scroll the time-synced lyrics—while scrolling the time-synced lyrics, the electronic device optionally continues playback of the content item independent of the scrolling of the time-synced lyrics). In some embodiments, in response to receiving the input corresponding to the request to scroll through the time-synced lyrics for the respective content item, such as in FIG. 6DD, the electronic device scrolls (772) through the time-synced lyrics 622 for the respective content item from a first respective portion of the lyrics for the respective content item to a second respective portion 622*d* of the lyrics for the respective content item (e.g., in accordance with the scrolling input, the electronic device optionally displays a portion of the lyrics that is different from the portion of the lyrics that corresponds to the portion of the item of content that is currently playing on the electronic device).

In some embodiments, such as in FIG. 6EE, after scrolling through the time-synced lyrics for the respective content item from the first respective portion of the lyrics for the respective content item to the second respective portion of the lyrics for the respective content item (774), in accordance with a determination that no further input has been received for a predetermined time period 650 (e.g., 5 seconds, 10 seconds, etc.), the electronic device scrolls (776) the time-synced lyrics for the respective content item to a respective portion 622*b* of the time-synced lyrics for the respective content item that corresponds to a currently playing portion of the respective content item. In some embodiments, after detecting the input to scroll the time-synced lyrics, the electronic device does not detect another input for the predetermined amount of time. In response to detecting that no input was received for the predetermined amount of time, the electronic device stops presenting the portion of the time-synced lyrics that the user scrolled to and presents the portion of the time-synced lyrics corresponding to the current playback position of the content item. In some embodiments, while scrolling the time-synced lyrics, the electronic device displays lyrics including lyrics that correspond to a portion of the content item that previously played and displays the lyrics with a first visual characteristic (e.g., all of the lyrics are presented in a high-contrast color such as black text on a light background or white text on a dark background). Optionally, when the electronic device scrolls the lyrics to the currently-playing portion of the content time in response to detecting no input was received, the electronic device displays the portion of the lyrics corresponding to the portion of the content item that is currently playing with a first visual characteristic (e.g., high contrast color) and the other lyrics with a second visual characteristic (e.g., low contrast color, such as grey). In some embodiments, when the electronic device scrolls the lyrics to the portion of lyrics corresponding to the portion of the content item that is currently playing, the electronic device ceases displaying portions of the lyrics corresponding to portions of the content item that already played. The above-described manner of scrolling the time-synced lyrics to the respective portion of time-synced lyrics that corresponds to the currently playing portion of the content item in response to determining that no further input has been received for a predetermined time period allows the electronic device to automatically resume displaying time-synced lyrics for the current playback position without requiring further user input, which simplifies the interaction between the user and the electronic device and enhances the operability of the electronic device and makes the user-device interface more efficient (e.g., by reducing the number of inputs needed to return to the time-synced lyrics view), which additionally reduces power usage and improves battery life of the electronic device by enabling the user to use the electronic device more quickly and efficiently.

In some embodiments, such as in FIG. 6Y, the content item is included in a sequence of content items (778) (e.g., the electronic device is configured to play a sequence of content items including the content item). Optionally, the sequence of content items is in a predetermined order of a collection of content items, such as an album or playlist, or in another order determined by the electronic device (e.g., a shuffled order according to a shuffle playback mode). In some embodiments, such as in FIG. 6Z, while playing the content item and displaying the time-synced lyrics 622 corresponding to the content item, the electronic device detects (780), via a remote control device having a touch-sensitive surface, a contact 603 on the touch-sensitive surface having an intensity greater than an intensity threshold (e.g., a contact with an amount of force that exceeds a force threshold or a click of a clickable touch-sensitive surface). In some embodiments, such as in FIG. 6Z, in response to detecting the contact 603 (782), in accordance with a determination that the contact 603 was detected in a first region of the touch-sensitive surface (e.g., a left region of the touch-sensitive surface), the electronic device skips (784) to a previous content item in the sequence of content items (e.g., playing the previous content item in the sequence of content items), and in accordance with a determination that the contact was detected in a second region of the touch-sensitive surface (e.g., a right region of the touch-sensitive surface), such as in FIG. 6Z, the electronic device skips (786) to a next content item in the sequence of content items (e.g., playing the next content item in the sequence of content items). In some embodiments, after skipping to the respective content item, the electronic device plays the respective content item while displaying the time-synced lyrics for the respective content item. In some embodiments, after skipping to the respective content item, the electronic device plays the respective content item without displaying the time-synced lyrics for the respective content item. The above-described manner of skipping to the next or previous content item in accordance with detecting the contact in the second or first region of the touch-sensitive surface allows the electronic device to provide a quick and easy way to skip through content items while maintaining display of the time-synced lyrics, which simplifies the interaction between the user and the electronic device and enhances the operability of the electronic device and makes the user-device interface more efficient (e.g., by enabling the user to skip the content item without navigating to a different user interface), which additionally reduces power usage and improves battery life of the electronic device by enabling the user to use the electronic device more quickly and efficiently.

In some embodiments, such as in FIG. 6FF, while the content item is paused and while displaying the time-synced lyrics 622 corresponding to the content item, the electronic device receives (788), via the one or more input devices, a second input corresponding to a request to scroll through the lyrics (e.g., a directional input to scroll the time-synced lyrics in accordance with the direction of the lyrics). In some embodiments, such as in FIG. 6GG, in response to receiving the second input corresponding to the request to scroll through the lyrics 622, the electronic device scrolls (790) through the lyrics from a third respective portion of the lyrics (e.g., a portion of the lyrics that corresponds to the playback position at which playback of the content item is paused) to a fourth respective portion 622*d* of the lyrics (e.g., a portion of the lyrics in accordance with the input to scroll the lyrics) while the content item remains paused (e.g., in some embodiments, the playback position within the content item at which playback remains paused does not move in accordance with the input to scroll the time-synced lyrics). In some embodiments, such as in FIG. 6GG, after scrolling through the lyrics 622, the electronic device receives (792), via the one or more input devices, selection of the fourth respective portion 622*d* of the lyrics. In some embodiments, such as in FIG. 6HH, in response to receiving the selection of the fourth respective portion of the lyrics, the electronic device starts (794) playback of the content from a second respective portion of the content item that corresponds to the fourth respective portion 622*b* of the lyrics. In some embodiments, the electronic device plays the content from the portion of the content corresponding to the selected portion of the lyrics. The above-described manner of starting playback from the selected lyric that was selected while scrolling the lyrics while the content item was paused allows the electronic device to move the playback position to the selected lyric and play the content in response to the input, which simplifies the interaction between the user and the electronic device and enhances the operability of the electronic device and makes the user-device interface more efficient (e.g., by reducing the number of inputs needed to play the content after moving the playback position), which additionally reduces power usage and improves battery life of the electronic device by enabling the user to use the electronic device more quickly and efficiently.

In some embodiments, such as in FIG. 6M, displaying the time-synced lyrics includes 622, in accordance with a determination that a second respective portion of the content item does not have lyrics (e.g., an instrumental break) and the second respective portion of the content item is longer than a time threshold (e.g., 5, 7, 10 seconds), displaying, via the display device, within the time-synced lyrics at a portion of the time-synced lyrics that corresponds to the second respective portion of the content item, a visual indication 622*f* indicating that the second respective portion of the content item does not have lyrics (796). In some embodiments, the electronic device displays an icon or image within the time synced lyrics at a position that corresponds to the second respective portion of the content item. The electronic device optionally updates the visual indication in accordance with the progress through the second respective portion of the content item that does not have lyrics. For example, the visual indication is three dots or circles that change color in sequence with timing that indicates the progress through the second respective portion of the content item that does not include lyrics. The above-described manner of displaying the visual indication of the portion of the content without lyrics allows the electronic device to quickly and efficiently indicate to the user that time-synced lyrics are still being displayed even when the electronic device is playing a portion of the content that does not have lyrics, which simplifies the interaction between the user and the electronic device and enhances the operability of the electronic device and makes the user-device interface more efficient (e.g., by reducing the amount of time it takes the user to confirm that time-synced lyrics are still being displayed when the content item includes a portion without lyrics), which additionally reduces power usage and improves battery life of the electronic device by enabling the user to use the electronic device more quickly and efficiently.

In some embodiments, such as in FIGS. 6M-6O, the visual indication 622*f* indicating that the second respective portion of the content item does not have lyrics includes an indication of a passage of time through the second respective portion of the content item as the content item is playing (798). The electronic device optionally updates the visual indication in accordance with the progress through the second respective portion of the content item that does not have lyrics. For example, the visual indication is three dots or circles that change color in sequence with timing that indicates the progress through the second respective portion of the content item that does not include lyrics. As another example, the visual indication is three circles and the electronic device changes the color of the circles from left to right at regular intervals within the second respective portion of the content. For example, if the instrumental break is 9 seconds long, the electronic device changes the color of one of the circles from left to right every three seconds within the second respective portion of the content item. The above-described manner of displaying the indication of the passage of time through the second respective portion of the content item as the content item is playing allows the electronic device to quickly indicate to the user how much time is left in the content item in the current non-lyrics-section of the content item, which simplifies the interaction between the user and the electronic device and enhances the operability of the electronic device and makes the user-device interface more efficient (e.g., by reducing the amount of time it takes the user to determine the position of the playback position within the portion of the content that does not include lyrics), which additionally reduces power usage and improves battery life of the electronic device by enabling the user to use the electronic device more quickly and efficiently.

In some embodiments, such as in FIG. 6EE, while playing the content item and displaying the time-synced lyrics 622 corresponding to the content item, and while a second respective portion 622*b* of the time-synced lyrics has a current focus, the electronic device detects (798-2), via a remote control device having a touch-sensitive surface, a contact 603 in a respective region of the touch-sensitive surface having an intensity greater than an intensity threshold, the touch-sensitive surface having the respective region and a second respective region (e.g., detecting a contact that has a force that exceeds a force threshold or a click of a clickable touch-sensitive surface—in some embodiments, the first respective region of the touch-sensitive surface is the center of the touch-sensitive surface). In some embodiments, such as in FIG. 6FF, in response to detecting the contact 603 in the respective region of the touch-sensitive surface having the intensity greater than the intensity threshold (798-4), in accordance with a determination that the second respective portion 622*b* of the time-synced lyrics that has the current focus is a portion of the time-synced lyrics that corresponds to the currently-playing portion of the content item, the electronic device pauses (798-6) playback of the content item, such as in FIG. 6FF (e.g., the contact is detected while the electronic device is displaying the time-synced lyrics corresponding to the currently-playing portion of the content as having the current focus, such as detecting the contact at a time the electronic device is not scrolling the time-synced lyrics). In some embodiments, such as in FIG. 6BB, in accordance with a determination that the second respective portion 622*d* of the time-synced lyrics that has the current focus is a portion of the time-synced lyrics 622*d* that does not correspond to the currently-playing portion of the content item, the electronic device plays (798-8) the content item from a portion of the content item that corresponds to the second respective portion of the time-synced lyrics, such as in FIG. 6CC. For example, the electronic device detects the contact while the user is scrolling the time-synced lyrics and the current focus is on a second respective portion of the time-synced lyrics that does not correspond to the currently-playing portion of the content item. The above-described manner of pausing the content if the input is received while the currently-playing portion of the time-synced lyrics has the current focus and playing the content from the position of the portion of the time-synced lyrics with the current focus if the portion of the time-synced lyrics with the current focus is not the currently-playing portion of the time-synced lyrics allows the electronic device to perform different functions using the same region of the touch-sensitive surface based on the content of the device, which simplifies the interaction between the user and the electronic device and enhances the operability of the electronic device and makes the user-device interface more efficient (e.g., by reducing the number of inputs the user needs to perform a variety of functions), which additionally reduces power usage and improves battery life of the electronic device by enabling the user to use the electronic device more quickly and efficiently.

In some embodiments, such as in FIG. 6R, while playing the content item and displaying the time-synced lyrics corresponding to the content item, in accordance with a determination that the content item is currently buffering at the electronic device, the electronic device displays (798-10), via the display device, an indication 630 that the content item is currently buffering. The above-described manner of displaying the indication that the content item is currently buffering when the content item is currently buffering allows the electronic device to quickly and efficiently indicate to the user when the content item is buffering while displaying the user interface for the time-synced lyrics, which simplifies the interaction between the user and the electronic device and enhances the operability of the electronic device and makes the user-device interface more efficient (e.g., by avoiding unnecessary inputs that won't have any effect while the content item is buffering), which additionally reduces power usage and improves battery life of the electronic device by enabling the user to use the electronic device more quickly and efficiently.

In some embodiments, such as in FIG. 6F, while not displaying the time-synced lyrics corresponding to the content item, the electronic device enters (798-12) a standby mode at the electronic device in response to standby criteria having been met, such as in FIG. 6G (e.g., in response to determining that no user input has been detected for a threshold amount of time (e.g., 30 seconds, 1 minute, 2 minutes, 5 minutes) while the electronic device is not displaying the time-synced lyrics, the electronic device enters the standby mode—the standby mode optionally includes ceasing display of an application user interface and powering off the display or displaying a screen saver). In some embodiments, such as in FIG. 6E, while displaying the time-synced lyrics 622 corresponding to the content item, the electronic device forgoes (798-14) entering the standby mode at the device in response to the standby criteria having been met. In response to determining that no user input has been detected for the threshold amount of time while the electronic device is displaying the time-synced lyrics, the electronic device continues to display the time-synced lyrics without entering the standby mode. The above-described manner of forgoing entering the standby mode while displaying the time-synced lyrics corresponding to the content item allows the electronic device to continue to display the time-synced lyrics even when the standby criteria are met and avoid unnecessary entering into standby mode (and thus unnecessary inputs from the user to exit standby mode), which simplifies the interaction between the user and the electronic device and enhances the operability of the electronic device and makes the user-device interface more efficient (e.g., by reducing the number of inputs needed to prevent the electronic device from entering the sleep mode while the electronic device displays the time-synced lyrics), which additionally reduces power usage and improves battery life of the electronic device by enabling the user to use the electronic device more quickly and efficiently.

In some embodiments, such as in FIG. 6C, displaying the time-synced lyrics corresponding to the content item while the content item is playing includes (798-16): initially concurrently displaying the time-synced lyrics 622 and one or more controls 608 for controlling playback of the content item (798-18). Optionally, in response to receiving an input to display the time-synced lyrics (e.g., selection of a time-synced lyrics selectable option), the electronic device concurrently displays the time-synced lyrics and the one or more controls for controlling playback of the content item. In some embodiments, the electronic device additionally displays one or more of album artwork, title, and artist of the content item while displaying the time-synced lyrics and playback controls.

In some embodiments, such as in FIG. 6C, after initially concurrently displaying the time-synced lyrics 622 and one or more controls 608 for controlling playback of the content item (798-20), in accordance with a determination that a time threshold 628*a* (e.g., 3, 5, 10 seconds) has elapsed since the time-synced lyrics 622 and the one or more controls for controlling playback of the content item were initially displayed, such as in FIG. 6D, the electronic device continues (798-22) to display the time-synced lyrics 622 and ceases to display the one or more controls for controlling playback of the content item. In some embodiments, the electronic device continues to display one or more of album artwork, title, and artist of the content item while continuing to display the time-synced lyrics. Optionally, the electronic device ceases displaying the playback controls in response to detecting selection of a region of the user interface that does not include the playback controls (e.g., a selection in the area of the display with the time-synced lyrics). The above-described manner of initially concurrently displaying the time-synced lyrics and one or more controls for controlling playback of the content item and, after the time threshold, ceasing to display the controls allows the electronic device to initially provide the user with options for controlling the playback of the content item while displaying the time-synced lyrics and, after the time threshold, allows the electronic device to display more time-synced lyrics in the situation where the playback controls were not utilized, which simplifies the interaction between the user and the electronic device and enhances the operability of the electronic device and makes the user-device interface more efficient (e.g., by providing additional functionality or additional information to the user depending on the context), which additionally reduces power usage and improves battery life of the electronic device by enabling the user to use the electronic device more quickly and efficiently.

In some embodiments, such as in FIG. 6I, after ceasing to display the one or more controls for controlling playback of the content item, the electronic device receives (798-24), via the one or more input devices, a second input corresponding to a request to scroll through the time-synced lyrics corresponding to the content item (e.g., detecting an input to scroll the lyrics down, then up). In some embodiments, such as in FIG. 6H, in response to receiving the second input (798-26), the electronic device scrolls (798-28) through the time-synced lyrics 622 (e.g., scrolling the time-synced lyrics in accordance with the scrolling input. For example, in response to detecting an input to scroll down, the electronic device scrolls the lyrics down and in response to an input to scroll up, the electronic device scrolls the lyrics up), and the electronic device redisplays (798-30), via the display device, the one or more controls 608 for controlling playback of the content item. In some embodiments, in response to detecting a tap in a region of the display that is next to a portion of the lyrics but not overlapping a portion of the lyrics, the electronic device displays the playback controls. The above-described manner of redisplaying the one or more controls for controlling playback of the content item in response to the request to scroll through the time-synced lyrics allows the electronic device to quickly and efficiently (without further user input) provide the options for controlling the playback of the content item in the time-synced lyrics user interface, which simplifies the interaction between the user and the electronic device and enhances the operability of the electronic device and makes the user-device interface more efficient (e.g., by enabling the user to control the playback of the content item without navigating to a different user interface), which additionally reduces power usage and improves battery life of the electronic device by enabling the user to use the electronic device more quickly and efficiently.

In some embodiments, such as in FIG. 6H, the time-synced lyrics 622 corresponding to the content item are displayed in a first region of the display device (798-34) (e.g., the time-synced lyrics are displayed in a time-synced lyrics region of the user interface), and a playback user interface element 608 for controlling playback of the content item is displayed in a second region of the display device, different than the first region (798-36). In some embodiments, the playback user interface is displayed in a playback region of the user interface. Optionally, the time synced lyrics are displayed horizontally adjacent to the playback region of the user interface. In some embodiments, the playback region of the user interface further includes playback controls, information about the content item playing, volume controls, and album artwork associated with the content item and a portion of the time-synced lyrics that corresponds to a currently-playing portion of the content item is horizontally aligned with the middle of the album artwork. The above-described manner of displaying the time-synced lyrics while displaying the user interface element for controlling playback of the content item allows the electronic device to enable the user to control the playback of the content item while viewing the time-synced lyrics without having to navigate between different user interfaces to do so, which simplifies the interaction between the user and the electronic device and enhances the operability of the electronic device and makes the user-device interface more efficient (e.g., by reducing the number of inputs needed to control the playback of the content item while viewing the time-synced lyrics), which additionally reduces power usage and improves battery life of the electronic device by enabling the user to use the electronic device more quickly and efficiently.

In some embodiments, such as in FIG. 6AA, a respective portion 622*b* of the lyrics that has a current focus is displayed as aligned with a respective element 602*b* in the playback user interface element (798-38). In some embodiments, the playback region of the user interface further includes album artwork associated with the content item and a portion of the time-synced lyrics that corresponds to a currently-playing portion of the content item is horizontally aligned with the middle of the album artwork. The above-described manner of aligning the respective portion of the lyrics with the current focus with a respective element in the playback user interface allows the electronic device to concurrently present the time-synced lyrics and the user interface for controlling the playback of the content item in a predictable layout, which simplifies the interaction between the user and the electronic device and enhances the operability of the electronic device and makes the user-device interface more efficient (e.g., by reducing the amount of time it takes the user to learn how to use the playback control user interface while viewing the time-synced lyrics user interface and reducing user error in interacting with the user interface), which additionally reduces power usage and improves battery life of the electronic device by enabling the user to use the electronic device more quickly and efficiently.

In some embodiments, such as in FIG. 6MM, the time-synced lyrics 622 corresponding to the content item are displayed in the first region of the display device, and the playback user interface element 608 for controlling playback of the content item is displayed in the second region of the display device when a display area for displaying the time-synced lyrics and the playback user interface element is greater than a threshold display area (798-40) (e.g., in some embodiments, the content application user interface, including the first and second regions of the display device, occupy the full display area). In some embodiments, such as in FIG. 6OO, the electronic device detects (798-42) a change of the display area for displaying the time-synced lyrics 622 and the playback user interface element to a display area that is less than the threshold display area (e.g., the electronic device concurrently displays the user interface of a second application in a first portion of the display area and the content application user interface in a second portion of the display area, and the second portion of the display area is less than the threshold display area. In some embodiments, in response to detecting the change of the display area for displaying the time-synced lyrics and the playback user interface element to the display area that is less than the threshold display area (798-44), the electronic device displays (798-46) the time-synced lyrics 622 within the playback user interface element, such as in FIG. 6OO. In some embodiments, when the display area for the content application user interface is below the threshold size, the electronic device displays the time-synced lyrics within the playback user interface element. Optionally, the electronic device initially displays the time-synced lyrics and the playback controls concurrently within the playback user interface element and after a predetermined amount of time (e.g., 2, 5, 10 seconds) ceases displaying one or more selectable options for controlling playback of the content item and continues to display the time-synced lyrics and album artwork associated with the content item. The above-described manner of displaying the time-synced lyrics within the playback user interface element in response to detecting the change of the display area for displaying the time-synced lyrics and the playback user interface element to a display area that is less than the threshold display area allows the electronic device to quickly and efficiently continue to display the time-synced lyrics after the display area for the time-synced lyrics and playback user interface is reduced without requiring user input to do so, which simplifies the interaction between the user and the electronic device and enhances the operability of the electronic device and makes the user-device interface more efficient (e.g., by reducing the number of inputs needed to continue to view the time-synced lyrics after the available display area is reduced), which additionally reduces power usage and improves battery life of the electronic device by enabling the user to use the electronic device more quickly and efficiently.

In some embodiments, such as in FIG. 6MM, while the time-synced lyrics 622 corresponding to the content item are displayed in the first region of the display device, and the playback user interface element 608 for controlling playback of the content item is displayed in the second region of the display device, the electronic device receives (798-48), via the one or more input devices, an input corresponding to a request to display representations of a sequence of content items, including the content item, in the playback user interface element. In some embodiments, the sequence of content items includes content items that the electronic device is configured to play after the content item. Optionally, the sequence of content items further includes one or more content items that previously played on the electronic device before the content item. In some embodiments, in response to receiving the input corresponding to the request to display the representations of the sequence of content items in the playback user interface element (798-50), such as in FIG. 6NN, the electronic device maintains (798-52) display of the time-synced lyrics 622 in the first region of the display device, displays (798-54), in the playback user interface element in the second region of the display device, the representations 656 of the sequence of content items in the playback user interface element. In some embodiments, the electronic device ceases display of one or more options for controlling the playback of the content item to display the sequence of content items. The above-described manner of concurrently displaying the time-synced lyrics and the representation of the sequence of content items in response to the request to view the representation of the sequence of content items allows the electronic device to enable the user to view the queue and the time-synced lyrics at the same time, which simplifies the interaction between the user and the electronic device and enhances the operability of the electronic device and makes the user-device interface more efficient (e.g., by reducing the number of inputs needed to continue viewing the time-synced lyrics after requesting to view the queue), which additionally reduces power usage and improves battery life of the electronic device by enabling the user to use the electronic device more quickly and efficiently.

In some embodiments, such as in FIG. 6II, in accordance with a determination that a parental control setting on the electronic device is a first setting, the electronic device replaces (798-56) one or more portions of the time-synced lyrics 622 with one or more visual indications that the one or more portions of the time-synced lyrics are not permitted to be displayed pursuant to the first setting (e.g., if parental controls are set to block explicit lyrics, the electronic device redacts (e.g., with asterisks) one or more portions of the lyrics that are explicit). In some embodiments, in accordance with a determination that the parental control setting on the electronic device is a second setting, different than the first setting, such as in FIG. 6HH, the electronic device forgoes (798-58) replacing the one or more portions of the time-synced lyrics with the one or more visual indications. In some embodiments, in accordance with a determination that the parental control settings are not set to block explicit lyrics and explicit lyrics are allowed to be played and displayed by the electronic device, the electronic device presents the full text of the lyrics including one or more portions of the lyrics that are explicit. The above-described manner of replacing one or more portions of the time-synced lyrics with one or more visual indications that one or more portions of time-synced lyrics are not permitted to be displayed pursuant to the parental control setting allows the electronic device to automatically enforce the parental control setting while still maintaining presentation of the time-synced lyrics, which simplifies the interaction between the user and the electronic device and enhances the operability of the electronic device and makes the user-device interface more efficient (e.g., by reducing the number of inputs needed to enforce the parental controls while displaying the time-synced lyrics), which additionally reduces power usage and improves battery life of the electronic device by enabling the user to use the electronic device more quickly and efficiently.

It should be understood that the particular order in which the operations in FIGS. 7A-7K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1100) are also applicable in an analogous manner to method 700 described above with respect to FIGS. 7A-7K. For example, the operation of the electronic device to present time-synced lyrics described above with reference to method 700 optionally has one or more of the characteristics of the presentation of representations of content items in a playback sequence, ways of sharing a content item with the user account of another electronic device, etc., described herein with reference to other methods described herein (e.g., methods 900 and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 7A-7K are, optionally, implemented by components depicted in FIGS. 1A-1B. For example, displaying operations 702, 718, and 738 and receiving operations 708, 770, and 788 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Representations of Content Items in a Playback Sequence

Users interact with electronic devices in many different manners, including using an electronic device to view representations of items of content that the electronic device will play next in a content application. In some embodiments, an electronic device is able to present representations of content items in a playback sequence with one or more selectable options for changing a playback arrangement of the items of content. The embodiments described below provide ways in which an electronic device presents the sequence of content items for playback. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
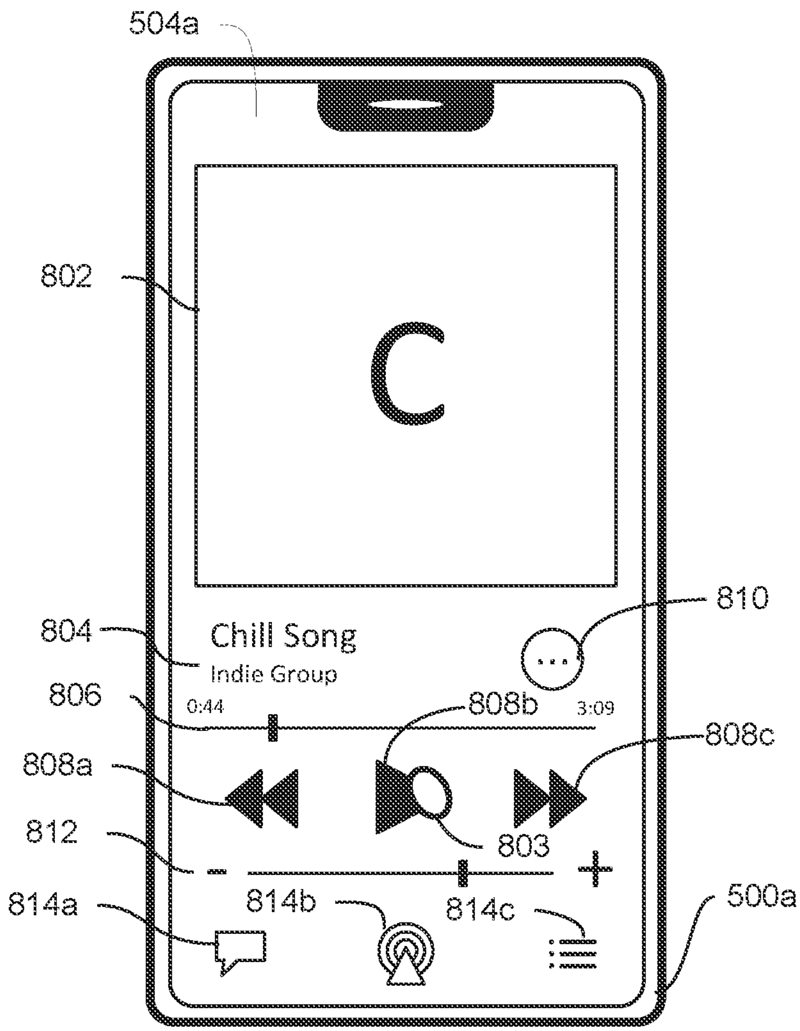
FIGS. 8A-8Y illustrate exemplary ways in which an electronic device presents representations of content items in a playback sequence in accordance with some embodiments.
Figure 8B:
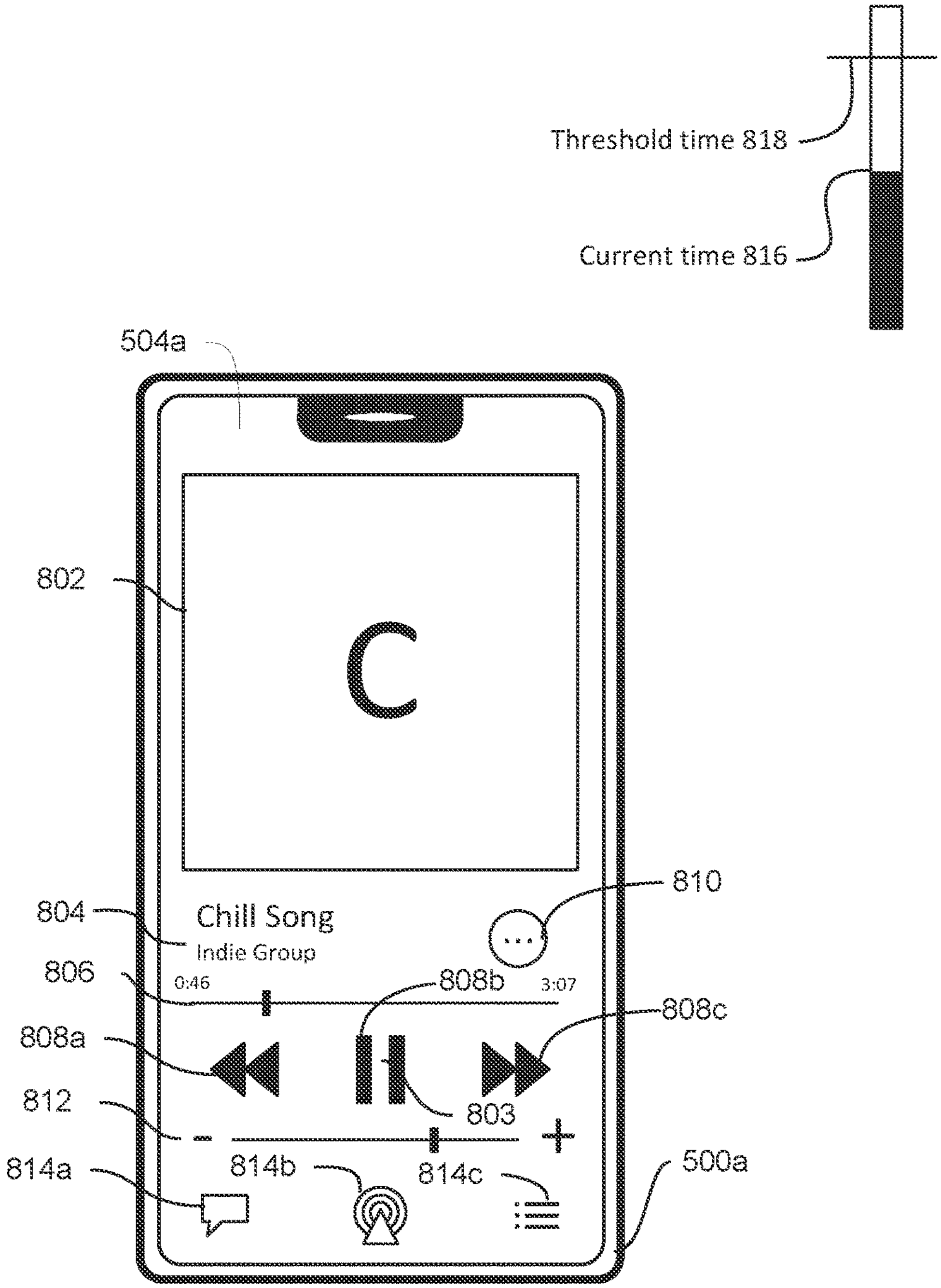
Figure 8C:
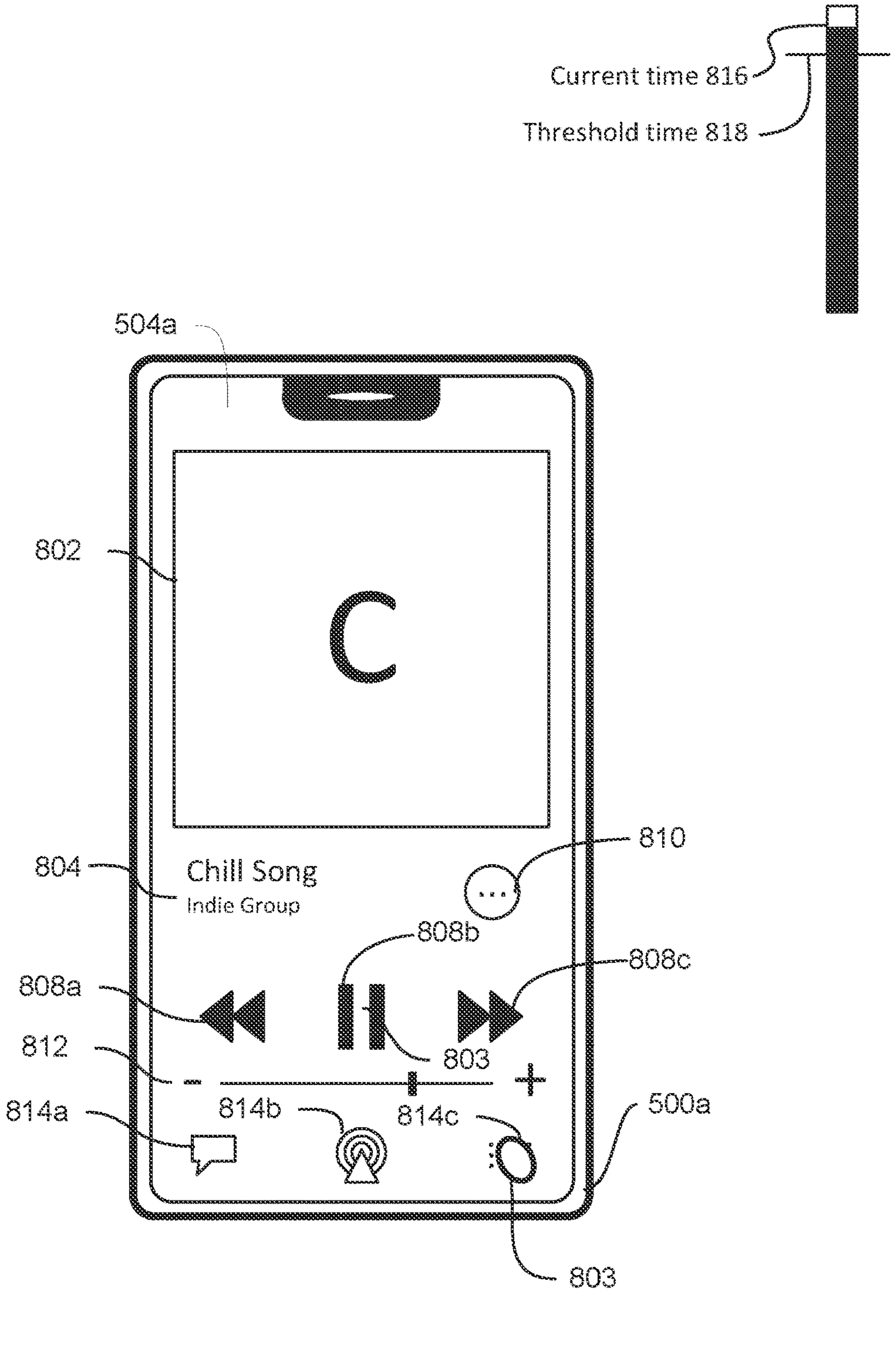
Figure 8D:
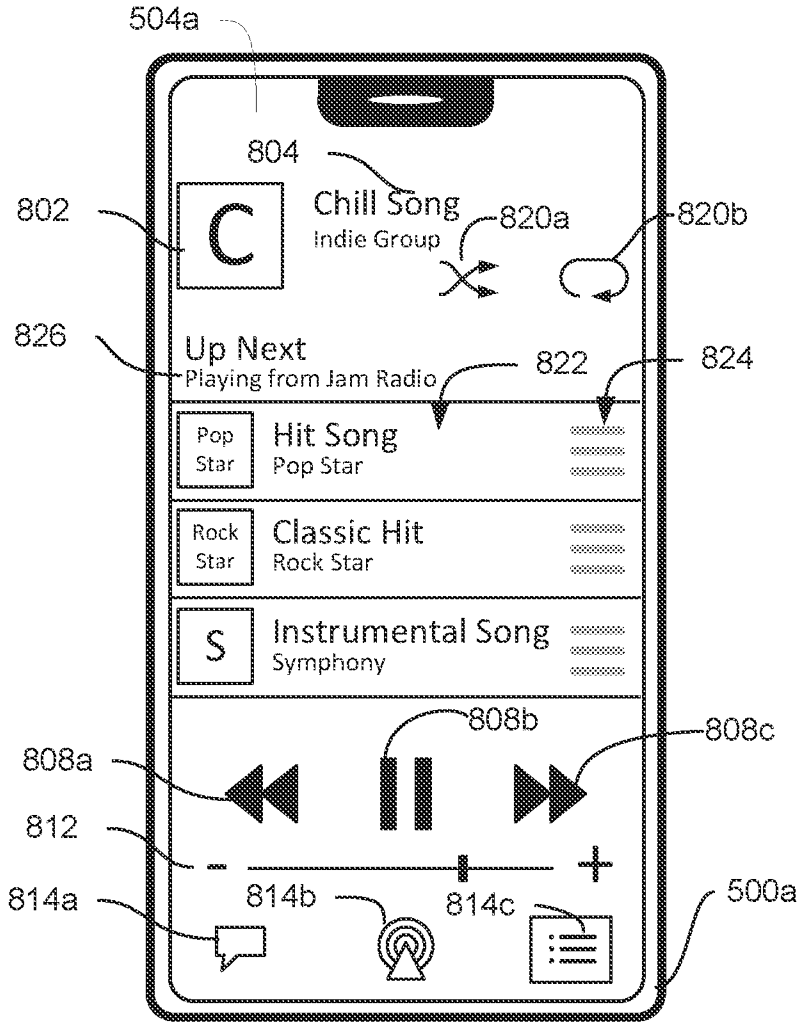
Figure 8E:
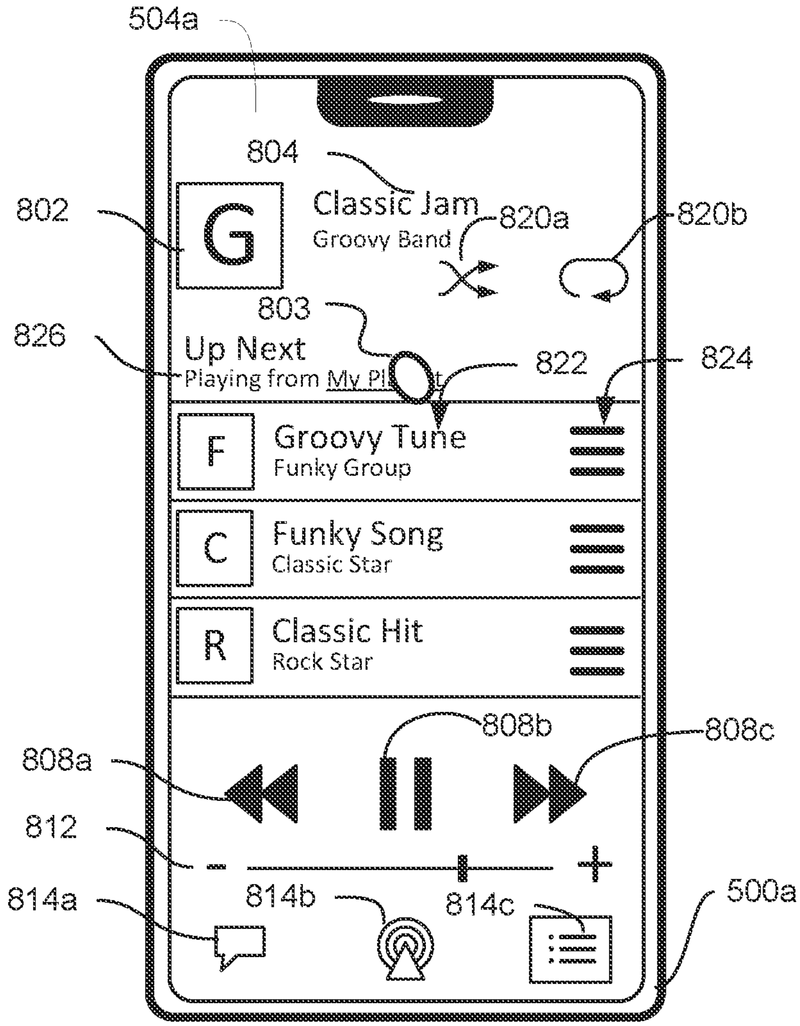
Figure 8F:
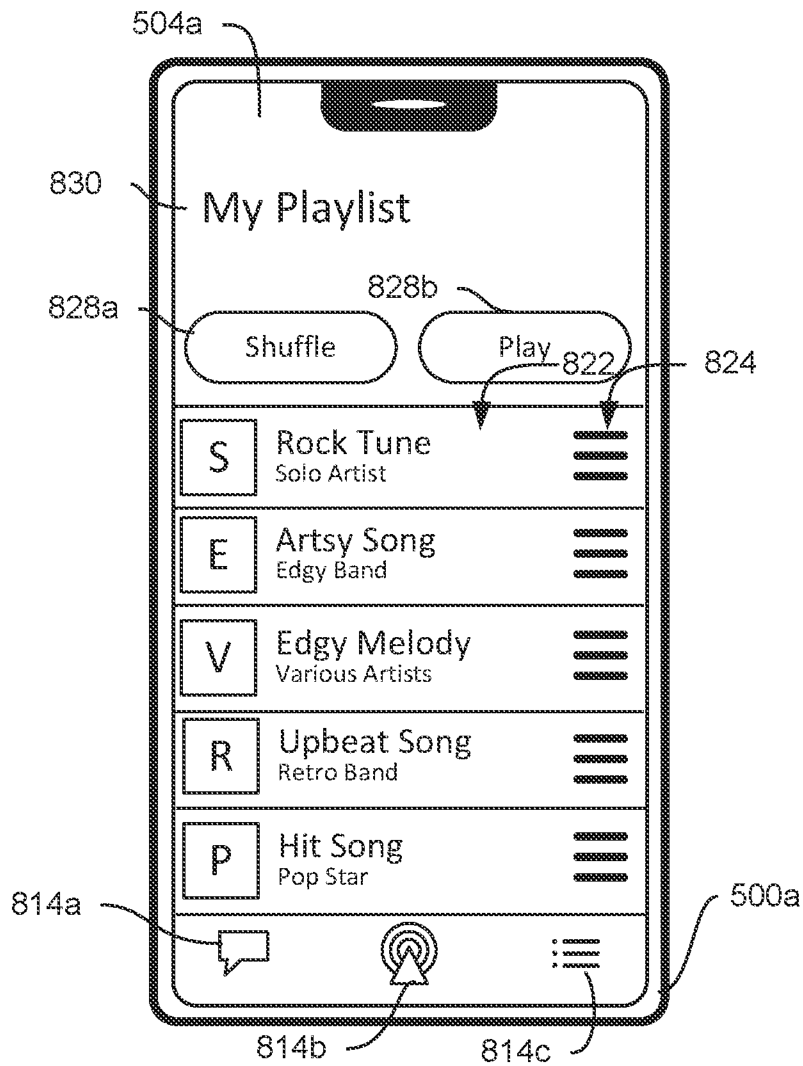
Figure 8G:
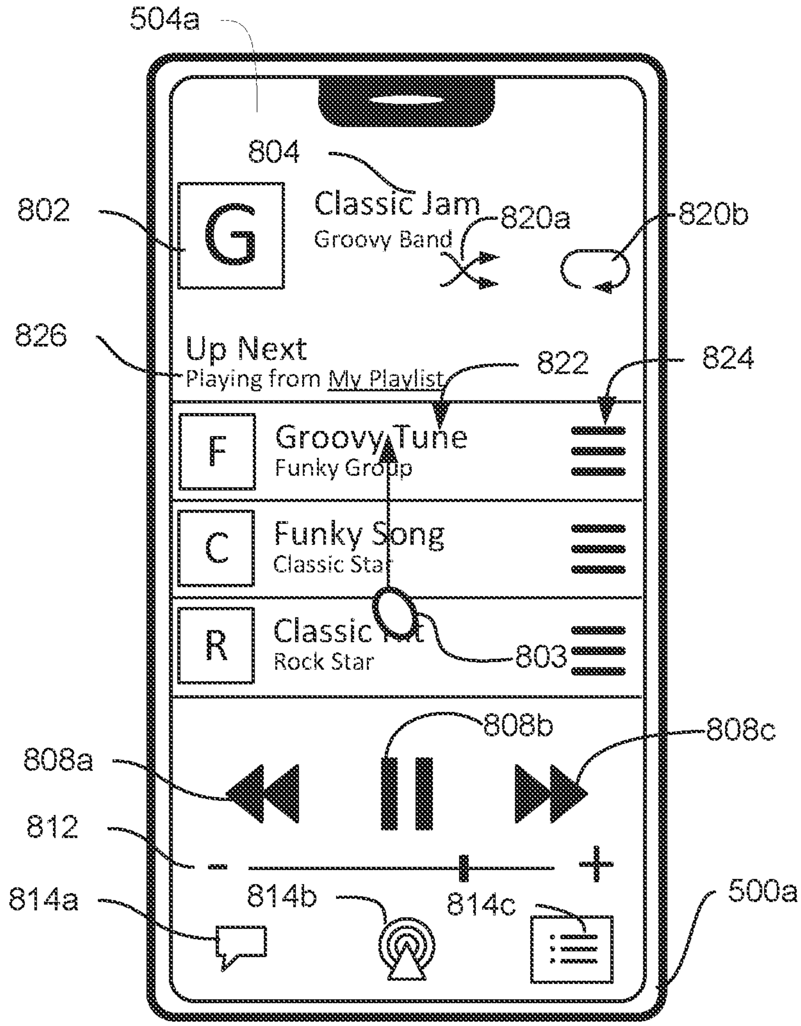
Figure 8H:
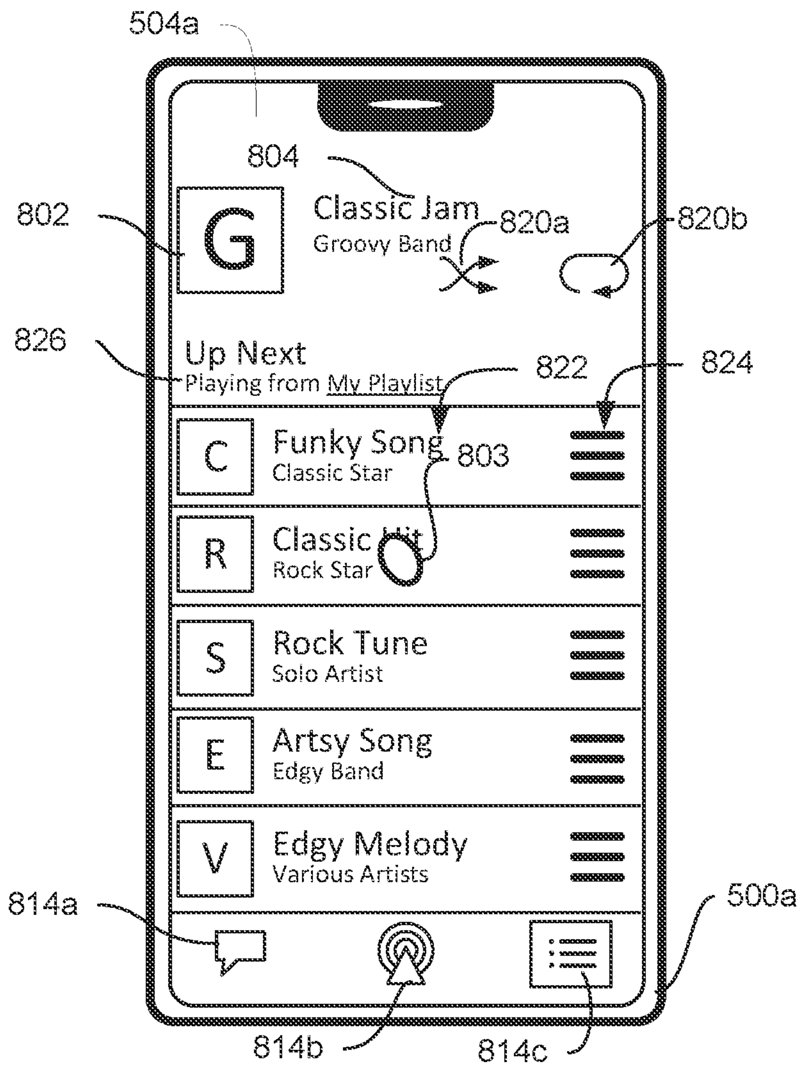
Figure 8I:
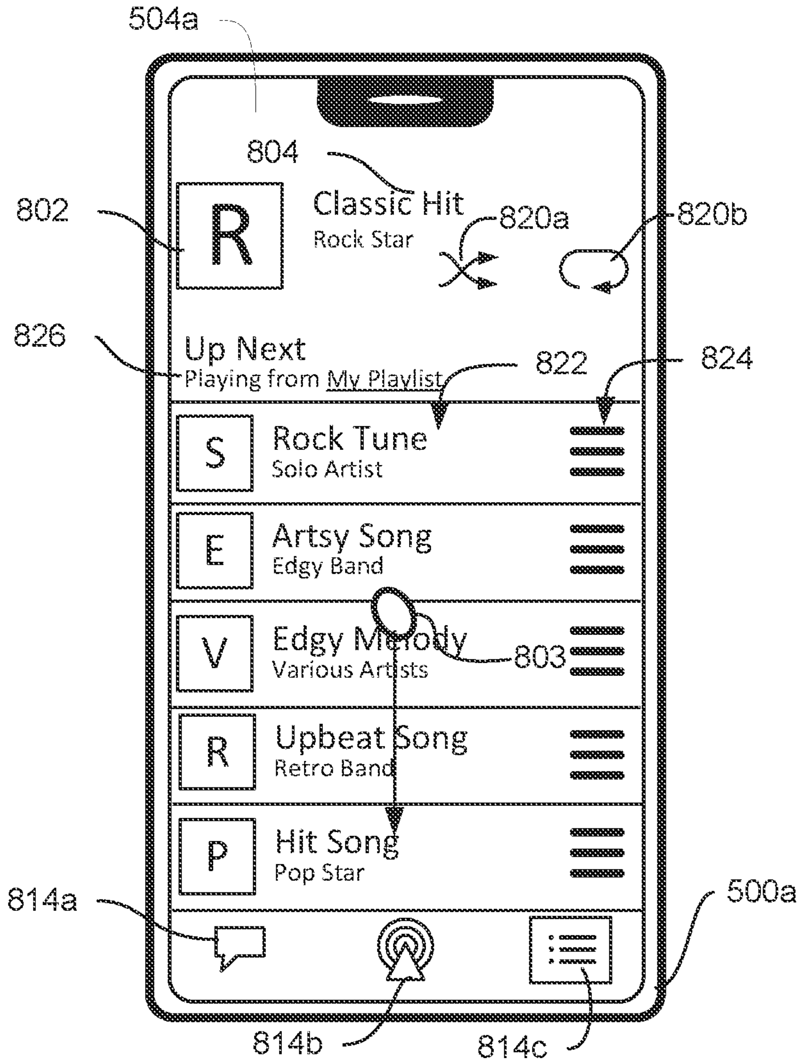
Figure 8J:
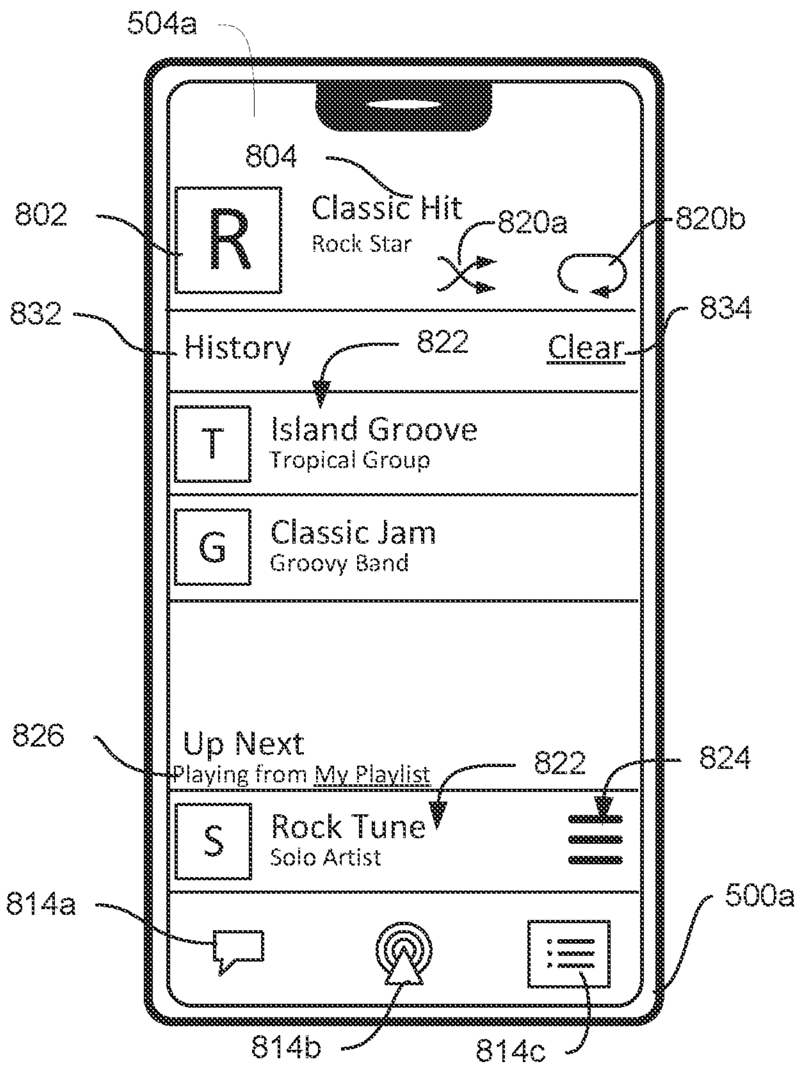
Figure 8K:
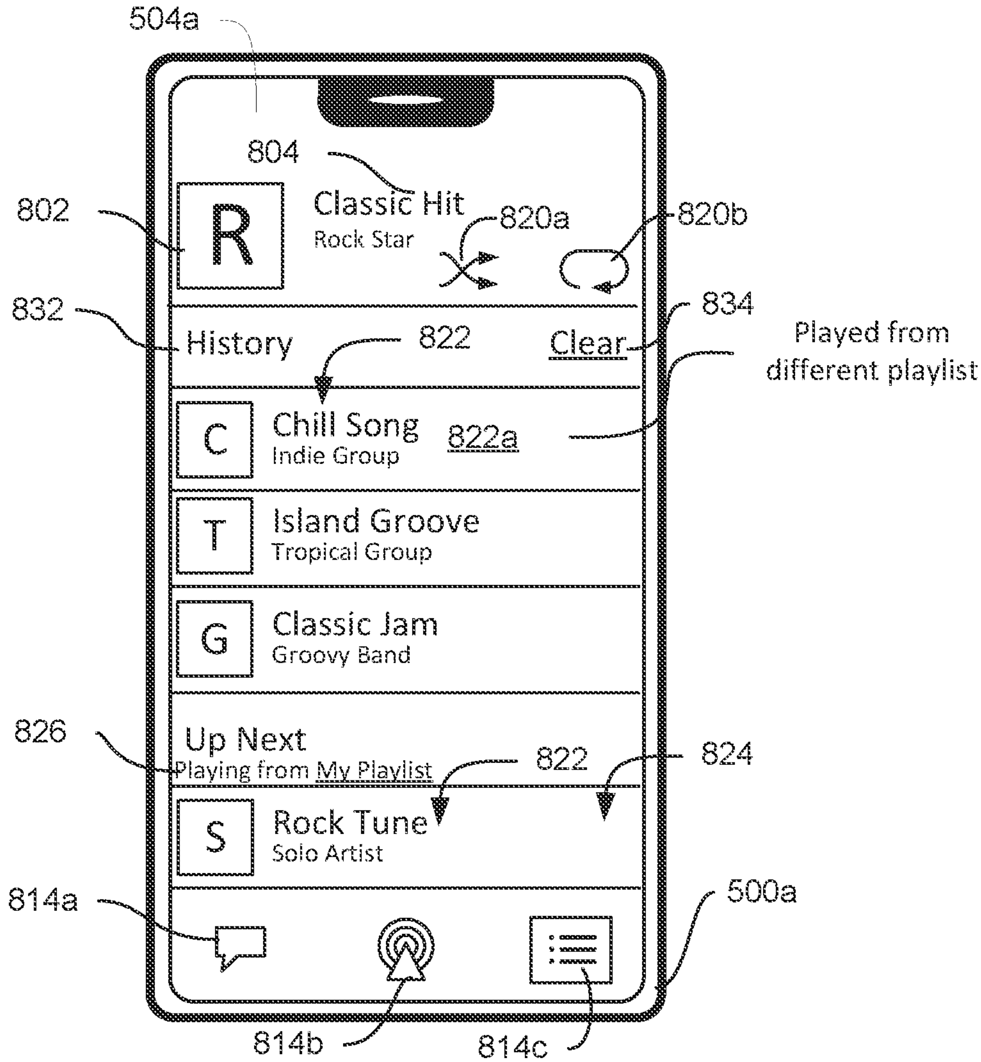
Figure 8L:
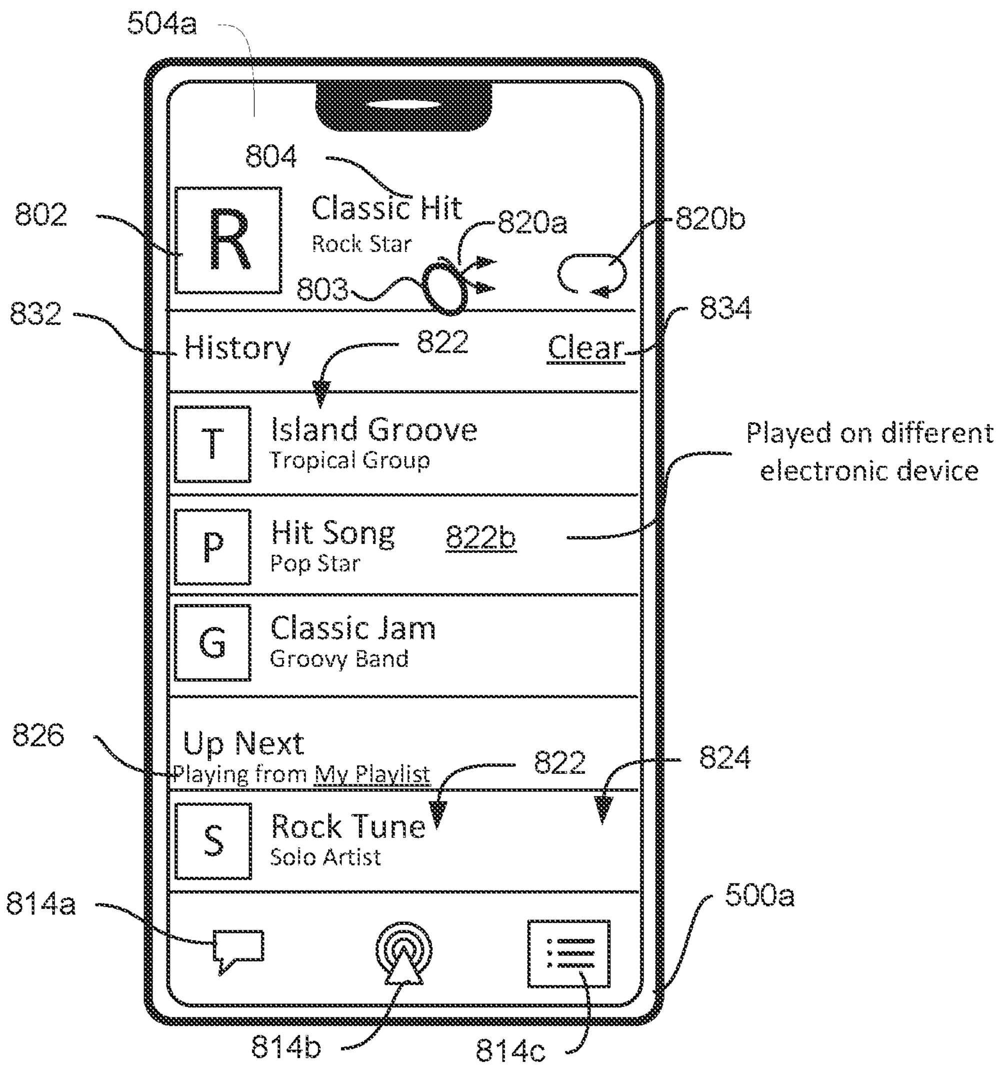
Figure 8M:
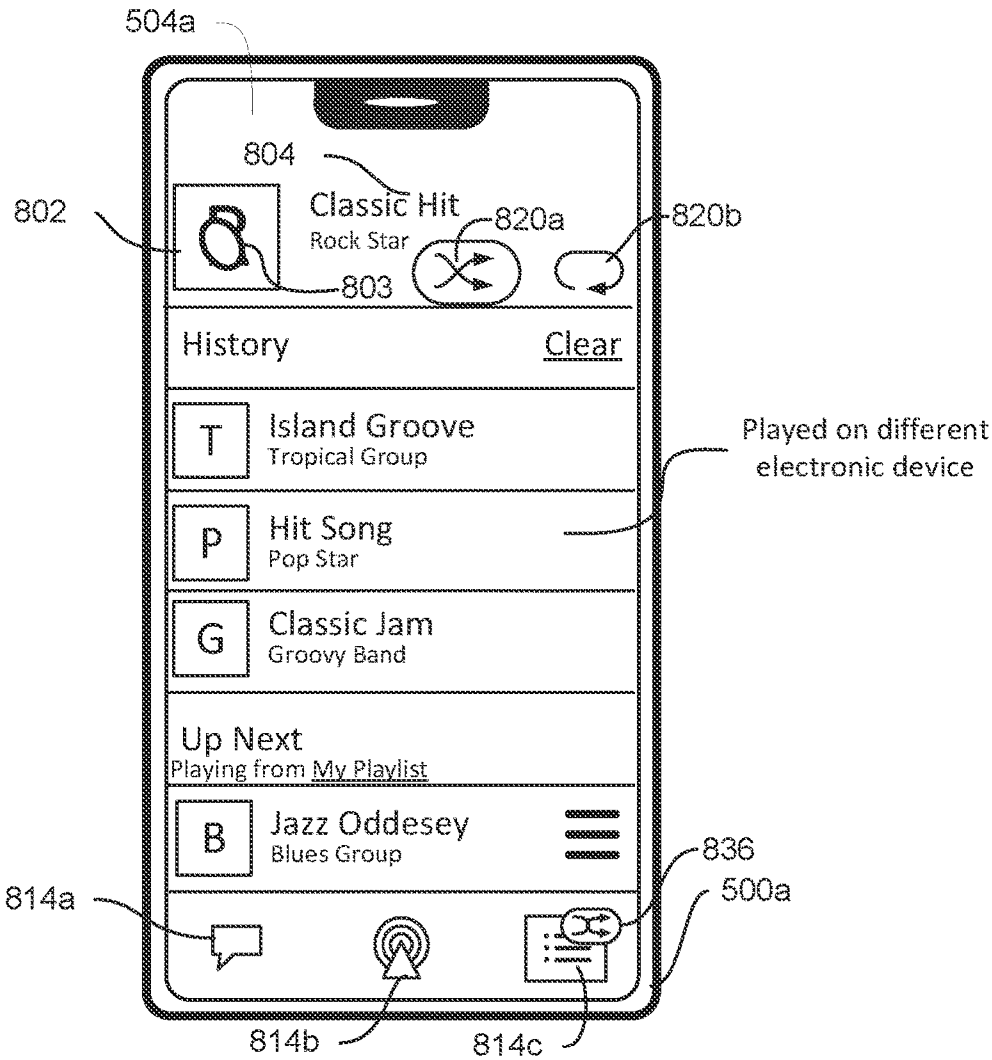
Figure 8N:
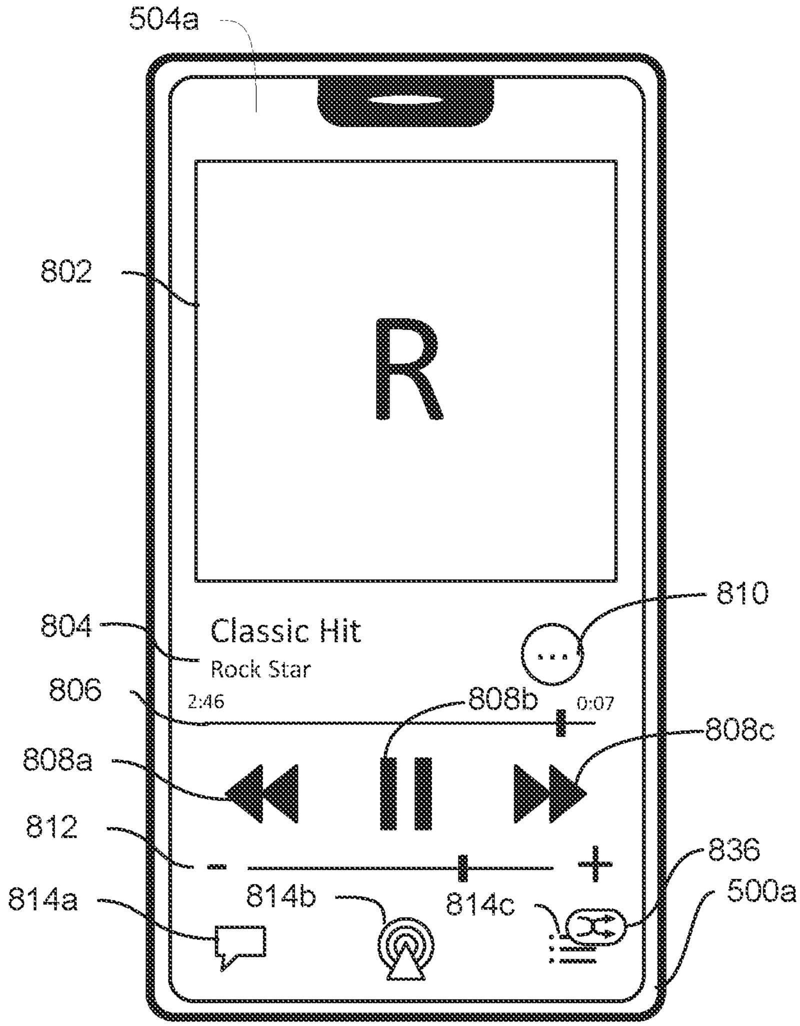
Figure 8O:
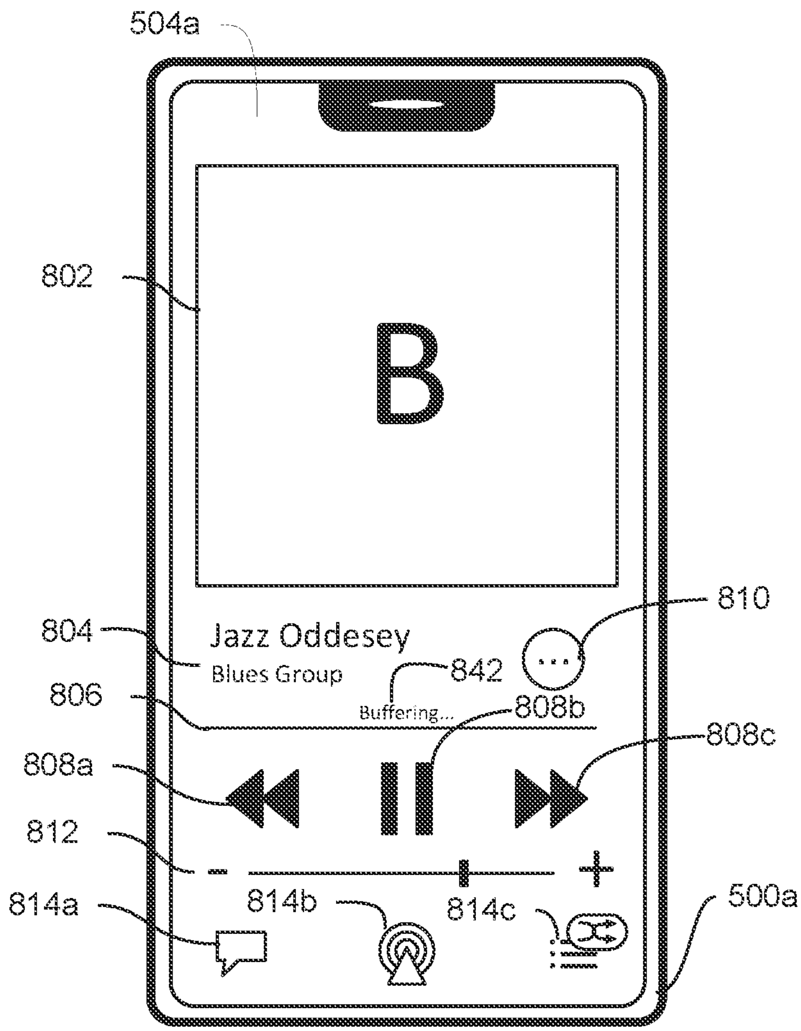
Figure 8P:
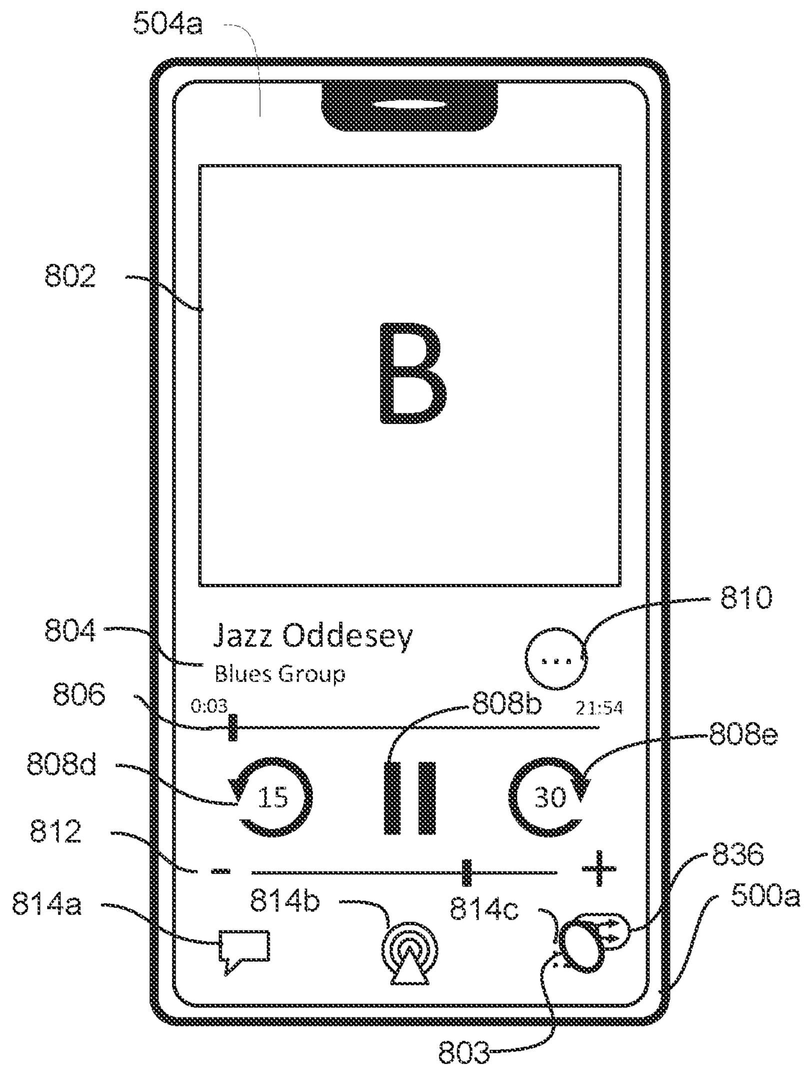
Figure 8Q:
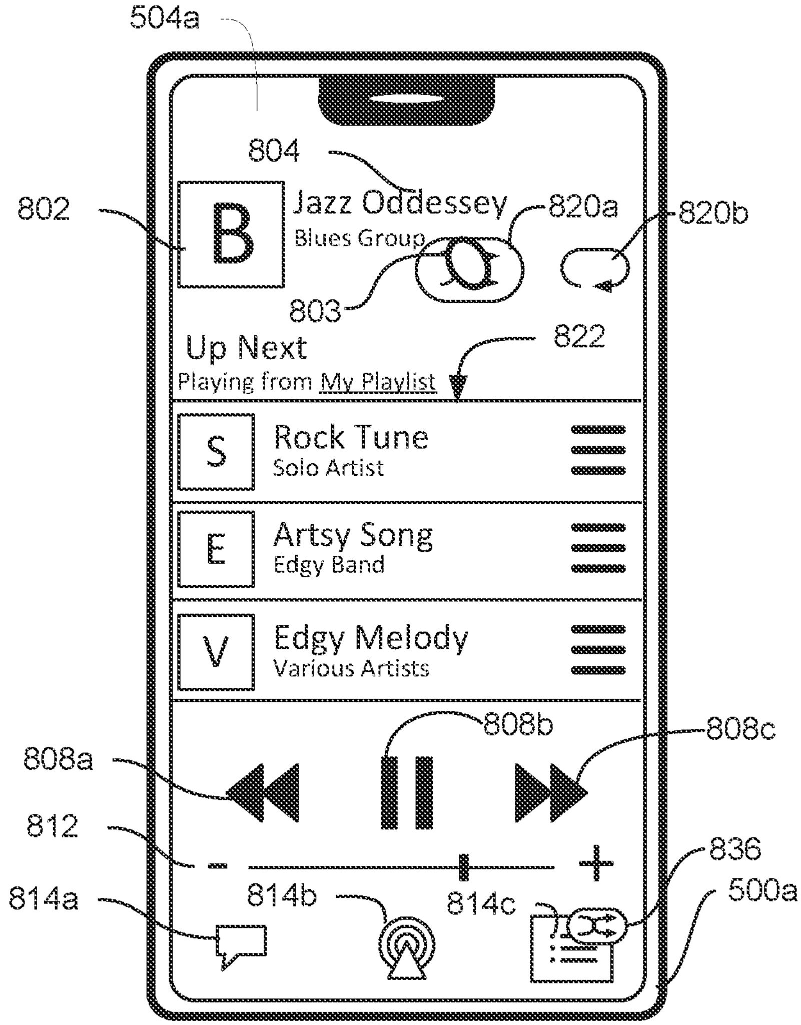
Figure 8R:
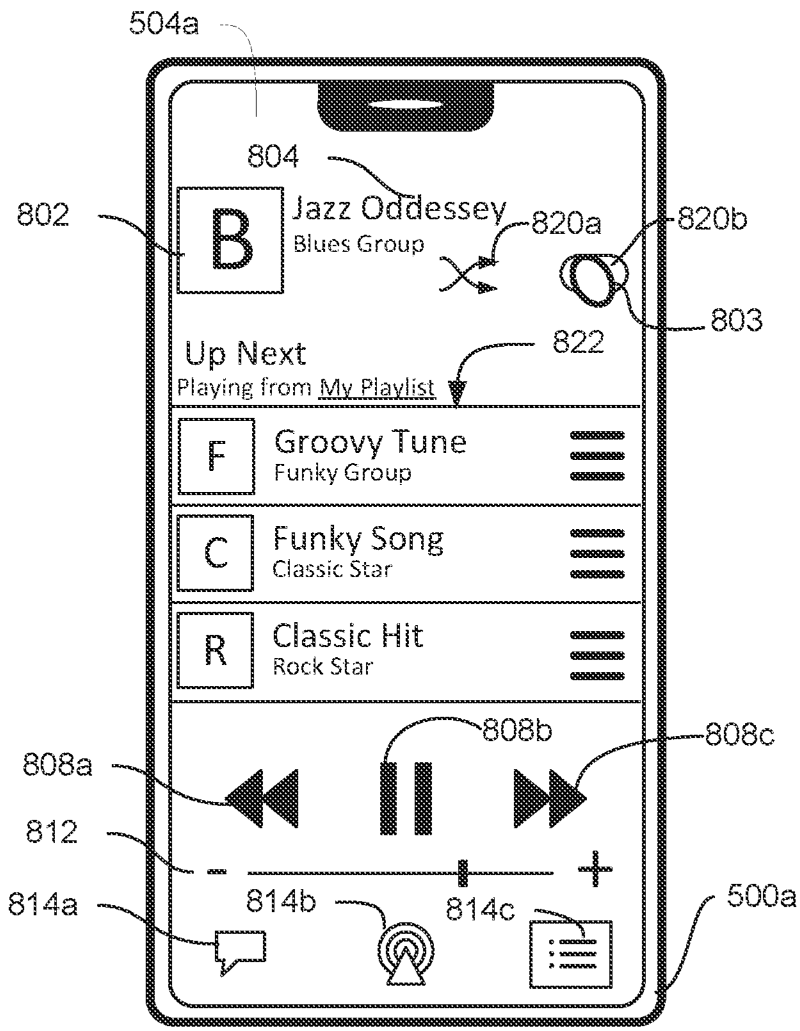
Figure 8S:
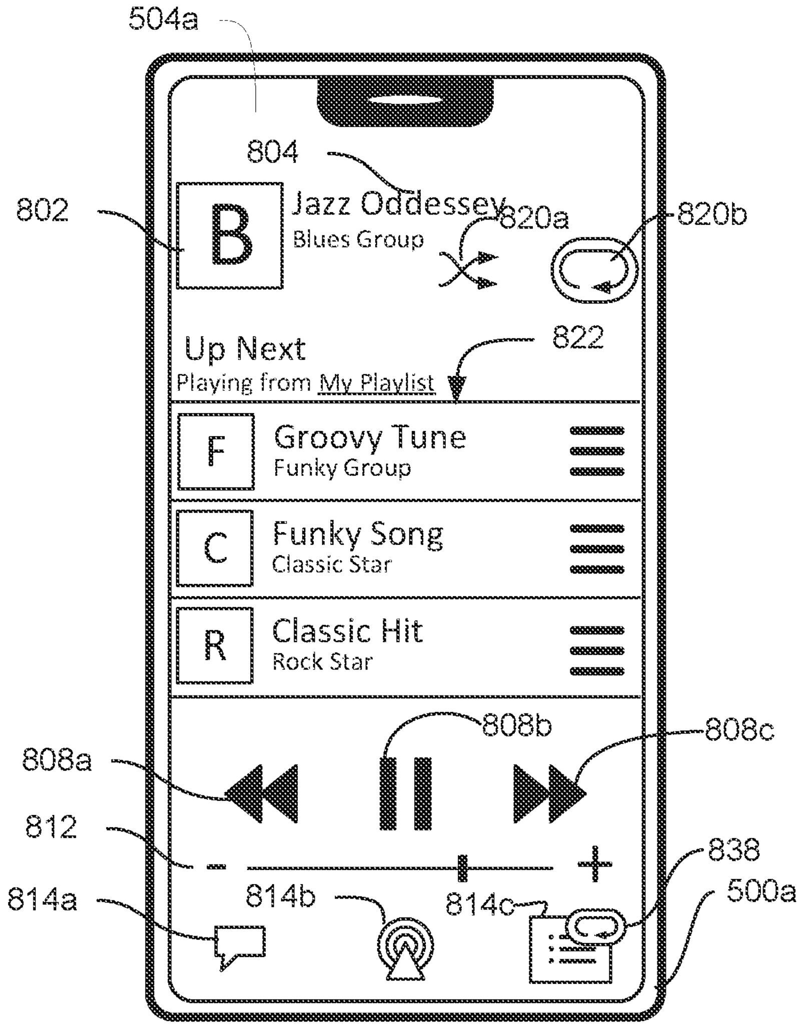
Figure 8T:
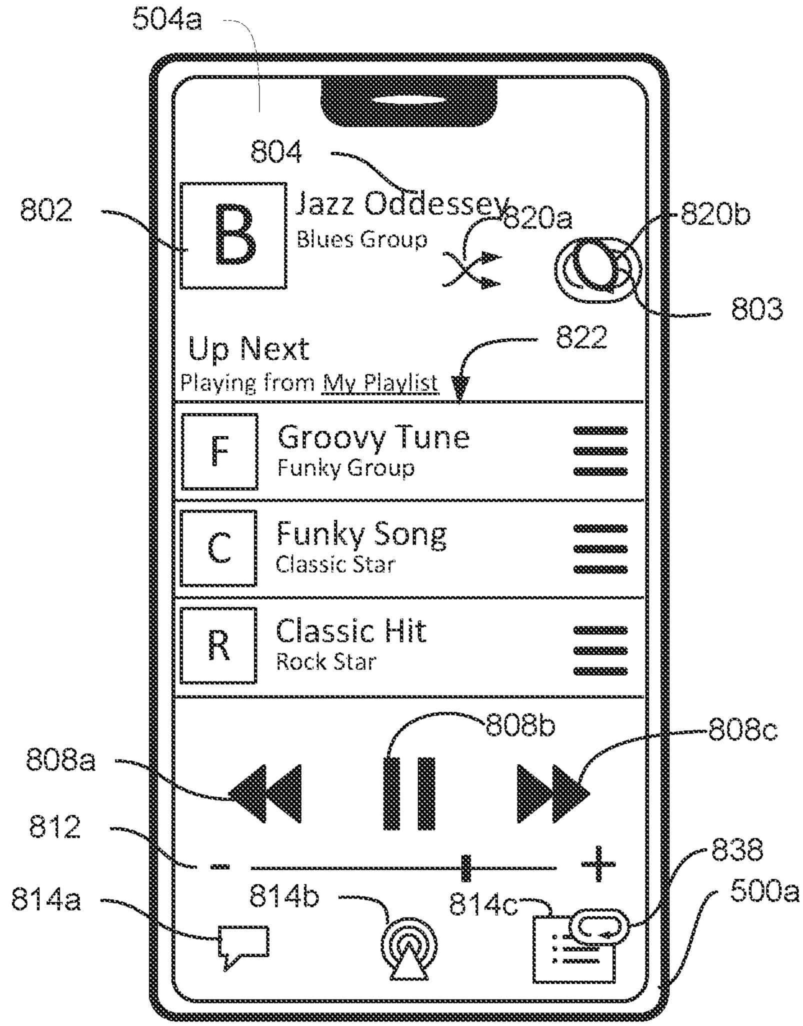
Figure 8U:
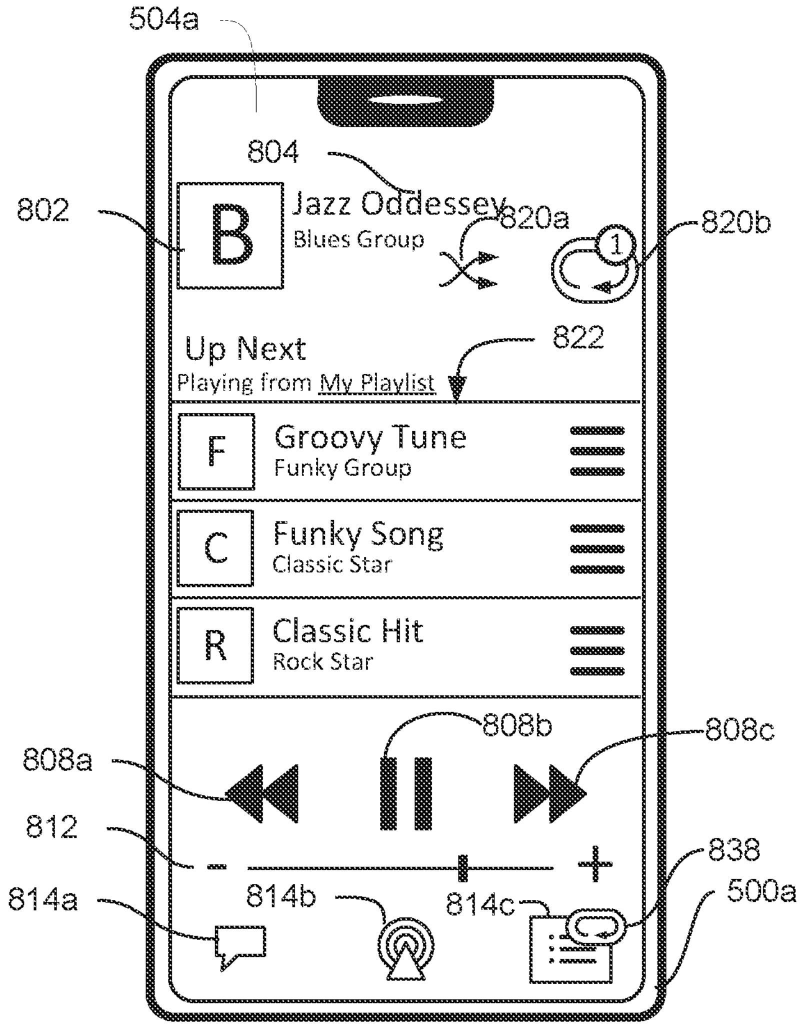
Figure 8V:
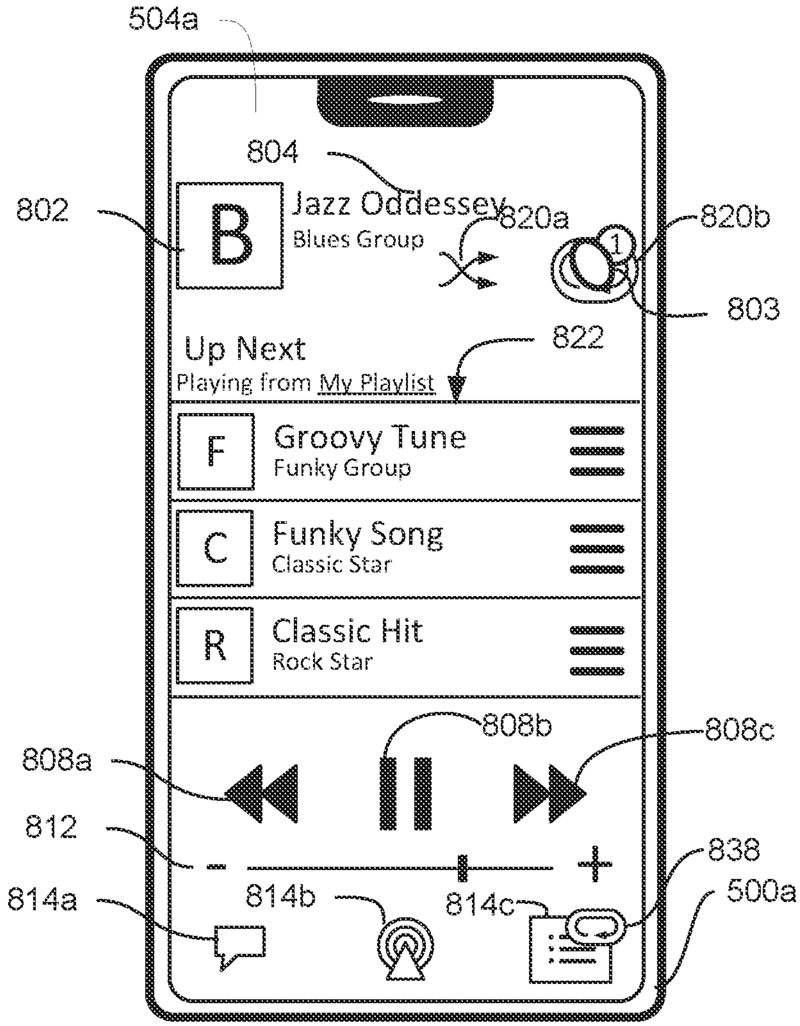
Figure 8W:
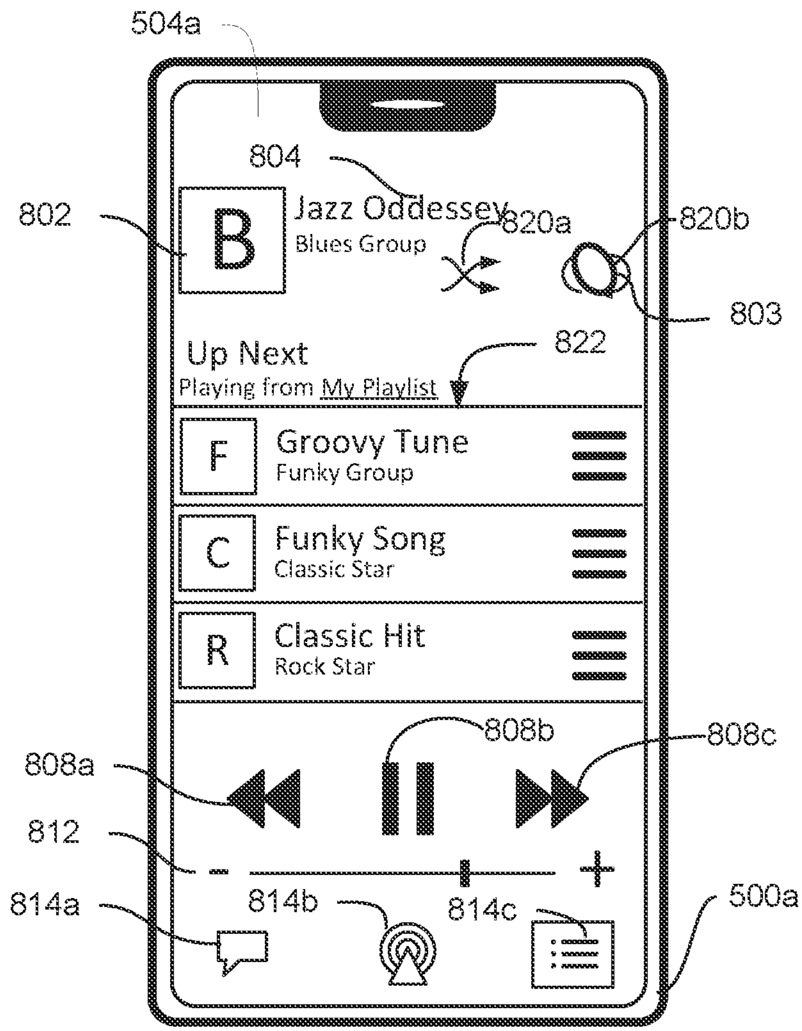
Figure 8X:
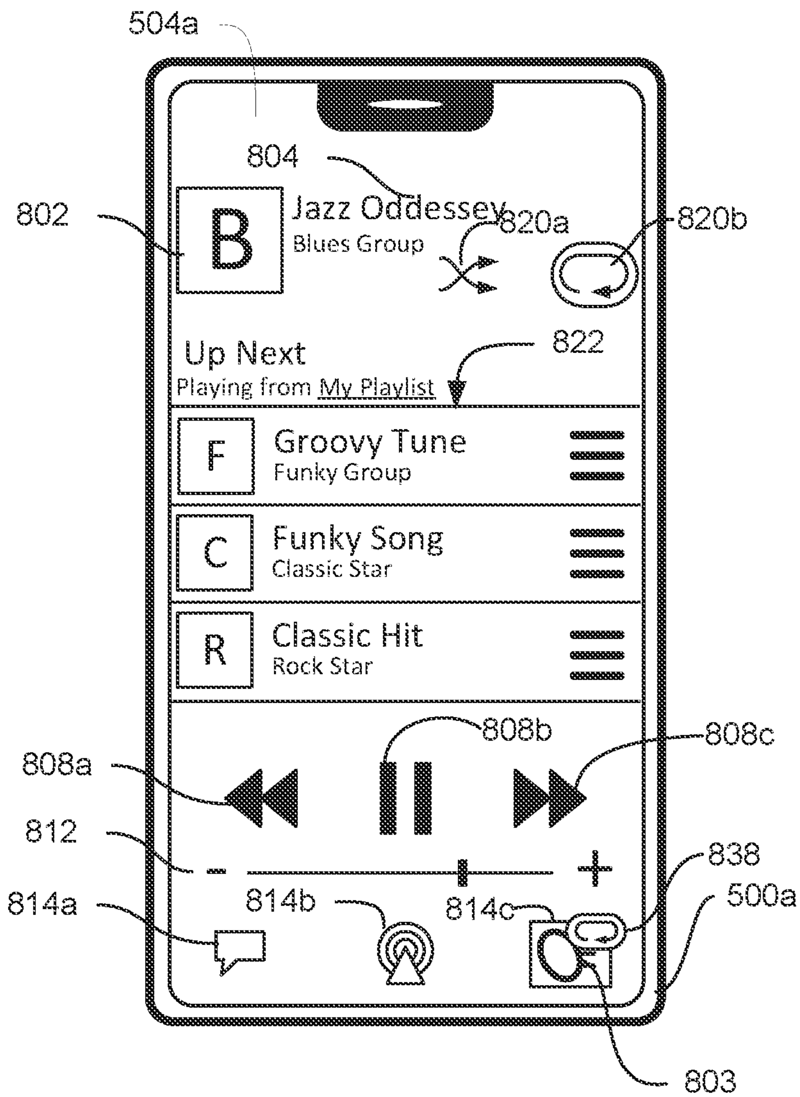
Figure 8Y:
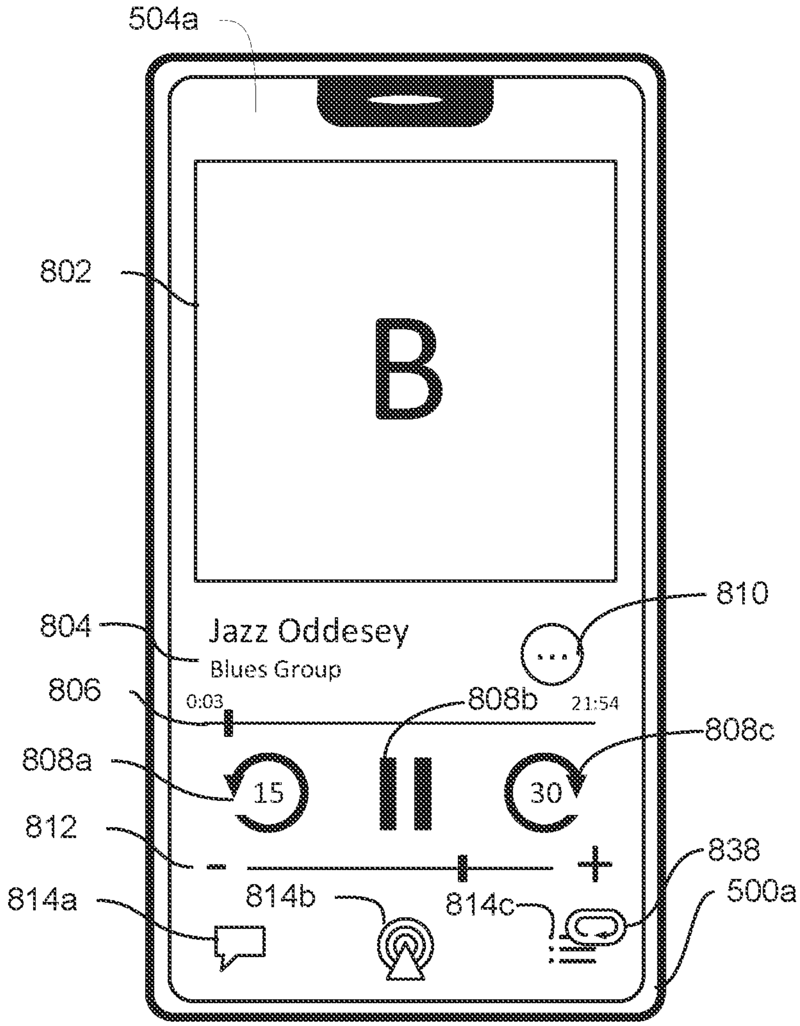
Figure 9A:
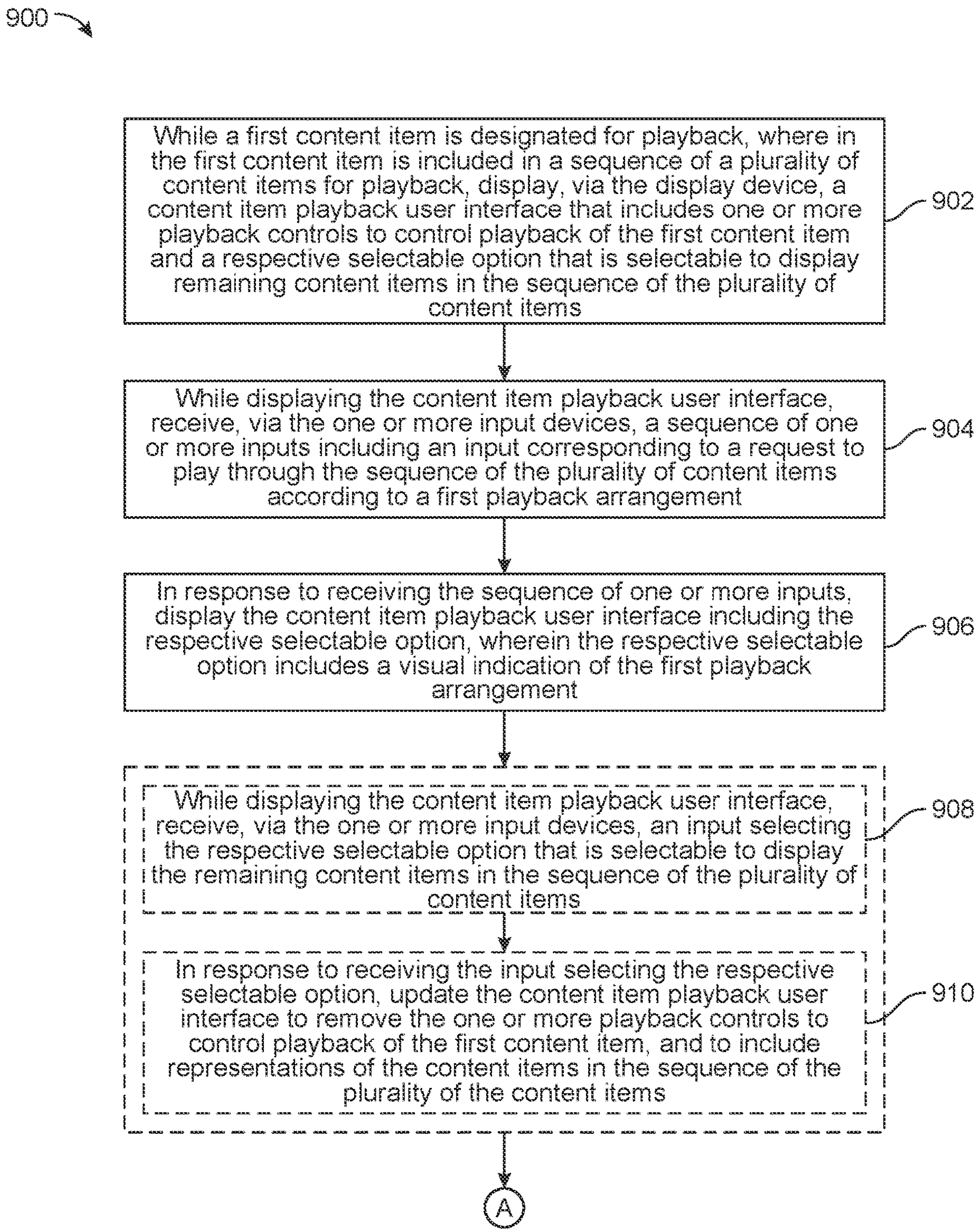
FIGS. 9A-9G are flow diagrams illustrating a method of presenting representations of content items in a playback sequence in accordance with some embodiments.
Figure 9B:
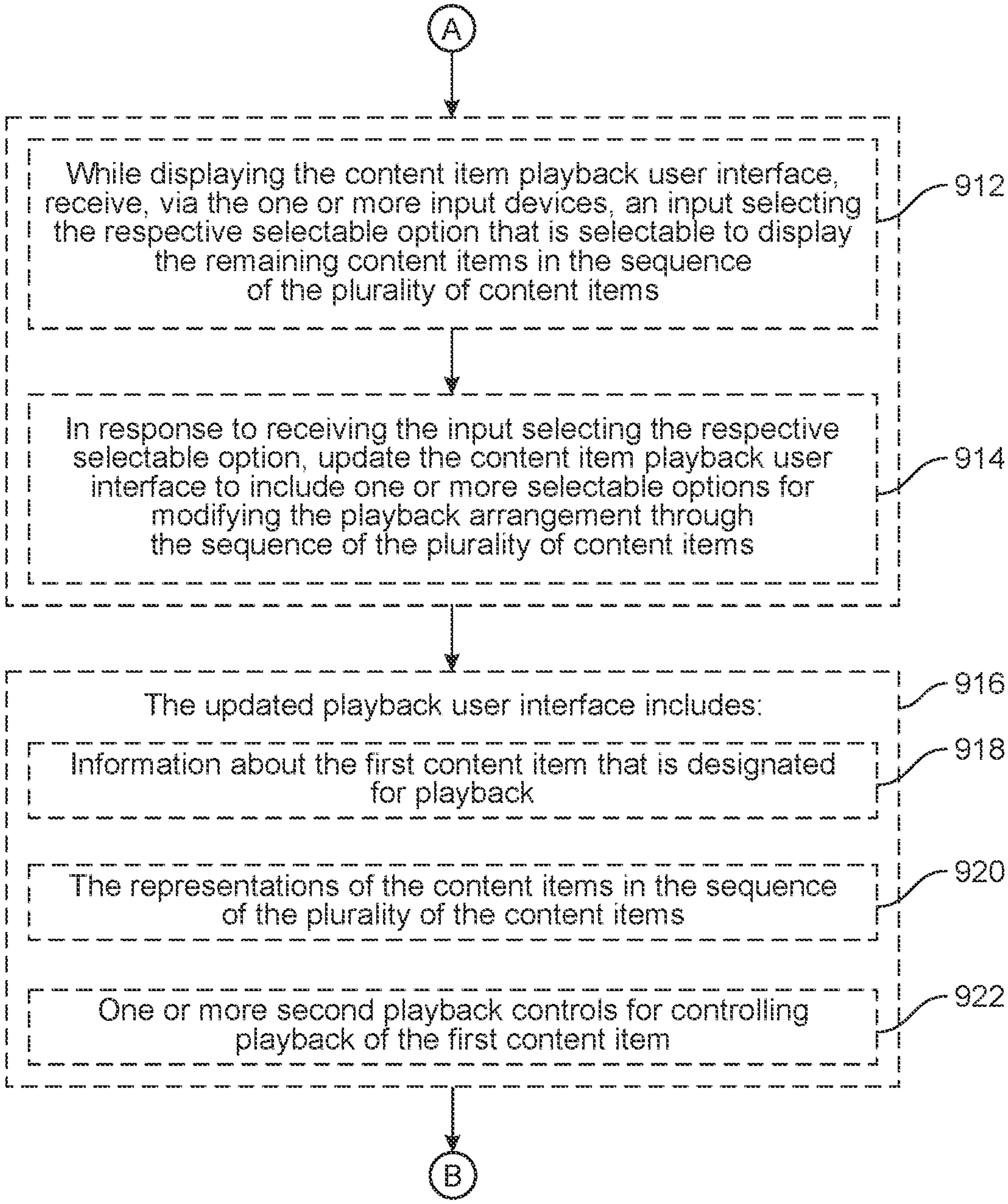
Figure 9C:
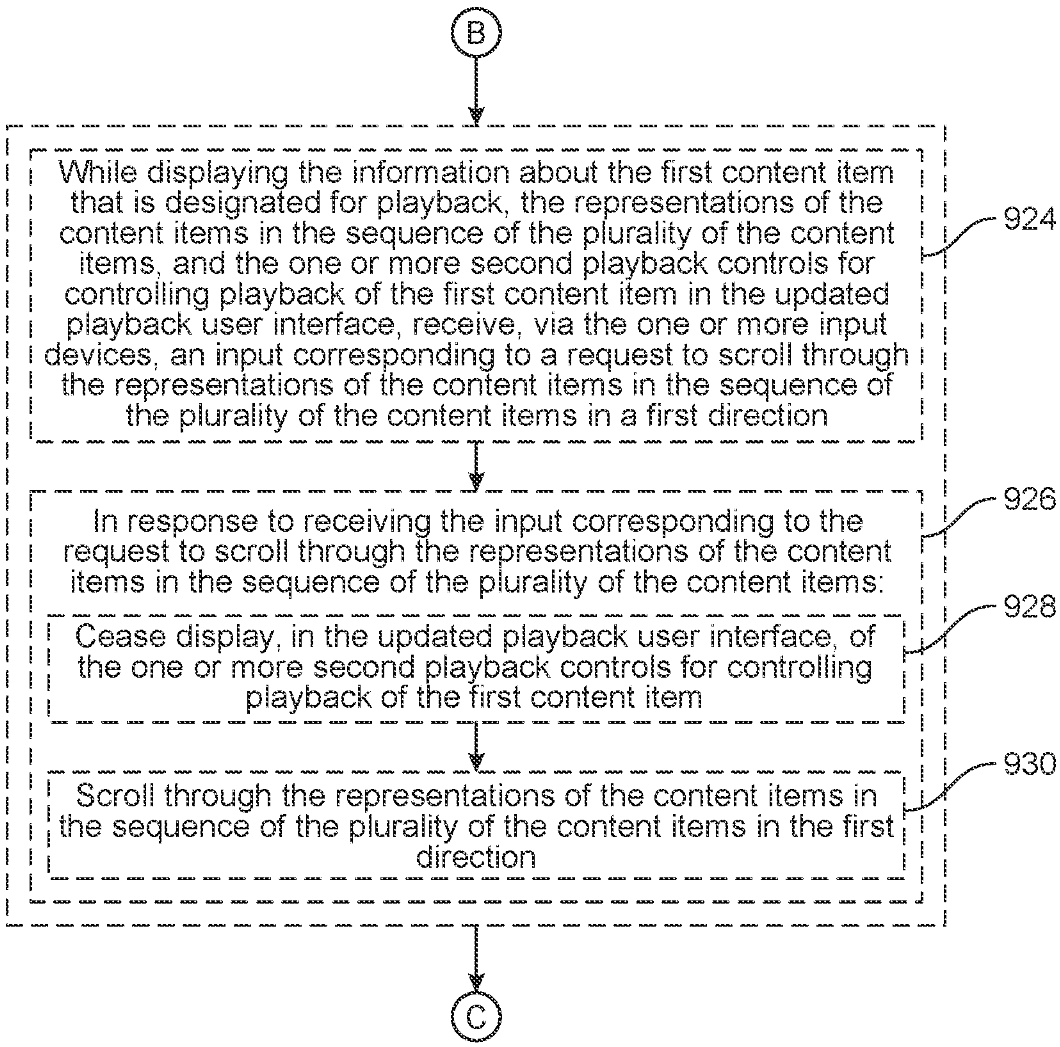
Figure 9D:
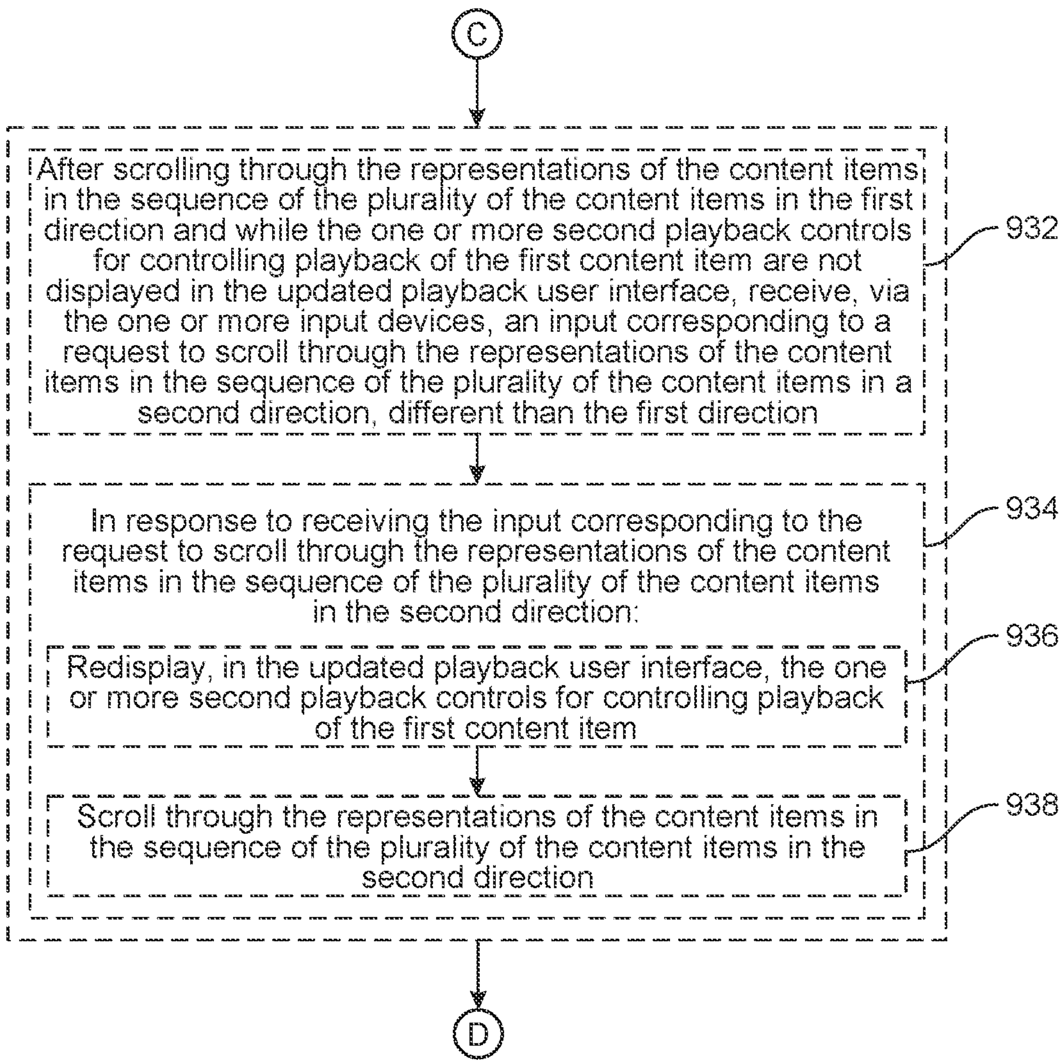
Figure 9E:
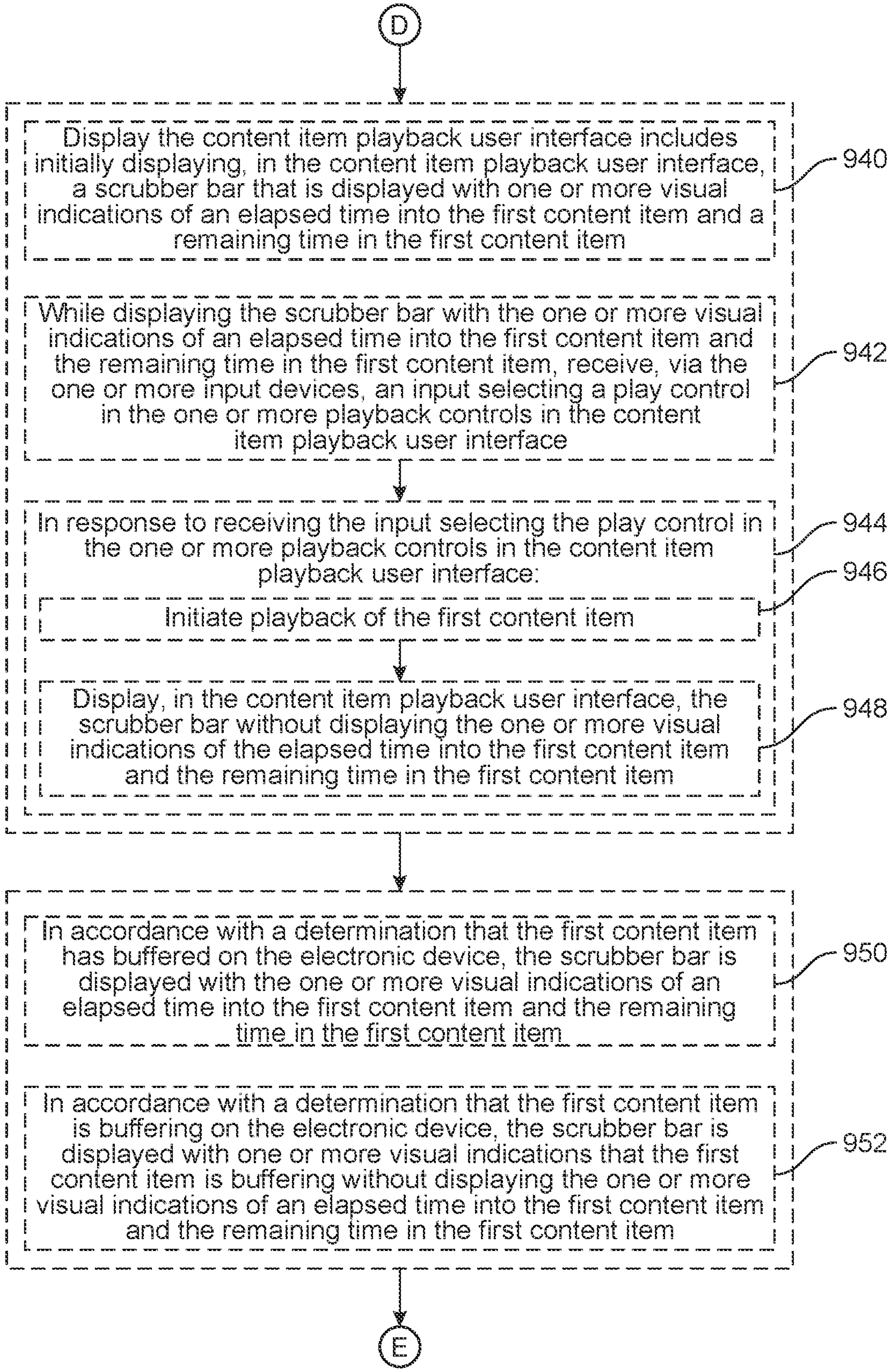
Figure 9F:
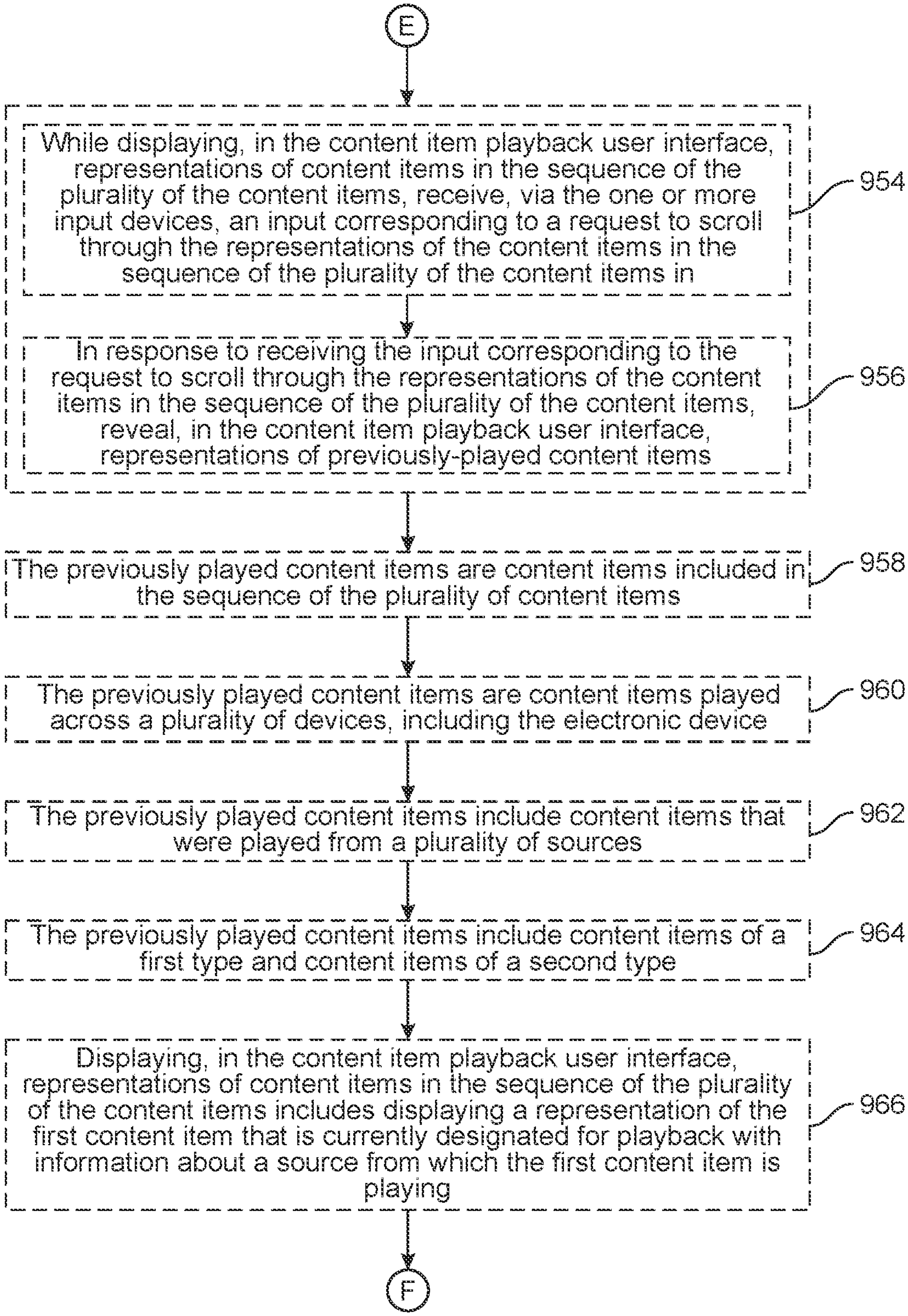
Figure 9G:
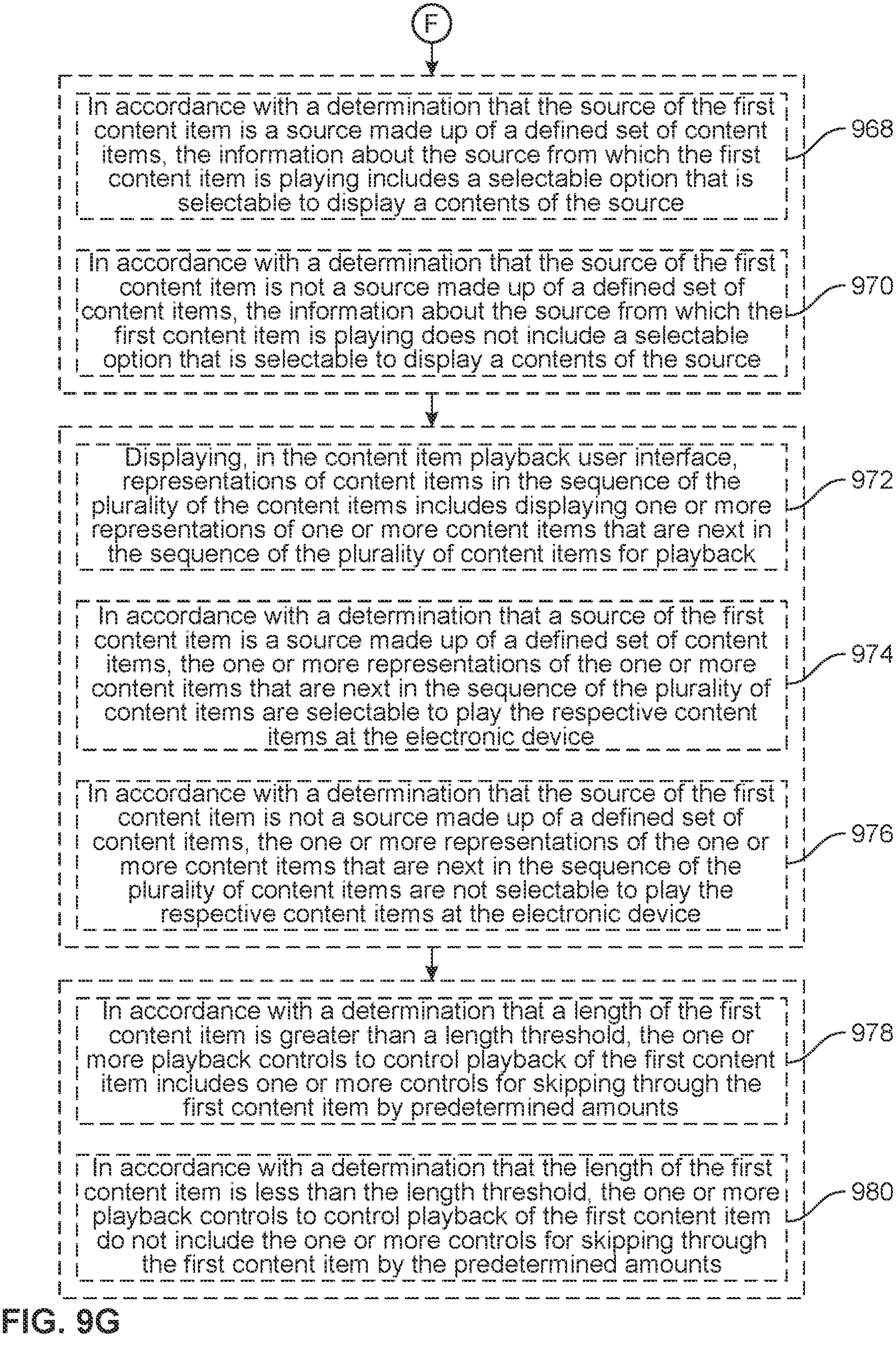

FIGS. 8A-8Y illustrate exemplary ways in which an electronic device presents representations of content items in a playback sequence in accordance with some embodiments. The embodiments in these figures are used to illustrate the processes described below, including the processes described with reference to FIGS. 9A-9G.

FIG. 8A illustrates a content playback user interface of a content application on electronic device 500*a*. The content playback user interface includes album artwork 802 associated with an item of content that is playing on the electronic device 500*a*, an indication 804 of the title and artist of the content item, a scrubber bar 806 that indicates the playback position in the item of content that is selectable to move the playback position to a different part of the content item, selectable controls 808*a-c* (e.g., skip back 808*a*, play 808*b*, skip forward 608*c*) for controlling playback of the content item, selectable volume controls 812 selectable to adjust the playback volume of the item of content, a menu option 810 that is selectable to present a menu such as the menu illustrated in FIG. 6V, a selectable option 814*a* to view time-synced lyrics of the content item (e.g., as described with reference to method 700), a selectable option 814*b* to select an audio output device to play the content, and a selectable option 814*c* to view representations of items of content in a playback sequence that will play after the item of content. As shown in FIG. 8A, the user selects (e.g., with contact 803) the option 808*b* to play the item of content.

In response to the user's selection in FIG. 8A, the electronic device 500*a* plays the content item, as shown in FIG. 8B. The electronic device 500*a* continues to display the scrubber bar 806 for a period of time that is less than a threshold time (e.g., 3, 5, 10, etc. seconds). As shown in FIG. 8C, once the time 816 exceeds the threshold time 818 without receiving user input, the electronic device 500*a* ceases displaying the scrubber bar. As shown in FIG. 8C, the user selects (e.g., with contact 803) the option 814*c* to display the indications of the content items included in the playback sequence that will play after the content item that is currently playing.

As shown in FIG. 8D, in response to the user's selection in FIG. 8C, the electronic device 500*a* presents the user interface including the representations 822 of the sequence of content items that will play next on the electronic device. The user interface includes the album art 802 and title and artist 804 of the content item that is playing, an option 820*a* to shuffle the order of the sequence of content items, and option 820*b* to repeat one or all of the content items, an indication 826 of the source of the content, and representations 822 of the content items in the playback sequence. Each representation 822 of a respective content item includes the album artwork, title, and artist of the respective content item.

The indication 826 of the source of the playback indicates a radio station that does not include a defined set of content items (and/or does not make content items available to the electronic device until the time of broadcast of given content item). Instead, the radio station optionally adds items of content to the sequence while the content is playing. Because the user is not able to view and edit the collection of content items included in the radio station, the indication 826 is not a link to view the content items included in the collection and options 824 selectable to re-arrange the representations 822 of the content items are inactive or optionally not displayed. In some embodiment, representations 822 are not selectable to initiate playback of the selected content item in the sequence for the above reasons.

FIG. 8E illustrates presentation of the representations 822 of the sequence of content items when the user is playing the content from a playlist. The playlist includes a defined set of content items that the user is able to view. Thus, the indication 826 of the name of the playlist is selectable to present a user interface including representations of the content items in the playlist. Further, the representation 822 of each content item in the sequence of content items includes options 824 to select and drag representations 822 to re-arrange the playback order of the content items. Each representation 822 is selectable to skip to the respective content item in the sequence of content items to play the respective content item and continue playing the sequence of content items after the respective content item.

As shown in FIG. 8E, the user selects (e.g., with contact 803) the indication 826 of the name of the playlist. In response to the user's selection, the electronic device 500*a* presents the playlist user interface illustrated in FIG. 8F.

FIG. 8F illustrates the playlist user interface. The playlist user interface includes an indication 830 of the name of the playlist, a selectable option 828*a* to play the playlist in a shuffled order that is different from the predetermined order in which the content items are arranged in the playlist, a selectable option 828*b* to play the playlist in the predetermined order in which content items are arranged in the playlist, representations 822 of the content items in the playlist, and navigation options 814*a-c* (previously described). The representations 822 of the content items each include options 824 to select and drag content items in the playlist to re-arrange the predetermined order of content items in the playlist.

Returning to the representations of content items in the playback sequence, in FIG. 8G, the user scrolls (e.g., with contact 803) the representations 822 to view additional representations 822 of content items in the playback sequence.

As shown in FIG. 8H, in response to the user's scrolling, the electronic device 500*a* reveals additional representations 822 of content items in the sequence and ceases displaying the playback controls. The user selects (e.g., with contact 803) one of the representations 822 (e.g., "Classic Hit").

In response to the user's selection in FIG. 8H, as shown in FIG. 8I, the electronic device 500*a* begins playing the selected content item and advances the sequence of content items to the content items immediately following the selected content item in the sequence. The user scrolls (e.g., with contact 803) up in the sequence of content items to reveal representations of previously-played content items, as shown in FIG. 8J.

In FIG. 8J, the electronic device 500*a* presents representations 822 of content items the user account of the electronic device 500*a* previously played. The representations 822 are presented beneath a History header 832 that includes a selectable option 834 to clear the content consumption history. Optionally, the representations 822 of content items in the playback history 832 are from the same playlist that is currently playing and were all played on the electronic device 500*a*.

FIG. 8K illustrates another way the electronic device 500*a* is able to present representations 822 of content items the user account of the electronic device 500*a* previously played. The representations 822 of previously-played content items include a representation 822*a* of a content item that was played from a different playlist as the playlist that is currently playing amongst representations 822 of previously played content items from the playlist that is currently playing.

FIG. 8L illustrates another way the electronic device 500*a* is able to present representations 822 of content items the user account of the electronic device 500*a* previously played. The representations 822 of previously-played content items include a representation 822*b* of a content item that was played on a different electronic device associated with the same user account as electronic device 500*a* amongst representations 822 of content items previously played on the current electronic device 500*a*. As shown in FIG. 8L, the user selects (e.g., with contact 803) the option 820*a* to change the playback sequence to play in a shuffled order.

As shown in FIG. 8M, in response to the user's selection in FIG. 8L, the electronic device 500*a* transitions from playing the content items in a predetermined order of the playlist to playing the content items in a shuffled order. The shuffle option 820*a* is presented with an activated appearance and the navigation button 814*c* associated with the playback sequence user interface includes a shuffle indication 836. As shown in FIG. 8M, the user selects (e.g., with contact 803) the album artwork 802 of the content item to navigate back to the content playback user interface.

FIG. 8N illustrates the content playback user interface. Because the electronic device 500*a* is playing the content items in the shuffled order, the playback sequence user interface option 814*c* is presented with the shuffle indication 836.

In FIG. 8O, the electronic device 500*a* finishes playing the content item and plays the next content item in the shuffled sequence. Before playing the next content item, the content item buffers on the electronic device 500*a*. While the content item is buffering, the electronic device 500*a* presents the scrubber bar 806 with an indication 842 that the content item is buffering. Although FIG. 8O illustrates one way of presenting a buffering indication 842, in some embodiments, other indications are possible.

In FIG. 8P, the electronic device 500*a* finishes buffering the content item and updates the content item playback user interface. The updated user interface includes an updated scrubber bar 806 that includes an indication of the elapsed time in the content item and an indication of the remaining time in the content item. Because the duration of the content item exceeds a threshold (e.g., 10, 15, 20 minutes), the electronic device 500*a* presents a selectable option 808*d* to skip back within the content item by 15 seconds and a selectable option 808*e* to skip ahead within the content item by 30 seconds in place of the options 808*a* and 808*c* to skip to the previous and next content items in the sequence, respectively. As shown in FIG. 8P, the user selects (e.g., with contact 803) the option 814*c* to navigate to the playback sequence user interface, as shown in FIG. 8Q.

In FIG. 8Q, the electronic device presents the playback sequence user interface. The option 820*a* to play the content items in a shuffled order has an active appearance and the playback sequence navigation option 814*c* includes the shuffle indication 836. As shown in FIG. 8Q, the user selects (e.g., with contact 803) the shuffle option 820*a*. In response to the user's selection, the electronic device 500*a* deactivates the shuffle mode and changes the order of the content items in the playback sequence from the shuffled order to the predetermined order, as shown in FIG. 8R.

In FIG. 8R, the electronic device 500*a* presents the representations 822 of the content items in the playback sequence in the predetermined order instead of the shuffled order. The electronic device 500*a* presents the shuffle option 820*a* with a deactivated appearance and no longer displays the indication of the shuffle mode on the playback sequence user interface navigation option 814*c* The user selects (e.g., with contact 803) the option 820*b* to play the content items in a repeat playback mode.

As shown in FIG. 8S, in response to the user's selection in FIG. 8R, the electronic device 500*a* presents the repeat option 820*b* with an activated appearance and displays the playback sequence navigation option 814*c* with an indication 838 of the repeated playback mode. In the repeated playback mode, after playing the content items in the collection, the electronic device 500*a* plays the collection of content items again.

In FIG. 8T, the user selects (e.g., with contact 803) the repeat option 820*b* again. In response to the user's selection, the electronic device toggles the repeat mode from repeat all to repeat one. In the repeat one mode, the electronic device 500*a* plays the same content item on repeat. Once the electronic device 500*a* finishes playing the content item, it plays the same content item again. As shown in FIG. 8U, in response to the user's selection in FIG. 8T, the electronic device 500*a* updates the repeat option 820*b* to include an indication that the repeat mode is repeat one. In some embodiments, indication 838 on option 814*c* is also updated to indicate the repeat one mode.

In FIG. 8V, the user selects (e.g., with contact 803) the repeat option 820*b* again. As shown in FIG. 8W, in response to the user's selection, the electronic device 500*a* presents the repeat option 820*b* without the activated appearance and presents the playback sequence navigation option 814*c* without the indication of the repeat mode. The user selects (e.g., with contact 803) the repeat option 820*b*. As shown in FIG. 8X, in response to the user's selection, the electronic device 500*a* presents the repeat option 820*b* with the activated appearance and the playback sequence navigation option 814*c* with the repeat indication 838. The user selects (e.g., with contact 803) the playback sequence navigation option 814*c*.

As shown in FIG. 8Y, in response to the user's selection in FIG. 8X, the electronic device 500*a* presents the playback user interface. The playback sequence navigation option 814*c* is displayed with an indication 838 of the repeat mode because the electronic device is playing the collection of content items in the repeat mode.

FIGS. 9A-9G are flow diagrams illustrating a method of presenting representations of content items in a playback sequence in accordance with some embodiments. The method 900 is optionally performed at an electronic device such as device 100, device 300, device 500, device 501, device 510, and device 591 as described above with reference to FIGS. 1A-1B, 2-3, 4A-4B and 5A-5J. Some operations in method 900 are, optionally combined and/or order of some operations is, optionally, changed.

As described below, the method 900 provides ways to present representations of content items in a playback sequence. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 8A, an electronic device in communication with a display device and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), while a first content item is designated for playback, wherein the first content item is included in a sequence of a plurality of content items for playback, displays (902), via the display device, a content item playback user interface that includes one or more playback controls 808 to control playback of the first content item and a respective selectable option 814*c* that is selectable to display remaining content items in the sequence of the plurality of content items (e.g., the electronic device is currently playing the first content item). In some embodiments, the electronic device is configured to play the remaining items in the sequence of the content items for playback in a predetermined order after playing the first content item. The remaining items in the sequence are optionally selected by the user (e.g., by adding each item or a collection of items to a queue of items that will play next) or are part of a collection of content items (e.g., a playlist, an album, or the user's library) that the user is currently playing. In some embodiments, the content item playback user interface includes text and/or an image identifying the first content item (e.g., the name of the content item and an image associated with the content item, such as album artwork), a plurality of selectable options that, when selected, modify playback of the item (e.g., volume controls, skip forward, skip backwards, play/pause), and one or more selectable options that, when selected, cause the electronic device to present a different user interface related to playback of the item. For example, the content item playback user interface includes the respective selectable option that is selectable to display the remaining content items in the sequence of content items and another selectable option that, when selected, causes the electronic device to present the lyrics of the first content item in accordance with one or more steps of method 700. In some embodiments, in response to detecting selection of the respective selectable option, the electronic device presents a plurality of representations of the remaining content items in the sequence of the plurality of content items. Each respective representation of a respective remaining content item in the sequence of the plurality of content items optionally includes text (e.g., the content item title, artist, and album that includes the respective content item) and an image associated with the respective content item (e.g., album artwork) that identify the respective content item. In some embodiments, the remaining content items in the sequence of the plurality of content items are listed in the order in which the electronic device is configured to play the remaining content items. In some embodiments, the content item playback user interface is presented in a sheet overlaid on another user interface of the music application. When the electronic device displays the user interface that includes the remaining content items in the sequence of the plurality of content items, the electronic device optionally replaces the content item playback user interface with the user interface that includes the remaining content items on the same sheet overlaid on the other user interface of the music application.

In some embodiments, such as in FIG. 8L, while displaying the content item playback user interface, the electronic device 500*a* receives (904), via the one or more input devices, a sequence of one or more inputs including an input corresponding to a request to play through the sequence of the plurality of content items according to a first playback arrangement (e.g., shuffle, repeat all items in a collection that is currently playing, repeat one item). In some embodiments, the sequence of one or more inputs includes an input selecting the respective selectable option, then selecting a selectable option included in the user interfaced that includes the remaining content items in the sequence of content items. For example, while displaying the content item playback user interface, the electronic device detects selection of the respective selectable option. In the example, in response to detecting selection of the respective selectable option, the electronic device presents a user interfaced that includes the indications of the remaining content items in the sequence of the plurality of content items, a shuffle option that, when selected, causes the electronic device to toggle the shuffle playback mode, and a repeat option that, when selected, causes the electronic device to toggle the repeat all, repeat one, and non-repeat playback modes. In some embodiments, after detecting selection of one of the options to request the first playback arrangement, the electronic device detects selection of a content playback user interface selectable option (e.g., a "done" button) and, in response to detecting selection of the content playback user interface selectable option, the electronic device presents the content playback user interface. In some embodiments, the electronic device is able to play a collection of content items (e.g., a playlist, album, or library) in a predetermined order in which the content items are arranged in the collection. In some embodiments, the user is able to edit the predetermined order of the content items in a playlist or library. Optionally, when the electronic device is configured to play the content items in the shuffle mode, the electronic device plays the content items in an order that is different from the predetermined order in which the content items are arranged in the collection. In some embodiments, when the electronic device is in the repeat all mode but not the shuffle mode, the electronic device plays through the collection in the predetermined order and, when the electronic device plays the last content item in the collection, plays the collection again in the predetermined order from the beginning. Optionally, when both the shuffle mode and the repeat all mode are on, the electronic device plays the collection of content items in an order different from the predetermined order, repeating the collection or one or more items in the collection. In some embodiments, when the repeat one mode is on, the electronic device repeats playback of one item of content.

In some embodiments, such as in FIG. 8M, in response to receiving the sequence of one or more inputs, the electronic device displays (906) the content item playback user interface including the respective selectable option 814*c*, wherein the respective selectable option includes a visual indication (e.g., shuffle indication 836) of the first playback arrangement (e.g., a badge indicating shuffle, repeat one, or repeat all). In some embodiments, if the electronic device is configured to play the items of content in a non-shuffled order without repeating one or more items of content, the respective selectable option does not include a visual indication of a playback arrangement. The above-described manner of presenting the respective selectable option with the visual indication of the first playback arrangement allows the electronic device to indicate to the user that the sequence of the plurality of content items presented in response to selection of the respective selectable option is arranged according to the first playback arrangement, which simplifies the interaction between the user and the electronic device and enhances the operability of the electronic device and makes the user-device interface more efficient (e.g., by enabling the user to view the indication of the first playback arrangement without selecting the respective selectable option), which additionally reduces power usage and improves battery life of the electronic device by enabling the user to use the electronic device more quickly and efficiency.

In some embodiments, such as in FIG. 8C, while displaying the content item playback user interface, the electronic device receives (908), via the one or more input devices, an input selecting the respective selectable option 814*c* that is selectable to display the remaining content items in the sequence of the plurality of content items. In some embodiments, the content item playback user interface includes one or more selectable options that, when selected, control the playback of a content item that is playing on the electronic device. For example, the content playback user interface includes options to play/pause the content, skip ahead or back to a different item of content, and to change the playback volume. In some embodiments, the content item playback user interface includes a selectable option that, when selected, causes the electronic device to present the representations of the content items in the sequence of the plurality of content items. In some embodiments, such as in FIG. 8D, in response to receiving the input selecting the respective selectable option, the electronic device updates (910) the content item playback user interface to remove the one or more playback controls to control playback of the first content item, and to include representations 822 of the content items in the sequence of the plurality of the content items. In some embodiments, the electronic device ceases displaying the content item playback user interface and displays the content items in the sequence instead. The user interface with the content item sequence optionally also includes a selectable option that, when selected, causes the electronic device to display the content item playback user interface. For example, the respective selectable option is a toggle that has an on state while the electronic device is displaying the sequence of content items and an off state while the electronic device displays a user interface other than the sequence of content items, such as the content item playback user interface or a time-synced lyrics user interface according to one or more steps of method 700. The above-described manner of displaying the sequence of content items and ceasing display of the content item playback user interface in response to detecting selection of the respective selectable option in the content item playback user interface allows the electronic device to use more display area to display the sequence of content items which simplifies the interaction between the user and the electronic device and enhances the operability of the electronic device and makes the user-device interface more efficient (e.g., by reducing the number of inputs (e.g., scrolling inputs) needed to view the sequence of content items), which additionally reduces power usage and improves battery life of the electronic device by enabling the user to use the electronic device more quickly and efficiently.

In some embodiments, such as in FIG. 8C, while displaying the content item playback user interface, the electronic device receives (912), via the one or more input devices, an input selecting the respective selectable option 814*c* that is selectable to display the remaining content items in the sequence of the plurality of content items. In some embodiments, the content item playback user interface includes one or more selectable options that, when selected, control the playback of a content item that is playing on the electronic device. For example, the content playback user interface includes options to play/pause the content, skip ahead or back to a different item of content, and to change the playback volume. In some embodiments, the content item playback user interface includes a selectable option that, when selected, causes the electronic device to present the representations of the content items in the sequence of the plurality of content items. In some embodiments, such as in FIG. 8D, in response to receiving the input selecting the respective selectable option, the electronic device updates (914) the content item playback user interface to include one or more selectable options 820*a* and 820*b* for modifying the playback arrangement through the sequence of the plurality of content items. In some embodiments, the one or more selectable options for modifying the playback arrangement through the sequence of content items include an option to toggle a shuffle mode and an option to toggle a repeat mode of the electronic device. Optionally, the one or more selectable options for modifying the playback arrangement through the sequence of content items are displayed concurrently with the sequence of content items. The above-described manner of displaying the one or more selectable options and ceasing to display the playback user interface in response to detecting selection of the respective selectable option allows the electronic device to forgo displaying the one or more selectable options in the content item playback user interface and therefore conserve display area for other playback controls and information about a content item playing on the electronic device in the content item playback user interface, which simplifies the interaction between the user and the electronic device and enhances the operability of the electronic device and makes the user-device interface more efficient (e.g., by reducing the number of inputs (e.g., scrolling inputs) needed to view the playback control options and information about the content item playing on the electronic device in the content item playback user interface), which additionally reduces power usage and improves battery life of the electronic device by enabling the user to use the electronic device more quickly and efficiently.

In some embodiments, such as in FIG. 8D, the updated playback user interface includes (916) information 804 about the first content item that is designated for playback (918) (e.g., album artwork, artist, title, etc. In some embodiments, the information about the first content item is displayed in a first region of the user interface, such as at the top of the user interface), the representations 822 of the content items in the sequence of the plurality of the content items (920) (e.g., album artwork, title, and artist for each content item in the sequence. In some embodiments, the representations of the content items in the sequence are displayed in a second region of the user interface, such as below the first region of the user interface and above a third region of the user interface, and are selectable to initiate playback of the content items), and one or more second playback controls 808 for controlling playback of the first content item (922). In some embodiments, the electronic device initially displays the playback controls in the user interface that includes the representations of the content items in the sequence and ceases displaying the controls in response to an input to cease displaying the controls or after a predetermined period of time (e.g., 2, 5, 10 seconds). The second playback controls are optionally displayed in the third region of the user interface, such as at the bottom of the user interface. The above-described manner of concurrently displaying the information about the first content item, the representations of the content items in the sequence, and the one or more second playback controls allows the electronic device to provide the user with the ability to view the information, the sequence, and the playback controls simultaneously, which simplifies the interaction between the user and the electronic device and enhances the operability of the electronic device and makes the user-device interface more efficient (e.g., by reducing the number of inputs needed to control playback of the content item while viewing the information about the first content item and the representations of the content items in the sequence), which additionally reduces power usage and improves battery life of the electronic device by enabling the user to use the electronic device more quickly and efficiently.

In some embodiments, such as in FIG. 8G, while displaying the information 804 about the first content item that is designated for playback, the representations 822 of the content items in the sequence of the plurality of the content items, and the one or more second playback controls 808 for controlling playback of the first content item in the updated playback user interface, the electronic device receives (924), via the one or more input devices, an input corresponding to a request to scroll through the representations 822 of the content items in the sequence of the plurality of the content items in a first direction (e.g., up or down. In some embodiments, the electronic device scrolls the representations of the content items in the sequence in accordance with the user input to scroll the user interface). In some embodiments, such as in FIG. 8H, in response to receiving the input corresponding to the request to scroll through the representations 822 of the content items in the sequence of the plurality of the content items (926), the electronic device ceases (928) display, in the updated playback user interface, of the one or more second playback controls for controlling playback of the first content item (e.g., in some embodiments, the electronic device replaces the one or more second playback controls with additional representations of items of content in the sequence of the items of content in response to the input corresponding to the request to scroll through the representations), and the electronic device scrolls (930) through the representations 822 of the content items in the sequence of the plurality of the content items in the first direction. Optionally, the electronic device ceases displaying the one or more second controls in response to an input to scroll down but does not cease displaying the one or more second controls in response to an input to scroll up, or vice-versa. The above-described manner of ceasing the display of the one or more second playback controls in response to the input to scroll the representations of content items in the sequence allows the electronic device to present additional representations of content items while the user is scrolling the representations of content items, which simplifies the interaction between the user and the electronic device and enhances the operability of the electronic device and makes the user-device interface more efficient (e.g., by reducing the number of scrolling inputs needed to view a respective portion of the representations of content items in the sequence), which additionally reduces power usage and improves battery life of the electronic device by enabling the user to use the electronic device more quickly and efficiently.

In some embodiments, such as in FIG. 8I, after scrolling through the representations 822 of the content items in the sequence of the plurality of the content items in the first direction and while the one or more second playback controls for controlling playback of the first content item are not displayed in the updated playback user interface, the electronic device receives (932), via the one or more input devices, an input corresponding to a request to scroll through the representations 822 of the content items in the sequence of the plurality of the content items in a second direction, different than the first direction (e.g., in some embodiments, in response to detecting an input to scroll down, the electronic device ceases displaying the one more second controls. Optionally, after ceasing to display the one or more second controls, the electronic device detects an input to scroll up). In some embodiments, in response to receiving the input corresponding to the request to scroll through the representations 822 of the content items in the sequence of the plurality of the content items in the second direction (934), the electronic device redisplays (936), in the updated playback user interface, the one or more second playback controls 808 for controlling playback of the first content item (e.g., optionally, the electronic device ceases display of a plurality of representations to display the one or more second playback controls), and the electronic device scrolls (938) through the representations 822 of the content items in the sequence of the plurality of the content items in the second direction. In some embodiments, the electronic device scrolls the remaining representations of content items in accordance with the scrolling input. The above-described manner of redisplaying the one or more second controls in the user interface that includes the representations of the content items in the sequence allows the electronic device to provide the one or more second playback controls to the user in a quick and efficient manner without requiring further input while the user continues to view the representations of the content items in the sequence, which simplifies the interaction between the user and the electronic device and enhances the operability of the electronic device and makes the user-device interface more efficient (e.g., by reducing the number of inputs needed to browse the representations of content items in the queue and interact with the one or more second playback controls), which additionally reduces power usage and improves battery life of the electronic device by enabling the user to use the electronic device more quickly and efficiently.

In some embodiments, such as in FIG. 8A, displaying the content item playback user interface includes initially displaying, in the content item playback user interface, a scrubber bar 806 that is displayed with one or more visual indications of an elapsed time into the first content item and a remaining time in the first content item (940). In some embodiments, the scrubber bar includes an indication of the elapsed playback time in the item of content and an indication of the time remaining within the playback content that update as the electronic device plays the content. Optionally, the scrubber bar includes an indication of the playback position of the content item that moves as the content item continues to play. In some embodiments, the indication of the playback position is selectable to be moved to a different playback position to causes the electronic device to resume playback of the content item from the different playback position indicated by the indication of the playback position. In some embodiments, such as in FIG. 8A, while displaying the scrubber bar 806 with the one or more visual indications of an elapsed time into the first content item and the remaining time in the first content item, the electronic device receives (942), via the one or more input devices, an input selecting a play control 808*b* in the one or more playback controls in the content item playback user interface (e.g., while the content item is paused, the electronic device displays the scrubber bar as described above and the option to play the content). In some embodiments, such as in FIG. 8B, in response to receiving the input selecting the play control in the one or more playback controls in the content item playback user interface (944), the electronic device initiates (946) playback of the first content item (e.g., in some embodiments, the electronic device initiates playback of the first content item from a playback position indicated by the scrubber bar), and the electronic device displays (948), in the content item playback user interface, the scrubber bar 806 without displaying the one or more visual indications of the elapsed time into the first content item and the remaining time in the first content item. Optionally, the electronic device displays the scrubber bar with the indication of the current playback position that does not include numbers indicating the elapsed or remaining playback time. In some embodiments, the electronic device ceases displaying the indications of the elapsed and remaining time a threshold time (e.g., 1, 3, 5 seconds) after detecting selection of the option to play the content. The above-described manner of ceasing to display the indications of the elapsed time and the remaining time in response to the input to play the content allows the electronic device to conserve display area for information about the item of content, such as title, artistic, album, etc., which simplifies the interaction between the user and the electronic device and enhances the operability of the electronic device and makes the user-device interface more efficient (e.g., by reducing the amount of time it takes the user to read the information on the user interface), which additionally reduces power usage and improves battery life of the electronic device by enabling the user to use the electronic device more quickly and efficiently.

In some embodiments, such as in FIG. 8P, in accordance with a determination that the first content item has buffered on the electronic device, the scrubber bar 806 is displayed with the one or more visual indications of an elapsed time into the first content item and the remaining time in the first content item (950) (e.g., in some embodiments, if the content item is done buffering and has loaded onto the electronic device, the scrubber bar includes the indications of elapsed and remaining time). In some embodiments, such as in FIG. 8O, in accordance with a determination that the first content item is buffering on the electronic device, the scrubber bar 806 is displayed with one or more visual indications 842 that the first content item is buffering without displaying the one or more visual indications of an elapsed time into the first content item and the remaining time in the first content item (952). In some embodiments, while the content item is still buffering, loading, downloading, etc. onto the electronic device, the scrubber bar includes a visual indication of the buffering. Optionally, the visual indication of the buffering is animated. The above-described manner of presenting the indication of buffering on the scrubber allows the electronic device to indicate to the user that the content item is buffering which simplifies the interaction between the user and the electronic device and enhances the operability of the electronic device and makes the user-device interface more efficient (e.g., by presenting the buffering indication automatically, without a user input requesting display of the buffering indication, and avoiding user input that would otherwise not perform any function), which additionally reduces power usage and improves battery life of the electronic device by enabling the user to use the electronic device more quickly and efficiently.

In some embodiments, such as in FIG. 8I, while displaying, in the content item playback user interface, representations 822 of content items in the sequence of the plurality of the content items, the electronic device receives (954), via the one or more input devices, an input corresponding to a request to scroll through the representations 822 of the content items in the sequence of the plurality of the content items (e.g., in some embodiments, the request to scroll through the representations is a request to scroll up above a representation of a content item that will play immediately after the content item that is currently playing). In some embodiments, such as in FIG. 8J, in response to receiving the input corresponding to the request to scroll through the representations of the content items in the sequence of the plurality of the content items, the electronic device reveals (956), in the content item playback user interface, representations 822 of previously-played content items. In some embodiments, the representations of previously-played content items are displayed above the sequence of content items that will play next. The above-described manner of displaying representations of previously-played content items allows the electronic device to provide the user with the ability to interact with items of content that were previously played, such as saving the content items to a library or playlist or playing the content items again, which simplifies the interaction between the user and the electronic device and enhances the operability of the electronic device and makes the user-device interface more efficient (e.g., by reducing the number of inputs needed to locate an item of content that previously played), which additionally reduces power usage and improves battery life of the electronic device by enabling the user to use the electronic device more quickly and efficiently.

In some embodiments, such as in FIG. 8J, the previously played content items are content items included in the sequence of the plurality of content items (958). In some embodiments, the electronic device displays previously played content items that belong to the same collection (e.g., album, playlist, radio station) as the content items that will play next and the content item that is currently playing without including one or more content items that previously played from a different collection of content items. The above-described manner of displaying previously-played content items included in the sequence of the plurality of content items allows the electronic device to filter the previously-played content items to display previously-played content items from the currently-playing collection, which simplifies the interaction between the user and the electronic device and enhances the operability of the electronic device and makes the user-device interface more efficient (e.g., by reducing the number of inputs needed to locate representations of previously-played content items from the currently-playing collection of content items), which additionally reduces power usage and improves battery life of the electronic device by enabling the user to use the electronic device more quickly and efficiently.

In some embodiments, such as in FIG. 8L, the previously played content items are content items played across a plurality of devices, including the electronic device (960). In some embodiments, the plurality of devices are associated with one user account and the previously-played content items include content items that were previously played using the user account. Optionally, the previously-played content items include content items from the same collection (e.g., playlist, album, radio station, etc.) of content items that is currently playing and from different collections of content items. The above-described manner of displaying previously played content items across the plurality of devices allows the electronic device to display representations of content items the user recently heard on other electronic devices, which simplifies the interaction between the user and the electronic device and enhances the operability of the electronic device and makes the user-device interface more efficient (e.g., by making it easier for the user to locate representations of content items that were played on other electronic devices), which additionally reduces power usage and improves battery life of the electronic device by enabling the user to use the electronic device more quickly and efficiently.

In some embodiments, such as in FIG. 8K, the previously played content items include content items that were played from a plurality of sources (962). In some embodiments, the sources include a streaming music library, a radio station, local audio files associated with a user account of the electronic device or stored on the electronic device. Optionally, the sources include a plurality of collections (e.g., playlists, albums, radio stations) of content items. The above-described manner of displaying previously played content items from a plurality of sources allows the electronic device to display the content items from the plurality of sources in one user interface, which simplifies the interaction between the user and the electronic device and enhances the operability of the electronic device and makes the user-device interface more efficient (e.g., by reducing the time it takes the user to locate previously-played content items from a plurality of sources), which additionally reduces power usage and improves battery life of the electronic device by enabling the user to use the electronic device more quickly and efficiently.

In some embodiments, such as in FIG. 8K, the previously played content items include content items of a first type and content items of a second type (964). In some embodiments, the content types include music, spoken word audio files, music videos, and other audio and video content. The above-described manner of displaying previously played content items of different types allows the electronic device to display the representations of content items of different types in one user interface, which simplifies the interaction between the user and the electronic device and enhances the operability of the electronic device and makes the user-device interface more efficient (e.g., by reducing the number of inputs needed to locate representations of content items of different types), which additionally reduces power usage and improves battery life of the electronic device by enabling the user to use the electronic device more quickly and efficiently.

In some embodiments, such as in FIG. 8K, displaying, in the content item playback user interface, representations 822 of content items in the sequence of the plurality of the content items includes displaying a representation of the first content item that is currently designated for playback with information 826 about a source from which the first content item is playing (966). In some embodiments, the content item is playing from a collection of content, such as a library, album, playlist, or radio station. Optionally, the electronic device displays an indication of the source of the content in the user interface that includes the representations of the content items in the sequence of content items. The above-described manner of displaying the indication of the source of the first content item that is designated for playback allows the electronic device to inform the user the source of the content items, which simplifies the interaction between the user and the electronic device and enhances the operability of the electronic device and makes the user-device interface more efficient (e.g., by reducing the number of inputs needed to identify the source of the content item that is playing or the source of the sequence of content items), which additionally reduces power usage and improves battery life of the electronic device by enabling the user to use the electronic device more quickly and efficiently.

In some embodiments, such as in FIG. 8E, in accordance with a determination that the source of the first content item is a source made up of a defined set of content items (e.g., a library, playlist, or album), the information about the source from which the first content item is playing includes a selectable option 826 that is selectable to display a contents of the source (968), such as in FIG. 8F. In some embodiments, in response to detecting selection of the selectable option, the electronic device displays representations of all (or a plurality) of the content items in the source. Optionally, the name of the source is the selectable option. In some embodiments, it is possible for the user to edit the content items in a library or playlist and the electronic device will continue playing content items from the edited library or playlist. In some embodiments, such as in FIG. 8D, in accordance with a determination that the source of the first content item is not a source made up of a defined set of content items (e.g., a radio station), the information 826 about the source from which the first content item is playing does not include a selectable option that is selectable to display a contents of the source (970). In some embodiments, the name of the source is not selectable if the source is not made up of a defined set of content items. Optionally, a radio station includes a series of content items that are selected during playback, as opposed to a playlist, library, or album that includes a predetermined plurality of content items before playback. The above-described manner of displaying a selectable option to view the contents of a source with a defined set of content items allows the electronic device to quickly and efficiently present the contents of the source in response to a user input received while displaying the representations of the sequence of content items, which simplifies the interaction between the user and the electronic device and enhances the operability of the electronic device and makes the user-device interface more efficient (e.g., by reducing the number of inputs needed to view the contents of the source), which additionally reduces power usage and improves battery life of the electronic device by enabling the user to use the electronic device more quickly and efficiently.

In some embodiments, such as in FIG. 8H, displaying, in the content item playback user interface, representations 822 of content items in the sequence of the plurality of the content items includes displaying one or more representations of one or more content items that are next in the sequence of the plurality of content items for playback (972) (e.g., in some embodiments, the electronic device displays representations of items of content that will play after the currently-playing item of content). In some embodiments, in accordance with a determination that a source of the first content item is a source made up of a defined set of content items (e.g., a library, playlist, or album), the one or more representations 822 of the one or more content items that are next in the sequence of the plurality of content items are selectable to play the respective content items at the electronic device (974). For example, in response to detecting selection of one of the representations, the electronic device plays the selected content item. Optionally, the representations of content items are selectable to drag into a different playback order. In some embodiments, the user is able to edit the defined set of content items in a library or playlist and, after editing the content items in the library or playlist, the electronic device plays content items from the edited library or playlist.

In some embodiments, such as in FIG. 8D, in accordance with a determination that the source of the first content item is not a source made up of a defined set of content items (e.g., a radio station or other streaming collection the user is not able to edit or control), the one or more representations 822 of the one or more content items that are next in the sequence of the plurality of content items are not selectable to play the respective content items at the electronic device (976). Optionally, the representations of the content items are not selectable or rearrangeable because the content items in the collection are not predetermined (and/or are not yet available for consumption, as they are streamed in a particular order and at particular times (e.g., sequential) from their source, such as a radio station) and, in some embodiments, are selected as the collection continues to play. The above-described manner of presenting selectable representations of content items that are from a source with a defined set of content items allows the electronic device to enable the user to select a content item to play while displaying the representations of the content items in the sequence of content items, which simplifies the interaction between the user and the electronic device and enhances the operability of the electronic device and makes the user-device interface more efficient (e.g., by reducing the number of inputs needed to find and select a content item to play), which additionally reduces power usage and improves battery life of the electronic device by enabling the user to use the electronic device more quickly and efficiently.

In some embodiments, such as in FIG. 8P, in accordance with a determination that a length of the first content item is greater than a length threshold (e.g., 5 minutes, 10 minutes, 15 minutes), the one or more playback controls to control playback of the first content item includes one or more controls 808*d* and 808*e* for skipping through the first content item by predetermined amounts (978) (e.g., a skip ahead option and a skip back option that skip through the content by a predetermined amount of time (e.g., 15, 30, 60 seconds) in response to detecting selection of the respective option), and in accordance with a determination that the length of the first content item is less than the length threshold (e.g., 5 minutes, 10 minutes, 15 minutes), such as in FIG. 8N, the one or more playback controls 808 to control playback of the first content item do not include the one or more controls for skipping through the first content item by the predetermined amounts (980). In some embodiments, instead of including controls for skipping through the first content item by the predetermined amounts, the electronic device displays options to play the next or previous content item in the sequence of content items. The above-described manner of displaying the options to skip through the content by predetermined amounts of time when the length of the content exceeds a threshold allows the electronic device to reduce the number of inputs needed to skip through long segments of a content item that has a length that exceeds the time threshold, which simplifies the interaction between the user and the electronic device and enhances the operability of the electronic device and makes the user-device interface more efficient (e.g., by reducing the number of inputs needed to skip within long content items), which additionally reduces power usage and improves battery life of the electronic device by enabling the user to use the electronic device more quickly and efficiently.

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1100) are also applicable in an analogous manner to method 900 described above with respect to FIGS. 9A-9G. For example, the operation of the electronic device to display representations of content items in a playback sequence described above with reference to method 900 optionally has one or more of the characteristics of the presentation of time-synced lyrics and ways of sharing content items with user accounts of other electronic devices, etc., described herein with reference to other methods described herein (e.g., methods 700 and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 9A-9G are, optionally, implemented by components depicted in FIGS. 1A-1B. For example, displaying operations 902, 906, and 940, receiving operations 904, 912, and 924, and initiating operation 946, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Sharing Items of Content with a User Account of Another Electronic Device

Users interact with electronic devices in many different manners. In some embodiments, users play items of content on an electronic device. In some embodiments, the user shares an item of content with a user account of a different electronic device. The embodiments described below provide ways in which an electronic device shares an item of content with the user account of a different electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
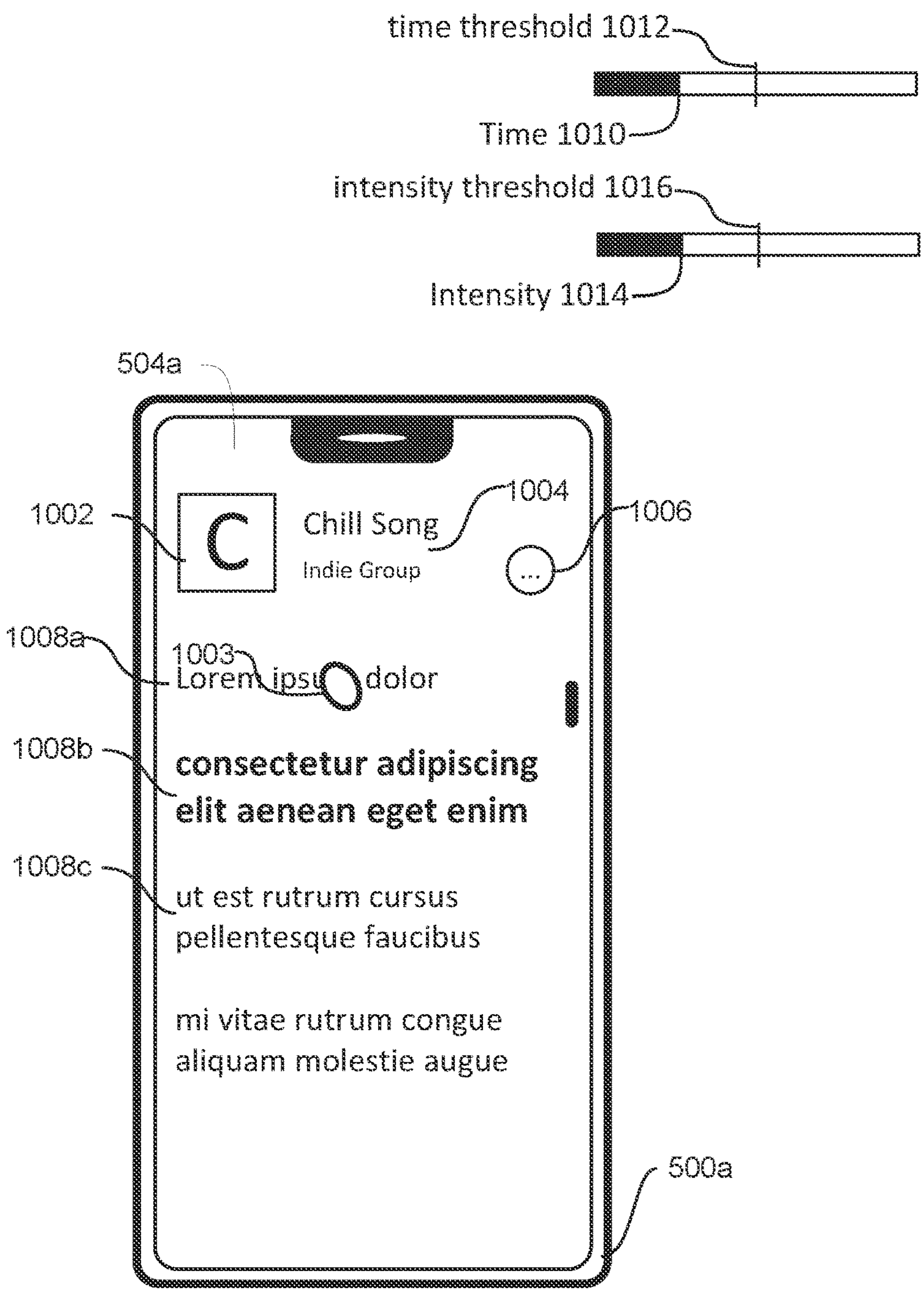
FIGS. 10A-10R illustrate exemplary ways in which an electronic device shares a content item with the user account of another electronic device in accordance with some embodiments.

In FIG. 10A, an electronic device 500*a* presents time-synced lyrics 1008 in accordance with one or more steps of method 700, described above with reference to FIGS. 6A-7K. The time-synced lyrics user interface includes album artwork 1002 and the title and artist 1004 of an item of content that is currently playing on the electronic device 500*a*, the menu option 1006, time-synced lyrics 1008*a* corresponding to a previously-played portion of the content item, time-synced lyrics 1008*b* corresponding to the currently-playing portion of the content item, and time-synced lyrics 1008*c* corresponding to a portion of the content item that will play next. The user selects (e.g., with contact 1003) a portion 1008*a* of the lyrics. Initially, the contact 1003 has an intensity 1014 less than an intensity threshold 1016 and/or a contact time for a time 1010 that is less than a time threshold 1012 (e.g., 0.05, 1, 2, etc. seconds).

Figure 10B:
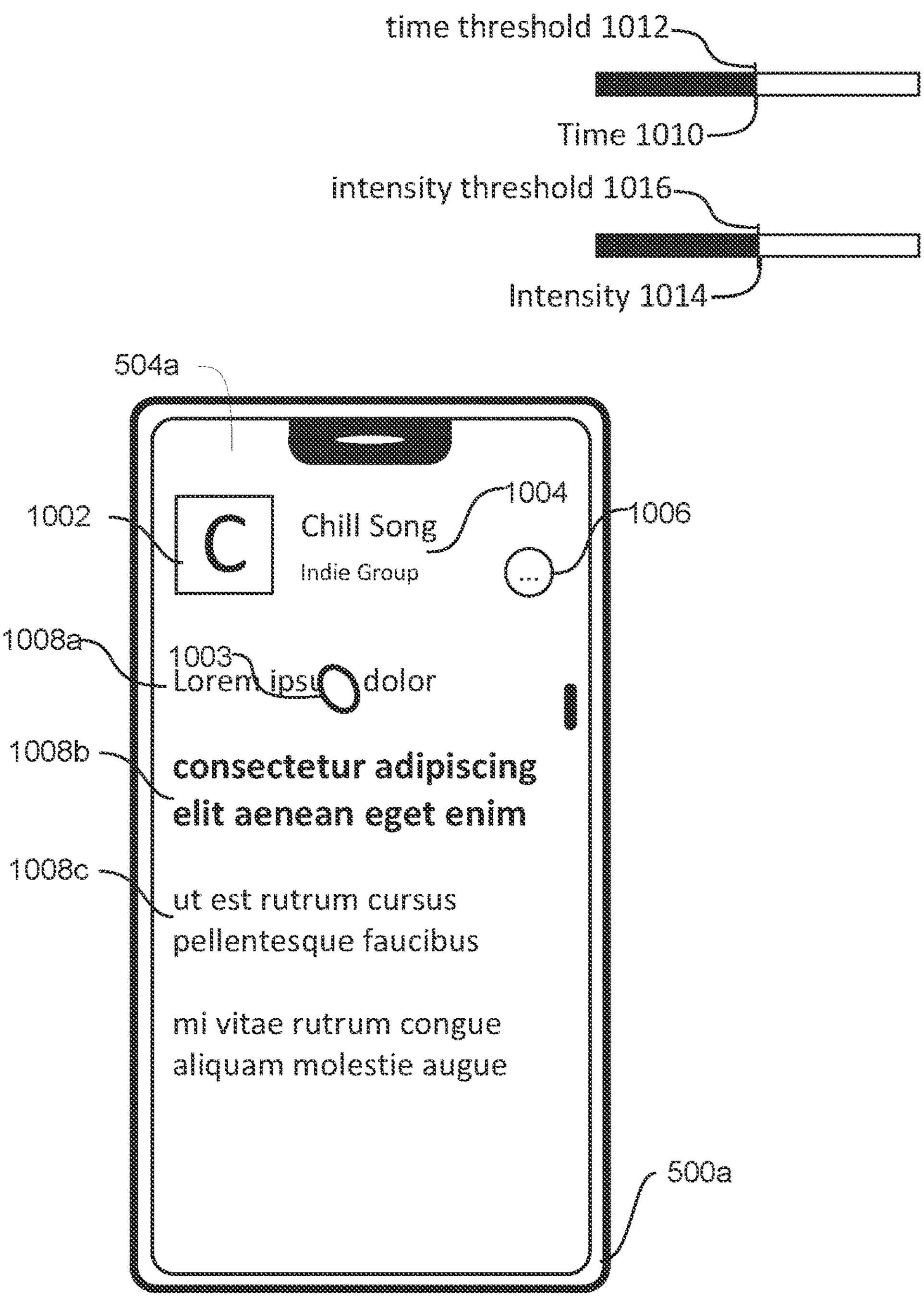
Figure 10C:
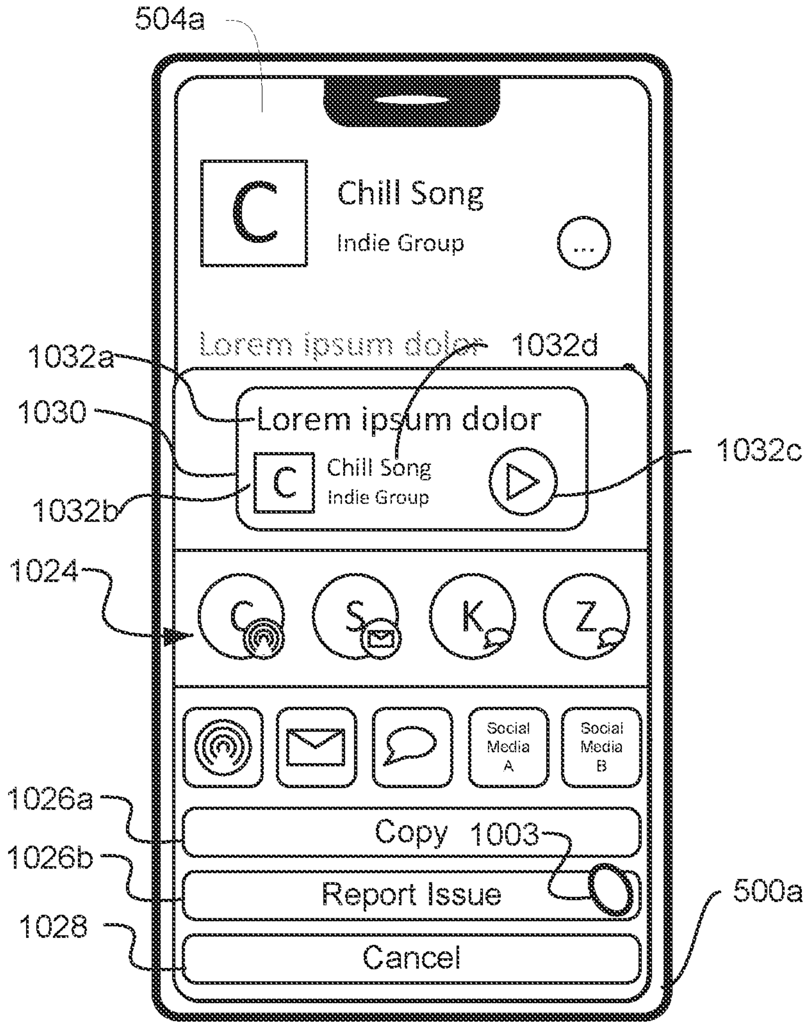

In FIG. 10B, the user continues to hold contact 1003 in place and the time 1010 reaches the time threshold 1012 and/or the intensity 1014 reaches the intensity threshold 1016 (e.g., either time or intensity is optionally sufficient to trigger the resulting behavior of FIG. 10C). As shown in FIG. 10C, in response to the time 1010 and/or intensity 1014 of the contact 1003, the electronic device 500 displays an action user interface including a plurality of selectable sharing options 1024 and a plurality of options 1026*a-b* associated with other actions related to the selected portion of the lyrics.

As shown in FIG. 10C, the action user interface includes a representation 1030 of the content item, a plurality of selectable sharing options 1024, a selectable option 1026*a* to copy to selected portion of the lyrics, a selectable option 1026*b* to report an issue with the selected portion of the lyrics or the lyrics as a whole, and a selected option 1028 to dismiss the action user interface. The representation 1030 includes an indication 1032*a* of the selected portion of lyrics, the album artwork 1032*b* associated with the content item, the title and artist 1032*d* of the content item, and a selectable option 1032*c* to play the content item from a playback position corresponding to the selected lyrics. The sharing options 1024 include a variety of options for sharing the lyrics with specific people in specific ways and a variety of options for initiating a process to share the lyrics in a specific way, with the ability to select the user with which to share the lyrics later.

Figure 10D:
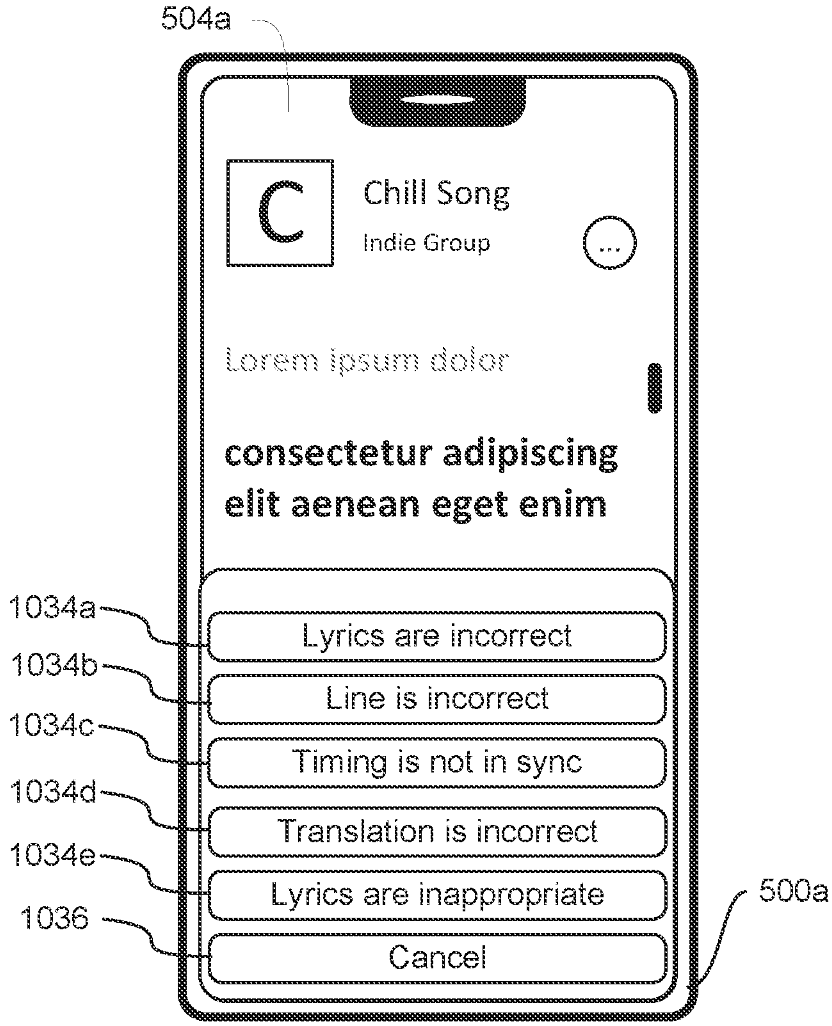

In FIG. 10C, the user selects (e.g., with contact 1003) the option 1026*b* to report an issue with the lyrics. In response to the user's selection, the electronic device 500*a* presents the user interface illustrated in FIG. 10D. As shown in FIG. 10D, the electronic device 500*a* presents a plurality of options 1034*a-e* for reporting an issue with the lyrics to the content provider. In response to detecting selection of selectable option 1034*a*, the electronic device 500*a* transmits an indication to the content provider that the lyrics for the content item are incorrect. In response to detecting selection of selectable option 1034*b*, the electronic device 500*a* transmits an indication to the content provider that the selected portion of the lyrics is incorrect. In response to detecting selection of selectable option 1034*c*, the electronic device 500*a* transmits an indication to the content provider that the timing of the lyrics of the content item is not correct. In response to detecting selection of selectable option 1034*d*, the electronic device 500*a* transmits an indication to the content provider that a translation of the lyrics is incorrect. In response to detecting selection of selectable option 1034*e*, the electronic device 500*a* transmits an indication to the content provider that the lyrics of the content item are inappropriate. The user interface also includes a selectable option 1036 that, when selected, causes the electronic device 500*a* to dismiss the user interface without sending an indication to the content provider.

Figure 10E:
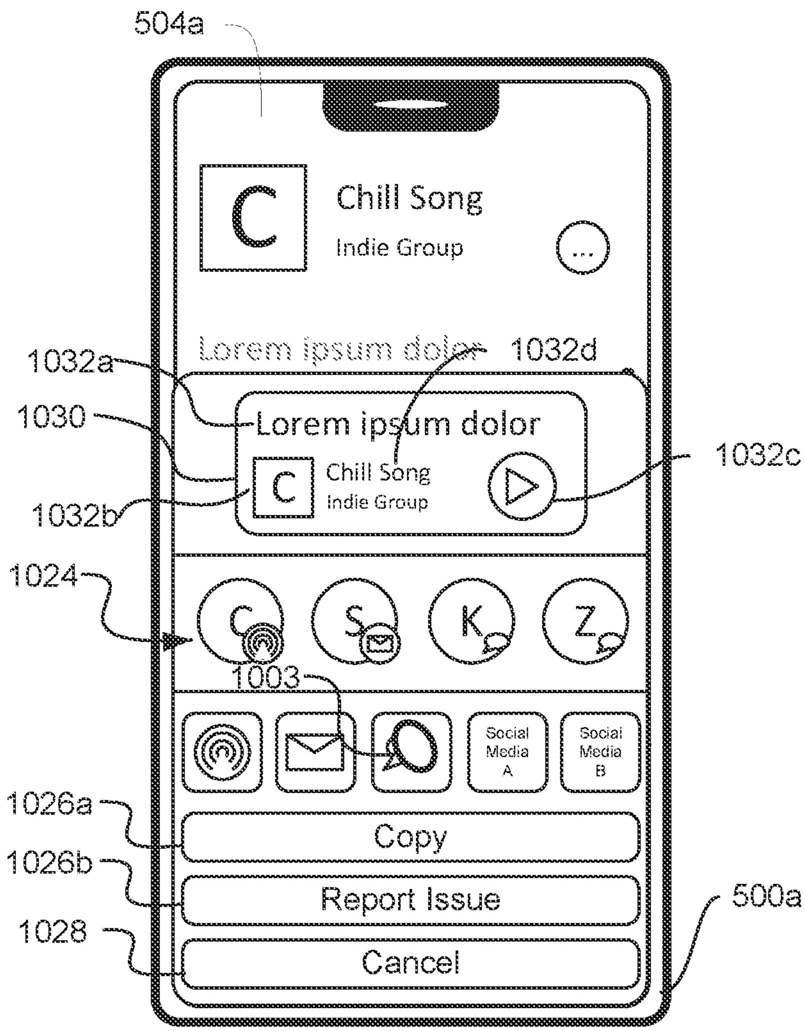

In FIG. 10E, rather than selecting the option 1026*b* to report an issue, the user selects (e.g., with contact 1003) one of the options 1024 for sharing the content item with another user account by text message or enhanced data-based messaging.

Figure 10F:
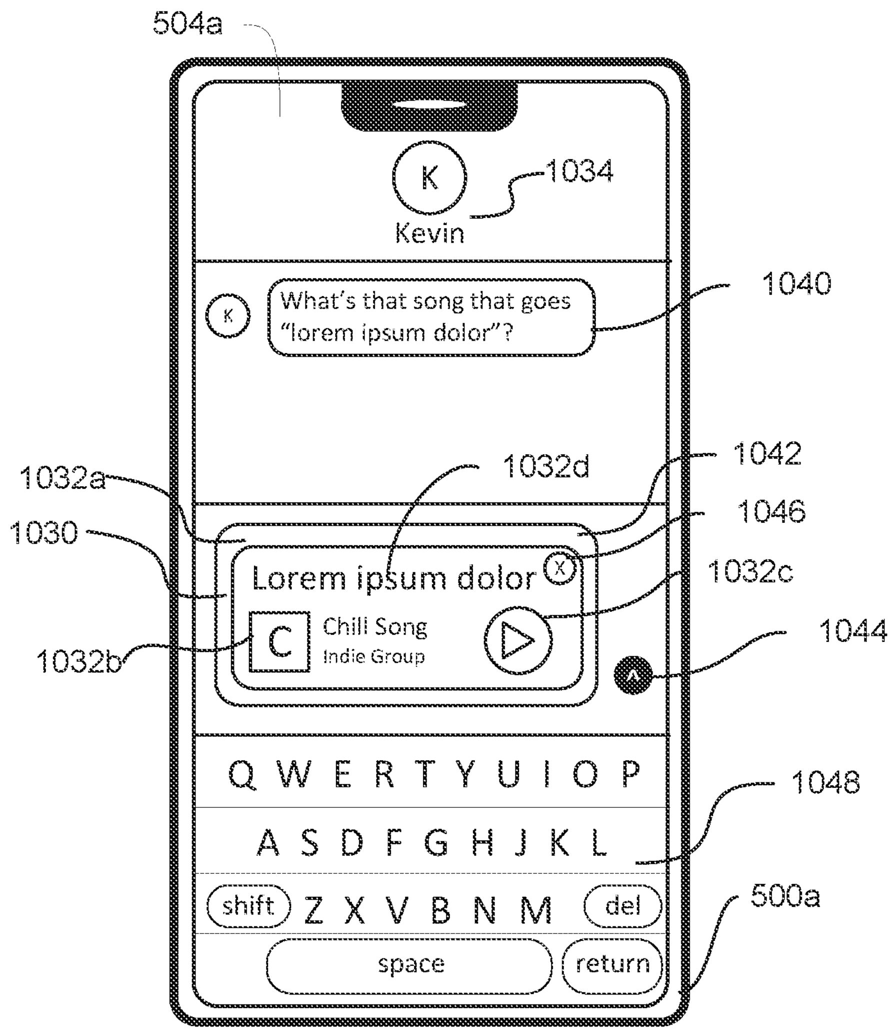

FIG. 10F illustrates a messaging user interface displayed by the electronic device 500*b* in response to the user's selection in FIG. 10E. The user is optionally able to enter the name of a user to send the content item to, causing the electronic device 500*a* to display an indication 1034 of the other user and a previous message 1040 in the conversation with the other user. The messaging user interface includes a message field 1042 that is pre-populated with the representation of the content item, a soft keyboard 1048 the user is able to use to type a message to send with the representation of the content item, an option 1046 to remove the representation 1030 from the message, and an option 1044 to send the message.

Figure 10G:
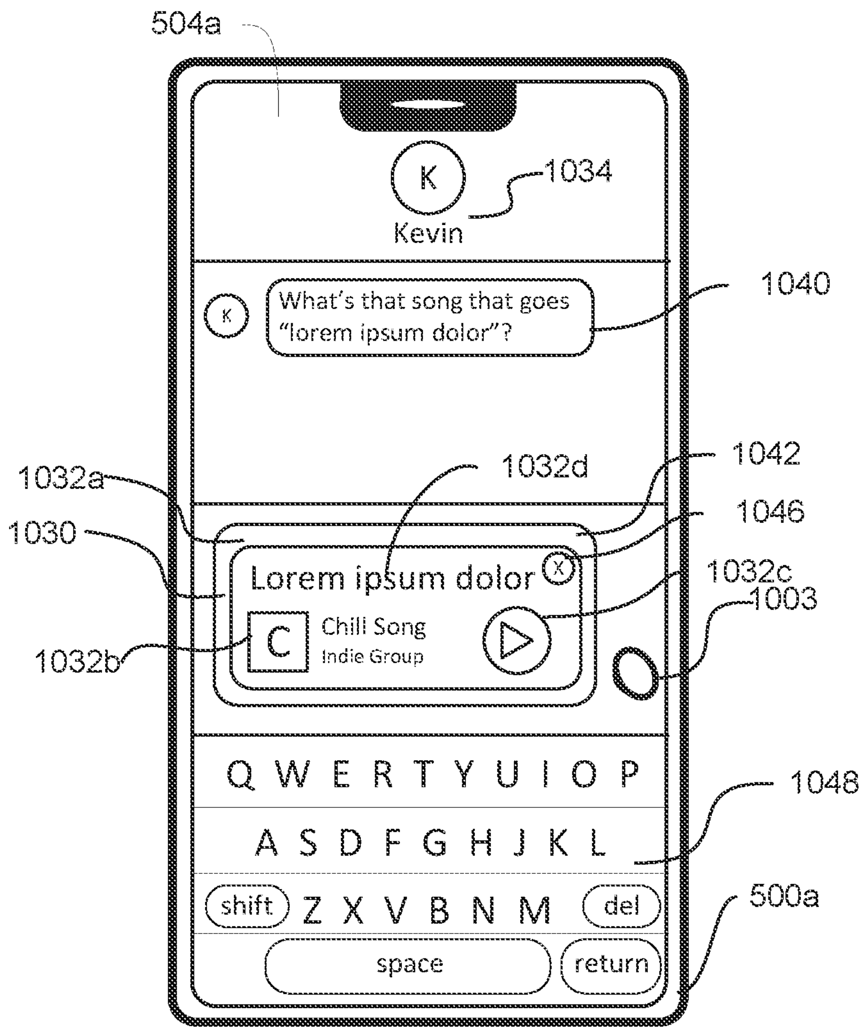
Figure 10H:
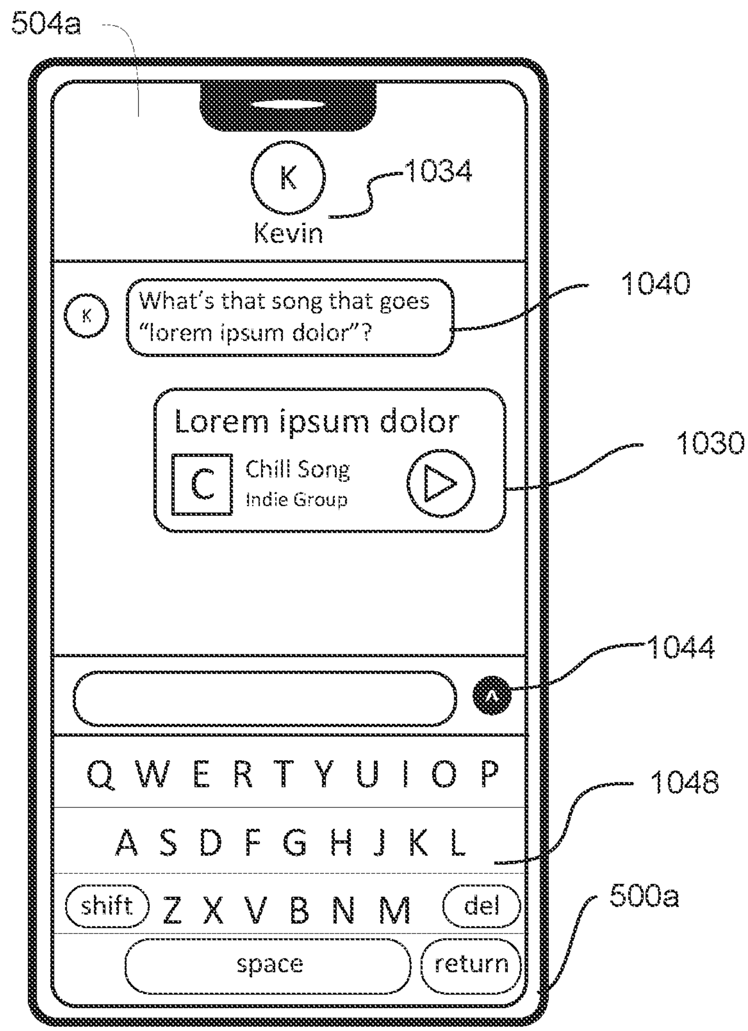

In FIG. 10G, the user selects the option 1044 to send the message. As shown in FIG. 10H, in response to the user's selection, the electronic device 500*a* sends a message to the other user that includes the representation 1030 of the content item.

Figure 10I:
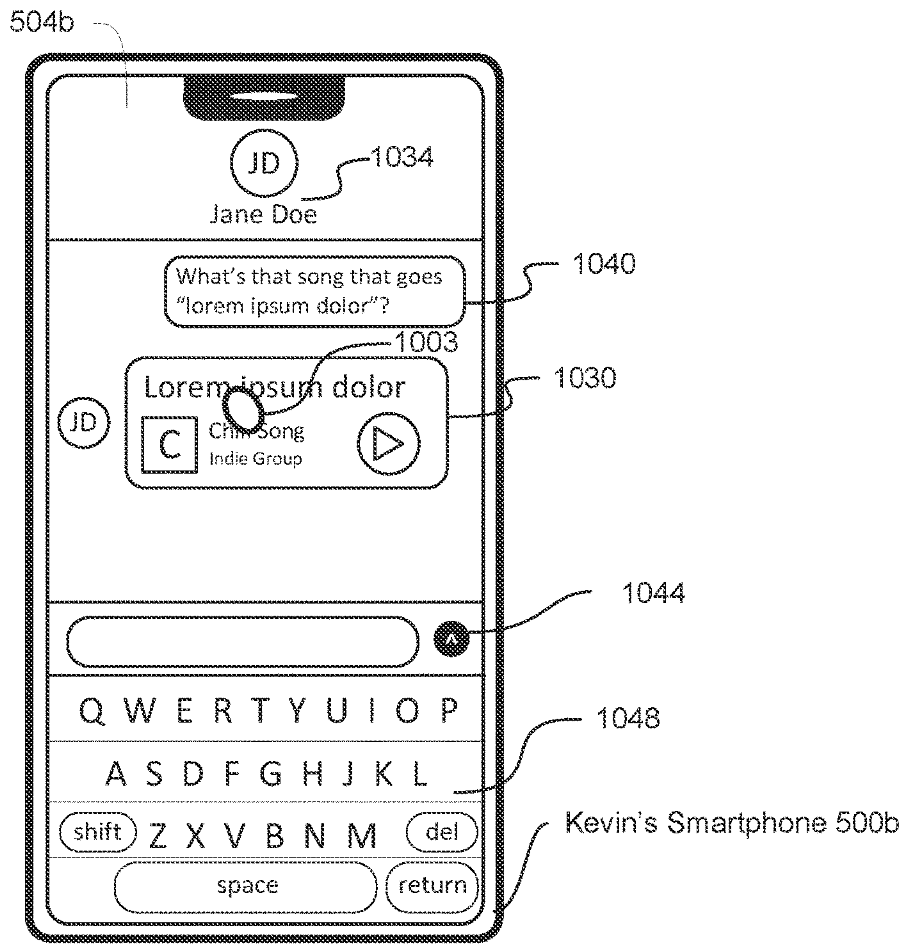

FIG. 10I illustrates the presentation of the messaging conversation on the other user's electronic device 500*b*. The user interface includes the previous message 1040 in the conversation and the representation 1030 of the content item that was sent from electronic device 500*a*. As shown in FIG. 10I, the other user selects (e.g., with contact 1003) the representation 1030 of the content item.

Figure 10J:
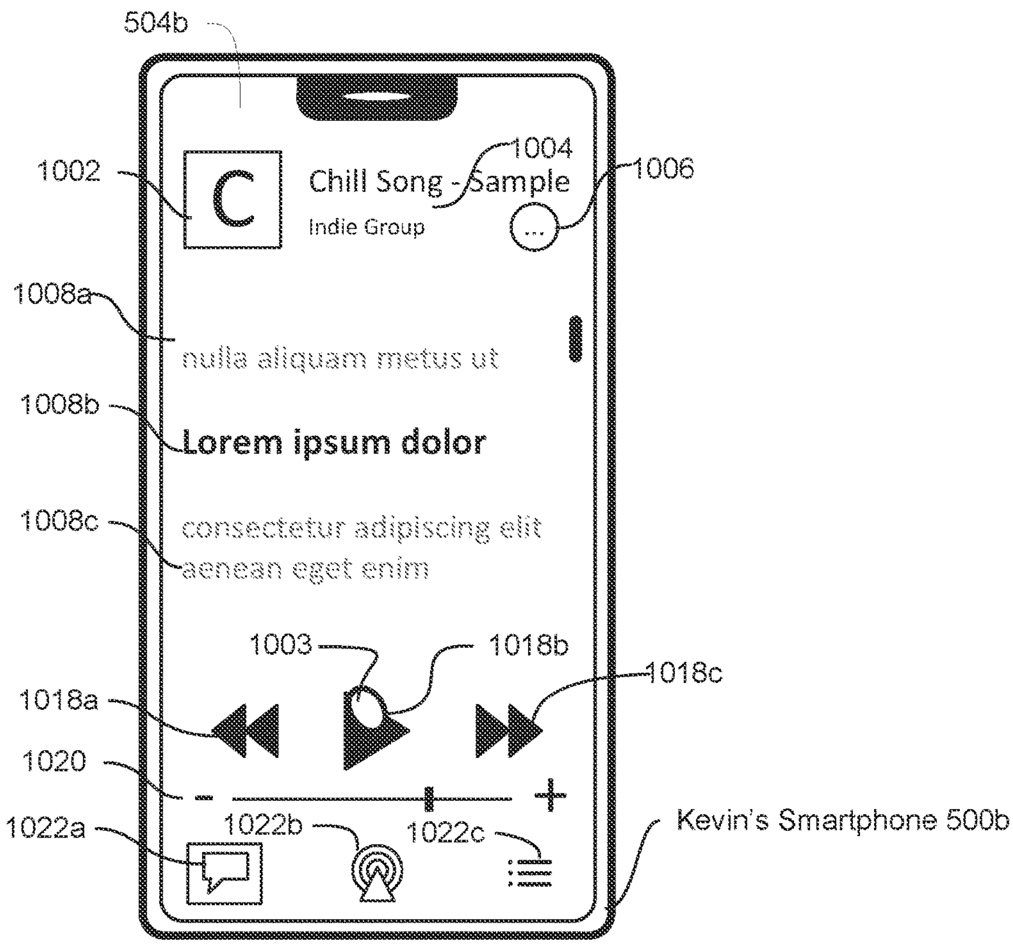
Figure 10K:
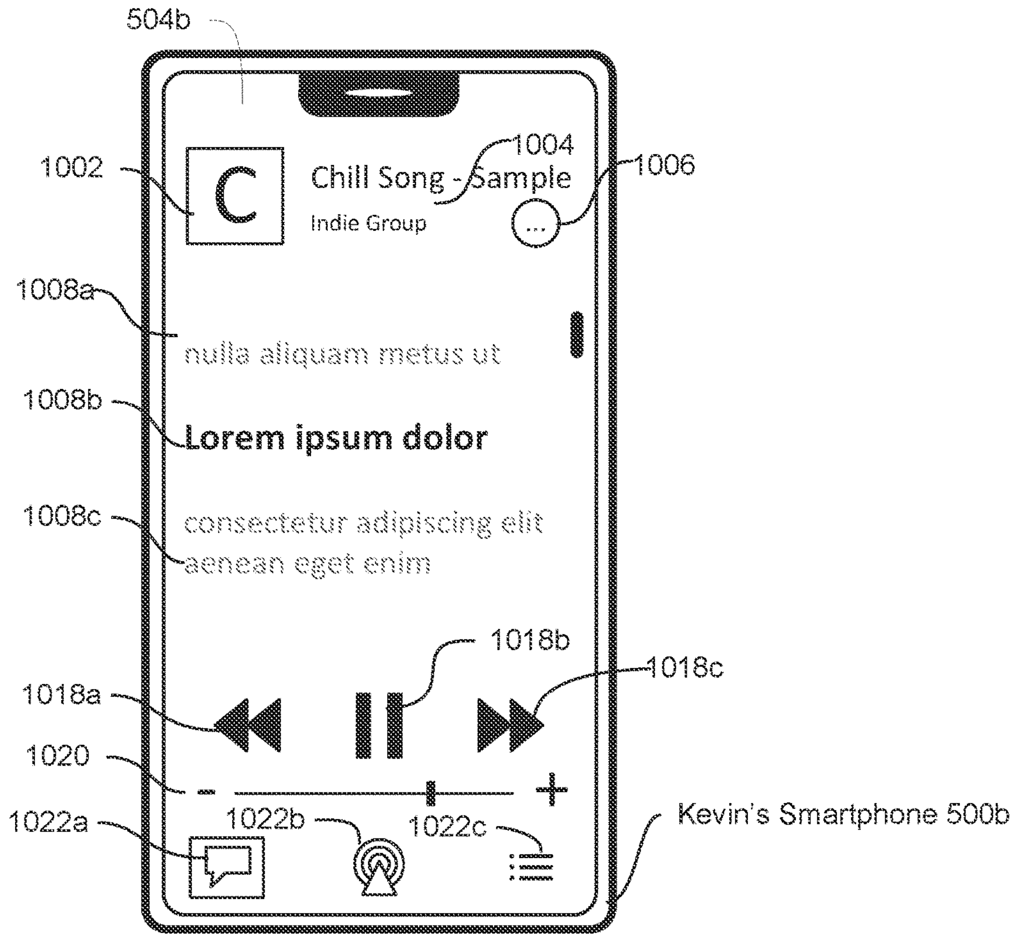

As shown in FIG. 10J, in response to the user's selection in FIG. 10I, the electronic device 500*b* displays a content application user interface including time-synced lyrics 1008*a* of the content item (e.g., the time-synced lyrics user interface described with reference to method 700). In FIG. 10J, the user of electronic device 500*b* is not a subscriber to the content provider that provides the content item (and/or does not otherwise have full entitlement to the content item, such as via purchase), so the content application plays a sample of the content item that does not include the full content item (e.g., a 30, 45, 60, etc. second sample instead), as indicated in displayed information 1004 ("Sample"). The playback position of the content item is automatically set to the portion of the content item that corresponds to the portion of lyrics 1008*b* shared from electronic device 500*a* (e.g., 3 seconds before the shared lyric, 5 seconds before the shared lyric, right at the start of the shared lyric, etc.). As shown in FIG. 10J, the user selects (e.g., with contact 1003) the selectable option 1018*b* to play the content item from the playback position corresponding to lyrics 1008*b*. As shown in FIG. 10K, in response to the user's selection in FIG. 10J, the electronic device 500*b* plays the content item from the playback position corresponding to lyrics 1008*b* for the sample length (or until the end of the content item is reached, whichever is earlier).

Figure 10L:
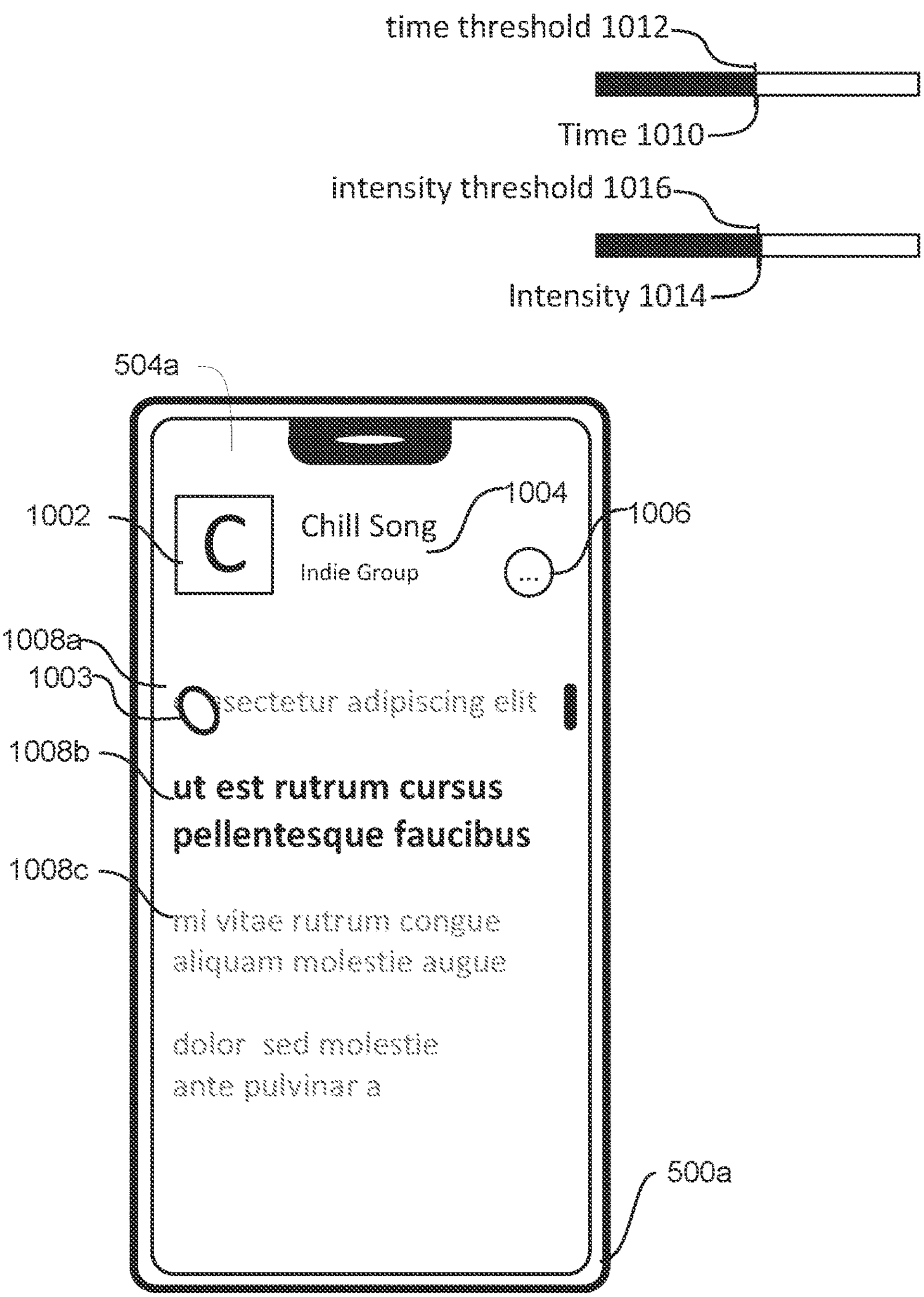
Figure 10M:
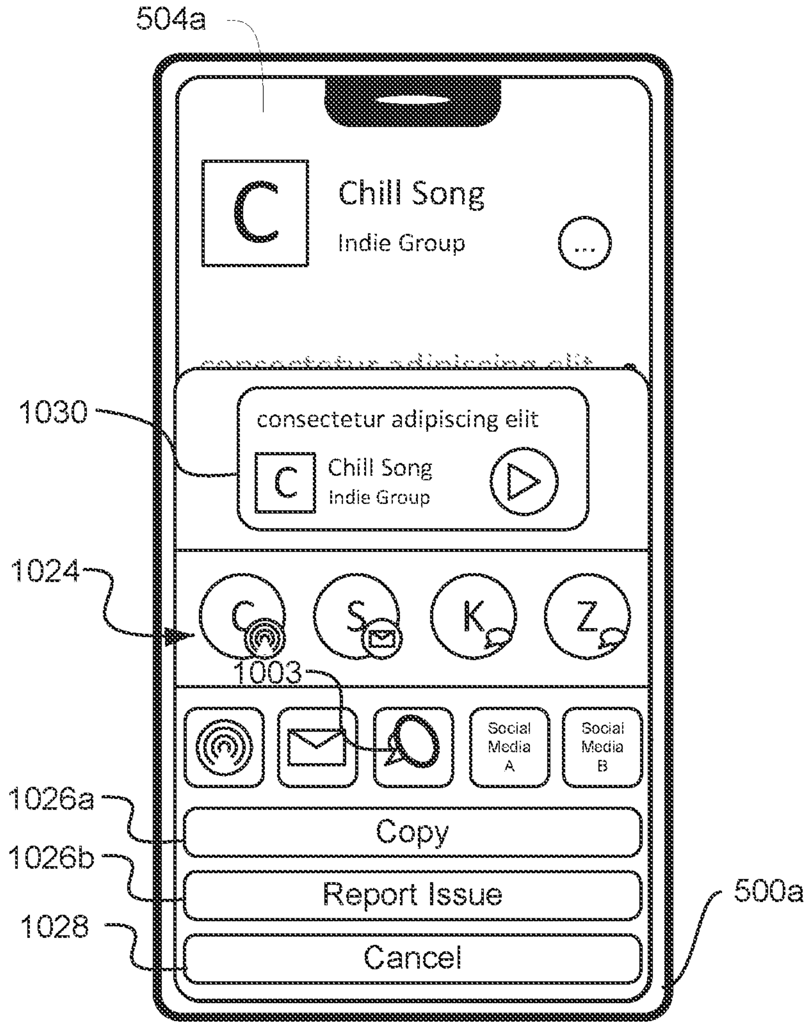

In FIG. 10L, the user of electronic device 500*a* selects (e.g., with contact 1003) another portion of lyrics 1008*a* (e.g., different than the portion selected in FIG. 10B) with a time 1010 that meets the time threshold 1012 and/or an intensity 1014 that meets the intensity threshold 1016. In response to the user's selection in FIG. 10L, the electronic device 500*a* presents the action user interface again, as shown in FIG. 10M. In FIG. 10M, the user selects (e.g., with contact 1003) one of the selectable sharing options 1024 to share the content item with another user.

Figure 10N:
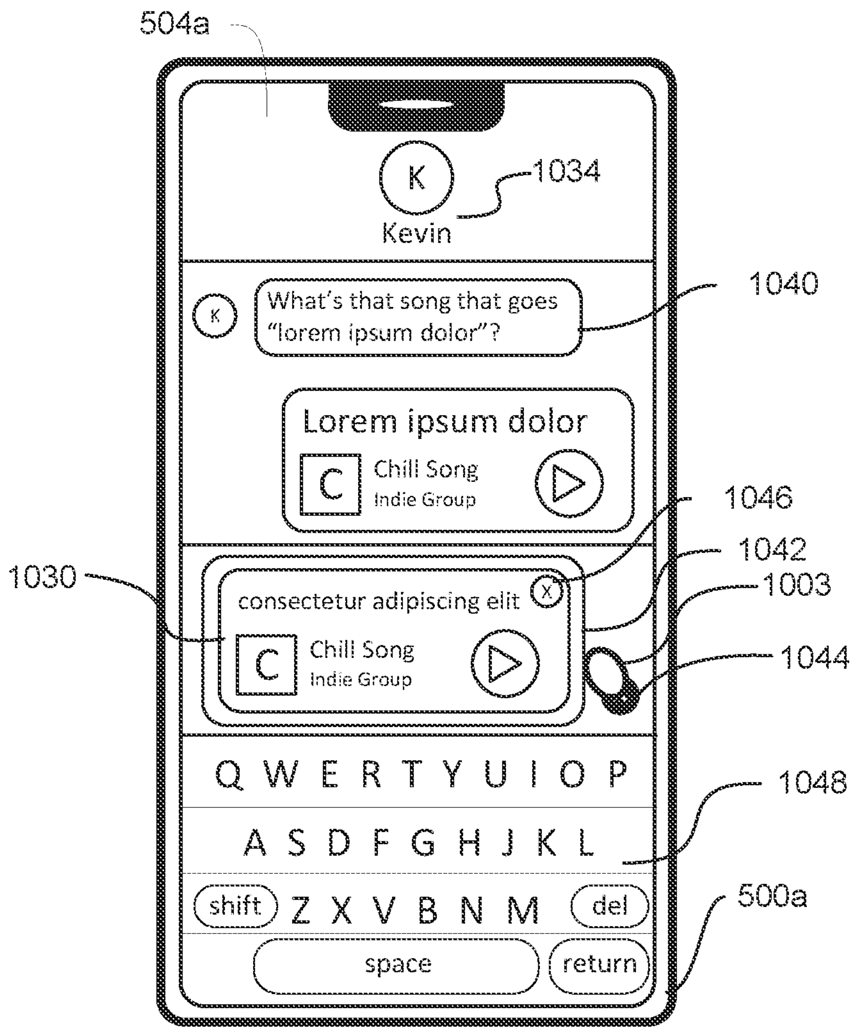

In FIG. 10N, in response to one or more inputs including the selection illustrated in FIG. 10M, the electronic device 500*a* presents the messaging user interface with the representation 1030 of the content item pre-populated into a message 1042, as previously described. The user selects (e.g., with contact 1003) the option 1044 to send the representation 1030 of the content item to the other user.

Figure 10O:
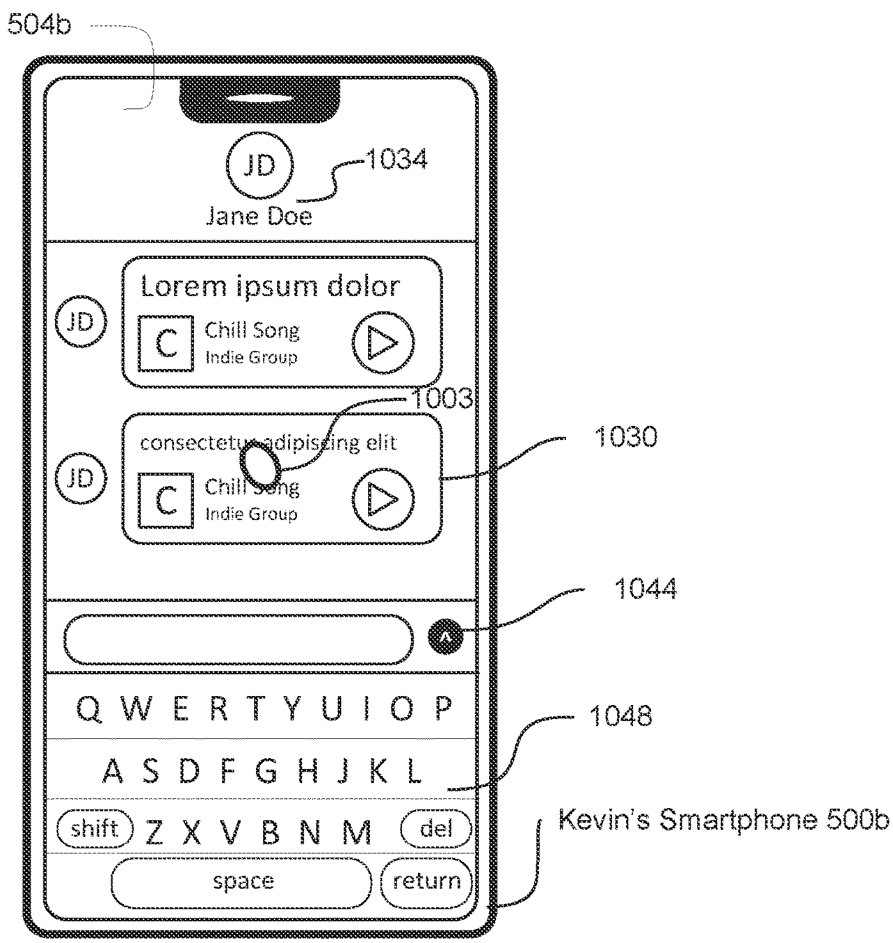
Figure 10P:
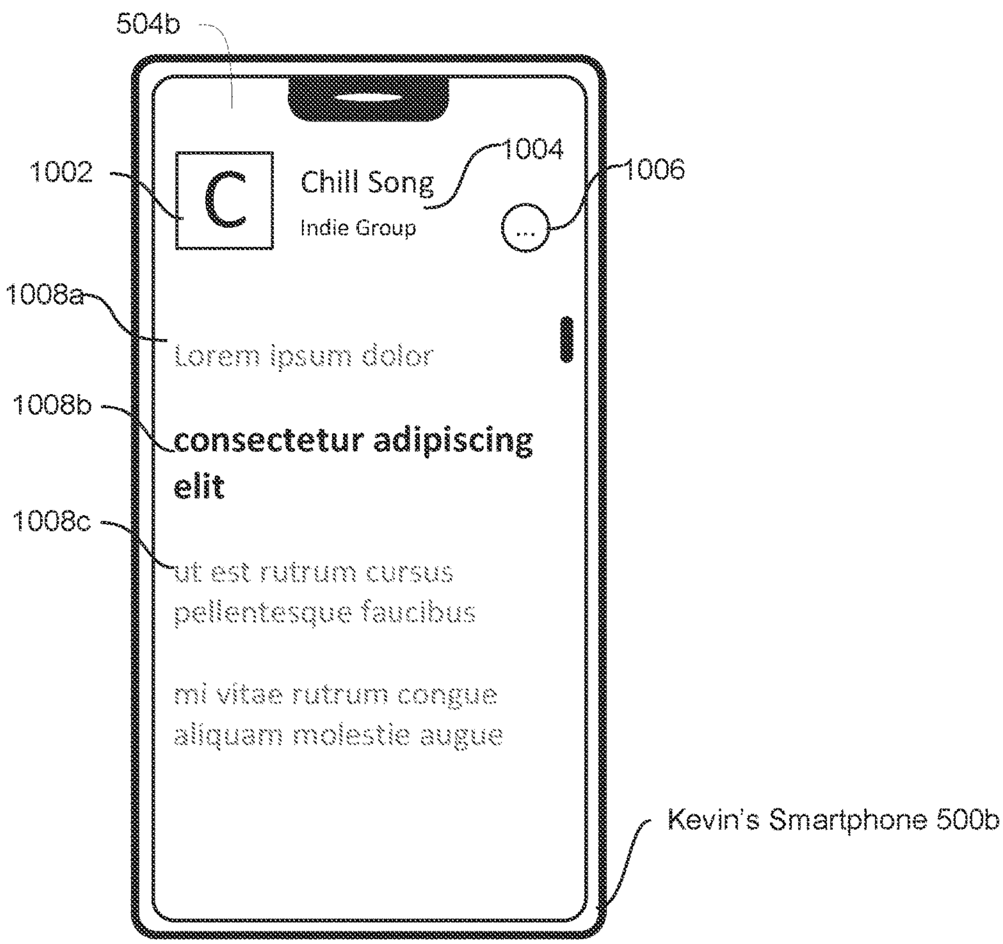

FIG. 10O illustrates the messaging user interface on the other electronic device 500*b* after having received the message sent in FIG. 10N. The user selects (e.g., with contact 1003) the representation 1030 of the content item. In response to the user's selection in FIG. 10O, the electronic device 500*b* displays the content application including time-synced lyrics 1008 of the content item, as shown in FIG. 10P. In response to an input to play the content item, the electronic device 500*b* plays the content item from the portion 1008*b* of lyrics shared by the user of electronic device 500*a* (e.g., different than the portion played in FIGS. 10J-10K). In FIG. 10P, the user of the other electronic device 500*b* has since become a subscriber to the content service that provides the content item (or has since otherwise obtained entitlement to the entire content item), so the electronic device 500*b* is able to play the entire content item to the end of the content item, as indicated by no "Sample" indication displayed in information 1004.

Figure 10Q:
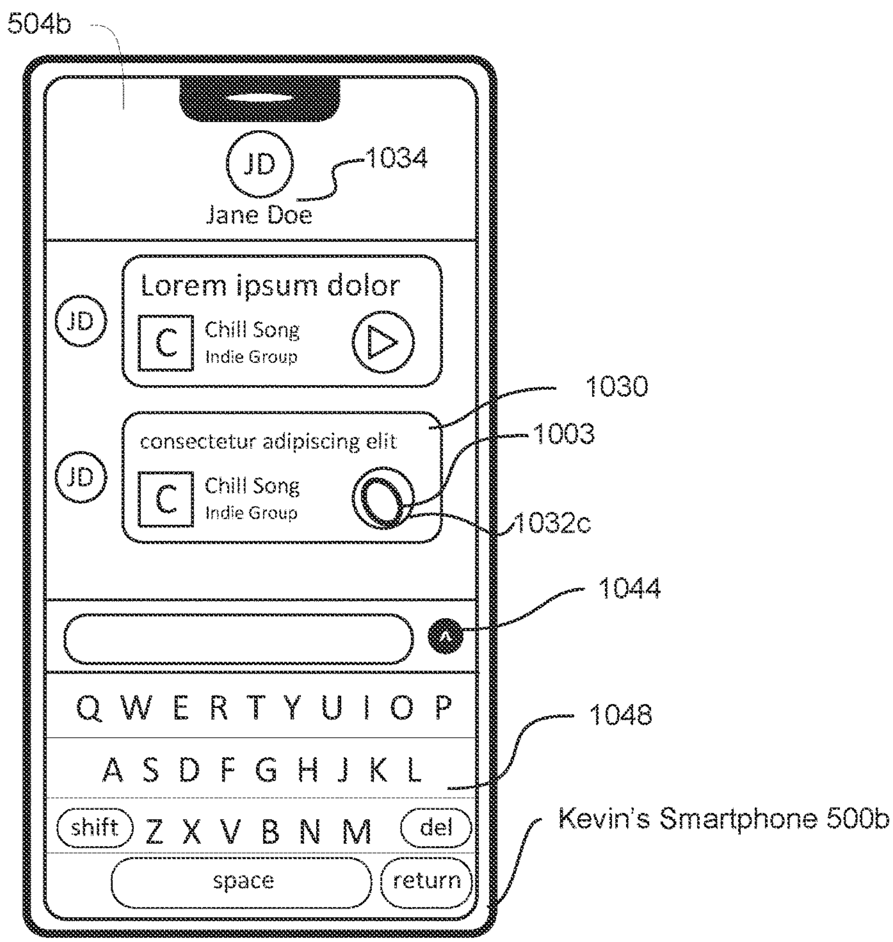
Figure 10R:
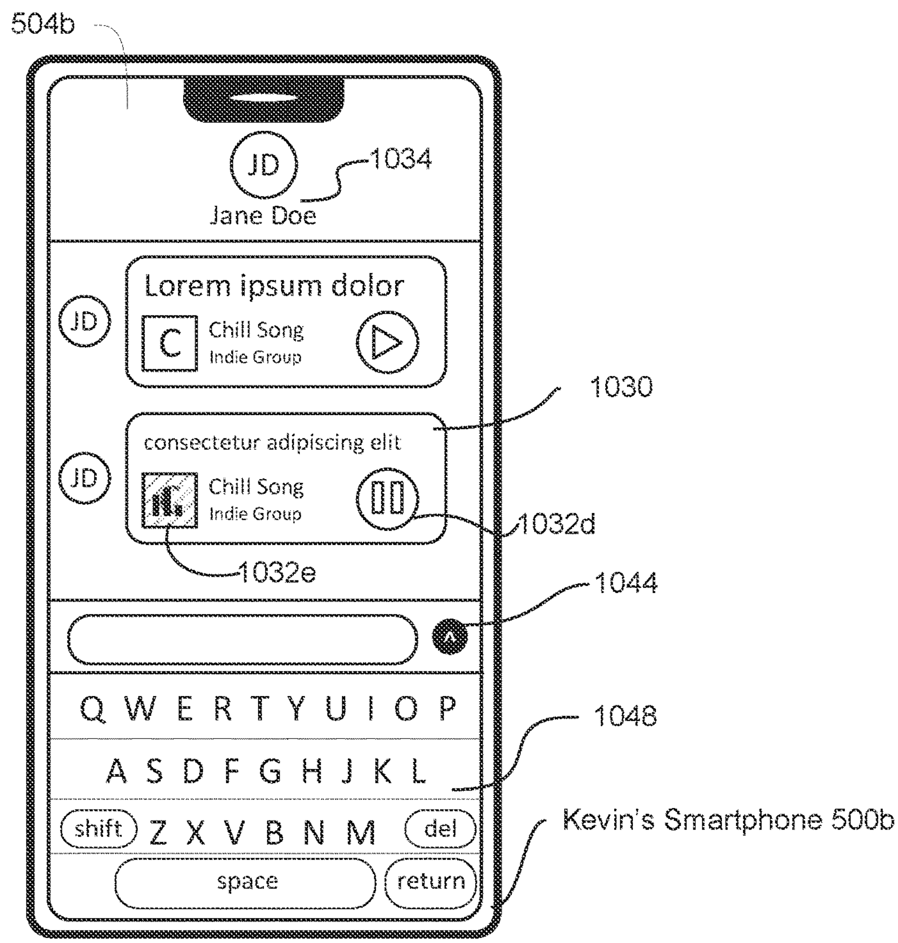

FIG. 10Q illustrates the messaging user interface on electronic device 500*b* again. In FIG. 10Q, the user selects (e.g., with contact 1003) the option 1032*c* to play the content item that is included in representation 1030 of the content item. As shown in FIG. 10R, in response to the user's selection in FIG. 10Q, the electronic device 500*b* plays the content item while continuing to display the messaging user interface. The electronic device 500*b* plays the content item from a playback position corresponding to the portion of lyrics shared by electronic device 500*a* (e.g., 3 seconds before the shared lyric, 5 seconds before the shared lyric, right at the shared lyric, etc.)—in some embodiments, for a sample time period (e.g., if the user does not have full entitlement), and in some embodiments, through the end of the content item (e.g., if the user does have full entitlement). The representation 1030 of the content item is updated to include a selectable option 1032*d* to pause playback of the content item and an indication 1032*e* that the content item is playing.

Figure 11A:
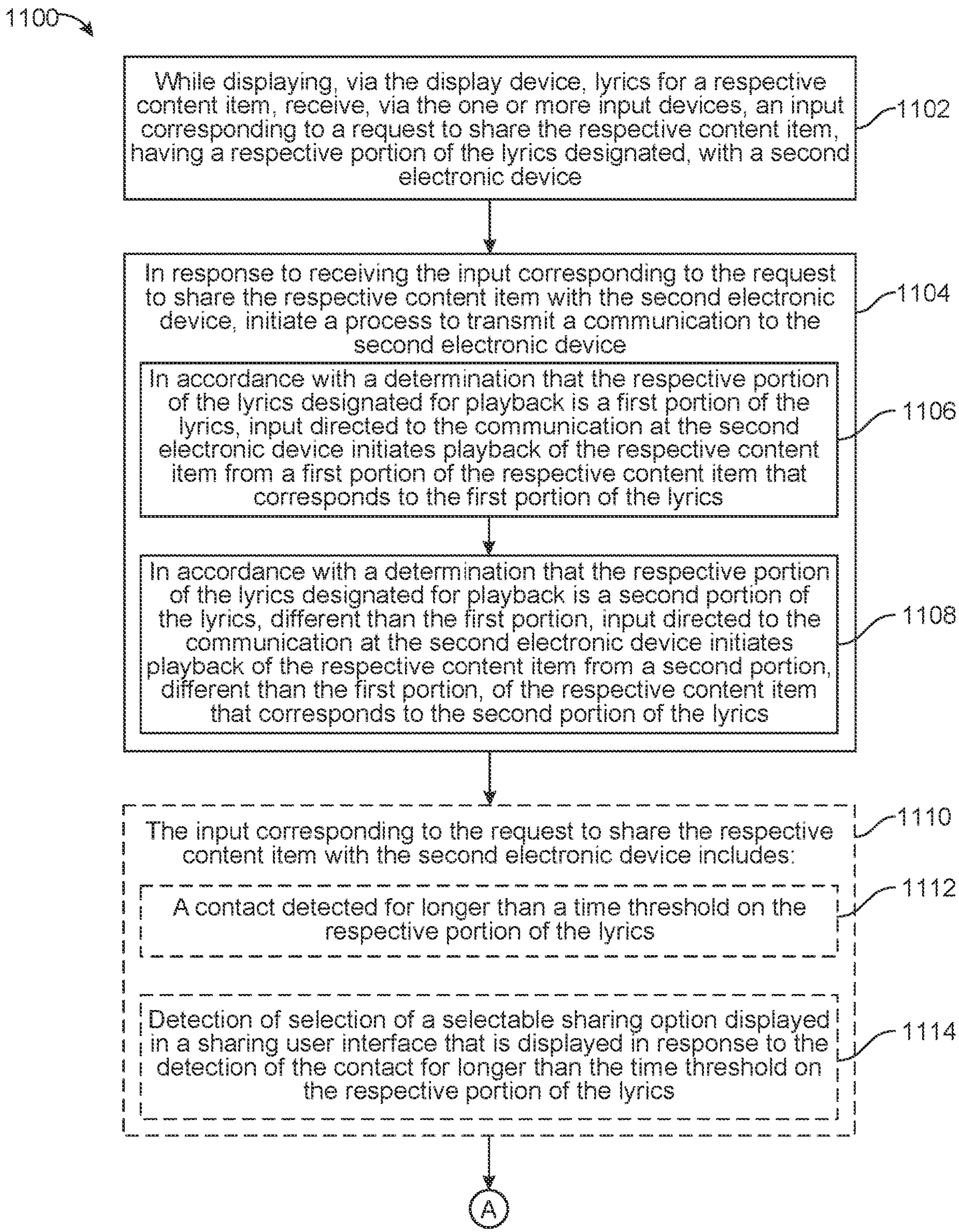
FIGS. 11A-11C are flow diagrams illustrating a method of sharing a content item with the user account of another electronic device in accordance with some embodiments.
Figure 11B:
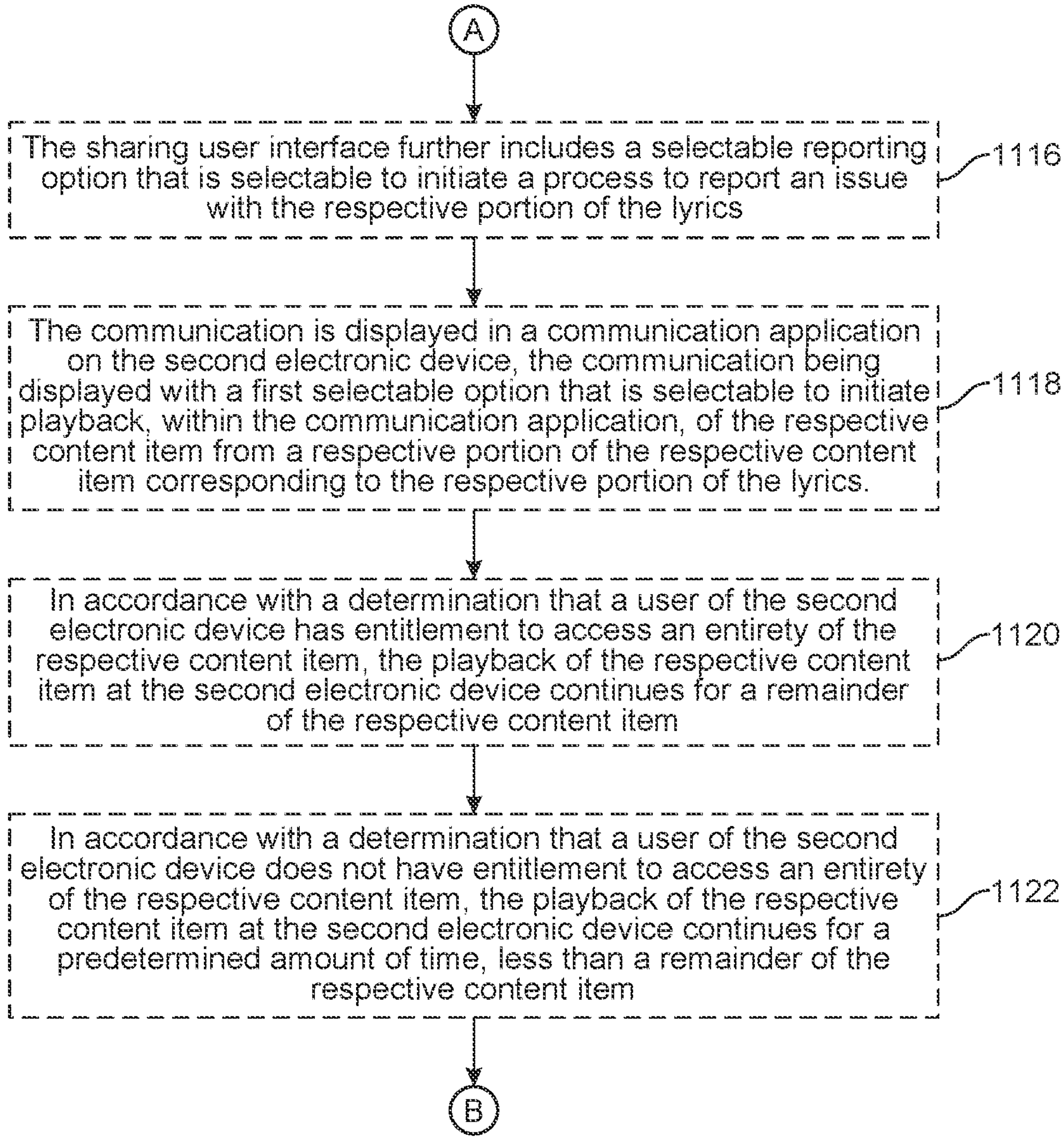
Figure 11C:
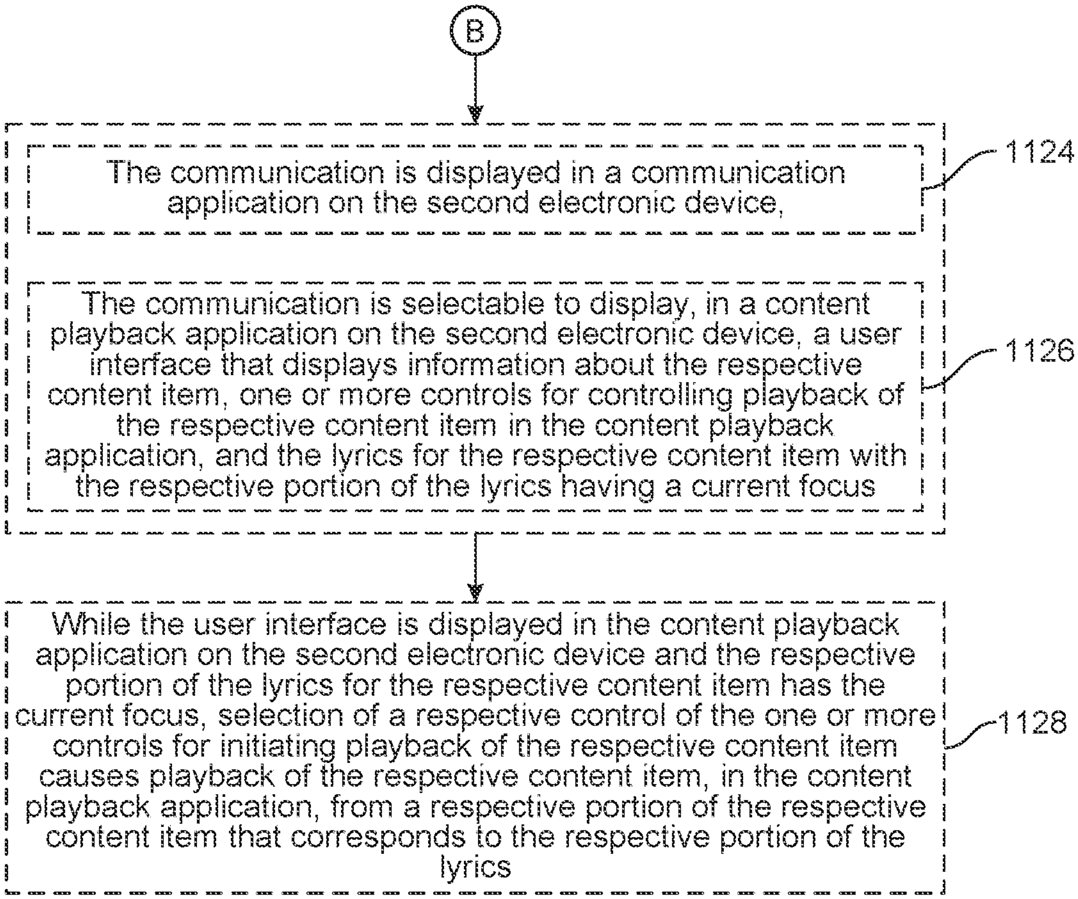

FIGS. 11A-11C are flow diagrams illustrating a method 1100 of sharing a content item with the user account of another electronic device in accordance with some embodiments. The method 1100 is optionally performed at an electronic device such as device 100, device 300, device 500, device 501, device 510, and device 591 as described above with reference to FIGS. 1A-1B, 2-3, 4A-4B and 5A-5J. Some operations in method 1100 are, optionally combined and/or order of some operations is, optionally, changed.

As described below, the method 1100 provides ways to share an item of content with a user account of another electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 10B, a first electronic device in communication with a display device and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), while displaying, via the display device, lyrics 1008 for a respective content item (e.g., whether or not the respective content item is currently playing on the first electronic device), receives (1102), via the one or more input devices, an input corresponding to a request to share the respective content item, having a respective portion of the lyrics 1008*a* designated (e.g., the respective portion of the lyrics are designated for playback on another device with which the respective portion of the lyrics is going to be shared, and another portion of the lyrics is not designated/highlighted for playback on the other device), with a second electronic device (e.g., while playing a respective content item, the electronic device displays the lyrics of the respective content item, including a line of lyrics included in a currently-playing portion of the respective content item and one or more lines of lyrics before and/or after the line of lyrics included in the currently-playing portion of the respective content item). Optionally, as the respective content item continues to play, the electronic device updates which lyrics are being displayed such that the lyrics are synchronized to the content such as described in method 700. In some embodiments, while playing the respective content item and displaying the lyrics of the respective content item, the electronic device detects an input corresponding to a request to share a respective portion of the lyrics designated for playback (e.g., before, after, or during the portion of the respective content item that is currently playing) that is displayed on the display device. For example, the request is selection of the respective portion of the lyrics (corresponding to the currently playing lyrics, or another section of lyrics that is not currently playing) with a first characteristic (e.g., a contact having an intensity greater than an intensity threshold, a long touch (e.g., a contact detected for longer than a time threshold), a secondary selection such as right-click, etc.), followed by selection of a share option that is presented in response to the selection with the first characteristic. In some embodiments, the user is able to select a method of communication with which to share the respective portion of the lyrics, such as e-mail, text message, enhanced data-based messaging, or short-range wireless communication between the electronic device and another electronic device. In some embodiments, selection of the lyrics with a second characteristic (e.g., a tap) rather than the first characteristic causes the first electronic device to skip to the selected portion of the lyrics/content item (e.g., as described in method 700) rather than initiating a process to share the lyrics.

In some embodiments, such as in FIG. 10C, in response to receiving the input corresponding to the request to share the respective content item with the second electronic device, the electronic device initiates (1104) a process to transmit a communication to the second electronic device (e.g., presenting a user interface of a communication application pre-populated with a message including the respective portion of the lyrics). For example, in response to detecting selection of an option to share the respective portion of the lyrics using enhanced data-based messaging, the electronic device presents a messaging user interface including a draft message that includes a rich link including the respective portion of the lyrics. In the example, the user is able to enter one or more user accounts with which to share the respective portion of the lyrics and add/edit text included in the message that has the respective portion of the lyrics. In some embodiments, the rich link including the lyrics is selectable to play a portion of the respective content item starting at a playback position a predetermined amount of time (e.g., 1 second, 3 seconds, 5 seconds, etc.) before the portion of the respective content item that includes the respective portion of the lyrics.

In some embodiments, such as in FIG. 10I, in accordance with a determination that the respective portion of the lyrics designated for playback is a first portion of the lyrics, input directed to the communication 1030 at the second electronic device initiates playback of the respective content item from a first portion of the respective content item that corresponds to the first portion of the lyrics (1106) (e.g., the rich link that is shared by the first electronic device includes the text of the first portion of the lyrics and in response to detecting selection of the rich link shared by the first electronic device, the second electronic device plays the respective content item starting at a playback position that is a predetermined amount of time (e.g., 1 second, 3 seconds, 5 seconds) before the portion of the respective content item that includes the first portion of the lyrics, or right at the portion of the respective content item that includes the first portion of the lyrics). In some embodiments, such as in FIG. 10O, in accordance with a determination that the respective portion of the lyrics designated for playback is a second portion of the lyrics, different than the first portion, input directed to the communication 1030 at the second electronic device initiates playback of the respective content item from a second portion, different than the first portion, of the respective content item that corresponds to the second portion of the lyrics (1108). In some embodiments, the rich link that is shared by the first electronic device includes the text of the second portion of the lyrics and in response to detecting selection of the rich link shared by the first electronic device, the second electronic device plays the respective content item starting at a playback position that is a predetermined amount of time (e.g., 1 second, 3 seconds, 5 seconds) before the portion of the respective content item that includes the second portion of the lyrics, or right at the portion of the respective content item that includes the first portion of the lyrics. The above-described manner of playing the respective content item from the portion of lyrics that was shared by the first electronic device allows the second electronic device to skip to the portion of the respective content item that includes the portion of the respective content item that includes the portion of lyrics shared by the first electronic device, which simplifies the interaction between the user and the second electronic device and enhances the operability of the second electronic device and makes the user-device interface more efficient (e.g., by reducing the amount of time it takes to reach the portion of the respective content item that includes the portion of the lyrics shared by the first electronic device), which additionally reduces power usage and improves battery life of the electronic device by enabling the user to use the electronic device more quickly and efficiency, such as by reducing the need for the user of the second electronic device to listen to the respective content item from the beginning or scrubbing the respective content item to reach the portion of the respective content item that includes the lyrics shared by the first electronic device.

In some embodiments, such as in FIG. 10L, the input corresponding to the request to share the respective content item with the second electronic device includes (1110), a contact 1003 detected for longer than a time threshold 1012 (e.g., 1, 2, 3 seconds) on the respective portion 1008*a* of the lyrics (1112) (e.g., in some embodiments, in response to detecting the contact for longer than the time threshold, the electronic device displays a plurality of selectable options, that, when selected, causes the electronic device to share the content in a respective manner). Optionally, in response to detecting a contact for less than the time threshold on the respective portion of the lyrics, the electronic device plays the content from a playback position corresponding to the respective portion of the lyrics. In some embodiments, such as in FIG. 10M, the input includes detection of selection of a selectable sharing option 1024 displayed in a sharing user interface that is displayed in response to the detection of the contact for longer than the time threshold on the respective portion of the lyrics (1114). In some embodiments, the selectable sharing option is associated with a respective way of sharing the content, such as via e-mail, text message, enhanced data-based message, or short-range wireless data transfer to another electronic device. Optionally, the electronic device displays a plurality of selectable sharing options in response to detecting the content for longer than the time threshold each associated with a respective way of sharing the content. The above-described manner of sharing the content in response to detecting the contact for longer than a time threshold and selection of the sharing option allows the electronic device to enable the user to quickly and easily initiate the process to share the content item while the user is viewing the time-synced lyrics of the content item, which simplifies the interaction between the user and the electronic device and enhances the operability of the electronic device and makes the user-device interface more efficient (e.g., by reducing the number of inputs needed to share the content item while playing the content item and viewing the time-synced lyrics), which additionally reduces power usage and improves battery life of the electronic device by enabling the user to use the electronic device more quickly and efficiently.

In some embodiments, such as in FIG. 10M, the sharing user interface further includes a selectable reporting option 1028 that is selectable to initiate a process to report an issue with the respective portion of the lyrics (1116). In some embodiments, the issues the user is able to report include incorrect lyrics, incorrect line of lyrics, incorrect synchronization of lyrics, inappropriate lyrics, or incorrect translation. Optionally, in response to detecting selection of an option to report an issue, the electronic device transmits the indication of the issue to an entity that manages the collection of content from which the content item is playing. The above-described manner of displaying a selectable option to report an issue with the lyrics in the sharing user interface allows the electronic device to concurrently display multiple options related to the selected portion of lyrics in response to detecting the contact on the portion of lyrics for longer than the threshold time and provides a quick and easy way to report particular sections of lyrics, which simplifies the interaction between the user and the electronic device and enhances the operability of the electronic device and makes the user-device interface more efficient (e.g., by reducing the number of inputs needed to perform multiple actions related to the selected portion of the lyrics), which additionally reduces power usage and improves battery life of the electronic device by enabling the user to use the electronic device more quickly and efficiently.

In some embodiments, such as in FIG. 10Q, the communication 1030 is displayed in a communication application on the second electronic device, the communication being displayed with a first selectable option 1032*c* that is selectable to initiate playback, within the communication application (e.g., without having to display a content playback application, such as a music application), of the respective content item from a respective portion of the respective content item corresponding to the respective portion of the lyrics (1118). In some embodiments, the content plays while the electronic device continues to display the communication user interface. Optionally, the electronic device initiates playback of the content item from a playback position that corresponds to the respective portion of the lyrics. The above-described manner of playing the content item while continuing to display the communication user interface allows the electronic device to play the content item without having to launch/display a different application, which simplifies the interaction between the user and the electronic device and enhances the operability of the electronic device and makes the user-device interface more efficient (e.g., by reducing the number of inputs needed to continue interacting with the communication application after playing the content item), which additionally reduces power usage and improves battery life of the electronic device by enabling the user to use the electronic device more quickly and efficiently.

In some embodiments, such as in FIG. 10P, in accordance with a determination that a user of the second electronic device has entitlement to access an entirety of the respective content item (e.g., the user has a subscription to the provider of the content item), the playback of the respective content item at the second electronic device continues for a remainder of the respective content item (1120). In some embodiments, if the second user has entitlement to access the entirety of the respective content item, the electronic device initiates playback from the portion of the content item corresponding to the respective portion of the lyrics and plays until the end of the respective content item. The above-described manner of playing the remainder of the respective content item if the user is entitled to access the entirety of the respective content item allows the electronic device to play the content item until the end of the content item in response to detecting selection of the first selectable option, which simplifies the interaction between the user and the electronic device and enhances the operability of the electronic device and makes the user-device interface more efficient (e.g., by reducing the number of inputs needed to play the remainder of the content item), which additionally reduces power usage and improves battery life of the electronic device by enabling the user to use the electronic device more quickly and efficiently.

In some embodiments, such as in FIG. 10K, in accordance with a determination that a user of the second electronic device does not have entitlement to access an entirety of the respective content item, the playback of the respective content item at the second electronic device continues for a predetermined amount of time (e.g., 20, 30, 40 seconds), less than a remainder of the respective content item (1122). For example, the user of the second electronic device is not a subscriber of the service that provides the respective content item. Optionally, in response to detecting selection of the first selectable option, the second electronic device plays the content item from the playback position corresponding to the respective portion of the lyrics and plays the content item for the predetermined amount of time. The above-described manner of playing a the content item for a predetermined amount of time if the user of the second electronic device is not entitled to access the entirety of the respective content item allows the electronic device to automatically play the appropriate portion of the content item corresponding to the respective portion of the lyrics without requiring manual user input to do so, which simplifies the interaction between the user and the electronic device and enhances the operability of the electronic device and makes the user-device interface more efficient (e.g., by enabling access to the portion of the content including the respective lyrics in response to selection of the first option of the communication even without entitlement to the full content item), which additionally reduces power usage and improves battery life of the electronic device by enabling the user to use the electronic device more quickly and efficiently.

In some embodiments, such as in FIG. 10I, the communication 1030 is displayed in a communication application on the second electronic device (1124), and the communication 1030 is selectable to display, in a content playback application on the second electronic device, a user interface that displays information 1004 about the respective content item, one or more controls 1018 for controlling playback of the respective content item in the content playback application, and the lyrics 1008 for the respective content item with the respective portion of the lyrics having a current focus, such as in FIG. 10J (1126) (e.g., the lyrics scrolled to the respective portion of the lyrics). In some embodiments, in response to detecting selection of a portion of the communication other than the first selectable option, the second electronic device displays a music application while playing the respective content item. Optionally, the user interface of the music application includes information about the respective content item, such as title, artist, album art, etc. The above-described manner of playing the respective content item in the music application in response to detecting selection of the communication allows the electronic device to quickly and efficiently present additional options for interacting with the content using the music application in response to detecting selection of the communication, which simplifies the interaction between the user and the electronic device and enhances the operability of the electronic device and makes the user-device interface more efficient (e.g., by reducing the number of inputs needed to navigate from the communication application to the music application playing the respective content item), which additionally reduces power usage and improves battery life of the electronic device by enabling the user to use the electronic device more quickly and efficiently.

In some embodiments, such as in FIG. 10J, while the user interface is displayed in the content playback application on the second electronic device and the respective portion of the lyrics 1008*b* for the respective content item has the current focus, selection of a respective control 1018*b* of the one or more controls for initiating playback of the respective content item causes playback of the respective content item, in the content playback application, from a respective portion of the respective content item that corresponds to the respective portion of the lyrics (1128). In some embodiments, in response to detecting selection of the communication, the electronic device displays the content application including a user interface for playing the respective content item that includes placing the playback position within the respective content item at a playback position corresponding to the portion of the respective content item that corresponds to the respective portion of the lyrics. The above-described manner of playing the respective portion of the respective content item that corresponds to the respective portion of the lyrics allows the electronic device to automatically place the playback position at the position within the content that corresponds to the respective portion of lyrics without additional user input needed to do so, which simplifies the interaction between the user and the electronic device and enhances the operability of the electronic device and makes the user-device interface more efficient (e.g., by reducing the number of inputs needed to play the portion of content that corresponds with the respective portion of the lyrics), which additionally reduces power usage and improves battery life of the electronic device by enabling the user to use the electronic device more quickly and efficiently.

It should be understood that the particular order in which the operations in FIGS. 11A-11C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 1100 described above. For example, the operation of the electronic device to share a content item with a user account of another electronic device described above with reference to method 1100 optionally has one or more of the characteristics of displaying time-synced lyrics and displaying representations of content items in a playback sequence, etc., described herein with reference to other methods described herein (e.g., methods 700 and 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 11A-11C are, optionally, implemented by components depicted in FIGS. 1A-1B. For example, receiving operation 1102, and initiating operations 1104 are optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the delivery to users of invitational content or any other content that may be of interest to them, such as song playlists. The present disclosure contemplates that in some instances, this gathered data may include personal information data that uniquely identifies or can be used to identify a specific person. Such personal information data can include demographic data, location-based data, online identifiers, telephone numbers, email addresses, home addresses, date of birth, or any other personal information.

The present disclosure recognizes that the use of such personal information data, in the present technology, can be used to the benefit of users. For example, the personal information data can be used to present items of content to the user based on the user's content consumption history. Accordingly, use of such personal information data enables users to experience improved content recommendations. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of targeted content or playlists recommendations, the present technology can be configured to allow users to select to "opt in" or "opt out" of participation in the collection of personal information data during registration for services or anytime thereafter. In another example, users can select not to provide data for targeted content delivery services. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at a first electronic device in communication with a display device and one or more input devices:

while displaying, via the display device, lyrics for a respective content item, receiving, via the one or more input devices, an input directed to a portion of the lyrics included in the lyrics of the respective content item displayed by the electronic device, the input corresponding to a request to share the respective content item, having a respective portion of the lyrics designated, with a second electronic device; and in response to receiving the input corresponding to the request to share the respective content item with the second electronic device, initiating a process to transmit a communication to the second electronic device, including displaying, via the display, a communication user interface including a message field pre-populated with a representation of the content item;

while displaying the communication user interface including the message field pre-populated with the representation of the content item, receiving, via the one or more input devices, an input selecting an option to send the communication; and in response to detecting the input selecting the option to send the message, sending the communication that includes the representation of the content item, wherein:

in accordance with a determination that the respective portion of the lyrics designated for playback is a first portion, input directed to the communication at the second electronic device initiates playback of the respective content item from a first portion of the respective content item that corresponds to the first portion of the lyrics, and in accordance with a determination that the respective portion of the lyrics designated for playback is a second portion of the lyrics, different than the first portion, input directed to the communication at the second electronic device initiates playback of the respective content item from a second portion of the respective content item, different than the first portion of the respective content item, that corresponds to the second portion of the lyrics.

2. The method of claim 1, wherein the input corresponding to the request to share the respective content item with the second electronic device includes:

a contact detected for longer than a time threshold on the respective portion of the lyrics; and detection of selection of a selectable sharing option displayed in a sharing user interface that is displayed in response to the detection of the contact for longer than the time threshold on the respective portion of the lyrics.

3. The method of claim 2, wherein the sharing user interface further includes a selectable reporting option that is selectable to initiate a process to report an issue with the respective portion of the lyrics.

4. The method of claim 1, wherein the communication is displayed in a communication application on the second electronic device, the communication being displayed with a first selectable option that is selectable to initiate playback, within the communication application, of the respective content item from a respective portion of the respective content item corresponding to the respective portion of the lyrics.

5. The method of claim 4, wherein in accordance with a determination that a user of the second electronic device has entitlement to access an entirety of the respective content item, the playback of the respective content item at the second electronic device continues for a remainder of the respective content item.

6. The method of claim 4, wherein in accordance with a determination that a user of the second electronic device does not have entitlement to access an entirety of the respective content item, the playback of the respective content item at the second electronic device continues for a predetermined amount of time, less than a remainder of the respective content item.

7. The method of claim 4, wherein the communication is displayed in a communication application on the second electronic device, and the communication is selectable to:

display, in a content playback application on the second electronic device, a user interface that displays information about the respective content item, one or more controls for controlling playback of the respective content item in the content playback application, and the lyrics for the respective content item with the respective portion of the lyrics having a current focus.

8. The method of claim 7, wherein:

while the user interface is displayed in the content playback application on the second electronic device and the respective portion of the lyrics for the respective content item has the current focus, selection of a respective control of the one or more controls for initiating playback of the respective content item causes playback of the respective content item, in the content playback application, from a respective portion of the respective content item that corresponds to the respective portion of the lyrics.

9. An electronic device, comprising:

one or more processors;

memory; and one or more programs, wherein the one or more programs are stored in the memory and configured to be executed by the one or more processors, the one or more programs including instructions for:

while displaying, via a display device, lyrics for a respective content item, receiving, via one or more input devices, an input directed to a portion of the lyrics included in the lyrics of the respective content item displayed by the electronic device, the input corresponding to a request to share the respective content item, having a respective portion of the lyrics designated, with a second electronic device; and in response to receiving the input corresponding to the request to share the respective content item with the second electronic device, initiating a process to transmit a communication to the second electronic device, including displaying, via the display, a communication user interface including a message field pre-populated with a representation of the content item;

while displaying the communication user interface including the message field pre-populated with the representation of the content item, receiving, via the one or more input devices, an input selecting an option to send the communication; and in response to detecting the input selecting the option to send the message, sending the communication that includes the representation of the content item, wherein:

in accordance with a determination that the respective portion of the lyrics designated for playback is a first portion of the lyrics, input directed to the communication at the second electronic device initiates playback of the respective content item from a first portion of the respective content item that corresponds to the first portion of the lyrics, and in accordance with a determination that the respective portion of the lyrics designated for playback is a second portion of the lyrics, different than the first portion, input directed to the communication at the second electronic device initiates playback of the respective content item from a second portion of the respective content item, different than the first portion of the respective content item, that corresponds to the second portion of the lyrics.

10. A non-transitory computer readable storage medium storing one or more programs, the one or more programs comprising instructions, which when executed by one or more processors of an electronic device, cause the electronic device to:

while displaying, via a display device, lyrics for a respective content item, receive, via one or more input devices, an input directed to a portion of the lyrics included in the lyrics of the respective content item displayed by the electronic device, the input corresponding to a request to share the respective content item, having a respective portion of the lyrics designated, with a second electronic device; and in response to receiving the input corresponding to the request to share the respective content item with the second electronic device, initiate a process to transmit a communication to the second electronic device, including displaying, via the display, a communication user interface including a message field pre-populated with a representation of the content item;

while displaying the communication user interface including the message field pre-populated with the representation of the content item, receiving, via the one or more input devices, an input selecting an option to send the communication; and in response to detecting the input selecting the option to send the message, sending the communication that includes the representation of the content item, wherein:

in accordance with a determination that the respective portion of the lyrics designated for playback is a first portion of the lyrics, input directed to the communication at the second electronic device initiates playback of the respective content item from a first portion of the respective content item that corresponds to the first portion of the lyrics, and in accordance with a determination that the respective portion of the lyrics designated for playback is a second portion of the lyrics, different than the first portion, input directed to the communication at the second electronic device initiates playback of the respective content item from a second portion of the respective content item, different than the first portion of the respective content item, that corresponds to the second portion of the lyrics.

11. The electronic device of claim 9, wherein the input corresponding to the request to share the respective content item with the second electronic device includes:

a contact detected for longer than a time threshold on the respective portion of the lyrics; and detection of selection of a selectable sharing option displayed in a sharing user interface that is displayed in response to the detection of the contact for longer than the time threshold on the respective portion of the lyrics.

12. The electronic device of claim 11, wherein the sharing user interface further includes a selectable reporting option that is selectable to initiate a process to report an issue with the respective portion of the lyrics.

13. The electronic device of claim 9, wherein the communication is displayed in a communication application on the second electronic device, the communication being displayed with a first selectable option that is selectable to initiate playback, within the communication application, of the respective content item from a respective portion of the respective content item corresponding to the respective portion of the lyrics.

14. The electronic device of claim 13, wherein in accordance with a determination that a user of the second electronic device has entitlement to access an entirety of the respective content item, the playback of the respective content item at the second electronic device continues for a remainder of the respective content item.

15. The electronic device of claim 13, wherein in accordance with a determination that a user of the second electronic device does not have entitlement to access an entirety of the respective content item, the playback of the respective content item at the second electronic device continues for a predetermined amount of time, less than a remainder of the respective content item.

16. The electronic device of claim 13, wherein the communication is displayed in a communication application on the second electronic device, and the communication is selectable to:

display, in a content playback application on the second electronic device, a user interface that displays information about the respective content item, one or more controls for controlling playback of the respective content item in the content playback application, and the lyrics for the respective content item with the respective portion of the lyrics having a current focus.

17. The electronic device of claim 16, wherein:

while the user interface is displayed in the content playback application on the second electronic device and the respective portion of the lyrics for the respective content item has the current focus, selection of a respective control of the one or more controls for initiating playback of the respective content item causes playback of the respective content item, in the content playback application, from a respective portion of the respective content item that corresponds to the respective portion of the lyrics.

18. The non-transitory computer readable storage medium of claim 10, wherein the input corresponding to the request to share the respective content item with the second electronic device includes:

a contact detected for longer than a time threshold on the respective portion of the lyrics; and detection of selection of a selectable sharing option displayed in a sharing user interface that is displayed in response to the detection of the contact for longer than the time threshold on the respective portion of the lyrics.

19. The non-transitory computer readable storage medium of claim 18, wherein the sharing user interface further includes a selectable reporting option that is selectable to initiate a process to report an issue with the respective portion of the lyrics.

20. The non-transitory computer readable storage medium of claim 10, wherein the communication is displayed in a communication application on the second electronic device, the communication being displayed with a first selectable option that is selectable to initiate playback, within the communication application, of the respective content item from a respective portion of the respective content item corresponding to the respective portion of the lyrics.

21. The non-transitory computer readable storage medium of claim 20, wherein in accordance with a determination that a user of the second electronic device has entitlement to access an entirety of the respective content item, the playback of the respective content item at the second electronic device continues for a remainder of the respective content item.

22. The non-transitory computer readable storage medium of claim 20, wherein in accordance with a determination that a user of the second electronic device does not have entitlement to access an entirety of the respective content item, the playback of the respective content item at the second electronic device continues for a predetermined amount of time, less than a remainder of the respective content item.

23. The non-transitory computer readable storage medium of claim 20, wherein the communication is displayed in a communication application on the second electronic device, and the communication is selectable to:

display, in a content playback application on the second electronic device, a user interface that displays information about the respective content item, one or more controls for controlling playback of the respective content item in the content playback application, and the lyrics for the respective content item with the respective portion of the lyrics having a current focus.

24. The non-transitory computer readable storage medium of claim 23, wherein:

while the user interface is displayed in the content playback application on the second electronic device and the respective portion of the lyrics for the respective content item has the current focus, selection of a respective control of the one or more controls for initiating playback of the respective content item causes playback of the respective content item, in the content playback application, from a respective portion of the respective content item that corresponds to the respective portion of the lyrics.

* * * * *